United States Patent [19]
Michelman et al.

[11] Patent Number: 5,255,356
[45] Date of Patent: Oct. 19, 1993

[54] METHOD FOR HIDING AND SHOWING SPREADSHEET CELLS

[75] Inventors: Eric H. Michelman, Saratoga; Devin E. Ben-Hur, Mountain View, both of Calif.

[73] Assignee: Microsoft Corporation, Redmond, Wash.

[21] Appl. No.: 990,409

[22] Filed: Dec. 14, 1992

Related U.S. Application Data

[63] Continuation of Ser. No. 359,678, May 31, 1989, abandoned.

[51] Int. Cl.$^5$ .............................................. G06F 15/62
[52] U.S. Cl. ..................................... 395/148; 395/161
[58] Field of Search ............................... 395/144–149, 395/155–161

[56] References Cited

U.S. PATENT DOCUMENTS 4,803,651  2/1989  Galkowski ........................... 395/500

OTHER PUBLICATIONS

*Using 1-2-3*, Special Edition, QUE Corp., 1987, pp. 12–23, 31, 57–67, 80–87, 101–109, 272–277, 721–722 and 758–764.

"Spreadsheets Stress Connectivity, Graphics" M. Bryan, p. 105, *PC Week*, Feb. 6, 1989.

"SuperCalc5: High-End Power for Low-End PCs" B. Freedman, *PC Week*, Dec. 26, 1988.

"Multidimensional Concept Gains Momentum" M. Bryan, pp. 106–108, *PC Week*, Feb. 6, 1989.

*Primary Examiner*—Heather R. Herndon
*Attorney, Agent, or Firm*—Seed and Berry

[57]  ABSTRACT

A method for hiding and showing spreadsheet cells of a worksheet being displayed on a computer system display means. The hiding and showing is based upon hierarchical relationships among the spreadsheet cells. This technique is implemented by first determining hierarchical relationships among cells based on cell indentation, content, and formulas. A group of contiguous cells having a common hierarchical relationship is then selected and hidden. Totals for the group of cells may then be shown in place of hidden cells. The hidden group of cells may be stored in a memory location other than main memory such as a magnetic or optical disk. The group of cells may then be retrieved from memory and shown on the display means.

25 Claims, 36 Drawing Sheets

|    | A | B | C | D | E | F | G | H |
|----|---|---|---|---|---|---|---|---|
| 1  |   |   |   |   |   |   |   |   |
| 2  |   |   |   |   | Office Budget for 1989 |   |   |   |
| 3  |   |   |   |   |   |   |   |   |
| 4  |   |   |   |   |   |   |   |   |
| 5  |   |   |   |   | JAN | FEB | MAR | APR |
| 6  | Monthly Expenses |   |   |   |   |   |   |   |
| 7  |   | Payroll |   |   |   |   |   |   |
| 8  |   |   | Holly |   | 4,100.00 | 4,100.00 | 4,100.00 | 4,100.00 |
| 9  |   |   | Jim |   | 4,100.00 | 4,100.00 | 4,100.00 | 4,100.00 |
| 10 |   |   | Stan |   | 1,732.00 | 1,732.00 | 1,732.00 | 1,732.00 |
| 11 |   |   | Audrey |   | 1,840.00 | 1,840.00 | 1,840.00 | 1,840.00 |
| 12 |   |   |   |   | ——— | ——— | ——— | ——— |
| 13 |   | Total Payroll |   |   | 11,772.00 | 11,772.00 | 11,772.00 | 11,772.00 |
| 14 |   | Premises |   |   |   |   |   |   |
| 15 |   |   | Rent |   | 900.00 | 900.00 | 900.00 | 900.00 |
| 16 |   |   | Utilities |   | 125.00 | 125.00 | 100.00 | 100.00 |
| 17 |   |   | Maintenance |   | 50.00 | 50.00 | 50.00 | 50.00 |
| 18 |   |   |   |   | ——— | ——— | ——— | ——— |
| 19 |   | Total Premises |   |   | 1,075.00 | 1,075.00 | 1,050.00 | 1,050.00 |
| 20 |   | Equipment |   |   |   |   |   |   |

*Figure 1A*

|   | A | B | C | D | E | F | G | H |
|---|---|---|---|---|---|---|---|---|
| 1 |   |   |   |   |   |   |   |   |
| 2 |   |   |   |   |   | Office Budget for 1989 |   |   |
| 3 |   |   |   |   |   |   |   |   |
| 4 |   |   |   |   | JAN | FEB | MAR | APR |
| 5 |   |   |   |   |   |   |   |   |
| 6 | Monthly Expenses |   |   |   |   |   |   |   |
| 7+ | Payroll |   |   |   | 11,772.00 | 11,772.00 | 11,772.00 | 11,772.00 |
| 8 | Premises |   |   |   |   |   |   |   |
| 9 |   | Rent |   |   | 900.00 | 900.00 | 900.00 | 900.00 |
| 10 |   | Utilities |   |   | 125.00 | 125.00 | 100.00 | 100.00 |
| 11 |   | Maintenance |   |   | 50.00 | 50.00 | 50.00 | 50.00 |
| 12 |   |   |   |   | ---- | ---- | ---- | ---- |
| 13 | Total Premises |   |   |   | 1,075.00 | 1,075.00 | 1,050.00 | 1,050.00 |
| 14 | Equipment |   |   |   |   |   |   |   |
| 15 |   | Acquisition |   |   | 200.00 | 200.00 | 200.00 | 200.00 |
| 16 |   | Depreciation |   |   | 220.00 | 220.00 | 220.00 | 220.00 |
| 17 |   | Maintenance |   |   | 25.00 | 25.00 | 25.00 | 25.00 |
| 18 |   |   |   |   | ---- | ---- | ---- | ---- |
| 19 | Total Equipment |   |   |   | 445.00 | 445.00 | 445.00 | 445.00 |
| 20 | Travel Expenses |   |   |   |   |   |   |   |

*Figure 1B*

|   | A | B | C | D | E | F | G | H |
|---|---|---|---|---|---|---|---|---|
| 1 |   |   |   |   |   |   |   |   |
| 2 |   |   |   |   | Office Budget for 1989 |   |   |   |
| 3 |   |   |   |   |   |   |   |   |
| 4 |   |   |   |   | JAN | FEB | MAR | APR |
| 5 |   |   |   |   |   |   |   |   |
| 6 | + Monthly Expenses |   |   |   |   |   |   |   |
| 7 |   |   |   |   | 13,841.00 | 13,841.00 | 13,816.00 | 13,816.00 |
| 8 |   |   |   |   |   |   |   |   |
| 9 |   |   |   |   |   |   |   |   |
| 10 |   |   |   |   |   |   |   |   |
| 11 |   |   |   |   |   |   |   |   |
| 12 |   |   |   |   |   |   |   |   |
| 13 |   |   |   |   |   |   |   |   |
| 14 |   |   |   |   |   |   |   |   |
| 15 |   |   |   |   |   |   |   |   |
| 16 |   |   |   |   |   |   |   |   |
| 17 |   |   |   |   |   |   |   |   |
| 18 |   |   |   |   |   |   |   |   |
| 19 |   |   |   |   |   |   |   |   |
| 20 |   |   |   |   |   |   |   |   |

*Figure 1C*

|   | A | B | C | D | E | F | G | H |
|---|---|---|---|---|---|---|---|---|
| 1 | | | | | | | | |
| 2 | | | | Office Budget for 1989 | | | | |
| 3 | | | | | | | | |
| 4 | | | | | JAN | FEB | MAR | APR |
| 5 | | | | | | | | |
| 6 | Monthly Expenses | | | | | | | |
| 7 | + | Payroll | | | 11,772.00 | 11,772.00 | 11,772.00 | 11,772.00 |
| 8 | + | Premises | | | 1,075.00 | 1,075.00 | 1,050.00 | 1,050.00 |
| 9 | + | Equipment | | | 445.00 | 445.00 | 445.00 | 445.00 |
| 10 | + | Travel Expenses | | | 440.00 | 440.00 | 440.00 | 440.00 |
| 11 | | Entertainment | | | 25.00 | 25.00 | 25.00 | 25.00 |
| 12 | + | Misc. Expenses | | | 42.00 | 42.00 | 42.00 | 42.00 |
| 13 | | | | | ======== | ======== | ======== | ======== |
| 14 | Total Monthly Expenses | | | | 13,799.00 | 13,799.00 | 13,774.00 | 13,774.00 |
| 15 | | | | | | | | |
| 16 | | | | | | | | |
| 17 | | | | | | | | |
| 18 | | | | | | | | |
| 19 | | | | | | | | |
| 20 | | | | | | | | |

*Figure 1D*

|   | A | B | C | D | E | F | G | H |
|---|---|---|---|---|---|---|---|---|
| 1 | | | | | | | | |
| 2 | | | | | Office Budget for 1989 | | | |
| 3 | | | | | | | | |
| 4 | | | | | 1Q | 2Q | 3Q | 4Q |
| 5 | | | | | | | | |
| 6 | Monthly Expenses | | | | | | | |
| 7 + | Payroll | | | | 35,316.00 | 35,316.00 | 35,316.00 | 35,316.00 |
| 8 + | Premises | | | | 3,200.00 | 3,125.00 | 3,100.00 | 3,175.00 |
| 9 + | Equipment | | | | 1,335.00 | 1,335.00 | 1,335.00 | 1,335.00 |
| 10 + | Travel Expenses | | | | 1,320.00 | 1,320.00 | 1,320.00 | 1,320.00 |
| 11 | Entertainment | | | | 75.00 | 75.00 | 75.00 | 75.00 |
| 12 + | Misc. Expenses | | | | 126.00 | 126.00 | 126.00 | 126.00 |
| 13 | | | | | ======== | ======== | ======== | ======== |
| 14 | Total Monthly Expenses | | | | 41,372.00 | 41,297.00 | 41,272.00 | 41,347.00 |
| 15 | | | | | | | | |
| 16 | | | | | | | | |
| 17 | | | | | | | | |
| 18 | | | | | | | | |
| 19 | | | | | | | | |
| 20 | | | | | | | | |

*Figure 1E*

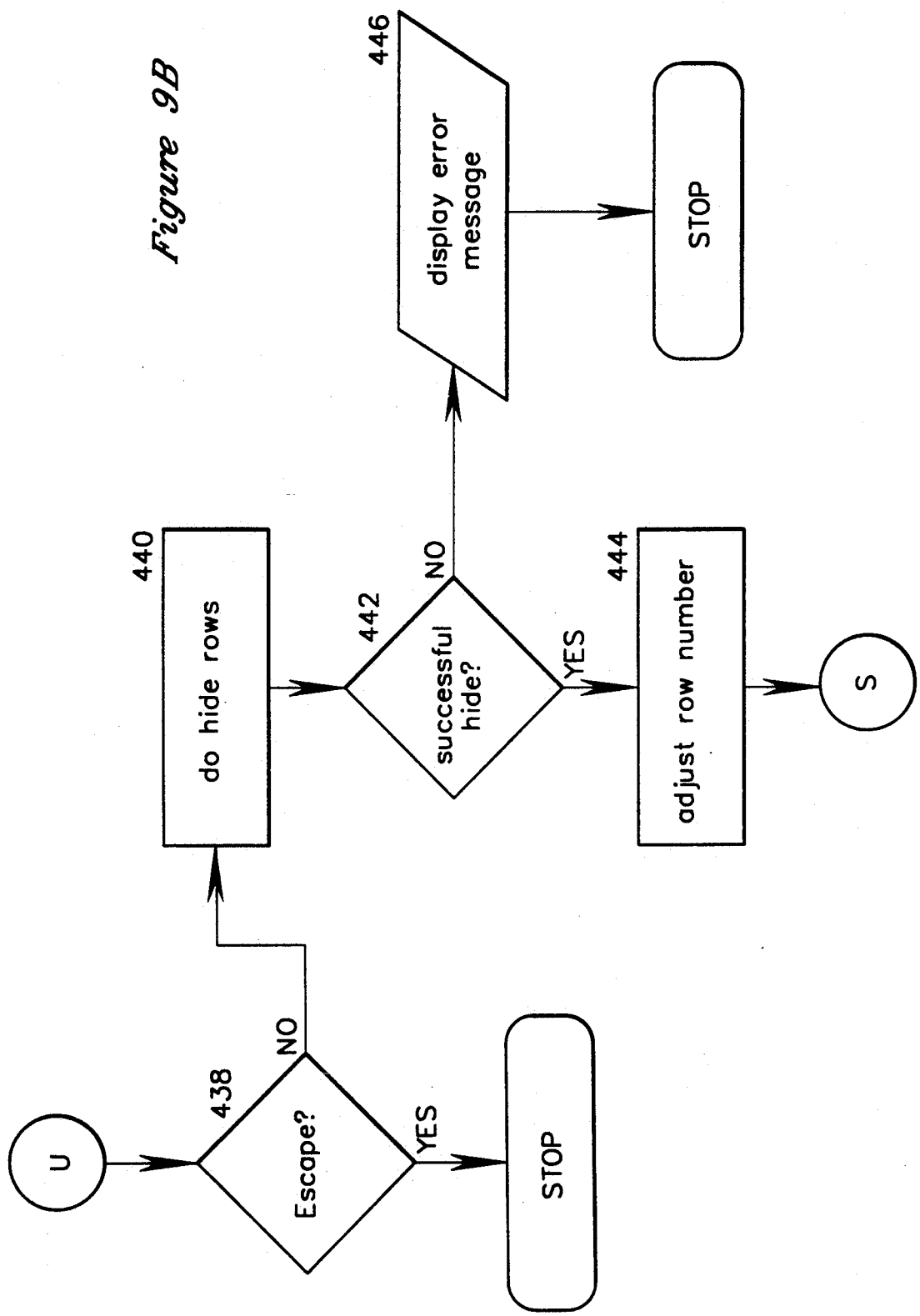

METHOD FOR HIDING AND SHOWING SPREADSHEET CELLS

This application is a continuation of U.S. application Ser. No. 07/359,678 filed on May 31, 1989, now abandoned.

BACKGROUND OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to a method of determining hierarchical relationships among cells in a spreadsheet and more particularly a method of hiding and showing cells in a spreadsheet based on hierarchical relationships among the cells.

DESCRIPTION OF THE PRIOR ART

The most common software application used on personal computers in business is the spreadsheet. Spreadsheets are commonly used for a wide variety of applications. These include financial applications such as budgets, forecasts, income statements and balance sheets; database applications such as customer lists, sales records, personnel files, and equipment inventories. Other applications include graphics and even word processing.

What makes spreadsheet software so useful and widespread is its simplicity and versatility. It offers a raw two (or more) dimensional grid of cells which the user can utilize as desired. Numbers and/or words can be entered into any of the cells as desired. A wide variety of operations are then available for use with this data, such as totaling, sorting, graphing, copying, moving, word justification, and more. This combination of free-form data entry and then extensive commands for operating on the data is a powerful combination which allows spreadsheet software to be used effectively in a wide range of applications.

However, this flexibility also has drawbacks. By being flexible enough for use in a wide range of applications, spreadsheet software is more limited than necessary for any one application.

Three important limitations of spreadsheet software exist in financial applications including (1) spreadsheet data is limited to RAM which limits the size of the worksheets that users may operate; (2) large worksheets become unwieldy such that it is hard to create summary views of the worksheet for viewing, printing, or graphing; and (3) the operations offered by the spreadsheet software are ignorant of the structure inherent in financial worksheets (i.e. categories and time periods). These three limitations are discussed in more detail below.

A key limitation in all of the popular spreadsheet software today is that the spreadsheet data must be held in free RAM (i.e. the RAM that is left over after the operating system, the spreadsheet software, and any co-resident applications are loaded) while the worksheet is being used. In contrast to other applications such as databases and some word processors, spreadsheet software does not take advantage of disk storage to hold data that is being operated on. This is a severe limitation for users wanting to work with large spreadsheets. Currently, the only solution for users desiring more spreadsheet data space is to purchase more RAM, and then using special-purpose hardware or software called expanded memory to expand beyond DOS's 650K-byte memory limit.

It is the flexibility inherent in spreadsheets which requires spreadsheet data to be stored in RAM during the operation of the spreadsheet software. Because any cell can be viewed at any time and any cell can refer to any other cell in a formula, the spreadsheet software must keep all the cell contents in RAM, where the contents of each cell can be quickly accessed. Storing cell contents on disk would slow display and recalculation down to a level which users would find unacceptable.

The uniformity of spreadsheets (i.e. a homogenous grid of rows and columns), which contributes greatly to the flexibility and ease-of-use of the spreadsheet, becomes a negative feature as the users' worksheets become large. With many rows and columns, it becomes difficult and time-consuming to find items of interest, to move around the worksheet, to rearrange it, to comprehend the data, to display or print summary data, and so forth. Also, recalculation time shows down as the spreadsheet gets larger.

The generality of spreadsheet software leads to the third limitation in working with financial worksheets, which is the difficulty in manipulating the worksheet. There is a certain structure to financial worksheet, which relates to the information contained within it and common operations performed on the information. Popular spreadsheet software is ignorant of this structure. This results in simple operations taking much more time than would be necessary if this financial worksheet structure or other application structures were utilized in spreadsheet functions.

SUMMARY OF THE INVENTION

The present invention provides a method for hiding and showing spreadsheet cells of a worksheet being displayed on a computer system display means. The hiding and showing is based upon hierarchical relationships among the spreadsheet cells. This technique is implemented by first determining hierarchical relationships among cells based on cell indentation, content, and formulas. A group of contiguous cells having a common hierarchical relationship is then selected and hidden. Totals for the group of cells may then be shown in place of hidden cells. The hidden group of cells may be stored in a memory location other than main memory such as a magnetic or optical disk. The group of cells may then be retrieved from memory and shown on the display means.

As a result of this technique, the user can increase the size of the worksheet without being constrained by the size of the computer main memory. In addition, the user can easily create a summary worksheet without duplication or loss of data while also preserving the structure of the worksheet. In a smaller or summary worksheet, it is easier to find items of interest and it is easier to understand and absorb the contents of the worksheet. Furthermore, this technique allows the user to more easily create reports and graphs with varying levels of summary or detail.

A further understanding of the nature and advantages of the present invention can be realized by reference to the remaining portions of the specification and the attached drawings.

BRIEF DESCRIPTION OF THE DRAWINGS

FIGS. 1a-1e are screen displays of a budget worksheet;

DETAILED DESCRIPTION OF THE PREFERRED EMBODIMENTS

User View

Figure 2A:
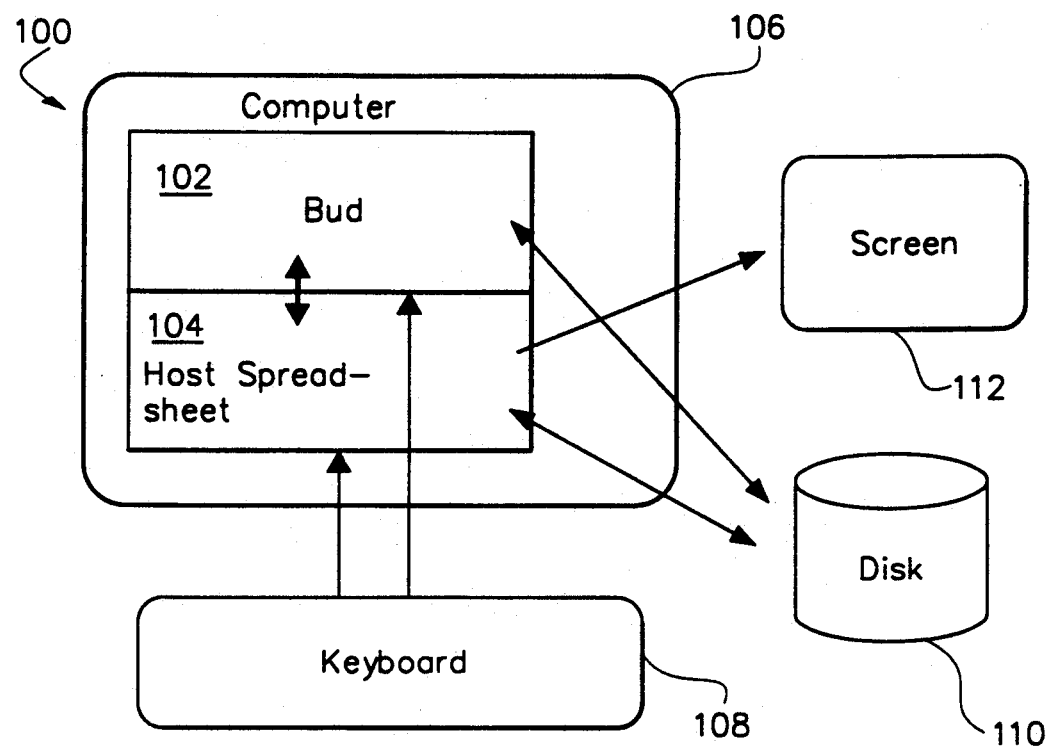
FIGS. 2a and 2b are block diagrams of a computer system utilizing first and second embodiments of the invention.

A first preferred embodiment of the present invention is a technique for showing and hiding sections of the worksheet corresponding to different hierarchies within the worksheet. This process referred to is hereinafter referred to as spreadsheet outlining. By showing or hiding different levels of detail and totals within the worksheet, the user can easily create different summary views of the worksheet, all within the same single worksheet. The user may hide rows to create a summary view by row category and/or hide columns to create a summary view by time period. This is much simpler, easier, faster, and reliable than creating multiple versions with formulas and links between versions. Similarly, in a three dimensional spreadsheet, the user may hide across the third dimension (and so forth for an n-dimensional spreadsheet).

FIG. 1a shows a screen displaying a portion of a budget worksheet. The user may hide a portion of the budget such as the detail rows under Payroll as shown in FIG. 1b. The user may hide the entire Monthly Expenses category rows as Shown in FIG. 1c or several portions of the Monthly Expenses category rows as shown in FIG. 1d. In addition, the user may hide or compress the monthly totals columns as shown in FIG. 1e.

By hiding sections of a worksheet, then showing sections of interest at a time, the user works with a smaller worksheet. As a result, it is easier to find items of interest, the worksheet is easier to understand and absorb, summary reports can be printed directly from the displayed worksheet, and the worksheet may recalculate faster.

In the first embodiment, hidden data may be moved off the worksheet. It can be moved to a variety of places, including to a disk drive, to an unused portion of the spreadsheet, or to other storage devices. Alternative embodiments may also move the data to RAM or simply suppress the display of the data without moving it.

When a category is hidden, the totals for that category remain on the worksheet. Typically, a financial worksheet will have a row with a category label, followed by detail lines, followed by a total line for that category, (e.g., see Payroll in FIG. 1a).

When hiding Payroll in FIG. 1a, the first embodiment moves the detail rows (Holly, Jim, Stan, Audrey) and the overscore out of the worksheet. If the data is being moved out of the spreadsheet entirely (e.g. to disk) and the total line contains formulas to calculate the totals, the first embodiment records the total formulas and replaces the total formulas with just the total numbers themselves. The total numbers are then moved up to the category label row (next to Payroll). The total label ("Total Payroll") is the moved off the worksheet. The result is shown in FIG. 1b. When the hidden data is later reshown, the process is reversed and the total formulas are reinserted. When hiding columns to show only the totals of higher-level time periods (e.g. hiding months to show only quarter and year totlas), if the totals were not already present in the worksheet, the first embodiment calculates them and then treats them as if they were. Alternative embodiments may also calculate totals for rows.

Moving the hidden data to a disk drive or other storage device provides the benefit of freeing the RAM that was used for that data, releasing it for use by other data. This allows the worksheet to grow beyond the size of RAM. That is, hidden portions of the worksheet reside on disk, while the un-hidden portions remain in RAM. To view the portion on disk, the user requests that the hidden portion be "shown". This has the effect of moving the hidden portion from disk to RAM for reinsertion in the spreadsheet. If there is not enough RAM to hold the data to be shown, the user is prompted to select another category of data to be hidden on disk.

It is Spreadsheet Outlining which allows portions of the worksheet to be moved to disk. The reason it is not done generally with spreadsheets is that they do not have enough structure to make intelligent decisions about which data can be moved to disk without being needed for display or formula recalculation. However, implicit in Spreadsheet Outlining is knowledge about which data is to be viewed and which is to be hidden at any given time. This removes the need to keep the data in the spreadsheet for display purposes. And when data is hidden, Spreadsheet Outlining replaces the total formulas referring to the hidden data with just the total numbers. This can be done because with the data hidden it cannot be changed and therefore the totals will not change until the data is re-shown. This removes the need to keep the data in the spreadsheet for formula recalculation.

Spreadsheet Outlining has additional capabilities for manipulating financial worksheets. A re-organization facility allows the user to point to a category title, point to where it should be put in the worksheet structure, and then have it automatically moved to the indicated place. All subsidiary rows are moved with the category title and no further spreadsheet operations such as inserting or deleting blank rows are necessary.

Operational View

The first embodiment exists within the context of an Electronic Spreadsheet (initially Lotus Development Corporation's 1-2-3). Such a spreadsheet is characterized by the ability to store data (numbers, text-labels, formulas) in cells organized in a two dimensional matrix in memory (a spreadsheet). In the existing implementation, the host spreadsheet program maintains and displays the data, and the first embodiment is responsible for extending the host's command set and functionality to implement outlining and storage of hidden data on disk. Alternatively, the outlining and storage of hidden data on disk could be integrated with the spreadsheet program to create a second preferred embodiment offering all these functions.

FIG. 2a is a block diagram showing the first embodiment within a computer system 100. The first embodiment (hereinafter referred to as Bud) 102 resides with a host spreadsheet program 104 in a computer 106. Both the first embodiment (Bud) and the host handle communications from a keyboard 108 and a disk 110. However, only the host handles communications to a display screen 112.

Figure 2B:
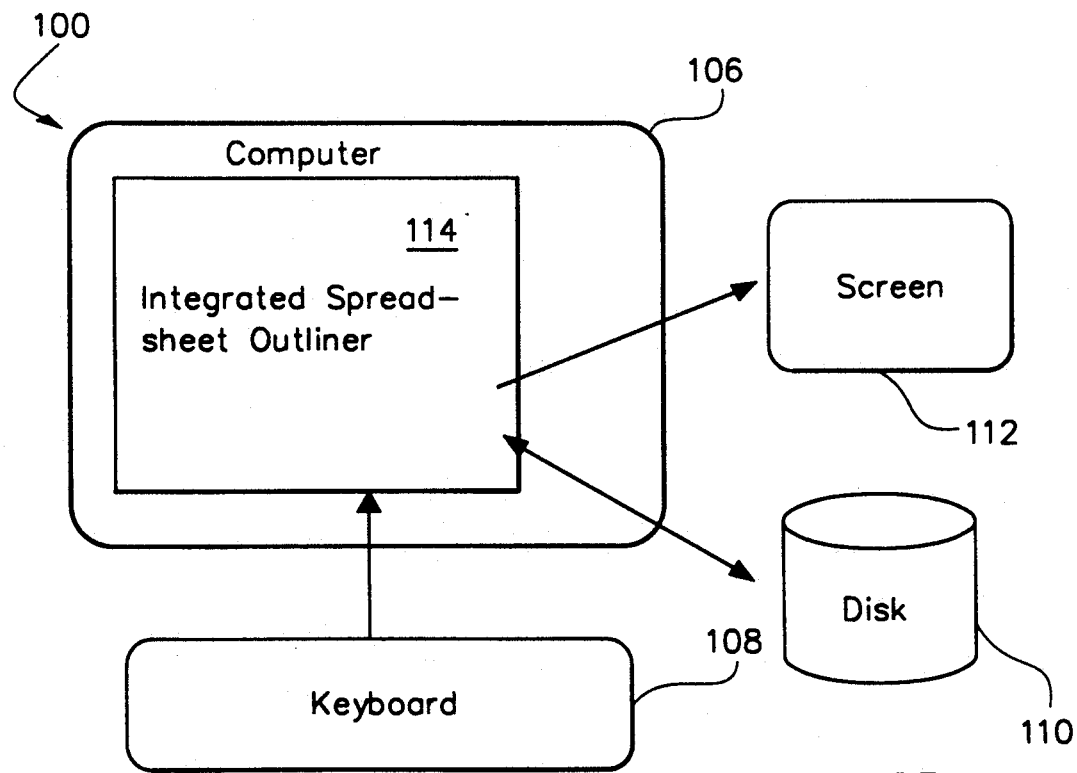

FIG. 2b is a block diagram showing the second embodiment within computer system 100. The second embodiment is an Integrated Spreadsheet Outliner 114 having all the functions of the first embodiment and the host spreadsheet program described above. However, there are efficiencies of implementation by combining the two programs.

General Functionality

The functionality involved is the ability to analyze data on the spreadsheet in order to discover hierarchical organizations of data which can then be manipulated so as to give the appearance of hiding and showing groupings and sub-groupings of data. Data manipulation consists of combinations of: moving data to/from remote regions of the spreadsheet, moving data to/from secondary storage media (typically magnetic disk drives), setting hidden column attributes, and introducing new data representing summary information calculated from the original data.

BUD is implemented as an add-in product for Lotus 123. In this environment the first embodiment receives control at several points. The user may invoke Bud by pressing a certain key sequence. This causes a routing to display a menu allowing the user to select an action such as hiding rows, showing rows, or setting the column detail display level. These commands will then be dispatched to the appropriate routines.

Figure 3A:
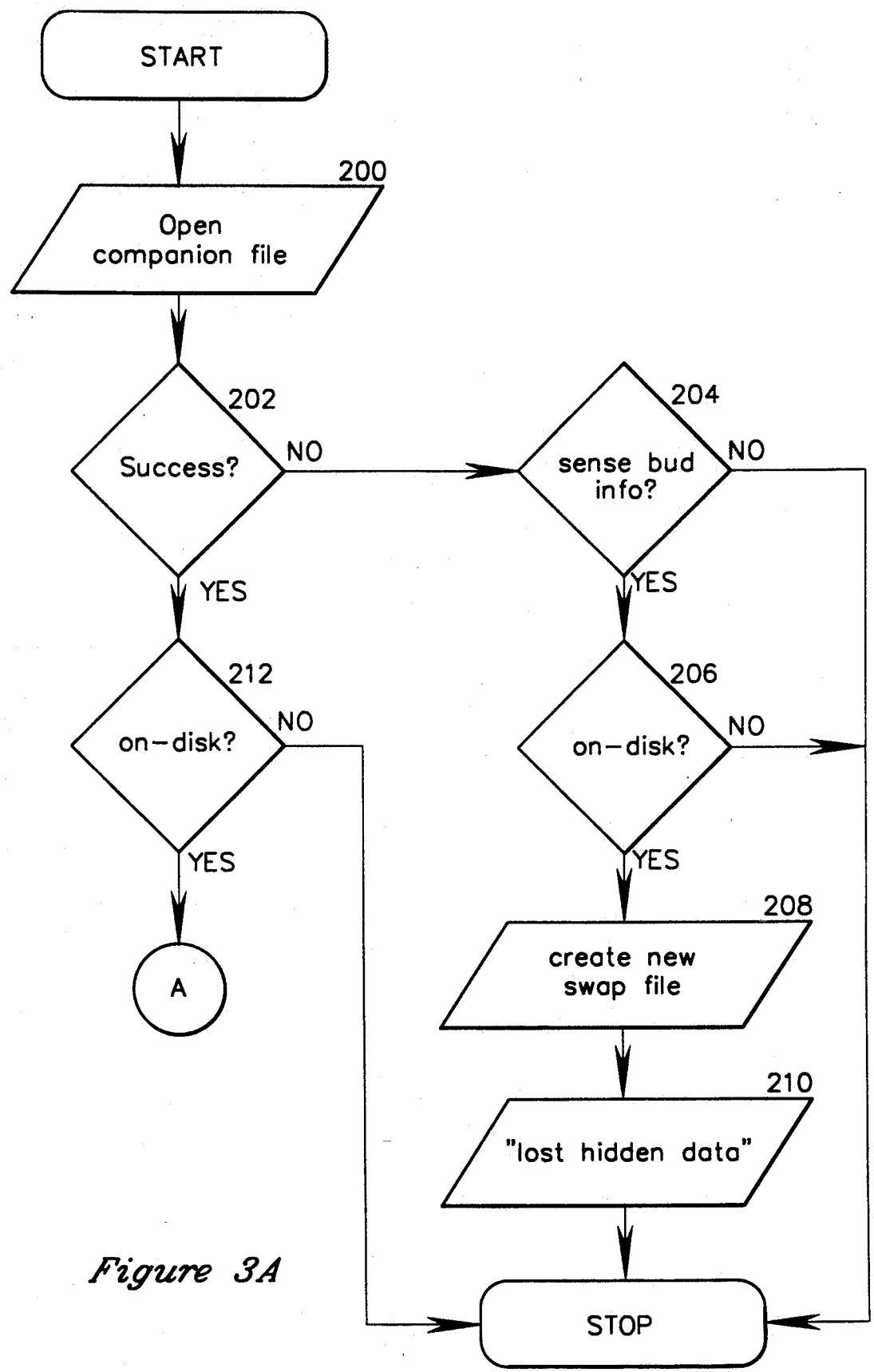
FIGS. 3a-9d are flowcharts showing the operation of the first embodiment.
Figure 3B:
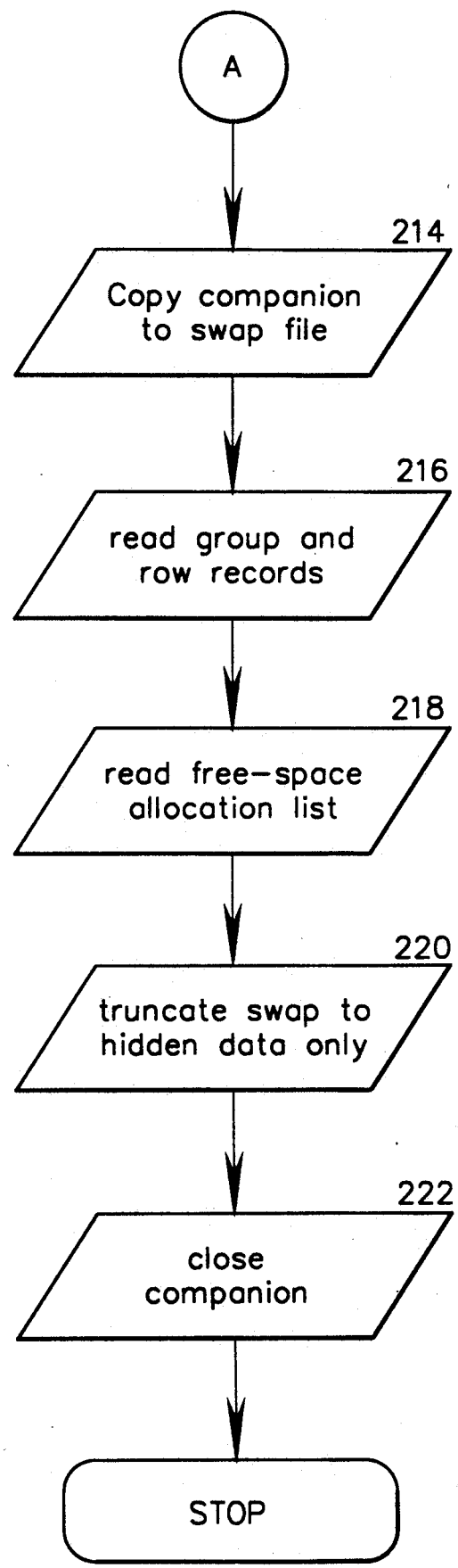

FIGS. 3a and 3b show the process when a previously saved worksheet file is loaded by the host spreadsheet. Bud will first open a previously saved companion file (step 200). The companion file has the same name as the worksheet file, but with a different extension (.bud). If there is no companion file (step 202), Bud will examine the sheet for Bud specific information (Step 204). If tag formulas indicating hidden rows stored to disk are detected (step 206), Bud will initialize a swap file (step 208) and display a "lost hidden data" message (step 210). If the file is found (step 202), and there is on-disk storage (step 212), Bud will copy the companion file to a swap file (step 214), read the linkage information (step 216), and free list information (step 218), and truncate the swap file to hidden data (step 220), before closing the companion file (step 222).

Figure 4:
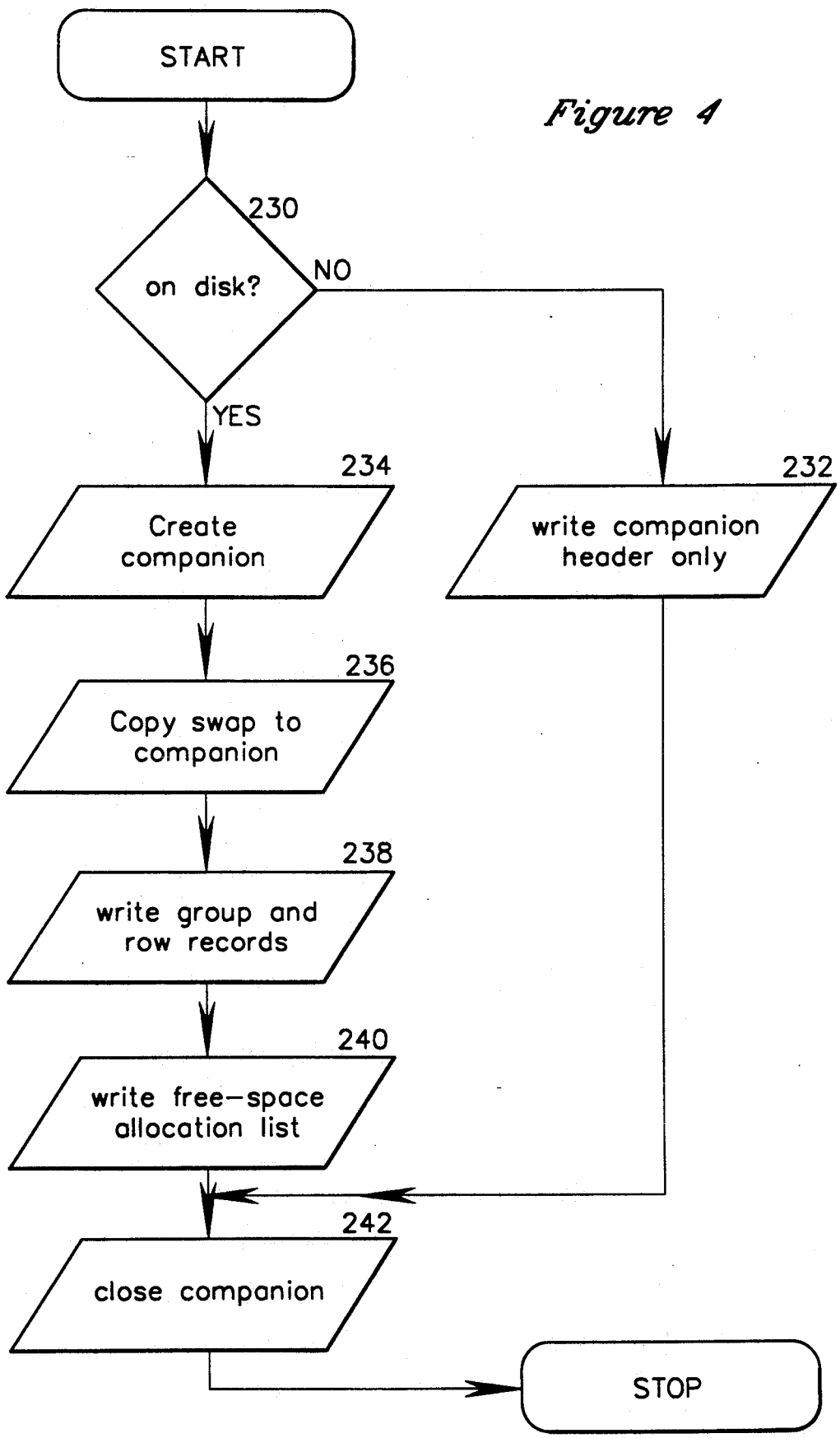

FIG. 4 shows the process when a worksheet file is saved by the host spreadsheet. Bud will be notified so that it may save a companion file. If on sheet storage is used (step 230), Bud only writes some basic header information with house keeping into the companion file (step 232). If on-disk storage is used (step 230), the swap file is copied to the companion (steps 234 and 236), linkage information and free-list information is written (steps 238 and 240) before closing the companion file (step 242).

Determining Row Hierarchy

Hierarchical groupings are determined in two distinct ways, one for each axis of the spreadsheet matrix.

A row group consists of a "parent" row, subsidiary "children" rows below it, and possibly a total row below the children. A row group is determined primarily from the relative indentation of data within a row. A row's indentation is determined by scanning from left to right until a non-blank cell is encountered. If this cell is textual, then the number of leading spaces in the text is considered low-order indentation information. That is, a whole column of indentation is always more significant than any number of leading spaces. Rows of greater indentation are considered to be "owned" or grouped under preceding rows of lesser indentation. If no indentation is used or it is ambiguous, labels and formulas are also examined. If line has a label beginning with the literals "Tot" or "sub" and ends with the literal that comprises the parent row's row header (the label in the leftmost cell in the row), then that row is a total line which concludes the group. Similarly, if a row is encountered which contains a formula totaling from the parent row to that row, it is considered to be a total line for that group and therefore concludes the group.

Figure 5A:
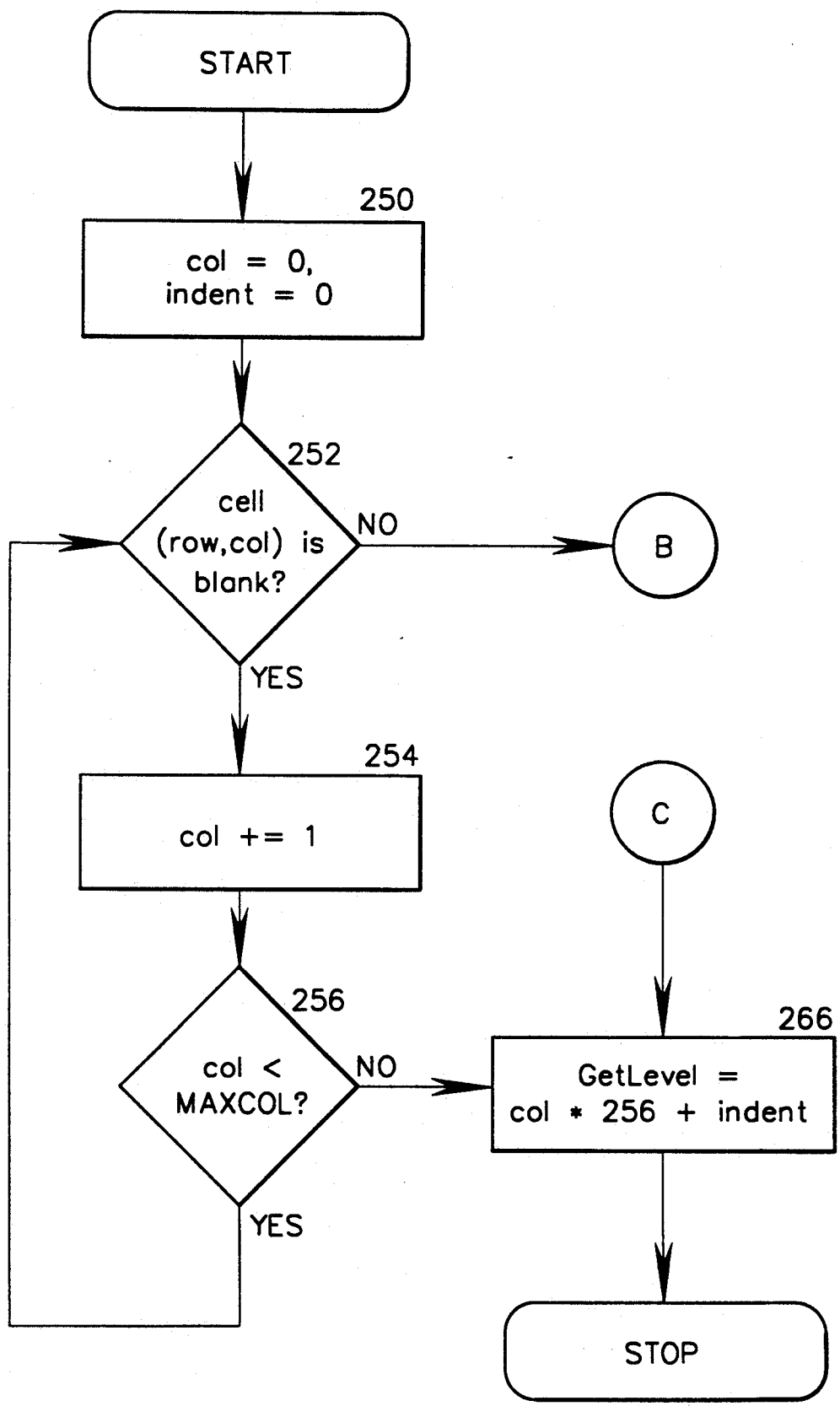
Figure 5B:
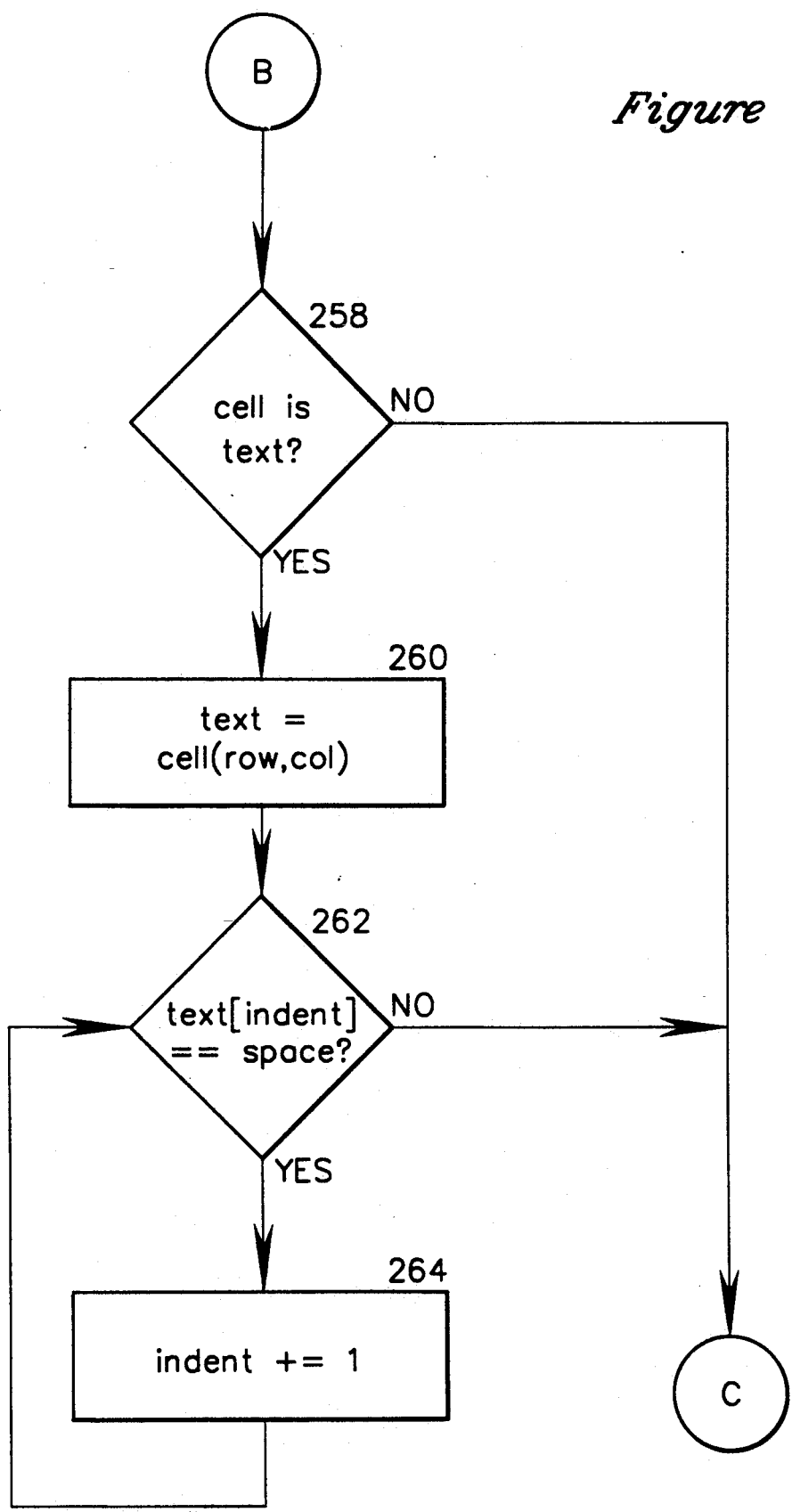
Figure 6A:
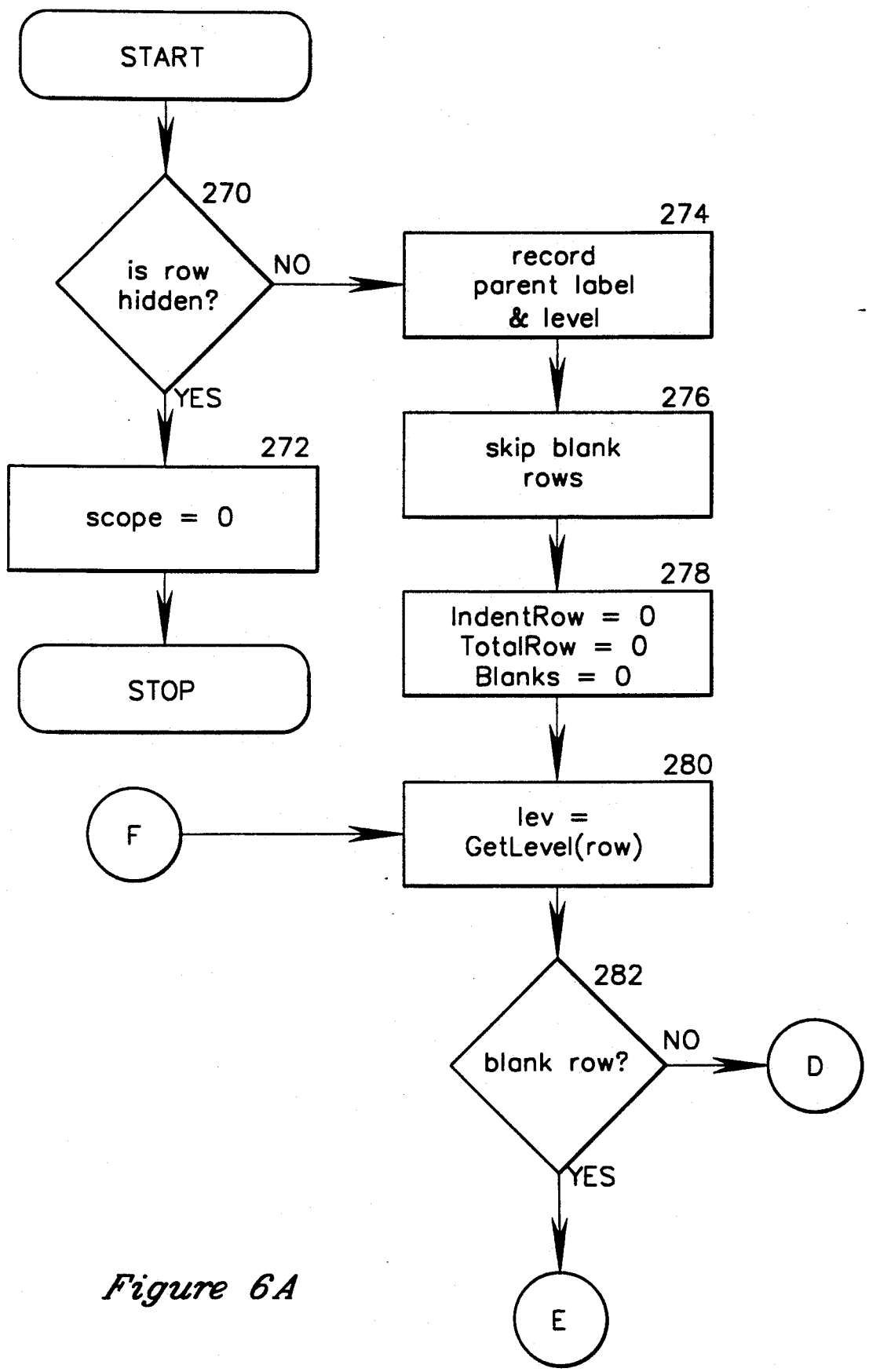
Figure 6B:
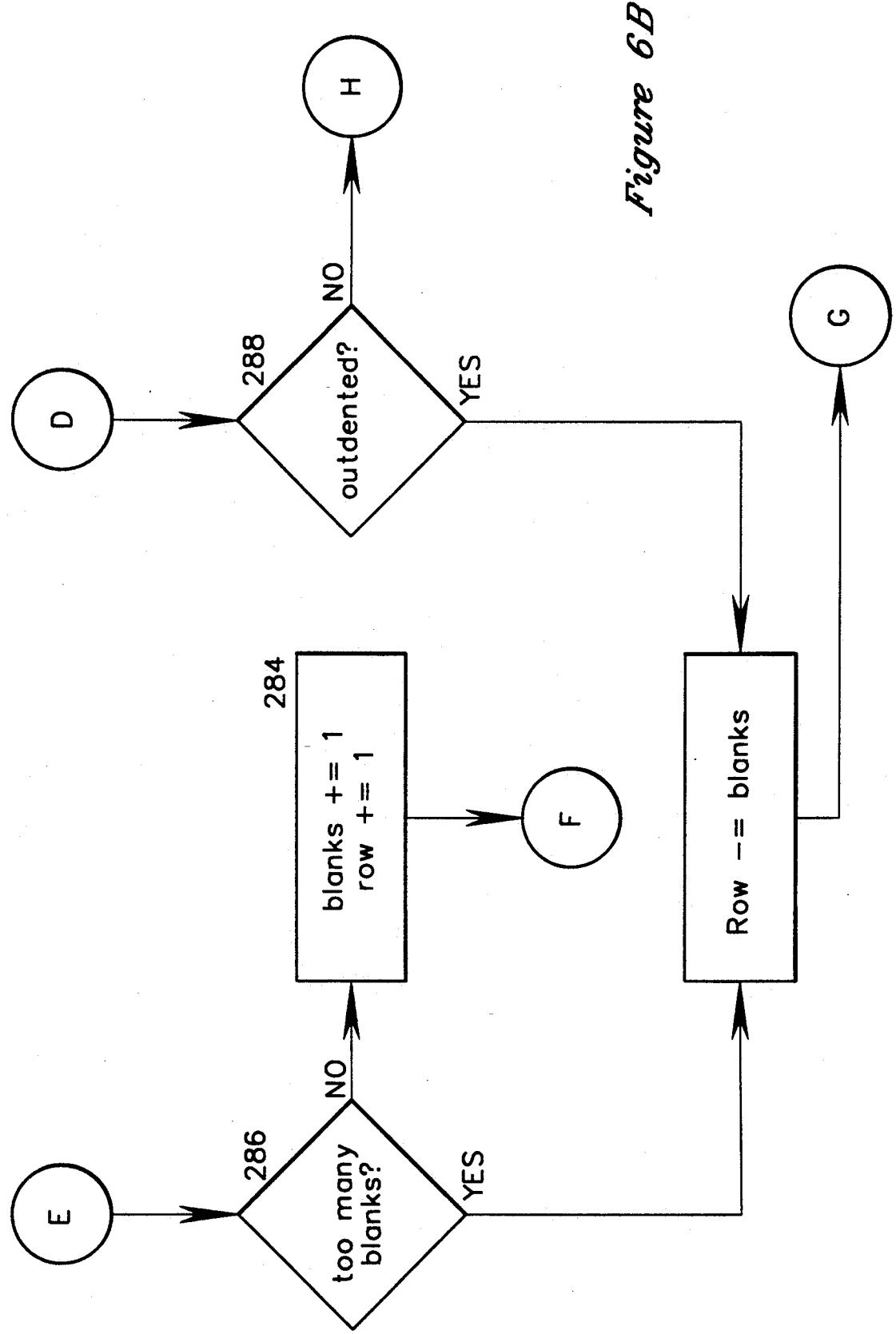
Figure 6C:
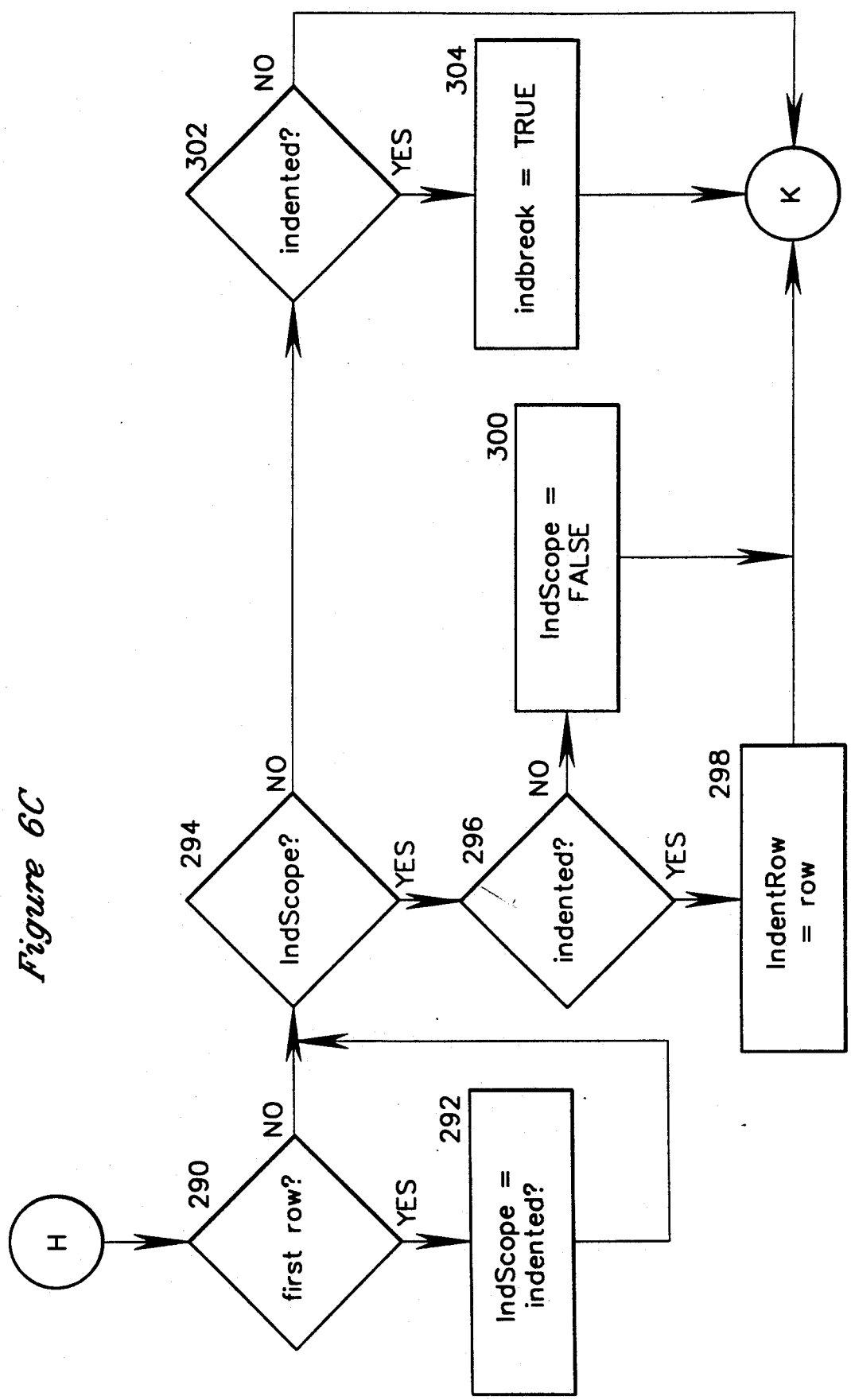
Figure 6D:
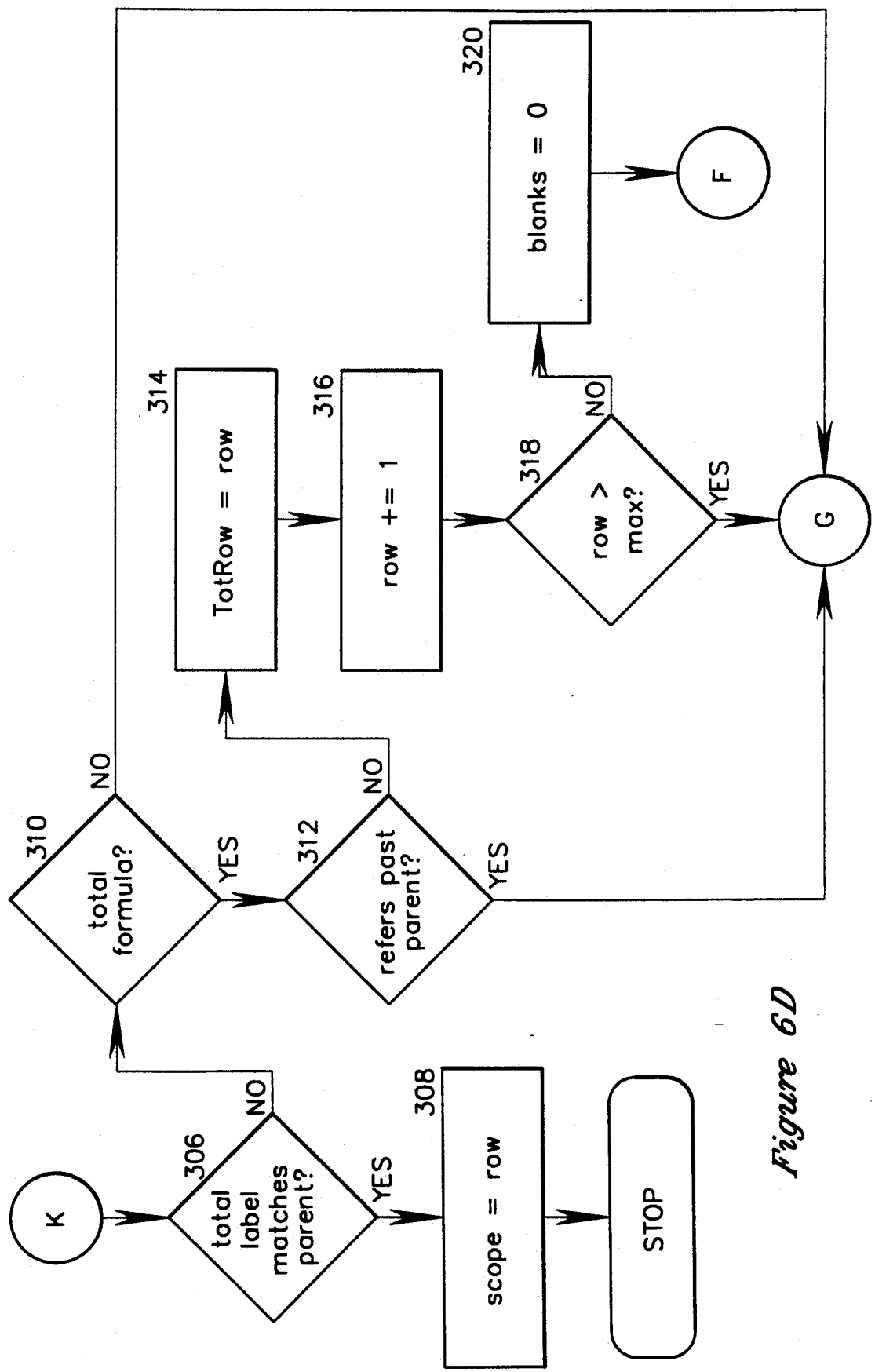
Figure 6E:
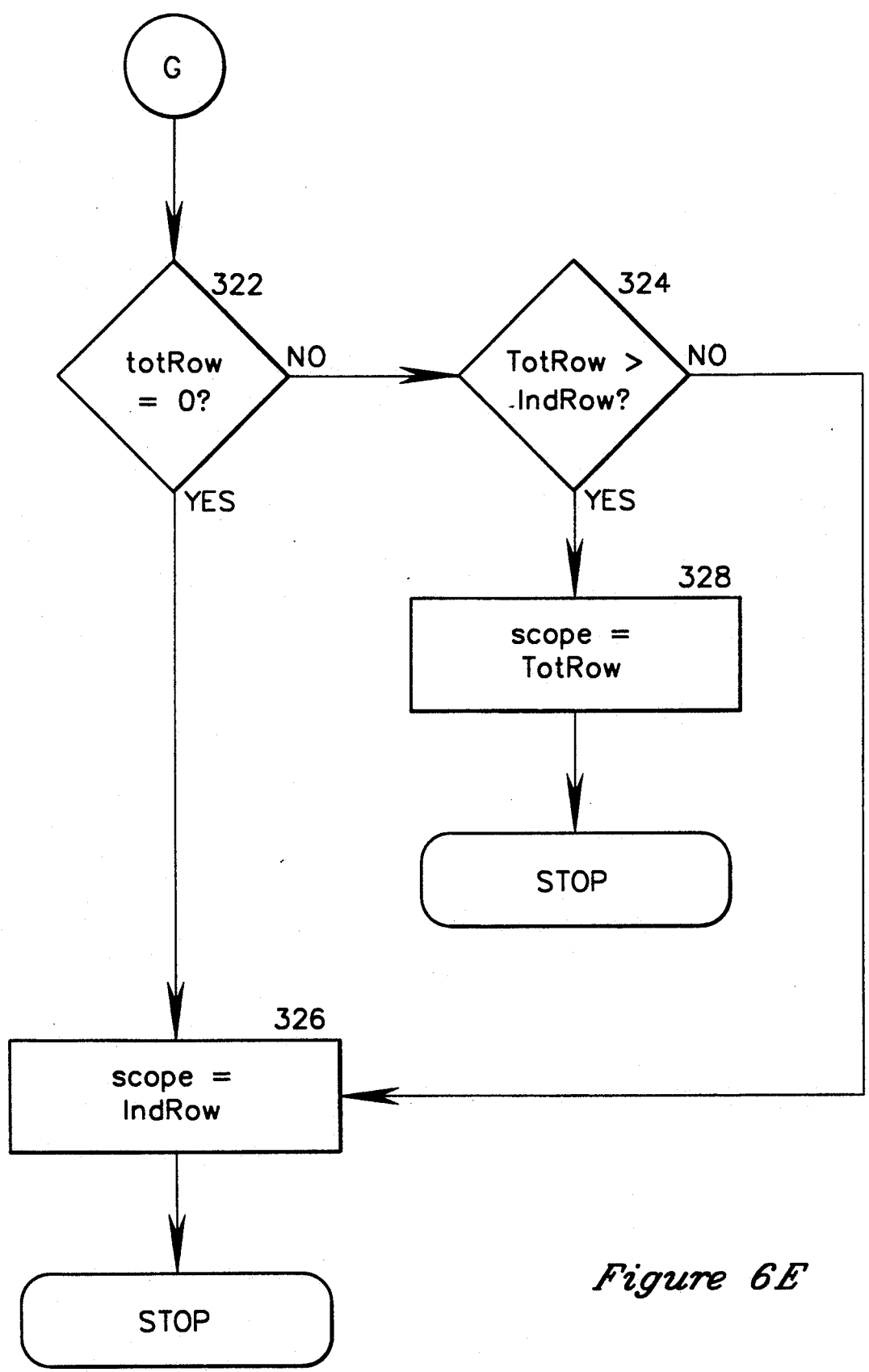
Figure 7A:
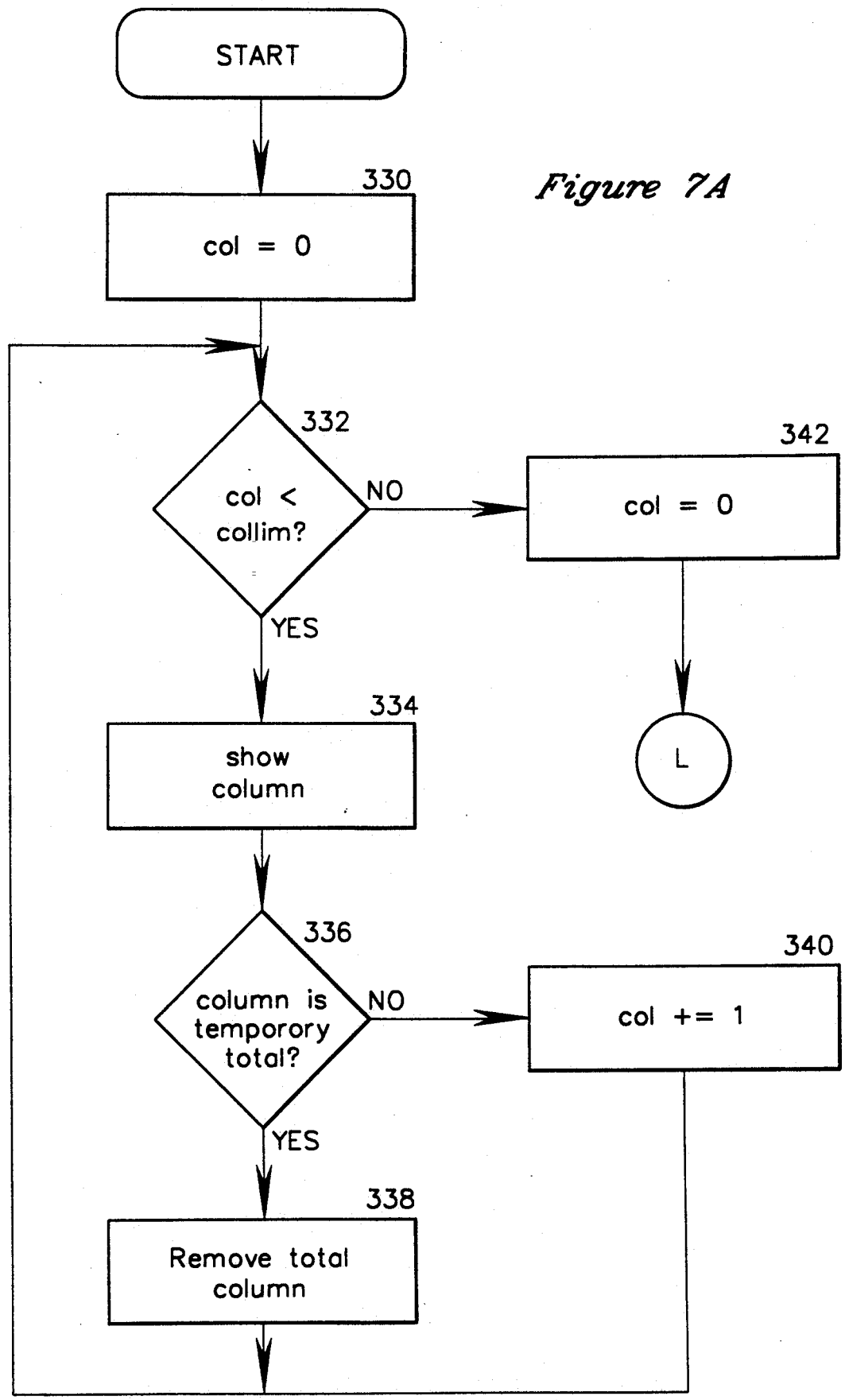
Figure 7B:
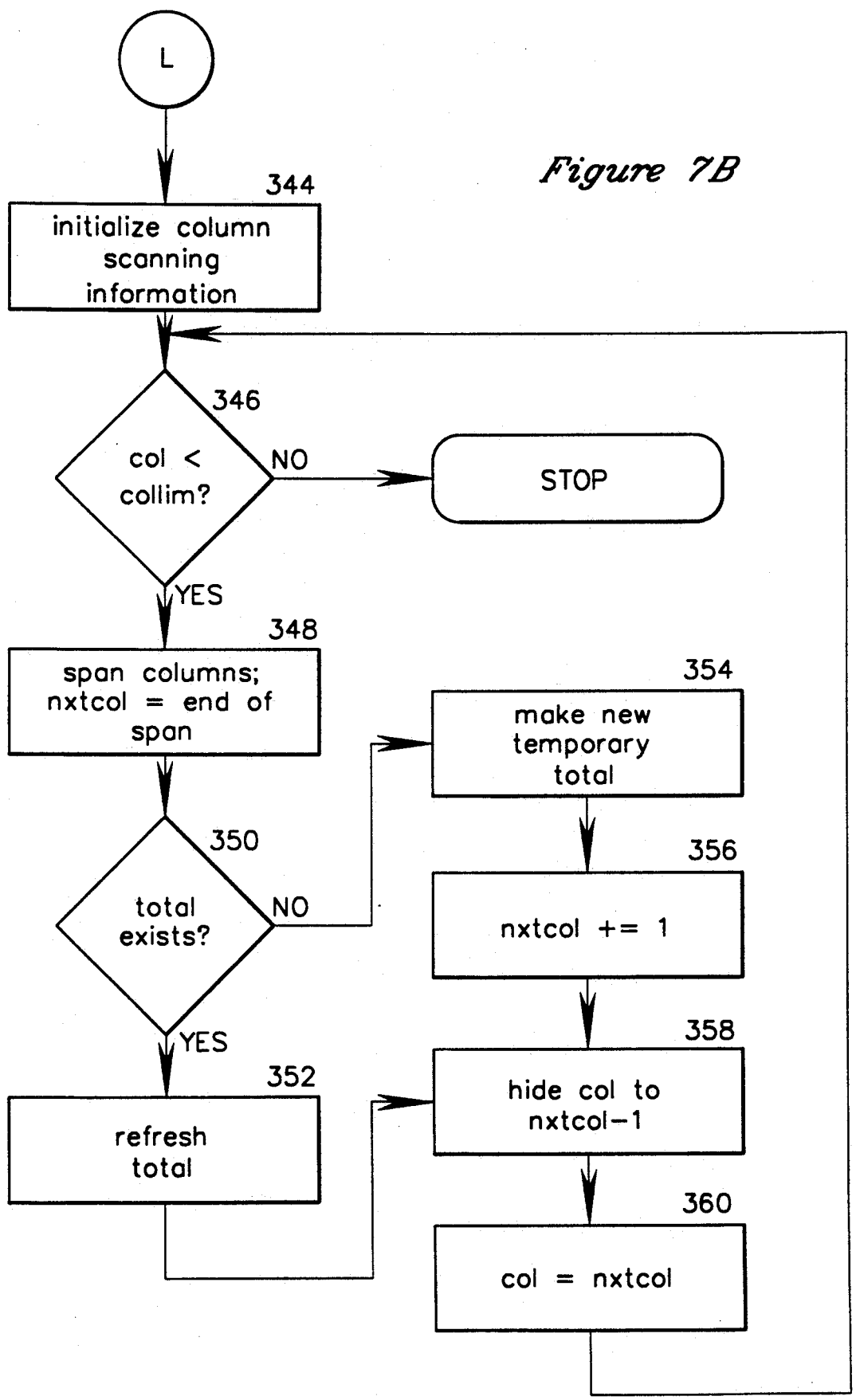
Figure 8A:
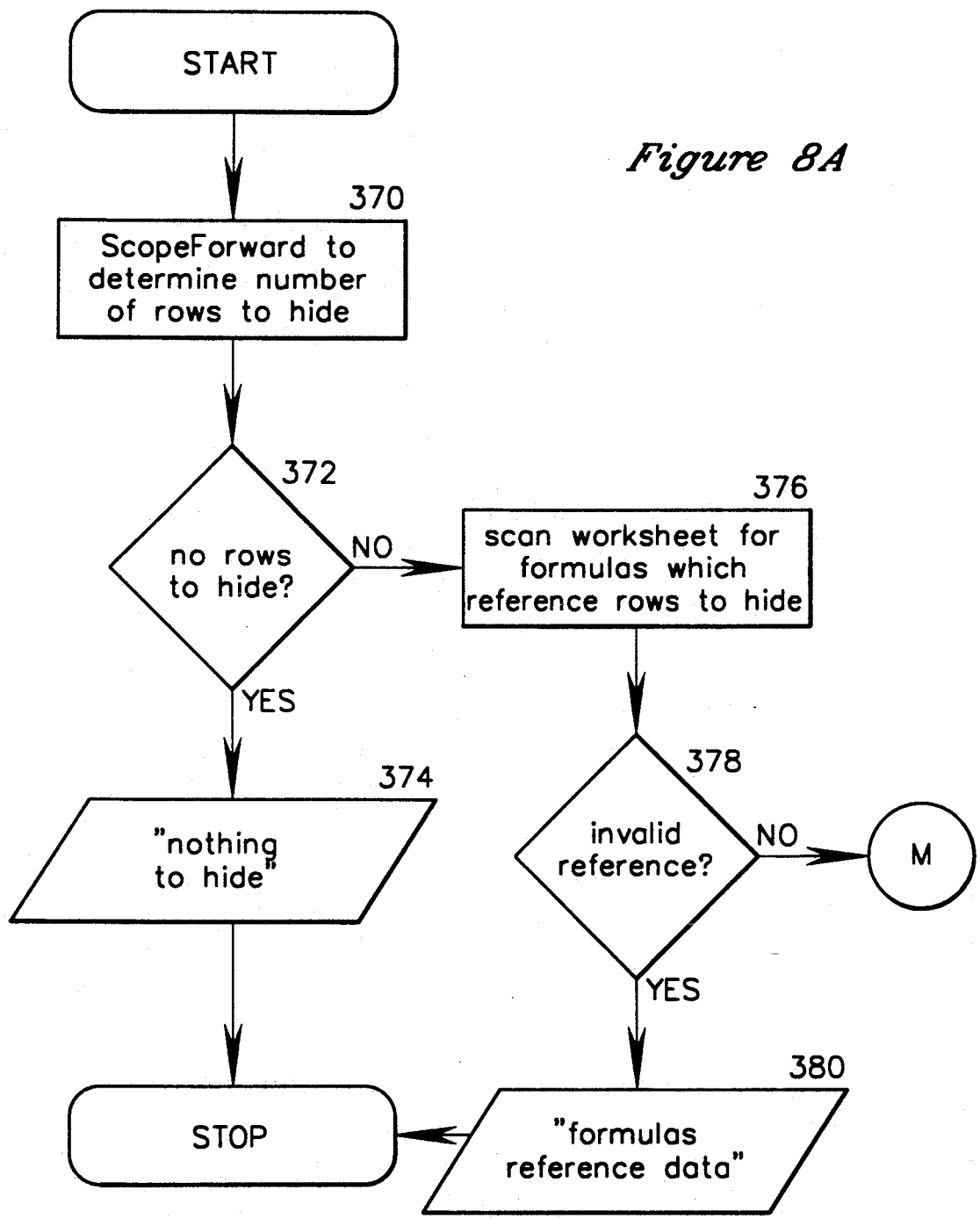
Figure 8B:
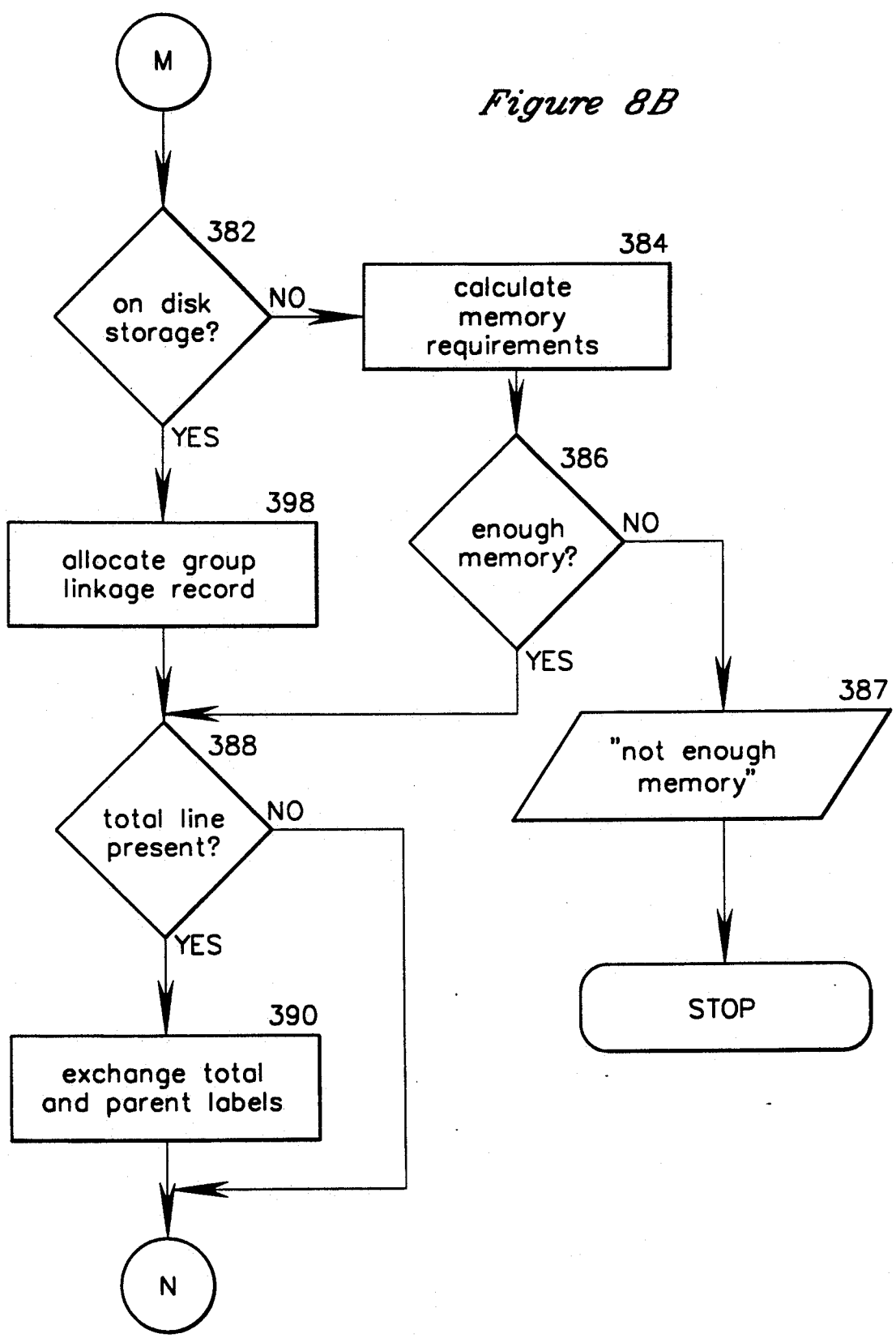
Figure 8C:
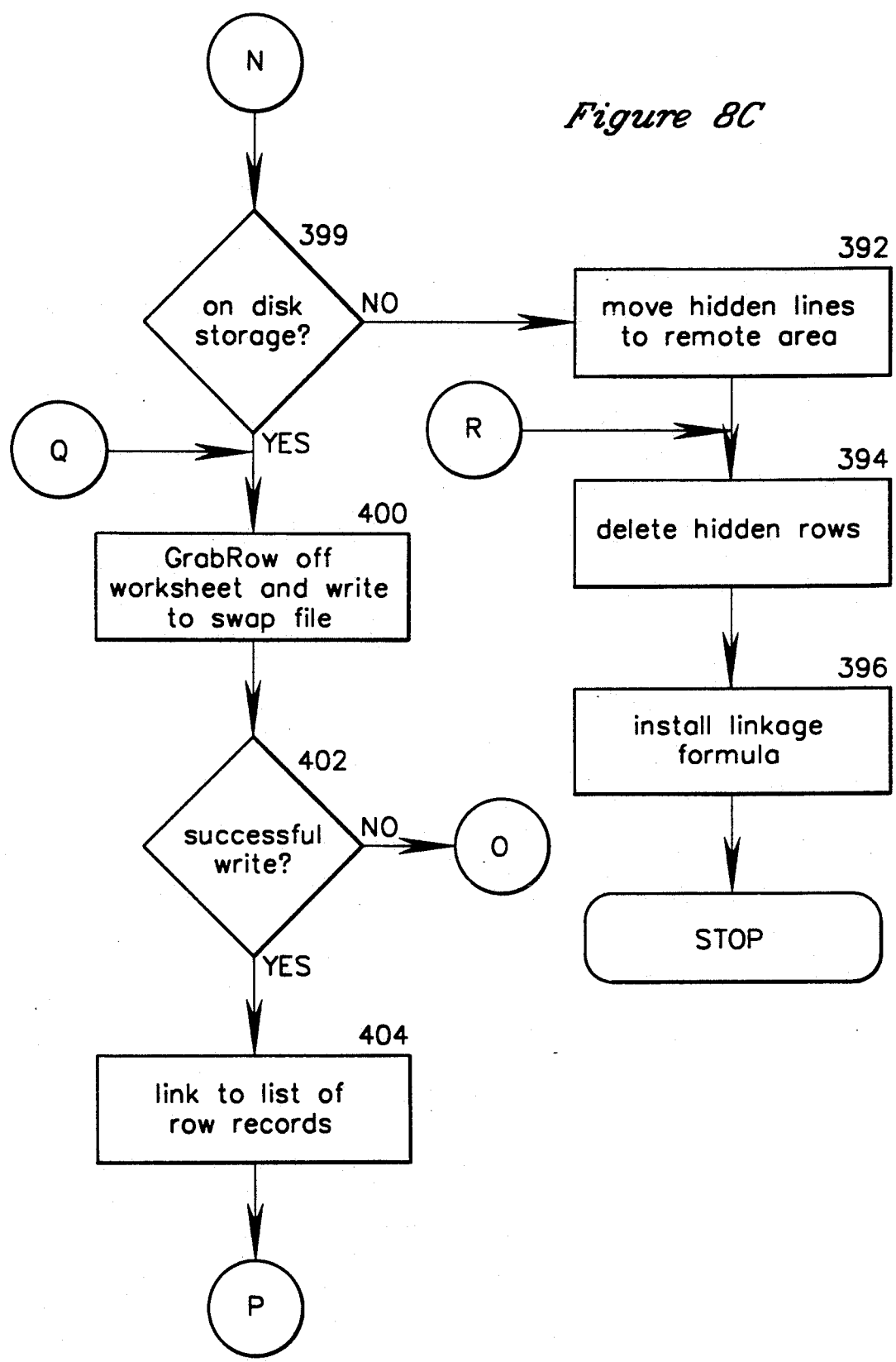
Figure 8D:
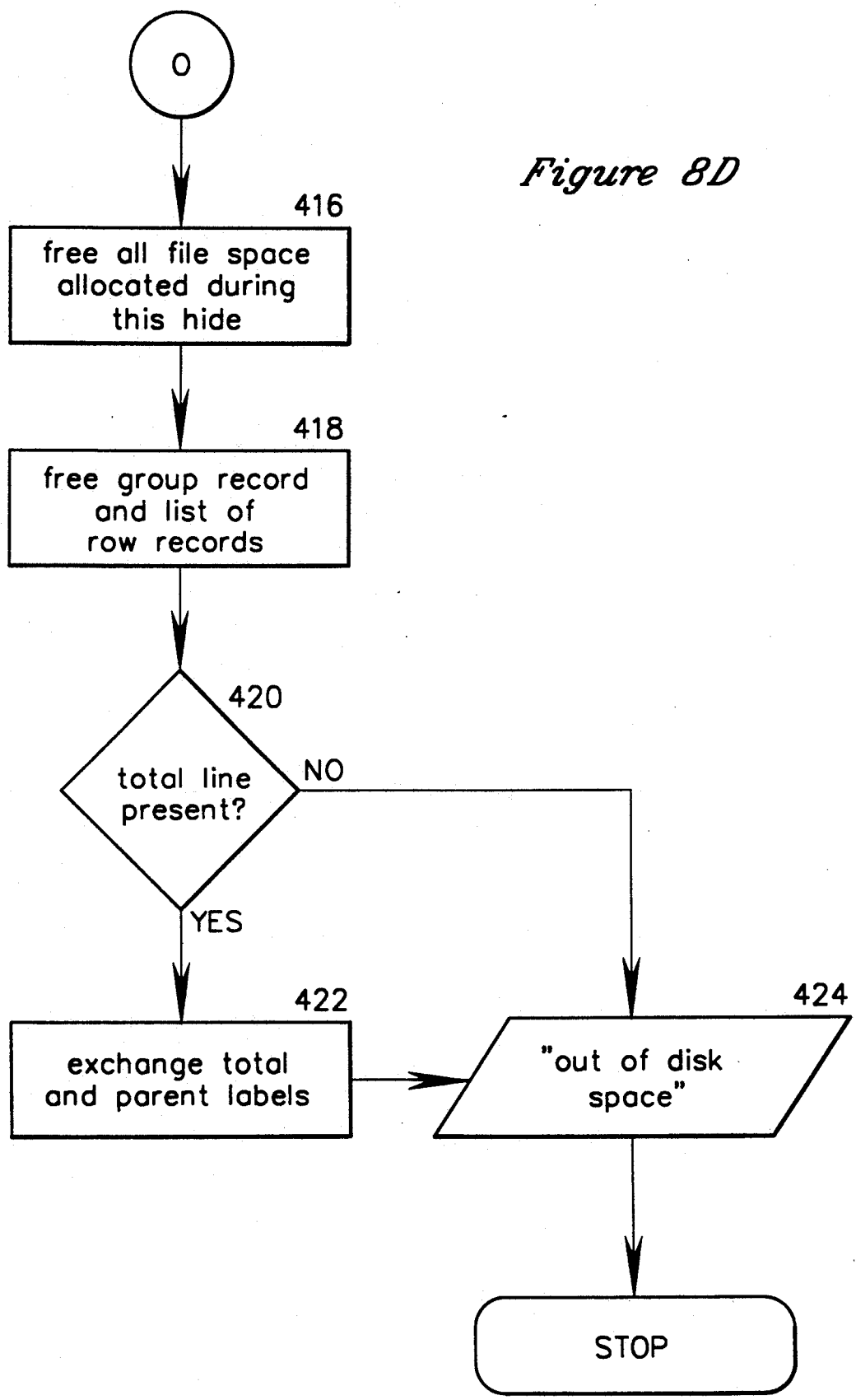
Figure 8E:
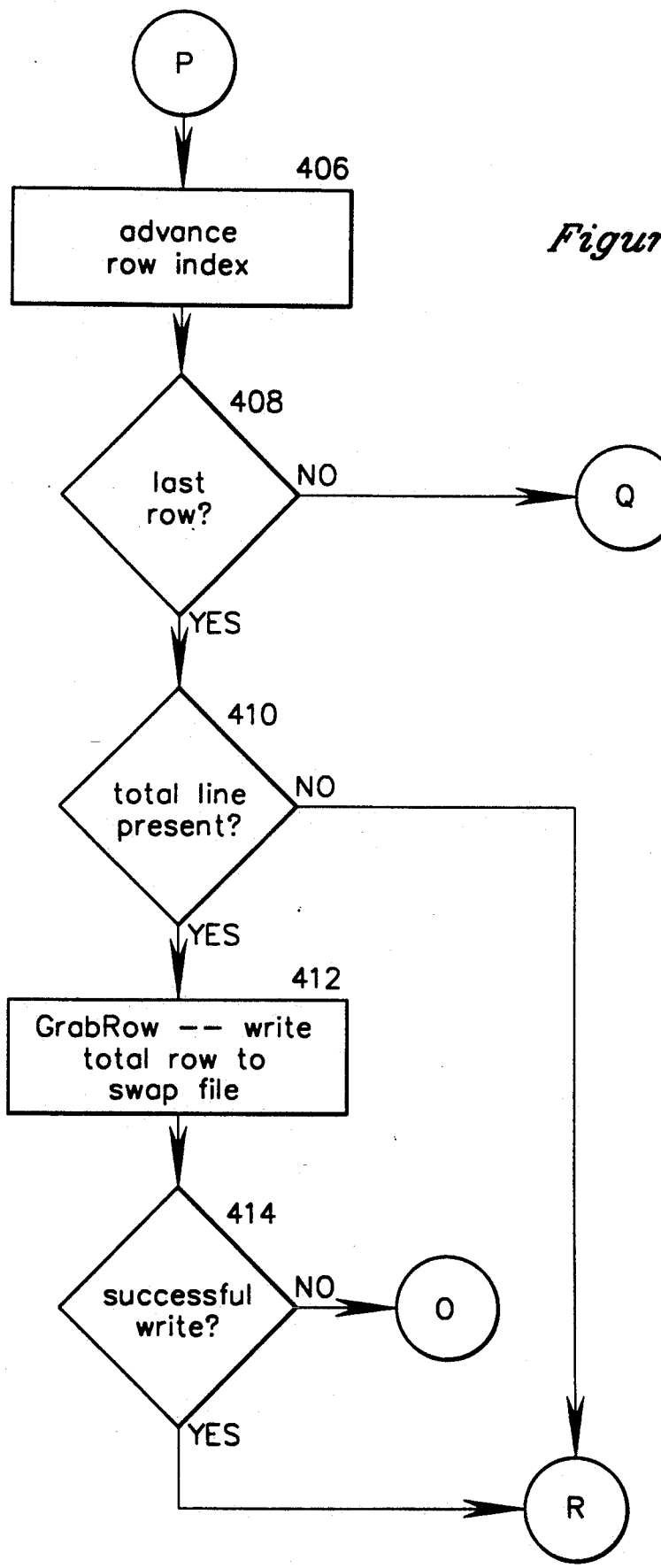
Figure 9A:
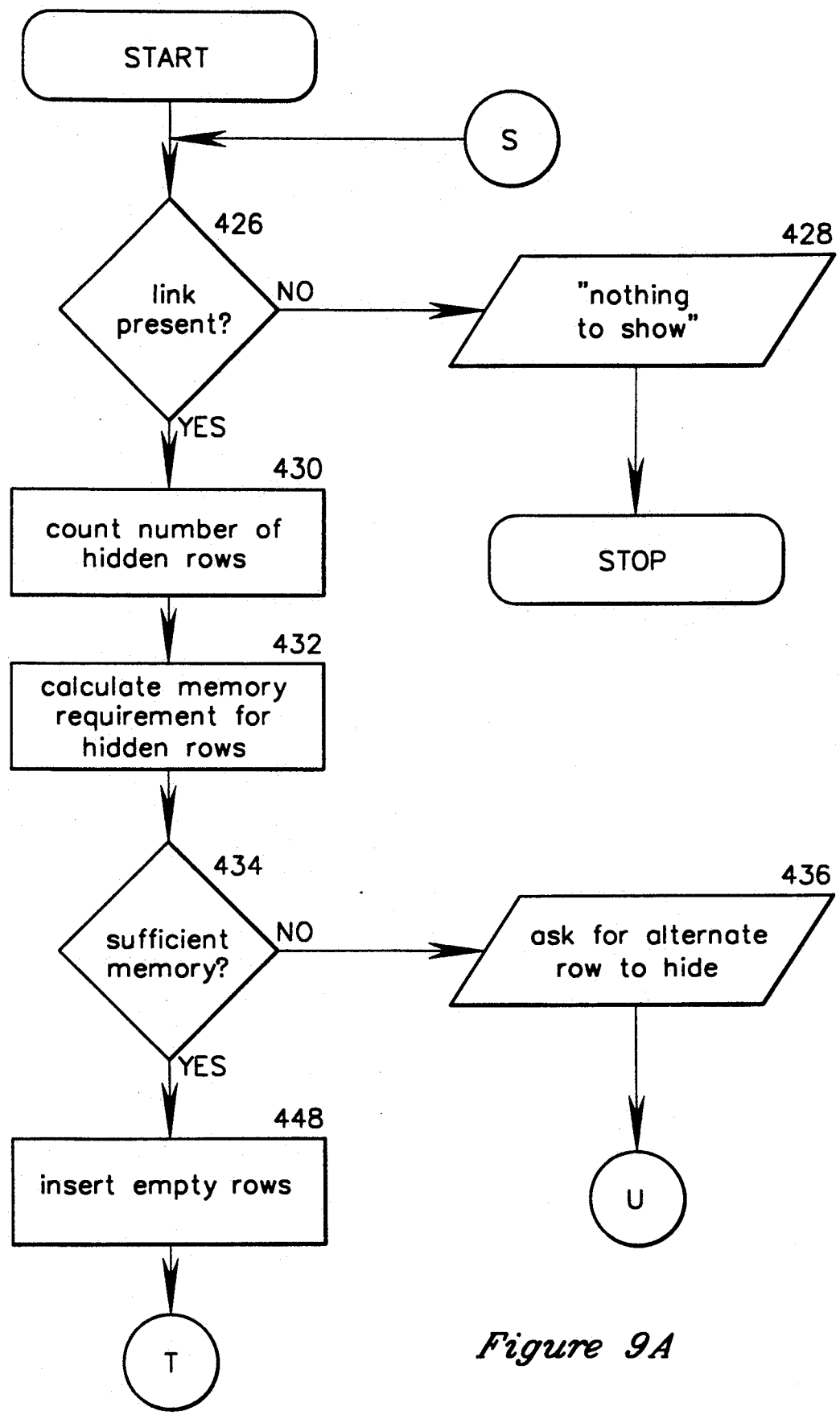
Figure 9C:
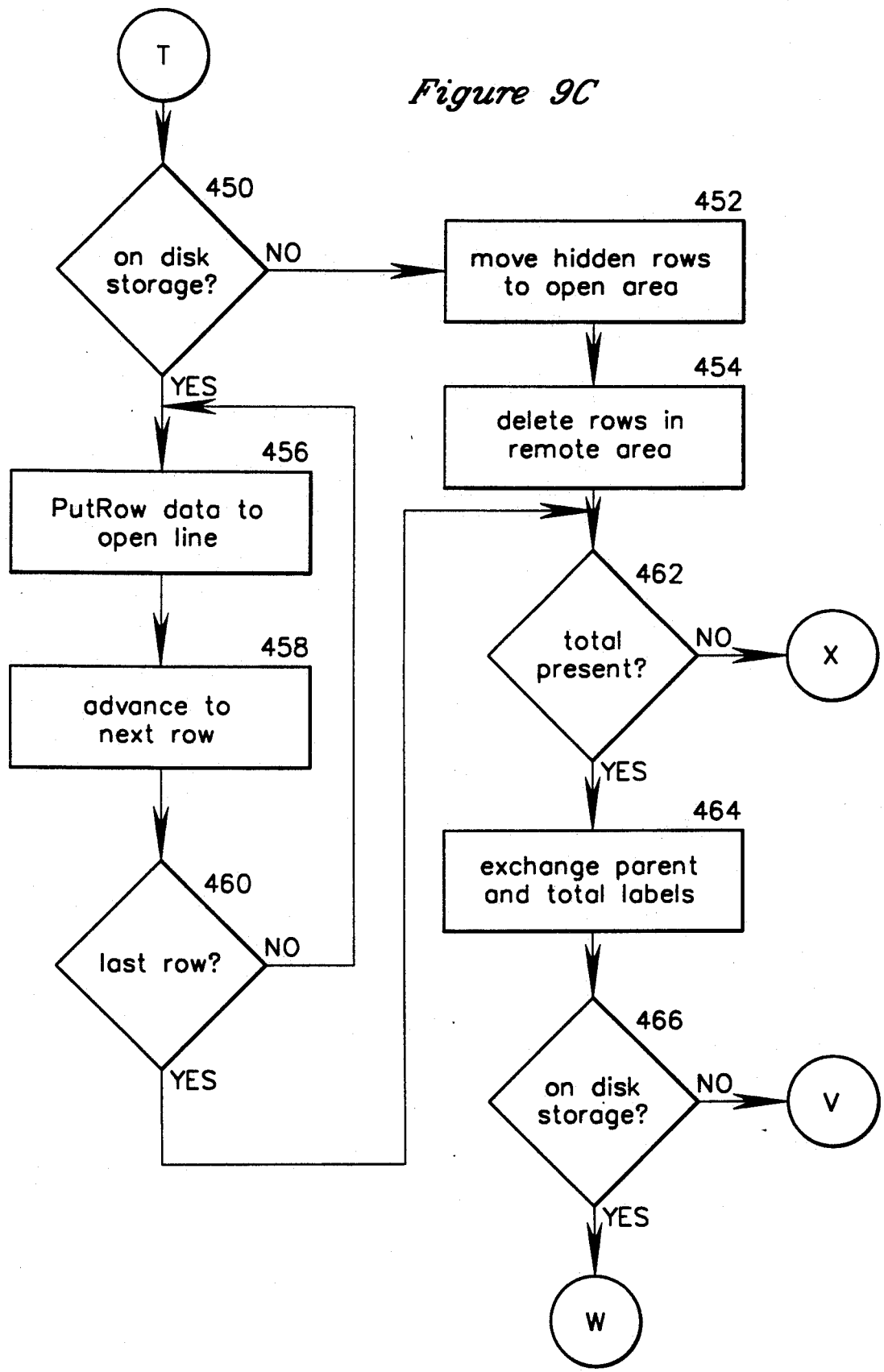
Figure 9D:
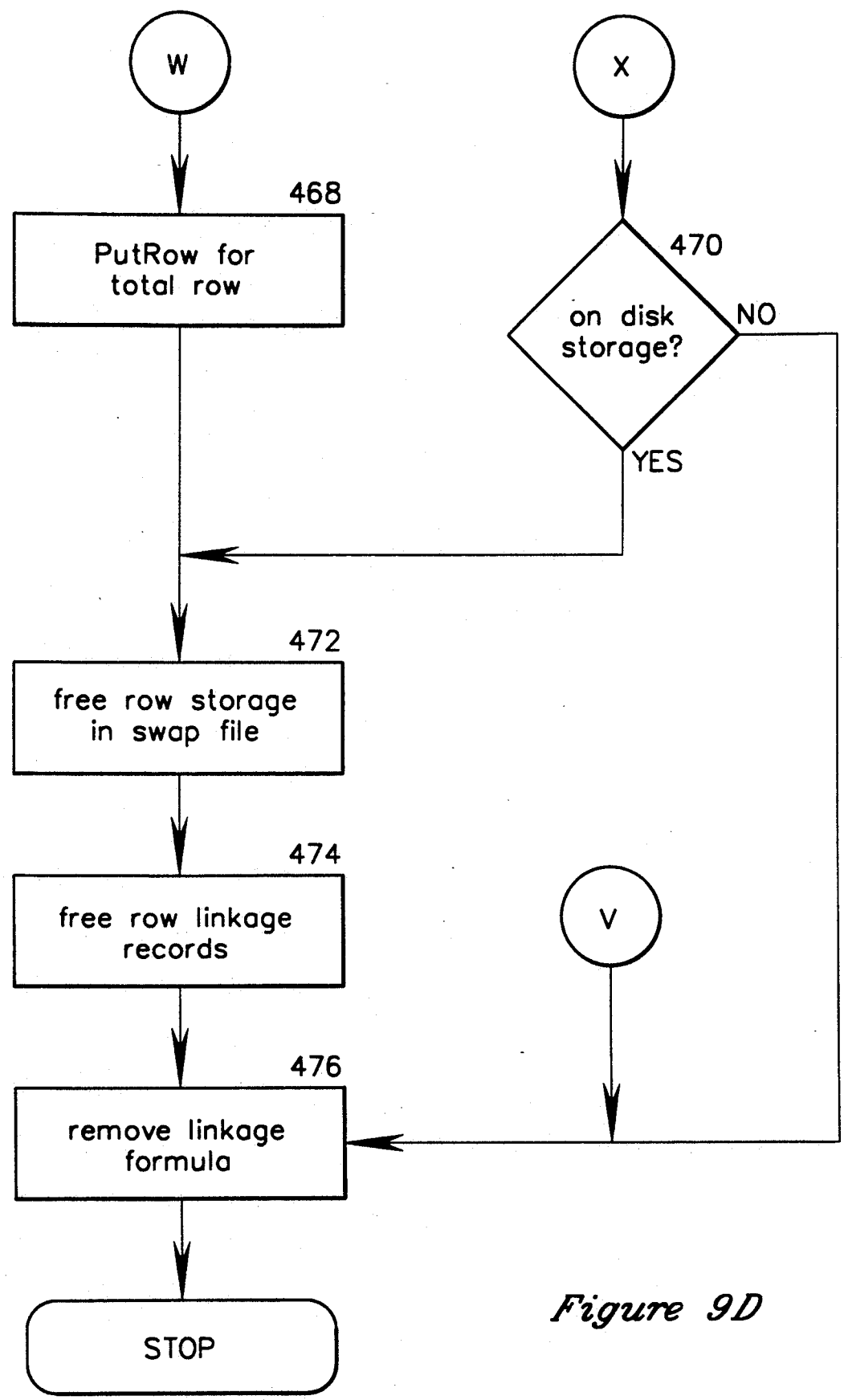
Figure 10A:
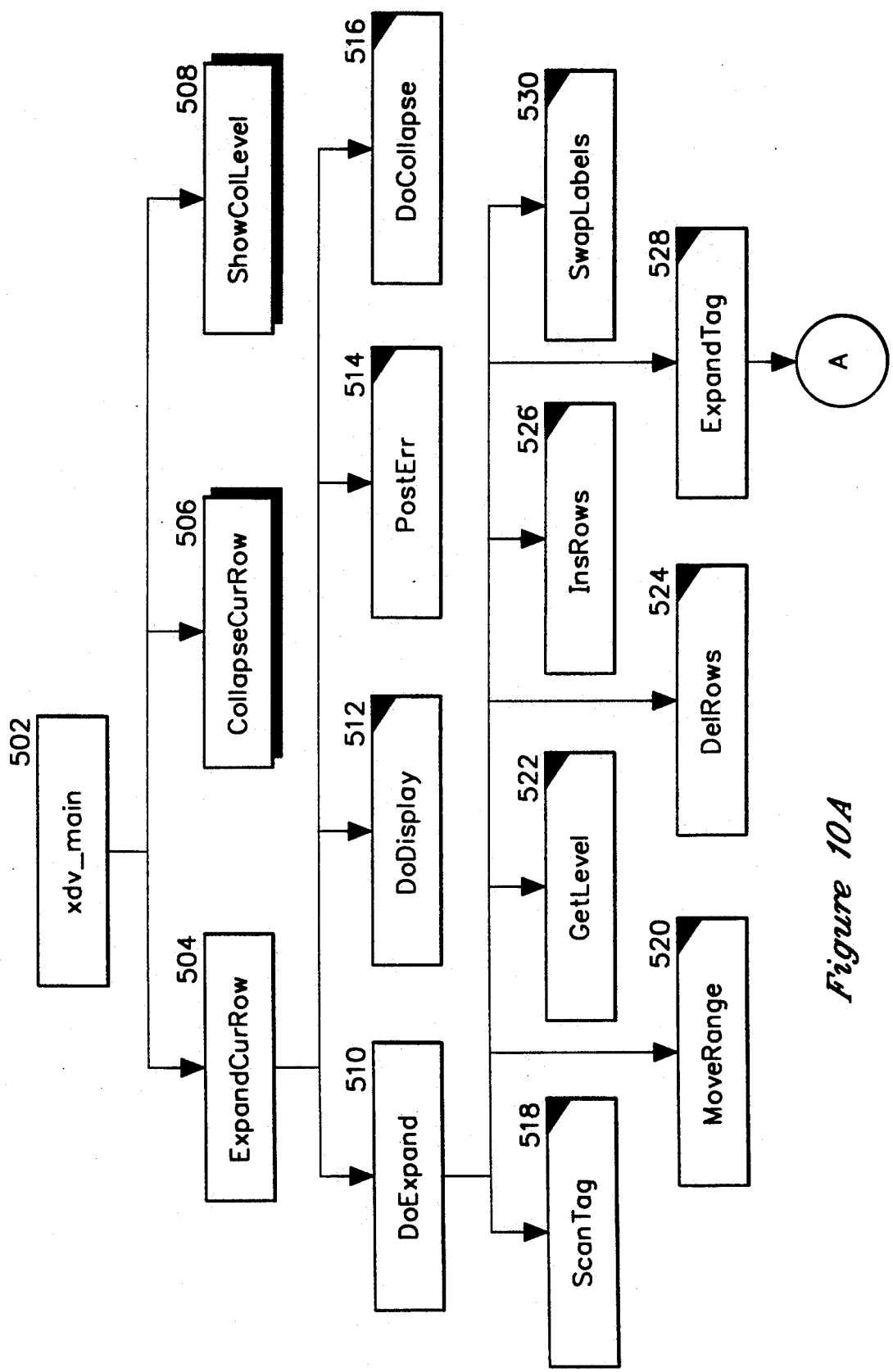
FIGS. 10a-13b are structure charts showing the structure of the first embodiment.
Figure 10B:
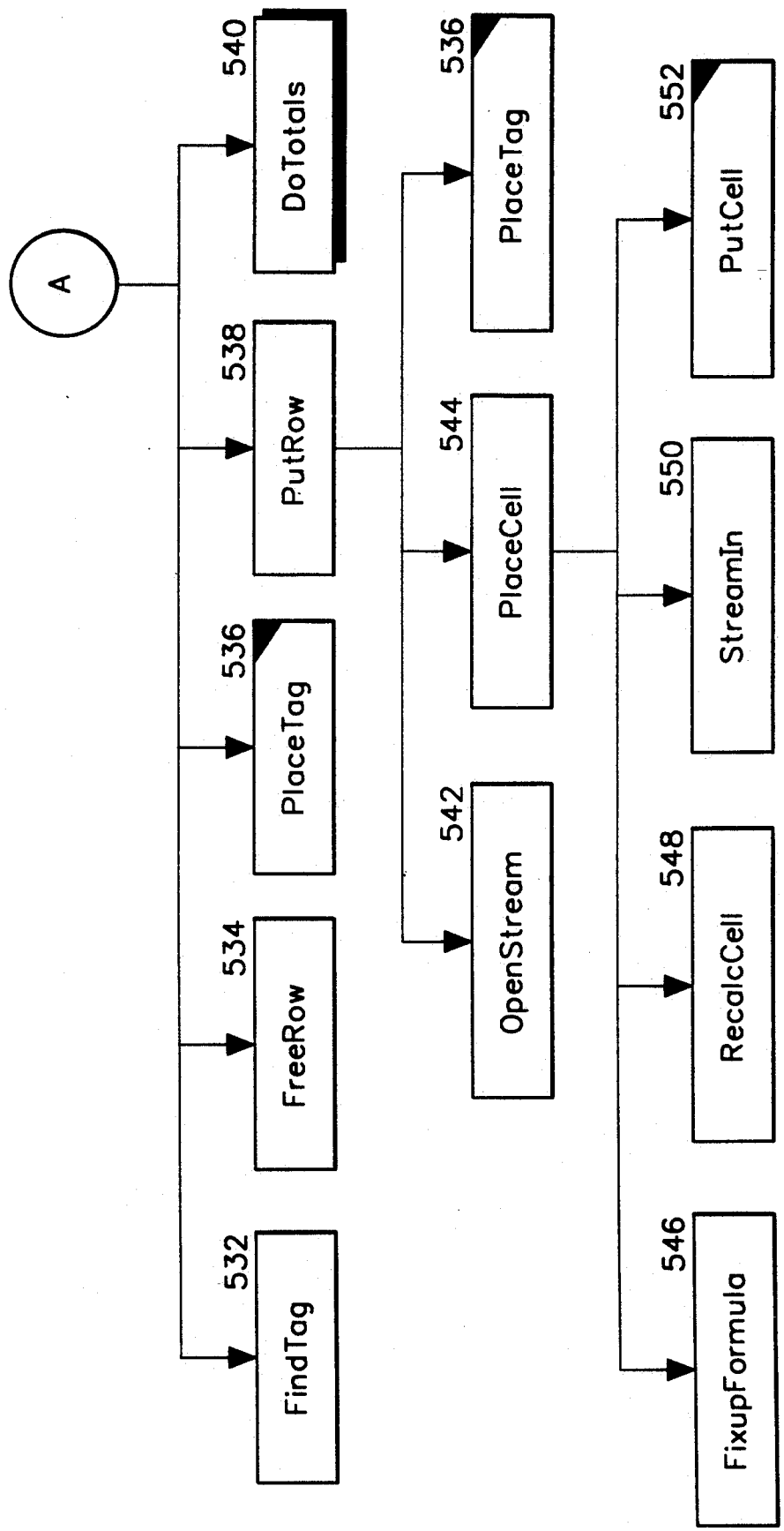
Figure 11A:
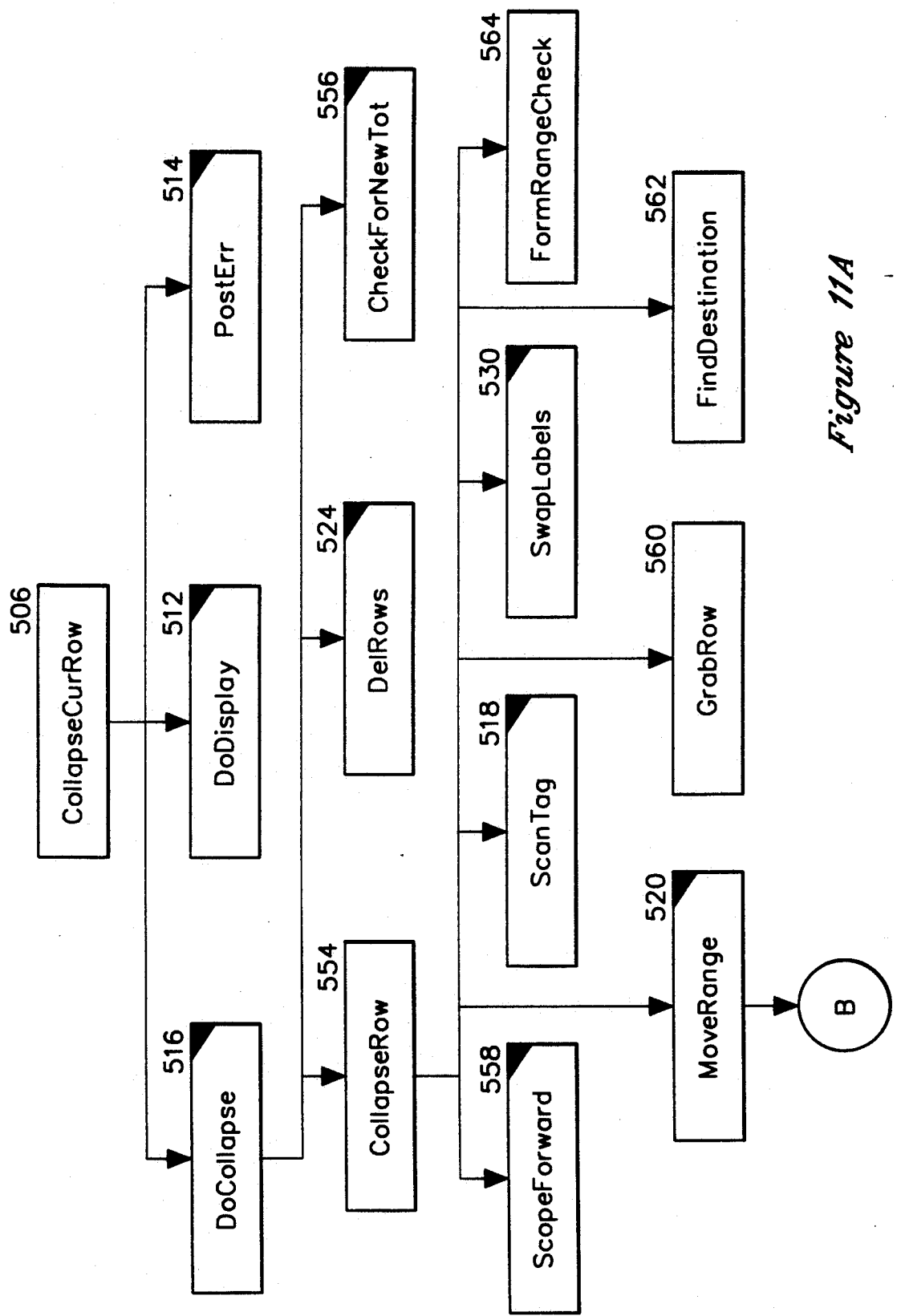
Figure 11B:
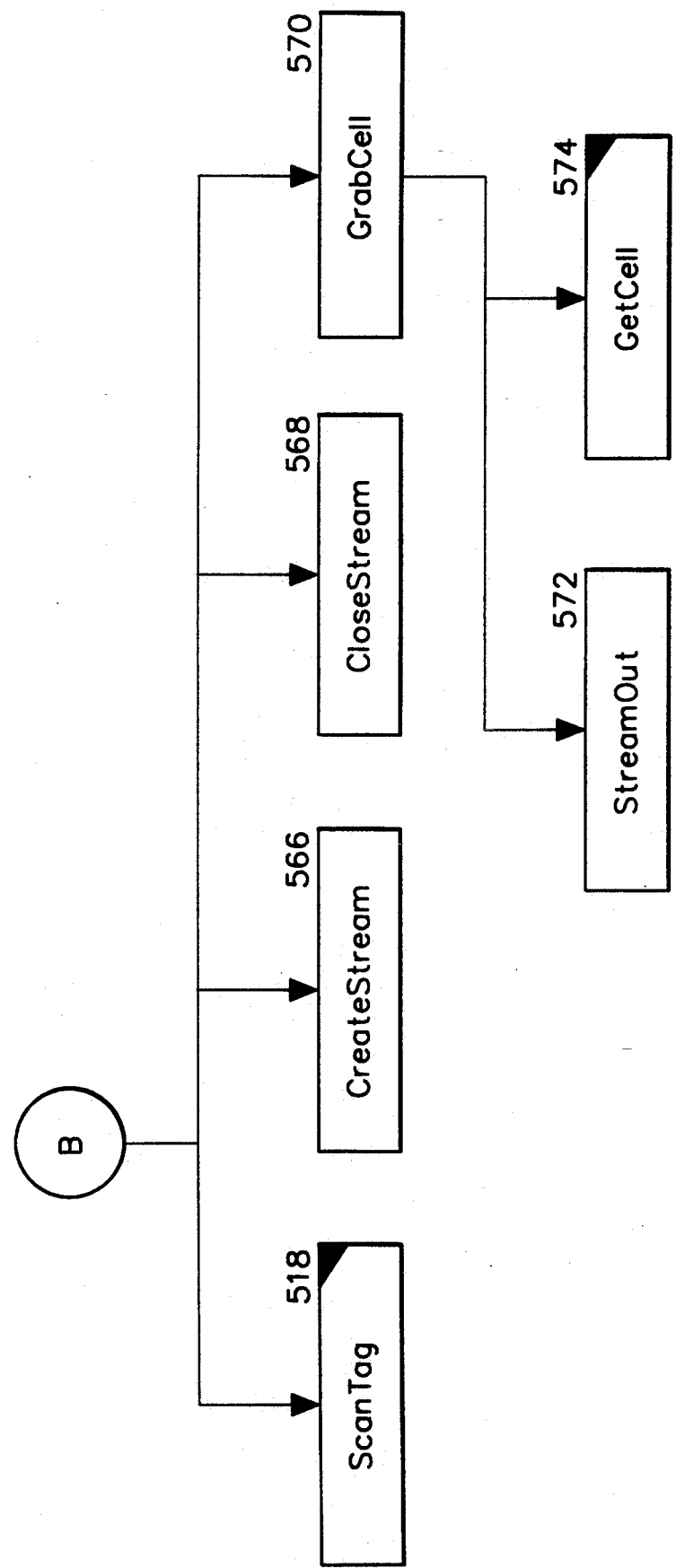
Figure 12A:
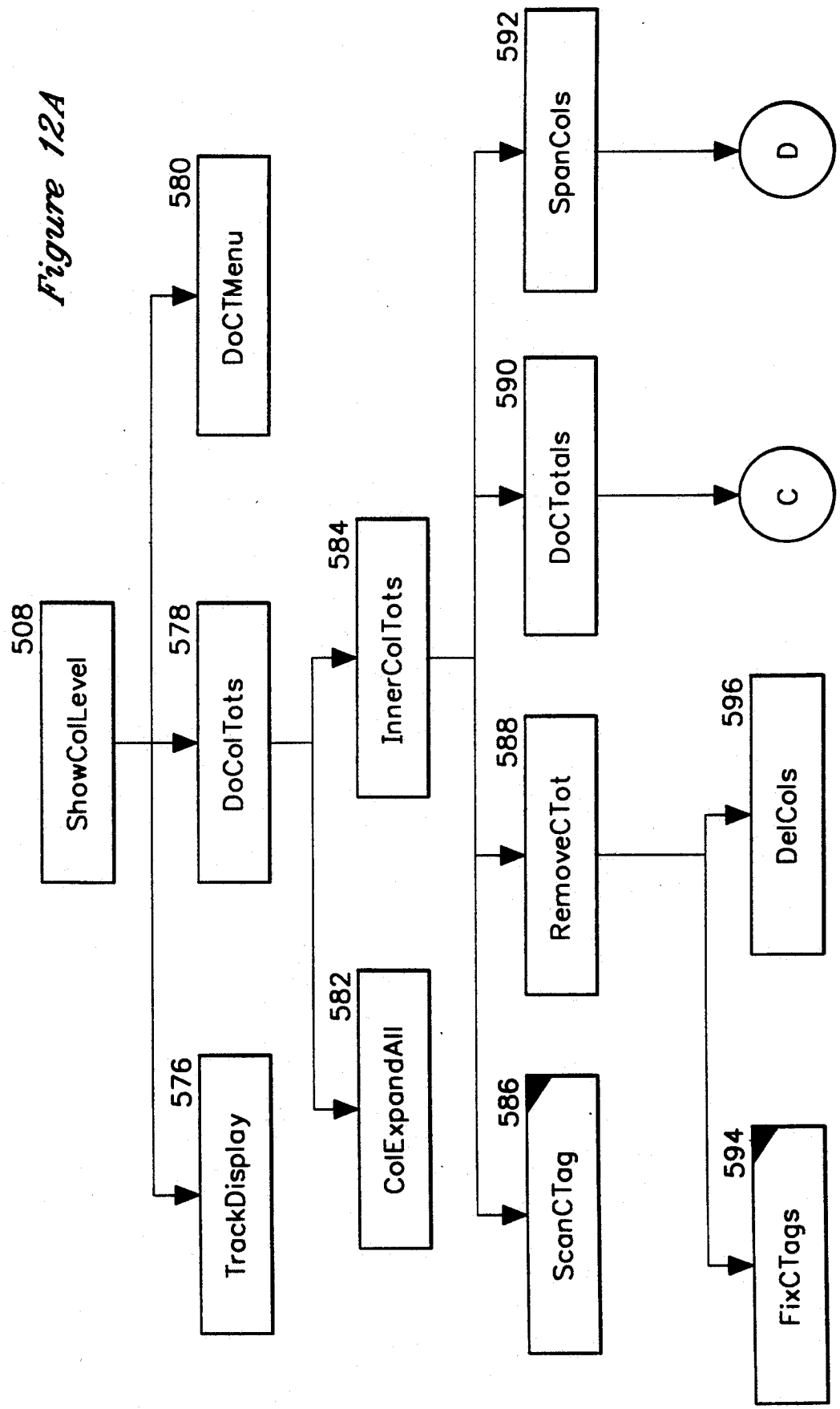
Figure 12B:
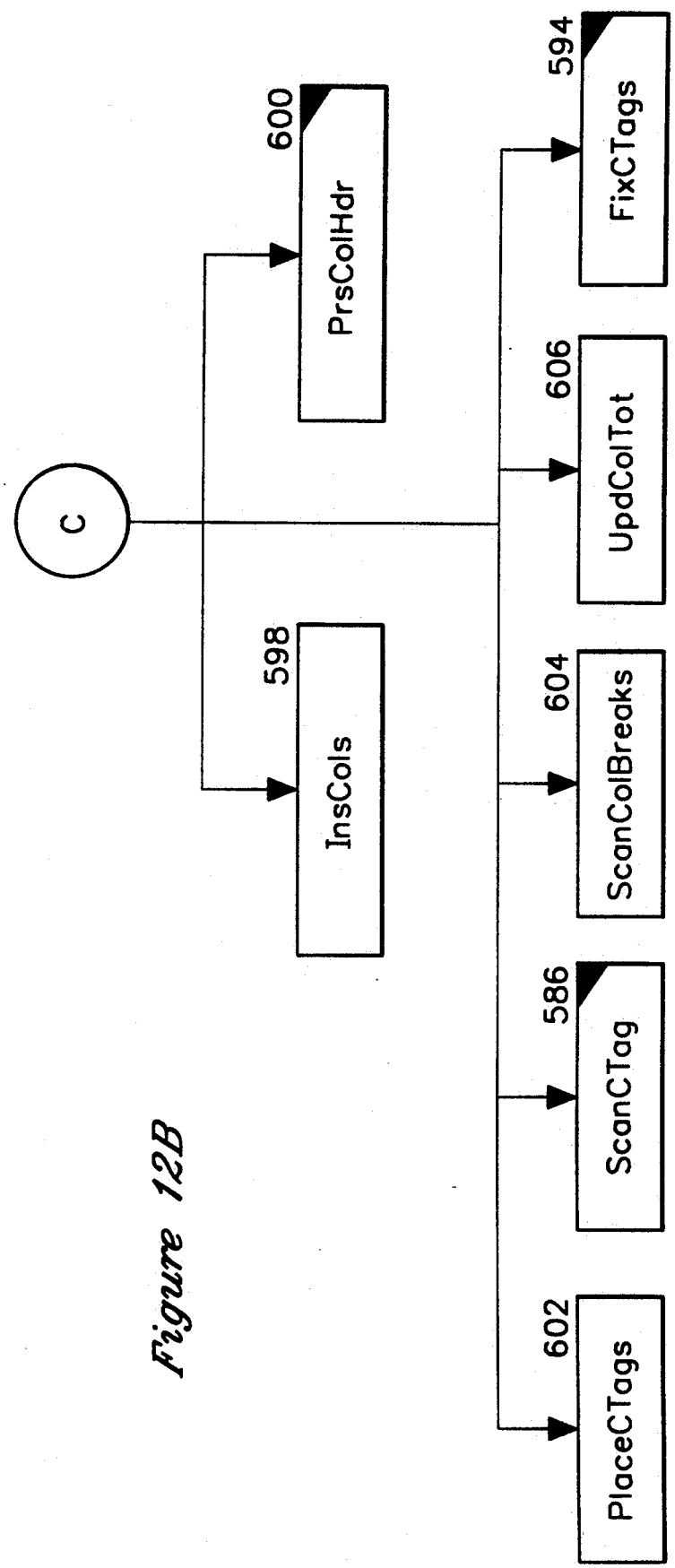
Figure 12C:
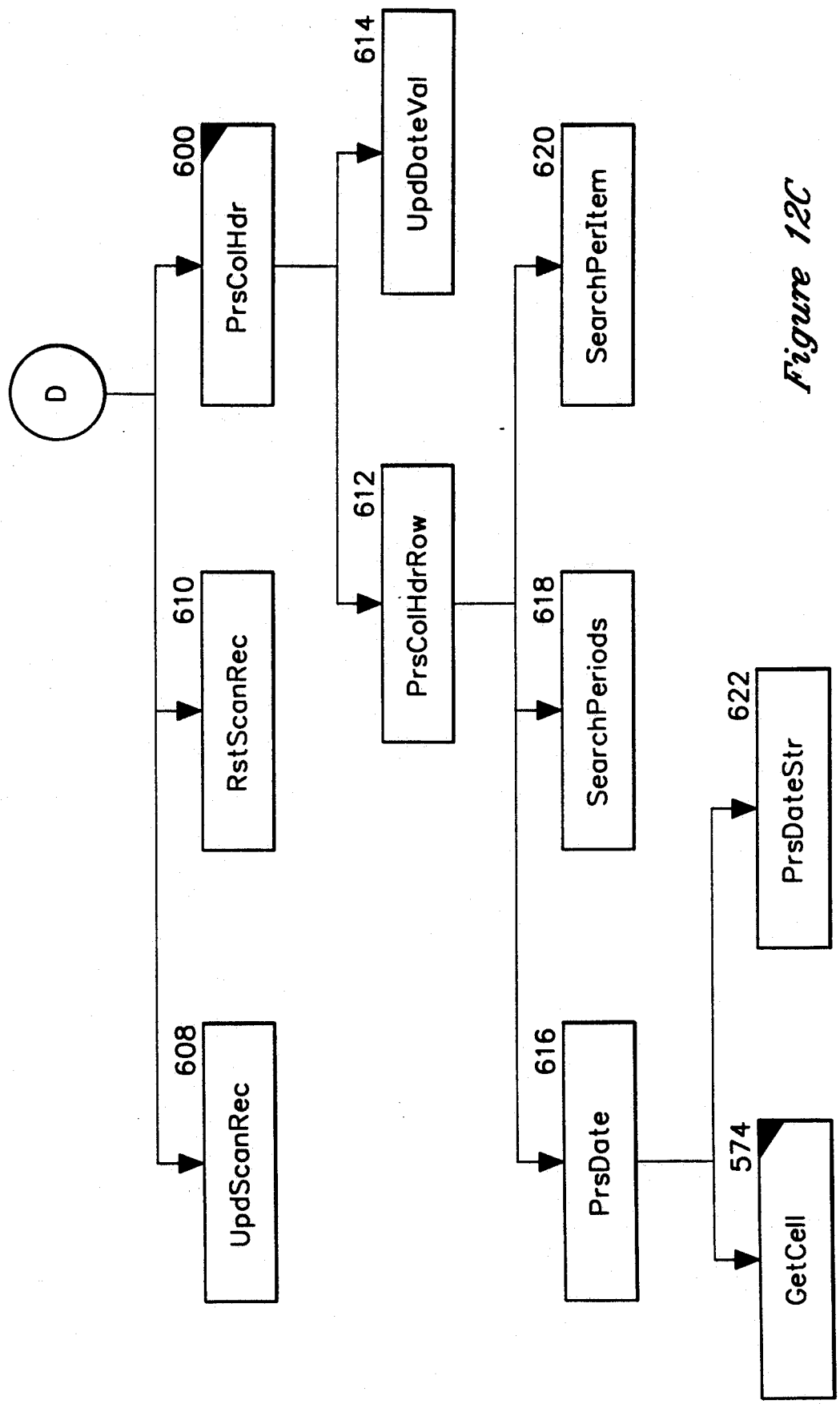
Figure 13A:
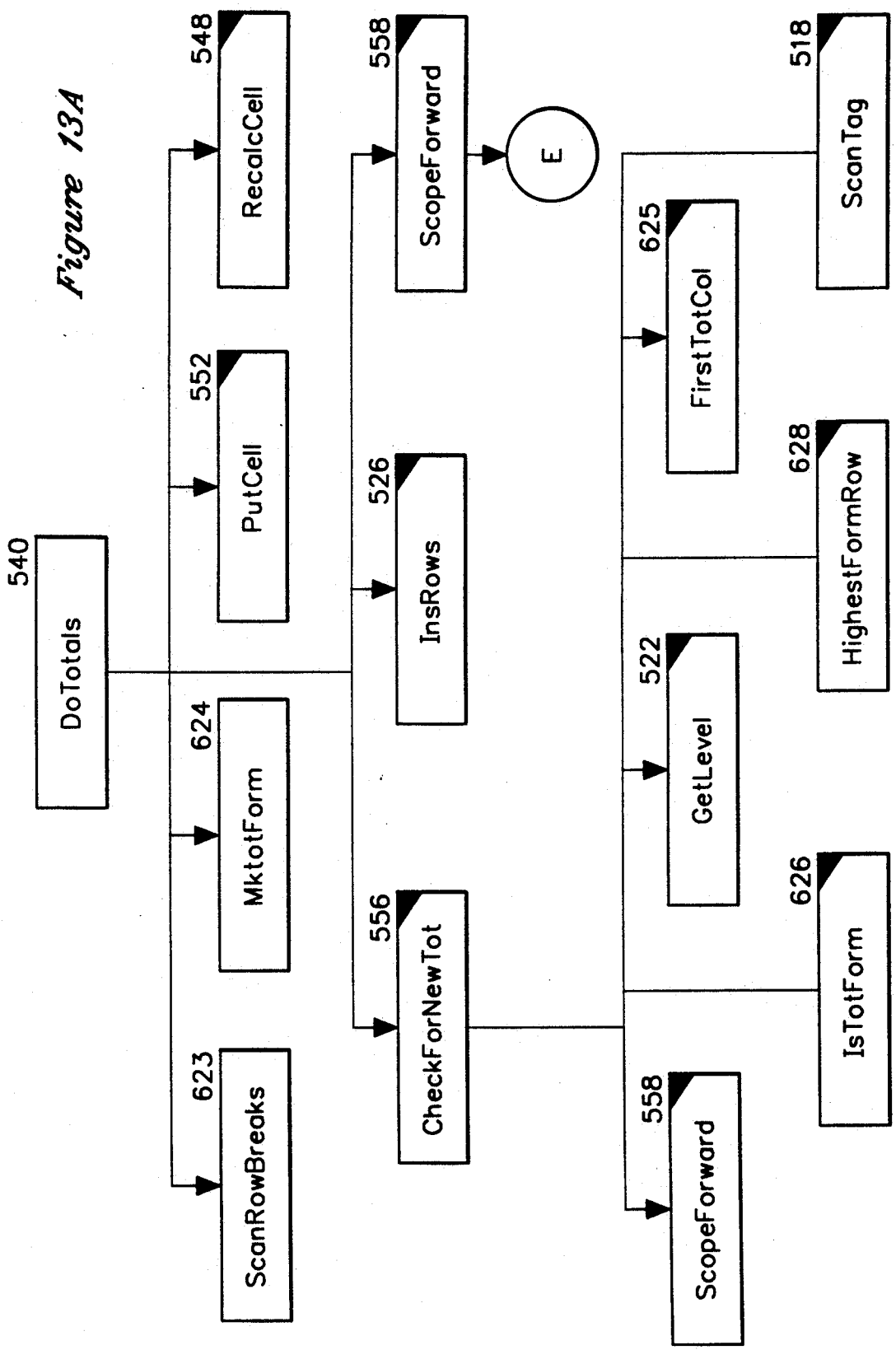
Figure 13B:
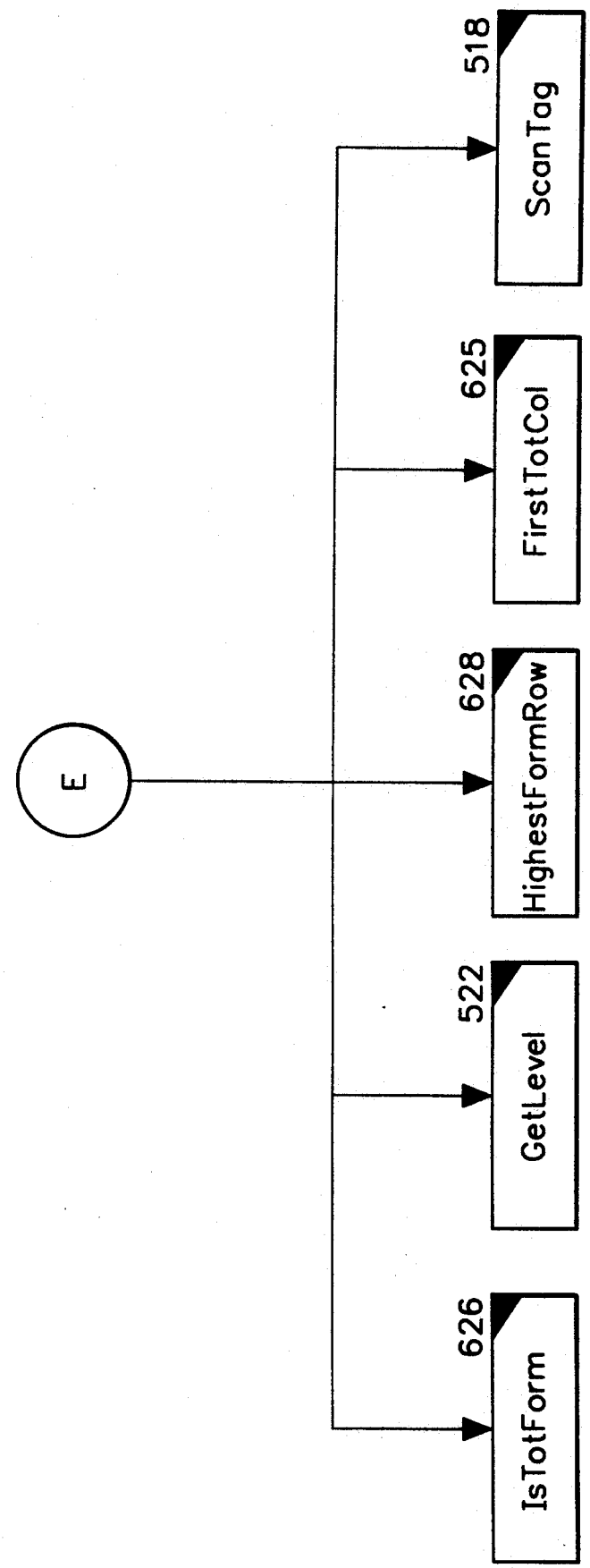

The indentation of a row is determined by the Get-Level routine whose flowchart is given in FIGS. 5a–5b. In a first step 250, column and indentation variables are initialized. The cell at (row, col) is examined (step 252). If cell is blank, col is incremented (step 254) and tested against the maximum column scanning limit (step 256) to control looping. The column scanning limit is the right most column used by the user unless the user specifies a different column. If the cell is non-blank (step 252) and contains text (step 258), the text is retrieved. A loop is used to count the number of leading spaces in the text (steps 258, 260, 262, and 264). The level information is encoded as 256 times the column indentation plus the count of leading spaces (step 266).

The discovery of row ownership is done through the ScopeForward routine whose flowchart is given FIGS. 6a–6e. The variable row begins with the value of the row to be scoped. If the initial row already has hidden rows (step 270), there is no further scope (step 272). If the initial row does not already have hidden rows, then the level information and label of the parent row are recorded for later comparison (step 274). Any initial blank rows are skipped (step 276). The IndentRow and TotalRow variables are initialized (step 278). These variables represent the furthest scoped rows due to indentation detection and to summary total formula detection respectively. The row indentation level is then calculated (step 280). If the row is a blank row (step 282), the blank count is incremented (step 284) and if past a threshold value (step 286), the main scoping loop is terminated. If the row is outdented from the parent row (step 288), the scoping loop is terminated. If the row is the first row (step 290), then the indScope flag is set based the indentation of this first row (step 292). If indent scoping is active (step 294), the current row level is compared against the parent row level (step 296). If the current row indented, IndentRow is advanced to current row (step 298), otherwise indentation scoping is de-activated (step 300). If indentation scoping is deactivated (step 294), an indented row will flag subsequent termination of the scoping loop (steps 302 and 304) If the row contains a total label that matches the value text of the parent's label (step 306), the scope is determined to reach the current row (step 308). If the label does not match (step 306) and there is a summary formula present (step 310), the formula is examined. If the formula refers to cells prior to the parent row (step 312), the scoping loop is terminated. Otherwise, TotRow is advanced to the current row (step 314). The current row variable is then incremented (step 316) and tested for row scanning limits before continuing the main scoping loop (step 320). Upon completion of the main scoping loop (off page connector A), the greater of the IndentRow and TotalRow values is used to determine the scope of the parent row (steps 322, 324, 326 and 328).

Determining Column Hierarchy

Column-wise hierarchies are determined by the relationship of column header cells to the time based groupings: month, quarter, and year. There are no "owner" columns, but there will be total columns which represent summary data for columns to the left of the respective total columns, based on the time periods included in the total. For example, there may be a column for "Year 1988" which is the total for the 12 previous columns representing data for "January 88" through "December 88".

The SetColLevel routine handles column wise hierarchy scanning and detail level control as given in FIG. 3f. The level of detail display is supplied by the user. Columns are first fully expanded by looping over all columns (steps 330-340). Each column is shown by turning off the "hidden" attribute (step 334). If the column is a temporary total (step 336), it is removed and scanning continues with the next column which will now be at the temporary's index. Otherwise, the column index is incremented (step 340) to continue showing columns. After the columns are fully expanded, the column scanning information is then reinitialized (steps 342, 344). The columns are again examined from left to right with a loop (344-360). Each pass through the loop will use a routine to find the next set of columns which are contained in the same period as the current column. If the last column spanned is a total (step 350), it is refreshed (step 352). Otherwise, a temporary total column is inserted (step 354 and the next column variable is incremented (step 356). All the spanned columns (but not the last one) are then hidden (step 358), and the current column is advance to the next column (step 360) after the span.

Hiding Rows

Groups are hidden in response to commands issued by the program operator. The flow chart for the hide rows operation is given in FIG. 3g.

First, rows are examined sequentially starting from the current row to determine which rows belong to the group to be hidden (step 370). This involves examining indentation levels, labels, and formulas, as described above in "Discovering Groups". If no rows are discovered to be owned by the current row (step 372), no action is taken (step 374).

Once the rows in the group are discovered, then the formulas of all rows must be examined to determine if they reference data that is about t be hidden (removed) from the spreadsheet (step 376). References to the total line, if present, are allowed, as this data will remain available. If invalid references are discovered (step 378), the hide operation is disallowed (step 380).

The physical manipulation of data now occurs. There are two storage options available in this implementation: on-sheet remote storage, and off-sheet disk-storage (step 382).

If on-sheet, memory availability is first calculated (step 384) and examined (step 386). If memory is available, the hidden row data is moved to a special reserved area of the spreadsheet matrix. First, exchange parent's and total line's label, if present (steps 388 and 390). This is because the total line will remain on the worksheet, but without the detail showing, the relevant label is that of the parent. Then move interior detail lines (and parent line if total present) to reserved area (step 392). Move subsequent lines (and total line) up to cover area vacated by interior lines (step 394). Finally, install a linkage formula in column A (step 396) to connect the visible line (parent or total, as appropriate) to the hidden rows. This linkage formula causes a plus-sign to appear in the reserved spreadsheet column.

If off-sheet (step 382), a group linkage record is allocated (step 398), parent and total line's labels are exchanged (steps 388 and 390). Interior detail lines are transferred by writing the contents of each cell sequentially to the disk file area allocated. As each line is successfully written (steps 400-402), a row locator record is allocated and linked to the list of row locators from the group linkage record (steps 404, 406, 408). If a total line is present (step 410), save the total line to the disk file and replace its formulas with constants representing their current values (steps 412-414) before covering hidden areas (step 394). The linkage formula in Column A (step 396) contains the ID number of a group-record which is linked to the list of row-records made in steps 400-410. If an error is encountered when writing hidden lines to disk (step 402 or 414), the hide operation is undone by releasing allocated file space (step 416), freeing group and row locator records (step 418) and re-exchanging the parent and total labels (steps 420, 422).

Showing Rows

Hidden groups may be shown in response to commands given by the program operator. This is the inverse operation to hiding rows and when successful will restore the spreadsheet to the appearance it had before the hide operation. Referring to FIG. 3b, the row is examined for presence of linkage formula in the first column (step 426). If there is no linkage, there is no hidden data (step 428). Calculate number of hidden rows and memory requirements (steps 430 and 432). If there is insufficient memory (step 434), allow user to hide other rows or terminate the show operation (see Swapping below) (steps 436, 438, 440, 442, 444 and 446). Open blank area on sheet by moving subsequent rows down (step 448). If on-sheet move hidden row data into newly opened area (steps 450, 452). If on disk, follow row-record links sequentially from group record and sequentially read cell contents from disk swap file (steps 456, 458, and 460). If total line present, exchange parent's and total's label (steps 462 and 464). If off-sheet storage, read total line's formulas from final hidden row record (steps 466 and 468). Release all disk storage allocated to the lines displayed (step 472) and free the group and row-locator records (step 474). Remove linkage formula from column A (step 476).

Swapping

The hierarchical organization of rows gives the program operator a convenient grouping for swapping spreadsheet data in and out of limited memory. With off-sheet storage, memory is reclaimed when groups are hidden. This enables the creation of spreadsheets larger than the central memory capacity of the computer.

For a spreadsheet larger than memory, the entire sheet may not be displayed at one time. It is possible that there will not be enough memory available to execute a show command. When this occurs, the program will allow the operator to point at an alternative group to hide. The program will hide the alternative group and then re-attempt the original show command (carefully keeping track of the shifting of row data due to hide operations). This loop will continue until the show operation succeeds or the operator terminates the command.

Hiding and Showing Columns

Columns are hidden or shown based on a request to homogeneously display data at a given time-based interval: months, quarters, years, or all-data. When hiding columns, data is not physically transferred, rather the hidden-column attribute of the host spreadsheet program is manipulated to prevent display of the desired columns. Temporary columns may be introduced to display summary (total) data for groups of columns.

1) Scan column headers left to right noticing when a break from one unit at the appropriate interval to the next occurs.

2) If the last column for a group is not a total for the interval, move subsequent columns right one column and install labels and formulas calculating the totals.

3) Install a special formula in the top row for the total column which records whether it was temporarily installed and displays as a plus-sign.

4) If a temporary total column whose interval level doesn't match the display level of the current command is found, remove it by moving columns to the right of this column left one column. That is, if quarter totals are being shown and a temporary month total is encountered, remove it.

5) Set the hide/show attribute of each column based on the interval levels. That is, if showing by quarters, hide specific day and month columns, show quarters and years.

Reading and Writing Spreadsheets

When hidden rows are stored off-sheet, there is a swap file maintained to hold the hidden data. When a normal spreadsheet Save or Retrieve command is executed, this swap-file must be transferred to/from a companion file with a common name component with the spreadsheet file. In addition the group-records, row-records, and free-space allocation list must be written to/from this companion file.

FIGS. 10a-13b are a structure chart of Bud. Each block represents a module or routine that is executed to perform a function. A block has a blackened upper right corner if the module is repeated elsewhere in the structure chart. A block has a shadow if it is shown in more detail in another drawing. It will be understood that in FIGS. 10a-13b, a calling module includes a function call to another called module if the calling module (e.g. PutRow 538) is shown above and pointing to the called module(s) (e.g. OpenStream 542, PlaceCell 544, and PlaceTag 536). Each of the modules is briefly described below in Appendix A.

A program listing of the first embodiment is given in Appendix B. The program code is written in the C language for Borland's Turbo C compiler for the IBM Personal Computer.

The invention has now been described with reference to specific embodiments. Other embodiments will be apparent to those of ordinary skill in the art. If is therefore not intended that this invention be limited, except as defined in the appended claims.

APPENDIX A

STRUCTURE CHART DESCRIPTION

| Module Label | Module Name | Module Function |
|---|---|---|
| 502 | xdv_main | primary entry point from host spreadsheet to BUD. |
| 504 | ExpandCurRow | show detail rows owned by row at current cursor position |
| 506 | CollapseCurRow | hide detail rows owned by row at current cursor or owned by row for which current row is a total row. |
| 508 | ShowColLevel | set the detail level for column display. |
| 510 | DoExpand | data manipulation to implement a show rows operation. |
| 512 | DoDisplay | update display and cursor position after show or hide operations. |
| 514 | PostErr | post an error or warning message. |
| 516 | DoCollapse | data manipulation to implement a hide rows operation. |
| 518 | ScanTag | parse a row tag formula. returns linkage information from formula in reserved tag column. |

| | | |
|---|---|---|
| 520 | MoveRange | move a range of cells to a new location on worksheet. |
| 522 | GetLevel | scan a row of cells to determine the indentation level. |
| 524 | DelRows | delete rows at a specified location on worksheet. |
| 526 | InsRows | insert blank rows at a specified location on worksheet. |
| 528 | ExpandTag | data manipulation to show the rows associated with a linkage formula. |
| 530 | SwapLabels | swap the left-most labels of two rows (parent & total). |
| 532 | FindTag | looks up a linkage ID-tag in list of linkage records. |
| 534 | FreeRow | free a row-locator record. |
| 536 | PlaceTag | place a row tag linkage formula in reserved tag column. |
| 538 | PutRow | read a row from swap file and put cells on worksheet. |
| 540 | DoTotals | installs or refreshes total row formulas. |
| 542 | OpenStream | open and postion swap file for stream input. |
| 544 | PlaceCell | read cell info from stream and place on worksheet. |
| 546 | FixupFormula | perform cell reference fixups on formula. |
| 548 | RecalcCell | recalculate a worksheet cell. |
| 550 | StreamIn | read from stream input. |
| 552 | PutCell | put a cell contents on worksheet. |
| 554 | CollapseRow | data manipulation to hide rows associated with parent. |
| 556 | CheckForNewTot | determines if row is a total for some previous row. |
| 558 | ScopeForward | scan rows to determine ownership scope of a parent row. |
| 560 | GrabRow | grab row of cells off worksheet and write to swap file. |
| 562 | FindDestination | find and open space in remote worksheet save area. |
| 564 | FormRangeCheck | examine formula for references into or across a range of cells. |
| 566 | CreateStream | open and position file for stream output. |
| 568 | CloseStream | close swap file output stream. |
| 570 | GrabCell | grab cell info from worksheet and write to open stream. |

| | | |
|---|---|---|
| 572 | StreamOut | write to stream output. |
| 574 | GetCell | grab cell info from worksheet. |
| 576 | TrackDisplay | update display and cursor position after column show/hide operations. |
| 578 | DoColTots | data manipulations to install, remove, and refresh total columns. |
| 580 | DoCTMenu | use menu to select column total/detail level. |
| 582 | ColExpandAll | unhide all columns and remove temporary "for show only" total columns. |
| 584 | InnerColTots | column scanning loop to scope and install or remove total columns. |
| 586 | ScanCTag | parse a column tag formula. returns scope and level information from formula in reserved tag row. |
| 588 | RemoveCTot | remove a total column. |
| 590 | DoCTotals | install or refresh a total column. |
| 592 | SpanCols | scan columns to determine scope for next total at a specified totaling level. |
| 594 | FixCTags | update subsequent total column tags to reflect installed or removed total column. |
| 596 | DelCols | delete columns at specified location on worksheet. |
| 598 | InsCols | insert blank columns at a specified location on worksheet. |
| 600 | PrsColHdr | examine column header cells to determine level and values of date units for column. |
| 602 | PlaceCTag | place a column tag scope/level formula in reserved tag row. |
| 604 | ScanColBreaks | scan over previous columns for subtotaling information. |
| 606 | UpdColTot | generate total labels and formula for total column. |
| 608 | UpdScanRec | update period scanning record to reflect latest column header information. |
| 610 | RstScanRec | restore period scanning record to state at previous column. |
| 612 | PrsColHdrRow | parse a column header row, accumulating date/period elements. |
| 614 | UpdDateVal | update date information record to reflect latest date/period parse. |
| 616 | PrsDate | parse a cell value to extract date information. |
| 618 | SearchPeriods | search custom periods tables for possible period information match. |

| | | |
|---|---|---|
| 620 | SearchPerItem | update period scanning record to relect latest period element found in custom period tables. |
| 622 | PrsDateStr | parse a text string for date information. |
| 623 | ScanRowBreaks | scan backwards to determine subtotaling information. |
| 624 | MkTotForm | generate a row total formula for a column. |
| 625 | FirstTotCol | determine first column which contains total formula on a row. |
| 626 | IsTotForm | examine formula to see if it looks like a total. |
| 628 | HighestFormRow | examine and chain formula references to find highest row referenced in formula. |

APPENDIX B

PROGRAM LISITING

```
/* MODES: TAB 4    Last Revision: Mon 05-29-89 06:58
**
** B123.H    -- 123 definitions for BUD
**
** Copyright (C) 1989 Saratoga Software, Inc. All rights reserved.
**
** 9/12/87 dbh Created.
*/ define MAXSTR   255 typedef ord16    ROW,COL;

define CPROW    1       /* control panel row */
#define CPROWS   2
#define MAXCOL   255
define MAXROW   8191 define ERR_MEMORY  0
define ERR_OPEN    10
#define ERR_NAE     17      /* name already exists */
define ERR_NONAME  18 typedef enum {
    T_BLANK, T_LABEL, T_INTEGER, T_NUMBER, T_FORMULA, T_NSTACK, T_NEWFORM
} CELL_TYPE;
define T_SHORTINT  T_NSTACK define FMT_DATE_DMY    0x72
define FMT_DATE_DM     0x73
#define FMT_DATE_MY     0x74
#define FMT_DATE_INTL   0x79
#define FMT_DATE_INTS   0x7a
#define FMT_DEF         0x7f
#define FMT_PERCENT     0x30
#define FMT_FIXED       0x00
#define FMT_DOLLAR      0x20
define FMT_COMMA       0x40 define FMT_MASK      0x7f
define FMT_TYPEMASK  0x70
define DEFAULT_FMT   0xff typedef struct {
    ord16   lft;
    ord16   top;
    ord16   rgt;
    ord16   bot;
} RANGE, *PRANGE, FAR QRANGE;
```

```c
extern char XDV_BUFFER[];

extern ord16 START_COL,START_ROW,END_COL,END_ROW;
extern byte ANCHORED;
#define Range123    (*(PRANGE)&START_COL)
#define TONE_BUMP    0
#define TONE_ERROR   1
#define TONE_BADKEY  2
define TONE_CTRLG   3 typedef enum (
    MODE_VALUE,
    MODE_POINT,
    MODE_EDIT,
    MODE_MENU,
    MODE_ERROR,
    MODE_LABEL,
    MODE_ENTER,
    MODE_QUERY,
    MODE_HELP,
    MODE_WAIT,
    MODE_FILES,
    MODE_STATUS,
    MODE_FORMAT,
    MODE_NAMES
) EDIT_MODE;
define MODE_BUD     MODE_FORMAT /* display bit flags */
define IND_WORKSHEET   0x0001  /* entire worksheet */
#define IND_MODE        0x0002  /* edit modes */
#define IND_END         0x0004  /* END indicator */
#define IND_SCROLL      0x0008  /* SCROLL lock indicaotr */
#define IND_CAPS        0x0010  /* CAPS lock indictaor */
#define IND_NUM         0x0020  /* NUM lock indicator */
#define IND_CIRC        0x0040  /* CIRC indicator */
#define IND_CALC        0x0080  /* CALC indicator */
#define IND_CMD         0x0100  /* CMD indicator */
#define IND_STEP        0x0200  /* STEP indicator */
#define IND_TIME        0x0400  /* TIME indicator */
#define IND_MEM         0x0800  /* MEM indicator */
#define IND_OVR         0x1000  /* OVR indicator */
define IND_EXTRA       0xE000  /* unused indicator bits */ define POST_MSG_AREA_SZ   38   /* # chars before indicators on bot line */ typedef enum (
    KEY_UP = 1,
    KEY_DOWN,
    KEY_LEFT,
    KEY_RIGHT,
    KEY_NAME,
    KEY_END,
    KEY_ABORT,
    KEY_GOTO,
    KEY_POINT,
    KEY_HELP,
    KEY_CR,
    KEY_ESC,
    KEY_RUBOUT,
    KEY_GRAPH,
    KEY_DELETE,
    KEY_HOME,
    KEY_CALC,
    KEY_SWITCH,
    KEY_TAB,
    KEY_BACKTAB,
    KEY_PGUP,
    KEY_PGDN,
    KEY_EDIT,
    KEY_TABLE,
    KEY_QUERY,
    KEY_INSERT,
    KEY_DD1 = 28,
```

```c
        KEY_DD2,
        KEY_DD3,
        KEY_DD4,
        KEY_BBASE = ' ',      /* base of 123-unaltered keys */
        KEY_MENU = '/',
        KEY_BESC = '~',       /* used to escape to special keys */
        KEY_HIGH = 0xff,      /* everything past here are bud defined */
        KEY_EXPAND,
        KEY_EXPANDALL,
        KEY_COLLAPSE,
        KEY_SIBUP,
        KEY_SIBDOWN,
        KEY_SIBHOME,
        KEY_SIBEND
) KEY123;
#define KEY_XLATE    (KEY_HIGH - KEY_BBASE)

/* text attributes */
#define AT_NORMAL    0
#define AT_REVERSE   1
#define AT_BRIGHT    2
#define AT_UNDER     4
#define AT_BLINK     8

/* addin entry aliases (for stack switching) */
#define GET_BREAK            ss_GET_BREAK
#define get_break            ss_GET_BREAK
#define GET_CHAR             ss_GET_CHAR
#define get_char             ss_GET_CHAR
#define GET_INPUT            ss_GET_INPUT
#define get_input            ss_GET_INPUT
#define DO_STRING            ss_DO_STRING
#define do_string            ss_DO_STRING
#define DO_ERROR             ss_DO_ERROR
#define do_error             ss_DO_ERROR
#define DO_NONFATAL          ss_DO_NONFATAL
define do_nonfatal          ss_DO_NONFATAL define DO_GETFILE           ss_DO_GETFILE
define do_getfile           ss_DO_GETFILE
#define DO_MENU              ss_DO_MENU
#define do_menu              ss_DO_MENU
#define DO_RANGE             ss_DO_RANGE
#define do_range             ss_DO_RANGE
#define DO_RANGE_LIST        ss_DO_RANGE_LIST
#define do_range_list        ss_DO_RANGE_LIST
#define DO_RECALC            ss_DO_RECALC
#define do_recalc            ss_DO_RECALC
#define DO_RECALC_RANGE      ss_DO_RECALC_RANGE
#define do_recalc_range      ss_DO_RECALC_RANGE
#define DO_ALLOC             ss_DO_ALLOC
#define do_alloc             ss_DO_ALLOC
#define DO_FREE              ss_DO_FREE
#define do_free              ss_DO_FREE
#define OUT_CELL             ss_OUT_CELL
#define out_cell             ss_OUT_CELL
#define GET_DISPLAYED_CELL   ss_GET_DISPLAYED_CELL
#define get_displayed_cell   ss_GET_DISPLAYED_CELL
#define DO_CREATE_RANGE      ss_DO_CREATE_RANGE
#define do_create_range      ss_DO_CREATE_RANGE
#define DO_DELETE_RANGE      ss_DO_DELETE_RANGE
#define do_delete_range      ss_DO_DELETE_RANGE
#define IN_CELL              ss_IN_CELL
#define in_cell              ss_IN_CELL
#define DO_INT               ss_DO_INT
#define do_int               ss_DO_INT
#define DO_FLOAT             ss_DO_FLOAT
#define do_float             ss_DO_FLOAT
#define DO_FTOS              ss_DO_FTOS
#define do_ftos              ss_DO_FTOS
#define DO_STON              ss_DO_STON
define do_ston              ss_DO_STON define CMP0_FLT     ss_CMP0_FLT
```

```
#define cmp0_flt      ss_CMP0_FLT
#define CMP_FLT       ss_CMP_FLT
#define cmp_flt       ss_CMP_FLT
#define FLT2INT       ss_FLT2INT
#define flt2int       ss_FLT2INT
#define INT2FLT       ss_INT2FLT
#define int2flt       ss_INT2FLT
#define DFLT2INT      ss_DFLT2INT
#define dflt2int      ss_DFLT2INT
#define DINT2FLT      ss_DINT2FLT
#define dint2flt      ss_DINT2FLT
#define NA_FLT        ss_NA_FLT
#define na_flt        ss_NA_FLT
#define ERR_FLT       ss_ERR_FLT
#define err_flt       ss_ERR_FLT
#define ADD_FLT       ss_ADD_FLT
#define add_flt       ss_ADD_FLT
#define SUB_FLT       ss_SUB_FLT
#define sub_flt       ss_SUB_FLT
#define MUL_FLT       ss_MUL_FLT
#define mul_flt       ss_MUL_FLT
#define DIV_FLT       ss_DIV_FLT
#define div_flt       ss_DIV_FLT
#define POP_FLT       ss_POP_FLT
#define pop_flt       ss_POP_FLT
#define PUSH_FLT      ss_PUSH_FLT
#define push_flt      ss_PUSH_FLT
#define DROP_FLT      ss_DROP_FLT
#define drop_flt      ss_DROP_FLT
#define SWAP_FLT      ss_SWAP_FLT
#define swap_flt      ss_SWAP_FLT
#define DUP_FLT       ss_DUP_FLT
define dup_flt       ss_DUP_FLT /* addin entries... */
define FNCT123(typ,name)    extern typ pascal name (void);
#define FUNC123(name)        FNCT123(void,name)

FUNC123( DO_MENU )   /* SI->messages, DI->procs */

FUNC123( DO_LOGO )
FUNC123( CHECK_TIMER )      /* CF>at time */
FUNC123( SET_TIMER )        /* AX:time in secs */

FUNC123( DO_BEEP )          /* void */
FUNC123( DO_DSPIND )        /* void */
FUNC123( DO_TONE )          /* BX:tone_code */
FUNC123( DO_WAIT )          /* void */
FNCT123( card8, GET_INDICATOR ) /* AL>editmode, BX>flags, SI->text */
FUNC123( SET_INDICATOR )    /* AL:editmode, BX:flags, SI->text */
FUNC123( GET_IND_STATUS )   /* AX>flags */
FUNC123( SET_IND_STATUS )   /* AX:flags */

FNCT123( char, GET_INPUT )  /* AL>char */
FNCT123( int, GET_CHAR )    /* AX>keycode, BX>funckey (no macros) */
FNCT123( char, DO_CHARTEST ) /* AL>char or -1 for no key */
#define NO_CHAR ((char)-1)

FUNC123( DO_STRING )        /* AL:editflag, CX:bufsz, SI->prompt, DI->buf */
FUNC123( DO_GETFILE )       /* AH:editflag, SI->prmpt, DI->def; >>filename */

FUNC123( DO_CELLPTR_UP )    /* void */
FUNC123( DO_CELLPTR_DOWN )  /* void */
FUNC123( DO_CELLPTR_LEFT )  /* void */
FUNC123( DO_CELLPTR_RIGHT ) /* void */
FUNC123( DO_DSP_CELLPTR )   /* AX:doc(0), CX:col, DX:row */
FUNC123( GET_CELLPTR )      /* AX>doc(0), CX>col, DX>row */

FUNC123( DO_RANGE_SCAN )    /* AL:order,SI->range,ES:DI->proc */

FUNC123( GET_DISPLAYED_CELL )   /* CX:col,DX:row; out like OUT_CELL */
FUNC123( IN_CELL )  /* AH:form,AL:type,CX:col,DX:row,SI->buf */
FUNC123( OUT_CELL ) /* AH:act,AL:blanks,CX:col,DX:row; */
                    /* AH>form,AL>typ,SI->buf,CX>len */
```

```
FUNC123( DO_HIDEMARK )    /* void */
FUNC123( DO_SETCUR )      /* CX:col,DX:row */
FUNC123( DO_SETMARK )     /* CX:col,DX:row */
FUNC123( GET_CUR )        /* CX>col,DX>row */
FUNC123( RESTORE_MARK )   /* void */
FUNC123( SAVE_MARK )      /* CX>col,DX>row */
FUNC123( DO_RECALC )      /* void */
FUNC123( DO_RECALC_RANGE )   /* AL:order,SI->range */

FUNC123( DO_VIDEOSYNC )   /* void */
FUNC123( REDISPLAY )      /* void */
FUNC123( DO_ERASE12 )     /* void */
FUNC123( DO_ERASEN )      /* CX:count */
FUNC123( DO_ERASE_LINES ) /* AX:start,CX:count */

FUNC123( DO_ALLOC )       /* AX:count; ES:BX->alloc */
FUNC123( DO_FREE )        /* AX:count, ES:BX->buf */
FUNC123( DO_PALLOC )      /* AX:count; ES:BX->alloc */
FUNC123( DO_PFREE )       /* AX:count, ES:BX->buf */
FUNC123( GET_FREEBYTES )  /* CX:BX>freebytes, DX:AX>heapsize */

FNCT123( card8, GET_COLWIDTH )     /* CX:col; AL>width */
FUNC123( SET_COLWIDTH )            /* CX:col, AL:width */
FNCT123( card8, GET_DEF_FORMAT )   /* AL>form */
FNCT123( card8, GET_DEF_COLWIDTH ) /* AL>width */
FUNC123( SET_DEF_COLWIDTH )        /* AL:width */

FUNC123( DO_ERROR )     /* SI->msg */
FUNC123( DO_NONFATAL )  /* SI->msg */

FUNC123( GET_BREAK )    /* CF>break */

FUNC123( GET_CELL_FMT ) /* CX:col,DX:row; AH>form,AL>type */
FUNC123( SET_CELL_FMT ) /* CX:col,DX:row,AH:form */

FUNC123( GET_ACTIVE )     /* CX>col,DX>row */
FUNC123( GET_SCRSIZE )    /* CX>col,DX>row */
FUNC123( GET_SHEETNAME )  /* ES:SI->buffer */
FUNC123( GET_STARTDIR )   /* ES:SI->buffer */
FNCT123( flg, DO_CHKPROT ) /* AL>protect_on */

FUNC123( DO_CREATE_RANGE ) /* AH:anch,SI->name,DI->range */
FUNC123( DO_DELETE_RANGE ) /* SI->name */
FUNC123( DO_RANGE )        /* AH:edit,AL:anch,CH:hide,SI->prmpt */
FUNC123( DO_RANGE_LIST )   /* ES:DI->proc */

FUNC123( DO_READA )   /* CX:len,ES:SI->buffer */
FUNC123( DO_WRITE )   /* CX:len,ES:SI->string */
FUNC123( DO_WRITEA )  /* CX:len,ES:SI->chrattrstr */
FUNC123( SET_ATTR )   /* AH:attr */
FUNC123( DO_OUTSTR )  /* CX:len,ES:SI->msg */
FUNC123( DO_MESSAGE ) /* ES:SI->msg */
FUNC123( DO_CHAROUT ) /* AL:char */

FNCT123( ord16, DO_INT )   /* x */
FUNC123( DO_FLOAT )        /* x */
FUNC123( DO_FTOS )         /* x */
FUNC123( DO_STON )         /* x */

/* floating pt routines */
FNCT123( ord16, CMP0_FLT )
FNCT123( ord16, CMP_FLT )
FNCT123( ord16, FLT2INT )
FNCT123( ord32, DFLT2INT )
FUNC123( INT2FLT )
FUNC123( DINT2FLT )
FUNC123( NA_FLT )
FUNC123( ERR_FLT )
FUNC123( ADD_FLT )
FUNC123( SUB_FLT )
FUNC123( MUL_FLT )
FUNC123( DIV_FLT )
FUNC123( POP_FLT )
FUNC123( PUSH_FLT )
FUNC123( DROP_FLT )
```

```
FUNC123( SWAP_FLT )
FUNC123( DUP_FLT )

#if 0    /* unused flt entries */
FUNC123( ISERR_FLT )
FUNC123( ISNA_FLT )
FUNC123( MINUS_FLT )
endif  /* unused flt entries */ define redisplay() DoRedisplay()    /* hack, should change cv*.c source */

/* end B123.H */

/* MODES: TAB 4
**
**  BDOVLY.H    -- bud data definitions for root
**
** Copyright (C) 1989 Saratoga Software, Inc.  All rights reserved.
**
*/ define XT extern include "bdovly.c"

/* MODES: TAB 4
**
**  DBROOT.H    -- bud data definitions for root
**
** Copyright (C) 1989 Saratoga Software, Inc.  All rights reserved.
**
*/ define XT extern include "bdroot.c"

/* MODES: TAB 5          Last Revision: Mon 05-29-89 06:59
**
**   BEMM.H -- defines for the expanded memory heap manager
**
** Copyright (C) 1989 Saratoga Software, Inc.  All rights reserved.
**
** 8/01/88 dbh    added Clear_EMM.
** 7/29/88 dbh    conditional include.
**
@style(tabwidth 5 chars)
@style(leftmargin 0 chars, rightmargin 0 chars, linewidth 80 chars)
@begin(format)
*/ if !defined(_BEMM_H)
define _BEMM_H 1 typedef    card32    XPTR;
define    XNULL     ((XPTR)0)

extern ord16 init_emm(ord16 percent_to_use);
extern void exit_emm(void);
extern void Clear_EMM(void);
extern XPTR allocm(card16 nBytes);
extern QPTR refm(XPTR handle);
extern void freem(XPTR handle, card16 size);
extern void save_emm(void);
extern void restore_emm(void);
extern void freemx(XPTR handle, card16 size);
extern XPTR allocmx(card16 nBytes);

#endif

/* @end(format) */

/* MODES: TAB 4     Last Revision: Mon 05-29-89 07:00
**
** BUD.H    --   common definitions for Bud.
```

```c
**
** Copyright (C) 1989 Saratoga Software, Inc.  All rights reserved.
**
** 7/26/88 dbh move ShowGoalVal into overlay.
** 8/21/87 dbh Created.
*/ define ITER_EXPAND 1   /* use iterative expand-all algorithm */ define DEVIN   0   /* 0 switches on my latest extensions */ define USERAM  0   /* 1 turns RAM storage-option on */ define FTAGS 0 /* 1 to allow tag rows on rgt/bot; 0 forces lft/top */ define BLANKS  4   /* # of blank lines to cause scope break */ define BOXLOGO 1 define LONG_LOGO_CT  2 /* number of invokes before reducing logo delay */
define TC_CHAR '?'        /* char to display tech credits */ define DELAY1      200     /* 1st logo delay in 1/100 seconds */
define DELAY2      80      /* 2nd logo delay in 1/100 seconds */
define TC_DELAY    2000    /* tech credits delay in 1/100secs */ define VERSION_ID  3
define CFG_ID      1 define MAXSPLIT 12     /* max split columns */
define MAXSAVE 19      /* max saved chars in keyboard handler */
#define MAXKEYS (1+MAXSAVE+MAXSPLIT)

define STR(x)   # x define BUD_EXT     "BUD"   /* file extension, special file name prefix */
define BUD_FILE    "BUD"   /* actual executable file name (no .ext) */
#define BUD_RANGE   "BUD"   /* bud range name prefix */
#define BUD_PRODUCT "BUD"   /* bud product acronym, mode string */

/* safety margins for allocation, etc. */
#define PUT_GAP     3000
#define ALLOC_GAP   3100
define MOVE_GAP    3200 ifdef nodebug
define debug 0
#else
#define debug 1
endif typedef enum { FALSE, TRUE } bool;
define NULL    0
#define QNULL   ((QPTR)0)

#define BEGDEF  do{
#define ENDDEF  }while(0)

#define forward
#define FOREVER while (1)

#define I   asm
#define CLC I clc
#define STC I stc
#define RETC        I mov ax,0; I rcl ax,1; return _AX
#define SAVC(var)   BEGDEF I mov ax,0; I rcl ax,1; var = _AX; ENDDEF
#define SETC(exp)   BEGDEF if (exp) STC; else CLC; ENDDEF
#define FIX_ES      BEGDEF I push cs; I pop es; ENDDEF
define FIX_DS      BEGDEF I push cs; I pop ds; ENDDEF define BP  Byte Ptr
define WP  Word Ptr
#define DP  Dword Ptr
#define BPG BP CGROUP:
```

```
#define WPG WP CGROUP:
#define DPG DP CGROUP:
#define ST_DWRD(v,hi,lo) BEGDEF I mov WPG v,lo; I mov WPG v+2,hi; ENDDEF
define LD_DWRD(hi,lo,v) BEGDEF I mov lo,WPG v; I mov hi,WPG v+2; ENDDEF define uns unsigned
define FAR far* typedef uns char    byte;
typedef uns int     word;
typedef uns long    dword;

typedef signed char ord8;
typedef signed int  ord16;
typedef signed long ord32;

typedef uns char    card8;
typedef uns int     card16;
typedef uns long    card32;

typedef card8 flg;

typedef void * PTR;
typedef void FAR QPTR;
typedef byte * BPTR;
typedef byte FAR QBPTR;
typedef char * CPTR;
typedef char FAR QCPTR;
typedef word * WPTR;
typedef word FAR QWPTR;

typedef void (*PFV)(void);
typedef int (*PFI)(void);

#define min(a,b)    ((a)<(b)?(a):(b))
#define max(a,b)    ((a)>(b)?(a):(b))

#define INRANGE(lo,mid,hi)   ((lo) <= (mid) && (mid) <= (hi))

/* CTYPE macros */
#define isdigit(c)  INRANGE('0',(c),'9')
#define isupper(c)  INRANGE('A',(c),'Z')
#define islower(c)  INRANGE('a',(c),'z')

/* machine specific stuff for TurboC from DOS.H */
void    __int__(int interruptnum);
#define GenInt(i)   __int__(i)
#define DBGTRAP()   GenInt(3)
extern void ss_dos_int(void);
#define DosInt()    ss_dos_int()
#define CallDos(f)    (_AH = (f), DosInt())
#define CallDosDX(f,d)    (_DX = (d), _AH = (f), DosInt())

/* TC library prototypes */
extern int cdecl sprintf(char * buf, char * form, ... );

include "b123.h"   /* 123 types and values ... */ define KEY_INT 0x16 define KI_READ     0
define KI_CHECK    1
#define KI_SHIFT    2

/* special entries ... */
extern void pascal la_init(void);   /* no parms */ define la_move ss_la_move
define la_copy ss_la_copy
extern void pascal la_move(void);   /* AX:fixup, SI->srcrange, DI->dstrange */
extern void pascal la_copy(void);   /* AX:fixup, SI->srcrange, DI->dstrange */ define la_file_save        ss_la_file_save
define la_file_retrieve    ss_la_file_retrieve
```

```c
extern int pascal la_file_save(void);        /* SI->name; AX,CF>error */
extern int pascal la_file_retrieve(void);    /* SI->name; AX,CF>error */ typedef struct {
    COL TitleCols;
    ROW TitleRows;
    COL TitleLft;
    ROW TitleTop;
} TITLEINFO;

extern void pascal la_title_info(void); /* BX->titleinfo */
extern void pascal la_set_titles(void); /* AX:lft,BX:cols, CX:top,DX:rows */ extern void pascal la_enable_protect(void);
extern void pascal la_disable_protect(void);
#define ProtectOn()     la_enable_protect()
#define ProtectOff()    la_disable_protect()
#define IsProtectOn()   DO_CHKPROT()

extern void pascal la_get_upper_left(void); /* CX>col, DX>row */
extern void pascal la_set_upper_left(void); /* CX:col, DX:row */ extern flg pascal la_get_calcmode(void);    /* AL>calcOn */
define IsAutoCalcOn()  (la_get_calcmode())

extern flg pascal la_system_exit(void); /* AL>sysexit */
#define IsSystemExit()  (la_system_exit())

extern byte pascal la_colwidth(void);       /* CX:col; AL>width (0=default) */
#define GetColWidthValue(col)   (_CX=(col), la_colwidth())

extern void pascal la_hide_column(void);    /* _CX:col; CF if last column */
extern void pascal la_expose_column(void);  /* _CX:col */
#if 0
extern void HideCol(COL col);
extern void ExposeCol(COL col);
#else
#define HideCol(col)    (_CX = (col), la_hide_column())
#define ExposeCol(col)  (_CX = (col), la_expose_column())
endif extern flg cdecl MvRange(
    ord16 left, ord16 top, ord16 right, ord16 bot,
    ord16 left2, ord16 top2
    );
#define MoveRange(l,t,r,b,l2,t2,r2,b2)  MvRange((l),(t),(r),(b),(l2),(t2))

extern flg cdecl CopyRange(
    ord16 left, ord16 top, ord16 right, ord16 bot,
    ord16 left2, ord16 top2, ord16 right2, ord16 bot2
    );
extern void cdecl EraseRange(
    ord16 left, ord16 top, ord16 right, ord16 bot
    );
extern void cdecl RecalcRange(
    ord16 left, ord16 top, ord16 right, ord16 bot
    );
extern void RecalcCell(ROW row, COL col);

/* array for subtotal info */
#define MAX_SUB_TOT 60  /* based on MAXSTR and formula syntax */
typedef struct {
    ROW row;
    uns ct;
} SUBTOT;

/*  SUBTOT  rSubTots[MAX_SUB_TOT]; -- see def below */

/* buffers -- time share with XDV_BUFFER (size is 0x605 -= 1.5K) */
#define rCTcache ((uns *)XDV_BUFFER)    /* note this overlays buffer too */
#define rfTotals XDV_BUFFER
#define buffer   (rfTotals  + (MAXCOL+1))
#define formbuf  (buffer    + (MAXSTR+1))
#define savebuf  (formbuf   + (MAXSTR+1))
#define rSubTots    ((SUBTOT*) (savebuf + (MAXSTR+1)))
```

```
#define help_spc_size        (2*80)  /* number of char/attr pairs */
#define help_special_buffer (XDV_BUFFER+1024)

#if 1
#define msg_buffer  (help_special_buffer+(2*help_spc_size))
#else
extern char msg_buffer[];
endif /* total use is 256*4 + 60*4 = 1264   (less than 1541) */

/* bud types */
typedef card16 EVENT;

typedef card16 LEVEL;
typedef card16 TAG;
typedef card8 CFORM;
typedef card8 CTYPE;

#define MAXLEVEL    0xFFF0
#define BLANKLEVEL  0xFFF1
#define BARSLEVEL   0xFFF2

/* use NUMs to defeat TC's double handling */
typedef struct {
    double d;
} NUM, * PNUM, FAR QNUM;
#define MSW(n)   ( ((word*)&(n)) [3] )

typedef enum { MOD_PERCENT, MOD_DELTA, MOD_ENTER } MODTYPE;

#define TAGNULL 0
#define TAGINIT 1
extern TAG nextTag;

typedef enum {
    TAG_NONE    = 0,
    TAG_OSHEET  = 1,
    TAG_TOT     = 2,
    TAG_OS_TOT  = 3,     /* TAG_OSHEET | TAG_TOT */
    TAG_SAVTOT  = 4,
/*  TAG_MARK    = 8 */
} TAGTYPE;

#define TAG_SHIFT   3
#define TAG_MASK    (TAG_OSHEET|TAG_TOT|TAG_SAVTOT)

#define IS_TOT(tt)  (((tt)&-TAG_SAVTOT) == TAG_TOT)

#define TAG_CH_OSHEET   '+'
#define TAG_STR_OSHEET  "+"
typedef enum {
    JAN, FEB, MAR, APR, MAY, JUN, JUL, AUG, SEP, OCT, NOV, DEC, NO_MONTH
} MONTH_VALS;

extern char * MkMonthName(int month,flg fShortMonth,int monthCap);

#if 0   /* old values */
typedef enum {
    CT_NULL  = 0,
    CT_YEAR  = 1,
    CT_QTR   = 2,
    CT_MONTH = 4,
    CT_DAY   = 8,
} COLTYPE;              /* column header types (bitmasks) */
else /* column type attribute bits: lower values -> higher significance */
typedef enum {
    CT_NULL    = 0,
    CT_GRAND   = 0x0001,    /* thinking about it? */
    CT_YEAR    = 0x0002,
    CT_CUSTHI  = 0x0004,    /* suggest that custom periods fit here */
    CT_HALF    = 0x0004,    /* not impl. */
```

```
    CT_QTR      = 0x0008,
    CT_CUSTLO   = 0x0400,    /* cust pericds here: 0x0004..0x0400 (8 levels) */
    CT_BIMONTH  = 0x0400,    /* not impl. */
    CT_MONTH    = 0x0800,
    CT_BIWEEK   = 0x1000,    /* not impl. */
    CT_WEEK     = 0x2000,    /* not impl. */
    CT_DAY      = 0x4000,
} eCOLTYPE;                  /* column header types (bitmasks) */
typedef uns COLTYPE;

#define CT_FULL_DATE   (CT_YEAR|CT_MONTH|CT_DAY)
#define CT_BASIC_DATE  (CT_MONTH|CT_DAY)

endif extern COLTYPE CTNormal(COLTYPE ct);
define CTFull(ct)   (((ct)<<1)-1)   /* full bits from normalized coltype */ typedef enum {
    BO_NULL,
    BO_NONE,
    BO_SINGLE,
    BO_DOUBLE,
} BARS_OPT;

typedef enum {
    AT_DIFF,
    AT_PER_DIFF,
    AT_RUN_TOT,
    AT_PER_TOT,
    AT_RUN_PER_TOT,
} ANALYSIS_TYPE;

typedef enum {
    AS_GROUP,
    AS_SIMILAR,
    AS_RANGE,
    AS_WHOLE,
} ASCOPE_TYPE;

#if !defined(_BEMM_H)
#include "bemm.h"
endif define CHUNK_SIZE  128 /* !! check implementation of convert routines
                        ** if chunk size changes.
                        */
typedef uns CHUNK;      /* swap "chunk" index (128*64Kb -> 8Mb) */ extern card32 ChunkToInt(CHUNK Addr);
extern CHUNK IntToChunk(card32 Val);

typedef struct {
    CHUNK Addr;
    CHUNK Size;
} SWAP_REC, FAR QSWAP_REC;
define MAX_FREE    64 define SWAP_HDR_SIZE   512    /* one sector */
define INIT_CHUNK  (SWAP_HDR_SIZE/CHUNK_SIZE)

typedef struct {
    uns     HdrID;
    uns     HdrSz;
    uns     VerID;
    uns     ChunkSize;
    CHUNK   TagsAddr;
    CHUNK   NextChunk;
    RANGE   BudRange;
    RANGE   ColHdrRange;
    RANGE   SaveRange;
    RANGE   TitleRange;     /* future */
    RANGE   ExtraRanges[2]; /* future */
    TAG     NextTag;
```

```c
        uns     FirstMon;
        uns     AdjCount;
        uns     FreeCount;
        uns     TagsCount;
        byte    StoreOpt;
        flg     fColHdrDef;
        uns     SplitCols;
        uns     NumPeriods;
        byte    Reserved[24];   /* future -- 100 bytes for fields up to here */
        SWAP_REC FreeVector[MAX_FREE];
        byte    Padding[SWAP_HDR_SIZE-100-(MAX_FREE*sizeof(SWAP_REC))];
} SWAP_HDR;

typedef struct cval {
    XPTR xNxtCVal;
    ROW row;
    COL col;
    NUM value;
    flg fFlip;
} CVAL, FAR QCVAL;

typedef XPTR XCVAL;
#define refcv(x)    ((QCVAL)refm(x))

typedef struct {
    CTYPE   Type;
    CFORM   Form;
} CELL_HDR;

typedef struct {
    ord32   ival;
} INT_DATA;

typedef struct {
    ord16   sival;
} SHORT_INT_DATA;

typedef struct {
    NUM nval;
} NUM_DATA;

typedef struct {
    uns vlen;
} VAR_DATA;

typedef union {
    SHORT_INT_DATA si;
    INT_DATA i;
    NUM_DATA n;
    VAR_DATA v;
} UDATA;

typedef struct {
    CELL_HDR    Head;
    UDATA       Data;
} CELL_REC;

extern byte rCellSizes[];

typedef union {
    XPTR        x;
    SWAP_REC    s;
} STREAM, XCELL;

extern void FreeStream(STREAM Stream);

extern QSWAP_REC qFreeList;
extern uns SwapFreeCount;
extern CHUNK SwapNextChunk;
extern SWAP_REC AllocSwap(card32 len);
extern void AddToFree(SWAP_REC sr);
extern void InitFreeList(void);

extern STREAM CopyRamToDisk(STREAM Stream);
```

```c
extern STREAM CopyDiskToRam(STREAM Stream);
extern flg CopyRowsToDisk(flg fFree);
extern flg CopyRowsFromDisk(void);

typedef struct {
    XPTR    next;
    uns     len;
    byte    data[1];
} STREAM_HDR, FAR QSTREAM_HDR;
#define STREAM_HDR_SIZE (sizeof(STREAM_HDR)-1)

typedef struct rrec {
    struct rrec FAR qNxtRow;
    STREAM  Cells;
#if USERAM
    STREAM  Temp;
#endif
    TAG     child;
    COLTYPE tot;
    LEVEL   level;
    ROW     OrgRow;
    uns     ctCells;
    TAG     span;
} RREC, FAR QRREC;

typedef struct trec {
    struct trec FAR qNxtTag;
    TAG tag;
    QRREC qFirst;
    QRREC qLast;
    int AdjID;
    COL LftCol;
    int Lock;
    flg fSavTot;
} TREC, FAR QTREC;

extern QTREC tags;
extern XCVAL cvals;

/* far ptr funcs */
extern card16 qstrlen(QPTR src);
extern QPTR qstrcpy(QPTR dst, QPTR src);
extern int qstrcmp(QPTR s1, QPTR s2);
#define qstricmp    FAR_STRICMP    /* alias */
extern int qstricmp(QPTR s1, QPTR s2);

extern QPTR qmovmem(QPTR src, QPTR dst, card16 cnt);
extern void memclr(void *src, unsigned n);

/* misc. functions */
extern card16 ScanInt(char * str, ord16 * pi);
extern int putdec(char * str, uns i, int width);

#define COL_HIDDEN_BIT  0x8000
#define ColIsHidden(col)    (GetColWidth(col) == 0)
extern card16 GetColWidth(COL col);
extern int GetColInfo(COL col);
extern void SetColInfo(COL col,int ColInfo);
extern void ShiftColWidths(COL col,int dir,int defInfo);

extern void ErrBeep(void);
extern void KeyBeep(void);
extern void BumpBeep(void);

extern void GetWinDimensions(void);

extern void DoRedisplay(void);
extern flg MaybeRecalc(void);
extern void ClearMsgArea(void);
extern void ClearMsg(void);
extern void PostMsg(char * msg);
extern void PostErrMsg(void);

/* range scanning */
```

```
extern flg fIsNonBlank;
extern void ScanBlankCell(void);
extern void ScanTotCell(void);
extern void ScanCTotCell(void);
extern void cdecl ScanRange(
    ord16 left, ord16 top, ord16 right, ord16 bot, PFV ScanFunc
    );
#define ScanTotRange(l,t,r,b)    ScanRange(l,t,r,b,ScanTotCell)
#define ScanCTotRange(l,t,r,b)   ScanRange(l,t,r,b,ScanCTotCell)
#define ScanBlankRange(l,t,r,b) (                  \
    fIsNonBlank=FALSE,                             \
    ScanRange(l,t,r,b,ScanBlankCell),              \
    fIsNonBlank                                    \
    )

extern ROW OrgRow;
extern COL OrgCol;
extern ROW WinOrgRow;
extern COL WinOrgCol;
extern ROW WinRows;
extern COL WinWidth;
extern COL ScrnWidth;

extern ROW CurRow,BotRow,TopRow,OldOrgRow;
extern COL CurCol,RgtCol,LftCol,OldOrgCol;

extern flg fReady;

extern EVENT GetEvent(void);
extern void UnGetEvent(EVENT evt);
extern flg CtrlBreakDetect(void);
extern void GetDispOriginCell(void);
extern flg Navigate(EVENT evt);
extern void MoveToCur(void);
extern void DoDisplay(flg fRecalc);

extern CFORM cellForm;
extern CTYPE cellType;
extern char * cellPtr;

extern flg GetCell(ROW row,COL col);
extern flg GetCellForm(ROW row,COL col);
extern flg GetCellStack(ROW row,COL col,PNUM pVal);
extern flg IsBlankCell(ROW row,COL col);
extern flg IsBarsCell(ROW row,COL col);

extern flg PutCell(ROW row,COL col,CTYPE ctype,CFORM cform,PTR val);
#define PutCellStack(r,c,cf)    PutCell((r),(c),T_NSTACK,(cf),NULL)
extern void EraseCell(ROW row,COL col);

extern ord16 cv_dirty_bit;

extern EVENT FirstEvent;
extern void EditCell(EVENT evt);
extern void CellEdit1(void);
extern void CellEdit2(void);

extern flg EditBuf(void);
extern flg in_string(
    int edit_mode_flg,
    EVENT entry_evt,
    uns max_string_length,
    char *prompt_string,
    char *in_string_buffer,
    int display_start_row,
    int display_start_col,
    int starting_edit_cursor_position
);
extern EVENT last_evt;

#define REF(q)   (q)
extern QPTR allocq(card16 sz);
```

```
extern void freeq(QPTR q, card16 sz);
extern card32 GetFreeSpace(void);

extern LEVEL GetLevel(ROW row);
extern LEVEL XGetLevel(ROW row,flg fRawMode);

extern char * months[];
extern char * smonths[];

extern int cYr, cMon, cDay, cQtr;
extern COLTYPE PrsDate(ROW row,COL col);
extern COLTYPE PrsDateStr(char * str);
extern char * ScanMonth(char * str, int * pMon);

extern uns GrabCell(ROW row, COL col, flg fStore);
extern flg PlaceCell(ROW row,COL col,int rdelta,int cdelta);
extern QRREC FreeRow(QRREC qr);
extern QRREC GrabRow(ROW row);
extern QRREC PutRow(ROW row,QRREC qr,int cdelta);
extern QRREC GrabCol(COL col);
extern QRREC PutCol(COL col,QRREC qc);

extern void MakeCellConstant(ROW r,COL c);
extern void MakeRowConstant(ROW r);
extern void MakeColConstant(COL c);
extern flg NewSub(ROW r);

extern QTREC MkTag(void);
extern QTREC FindTag(TAG tag);
extern void FreeTag(TAG tag);
extern flg IsATag(void);

extern flg RowHasChildren(ROW row);

extern TAGTYPE ScanTag(ROW row,TAG *pTag);
extern flg PlaceTag(ROW row,TAG tag,TAGTYPE ttype);
#define ClearTag(r)   PlaceTag(r,TAGNULL,TAG_NONE)

extern TAGTYPE ScanCTag(COL col,TAG *pTag,COLTYPE *pCT);
extern void PlaceCTag(COL col,TAG tag,TAGTYPE ttype,COLTYPE ct);
#define ClearCTag(c)    PlaceCTag(c,TAGNULL,TAG_NONE,CT_NULL)

extern int CountTag(TAG tag, flg fFullExpand);

typedef enum { CR_NORM, CR_TOT, CR_STOP, CR_NEWTOT } CR_CODE;

extern CR_CODE ScopeForward(ROW row,int * pSkip,LEVEL * pLev,
              flg fIndentSeen,flg * pfIndentFound);
extern int CheckForNewTot(ROW row, ROW minRow);

extern flg OkToChange(flg fFYear);
extern flg ColTotsPresent(COLTYPE ct);

extern int SpanCols(COL cl,COLTYPE ct,COL * pCHi,COLTYPE * pLoCT);

extern int DoExpand(ROW row,flg fFullExpand,flg fDoChilds);
extern int DoCollapse(ROW row,ROW * pNewRow);
extern int DoTotals(ROW row,BARS_OPT BarsOpt);
extern int DoRemTot(ROW row);
extern int DoMove(ROW To,ROW FromTop,ROW FromBot);

extern int ExpandAll(/*flg fRestore*/ void);
/*extern void RestoreAll(void);*/ extern int DoCTotals(COL cl,COL ch,COLTYPE ct,flg fForShow);

extern flg ColExpandAll(COLTYPE * pCur);
extern flg DoColTots(COLTYPE ct,flg fRemove,flg fForShow);

extern void DoAnalysis(void);
/* definition stuff */
extern flg fBudAttached;
extern flg fBudActive;
extern flg fBudDefined;
```

```c
extern RANGE BudRange;   /* active range */
#define RowsBound()  (BudRange.top != BudRange.bot)
#define ColsBound()  (BudRange.lft != BudRange.rgt)

if FTAGS extern flg fTagLft;
extern flg fTagTop;

#define TagCol()     (fTagLft ? BudRange.lft : BudRange.rgt)
#define TagRow()     (fTagTop ? BudRange.top : BudRange.bot)

else define fTagLft 1
define fTagTop 1 define TagCol()     (BudRange.lft)
define TagRow()     (BudRange.top)

endif define BudLeft()    (BudRange.lft)
define BudTop()     (BudRange.top)
extern COL BudRight(void);
extern ROW BudBottom(void);
extern ROW ABudBottom(void);

extern COL MaxCol(void);
#define AMaxCol()    MaxCol()
#define FMaxCol()    (BudRange.rgt+fTagLft)

extern ROW MaxRow(void);
extern ROW BoundMaxRow(void);
#define AMaxRow()    MaxRow()
#define FMaxRow()    (BudRange.bot+fTagTop)

extern COL AMinCol(void);
extern COL MinCol(void);
extern ROW AMinRow(void);
extern ROW MinRow(void);

#define LevelCol(lev)     (MinCol() + ((lev) >> 8))
#define LevelIndent(lev)  (lev & 0xff)

extern ROW SetRowLim(int row);

#define RNG_ANCH     0x00ff
#define RNG_EDIT     0xff00
extern flg SelectRange(char * prmpt, uns option);
extern flg EditBudRange(void);
extern uns NewBudRange(RANGE * pRng,flg fEdit);

extern flg PromptString(char * prmpt);

extern flg SenseBud(void);
extern flg SenseColHdr(void);

extern int menu_choice;

extern flg DoAMenuH(void * menustrs, void * menuprocs, card8 helpcode);
extern flg DoAMenu(void * menustrs, void * menuprocs);

/* file i/o stuff */
extern flg fFileOpen;
extern flg fRWinCons;
extern flg fUseIFN;

extern flg  OpenBudFile(flg fWrite);
extern flg  FileWriteFix(int fhndl,QPTR q,card16 sz);
extern flg  WriteFix(QPTR q,card16 sz);
#define     WriteQ  WriteFix
extern flg  FileReadFix(int fhndl,QPTR q,card16 sz);
```

```c
extern flg   ReadFix(QPTR q,card16 sz);
extern flg   ReadQ(QPTR *pq,card16 sz);
extern void  FileClose(int fhndl);
extern void  CloseCurFile(void);
extern void  AbortBudFile(void);
extern void  KillSwapFile(void);

extern void c_clear(void);
extern void c_save(void);
extern void c_retrieve(void);

#define DoSetAttr(attr) BEGDEF _AH = (attr); SET_ATTR(); ENDDEF
#define DoSetCur(row,col) BEGDEF _CX=(col); _DX=(row); DO_SETCUR(); ENDDEF
#define DoMessage(str)  BEGDEF FIX_ES; _SI = (uns)(str); DO_MESSAGE(); ENDDEF
#define DoNonFatal(str) BEGDEF _SI = (uns)(str); DO_NONFATAL(); ENDDEF
#define DoOutstr(str,len)    \
    BEGDEF FIX_ES; _SI=(uns)(str);_CX=(len);DO_OUTSTR(); ENDDEF
#define DoEraseN(len)     BEGDEF _CX = (len); DO_ERASEN(); ENDDEF
#define DoEraseLines(start,ct)   \
    BEGDEF _CX = (ct); _AX = (start); DO_ERASE_LINES(); ENDDEF extern void GotoMsgArea(void);
extern void WriteScoreBoard(void);
extern void ReadScoreBoard(int * pBuf);

typedef enum {
    STATE_NORM,
    STATE_GOAL,
    STATE_CONS,
    STATE_PERIODS
} BUD_STATE;

extern BUD_STATE BudState;

#define BoundsState()   (BudState <= STATE_GOAL)
#define NoBoundsState() (BudState >= STATE_CONS)

typedef struct {
        byte    chr;
        byte    scan;
} AKEY;

typedef union {
    word    w;
    AKEY    k;
} UKEY;

#define MAKE_KEY(s,k)    (((s) << 8) | (k))
#define ESCAPE_KEY  MAKE_KEY(1,0x1b)
#define BESC_KEY    MAKE_KEY(SCAN_BESC,KEY_BESC)
#define ALT_F10_KEY MAKE_KEY(SCAN_ALT_F10,0)
#define RIGHT_KEY   MAKE_KEY(SCAN_RIGHT,0)
#define MENU_KEY    MAKE_KEY(53,KEY_MENU)

extern flg fGoalIsLower;
extern NUM GoalVal;
extern ROW GoalRow;
extern COL GoalCol;

extern MODTYPE ModType;
extern flg DoModMenu(void);

extern NUM NumValue;
extern flg GetNumVal(char * prmpt);

#define INTERR   ((int)0x8000)
extern int GetIntVal(char * prmpt,int def,int hival);

extern NUM OldValue;
extern NUM ModValue;
extern flg GetModValue(void);
extern flg ApplyMod(ROW row,COL col,PNUM pn);
```

```c
extern XCVAL FindCVal(ROW row,COL col);
extern XCVAL AddCVal(ROW row,COL col,PNUM pn);
extern void FreeCVals(void);
extern void FreeCVal(XCVAL xvf);

extern void SaveCalc(void);
extern void RestCalc(void);
extern void MaybeSetCalcOn(void);

extern void CreateRange(char * name,PRANGE pr);
extern flg QueryRange(char * name,PRANGE pr);

extern ROW MkSaveArea(void);
extern ROW GetSaveRow(void);
extern ord16 read_wk1(card8 filename[], ord16 read_worksheet_settings);
extern ord16 save_wk1(card8 filename[], ord16 write_spec_ranges);
extern void clear_wk1_rec_contents(void);
extern void set_cons_boundaries(void);
extern ord16 fdelem(card8 *filename);
extern char * MkHomeFileName(char * outname,char * fname,char * ext);

#if debug
extern uns dpfmask;
extern void cdecl dpf(ord8 dbcode,char *format,...);
/*extern void LostTag(TAG tag); */
endif define LostTag(x)

extern char * MkColName(COL c,char ColName[]);
extern char * MkCellName(ROW row,COL col,char CellName[]);
extern flg FixupFormula(char FAR qForm,
            ROW KeyRow,int RowDelta,COL KeyCol,int ColDelta);
extern ROW HighFormRow(char * pForm);
extern flg IsTotalForm(char * pForm);
extern flg isTotLabel(char * str);

extern QPTR Find123Str(char * str,int slen,char last);
extern flg DoEventLoop(void);

extern RANGE ColHdrRange;
#define CHdrBot (ColHdrRange.bot)
#define CHdrTop (ColHdrRange.top)
#define CHdrLft (ColHdrRange.lft)

extern ROW CHdrRow;
extern ROW SetCHdrRow(void);

extern flg fColHdrDef;
extern flg GetColHdrRange(void);
extern flg EditColHdrRange(void);
extern void InitColHdrs(void);
extern void UpdateColRange(void);
extern void UpdateBudRange(void);
extern flg RngOk(PRANGE pr);

extern uns GetGoalVal(ROW row,COL col,char * buf);
extern void ShowGoalVal(void);
extern void TimeOff(void);
extern void TimeOn(void);

extern void DelRows(ROW row, int NumRows, flg fUnBound);
extern flg InsRows(ROW row, int NumRows, flg fUnBound);

extern void InsOSRows(ROW row,int NumRows);
extern void DelOSRows(ROW row,int NumRows);
extern int PrsRange(char FAR qStr, RANGE * pRng, flg * pfRAbs,flg * pfCabs);

extern flg FormRangeCheck(char * pForm,PRANGE pBrng,flg fForRows);

extern void ReadScreenText(ROW row,COL col,card16 len);
#define INS_DEL_TEXT_LEN (35+2+8+8)

extern card8    select_insert_col_range_string[];
```

```
/*           "Enter column insert range: ";   */
extern card8    select_insert_row_range_string[];
/*           "Enter row insert range: "; */
extern card8    select_delete_col_range_string[];
/*           "Enter range of columns to delete: ";   */
extern card8    select_delete_row_range_string[];
/*           "Enter range of rows to delete: ";   */ extern flg fKeepCons;
extern flg fKeepPeriods;
extern void consolidation_attachment_initialization(void);
extern ROW highest_row;
extern COL highest_col;

typedef struct {
    card16 rType;
    card16 rLen;
} EOFR, BHR;        /* 123's EOF record */ typedef struct bpr {
    card16 rType;
    card16 rLen;
    ord32 BudPos;
} BPR;              /* our locator record */ define FN_BUF_SZ   (2+64+13+1)
extern card16 FileHandle;

typedef enum { SEEK_ABS, SEEK_REL, SEEK_END } SEEK_MODE;

extern card32 FileSeek(int fhndl,SEEK_MODE mode,ord32 pos);
extern card32 Seek(SEEK_MODE mode,ord32 pos);
#define CurFilePos()    Seek(SEEK_REL,0)

typedef struct {
    char    ff_reserved[21];
    char    ff_attrib;
    uns     ff_ftime;
    uns     ff_fdate;
    long    ff_fsize;
    char    ff_name[13];
} DIR_INFO;

extern flg DosFindFirst(char * pName, DIR_INFO * pDirrec);
extern flg DosFindNext(DIR_INFO * pDirrec);
extern flg find_first(char * pName);

typedef struct {
    void * menustrs;
    void * menuprocs;
} MENUSTACK;

extern void BudHelp(void);

#define SCREEN_WIDTH        80
#define NO_HELP_ROWS              18
#define HELP_SCREEN_START_ROW    3
/* make sure that the number of chars read in for each screen doesn't overrun
    text_val_buffer (which is BIGGEST_BUFFER_LENGTH long), keeping in mind that
    the first SCREEN_WIDTH chars of it are used for the decoded line. */
/*#define    HELP_NO_SCREEN_CHARS   (BIGGEST_BUFFER_LENGTH-SCREEN_WIDTH-5)*/
#define  HELP_NO_SCREEN_CHARS    (SCREEN_WIDTH*NO_HELP_ROWS)
#define  NO_HELP_SCREENS    103
#define  NO_HELP_TOPICS      8
#define  HELP_LINE_INDENT    5
define  AVG_TOPIC_NAME_LENGTH    13 define HS_NIL   0xff
define HS_DEFAULT   0 define HS_INTRO             4
define HS_OUTLINES       12
#define HS_SHOWHIDE       24
```

```
#define HS_TOTALS            34
#define HS_GT                42
#define HS_ANALYSIS          50
#define HS_CONSOLIDATION     59
define HS_DISK              101 define HS_CALCSELECTM       (HS_ANALYSIS+6) /* calc or select total */
define HS_VALUESM           (HS_ANALYSIS)   /* top-level values */
#define HS_SCOPEM            (HS_ANALYSIS+5) /* group/similar/range/whole */
#define HS_SHOWDEPTHM        (HS_SHOWHIDE+4) /* next/all/whole */
#define HS_MODIFYM           (HS_GT+1) /* GT 1st menu: number/diff/percent */
#define HS_GOALM             (HS_GT)   /* top-level goal tracking */
#define HS_MAINM             (HS_OUTLINES) /* main bud menu */
#define HS_OPTM              (HS_DISK-1) /* options menu */
#define HS_KEYM              (HS_SHOWHIDE+7) /* key enable/disable */
#define HS_COLM              (HS_TOTALS+3) /* columns menu */
#define HS_ANALM             (HS_GT) /* top-level analysis menu */
#define HS_TOTM              (HS_TOTALS) /* row total menu */
#define HS_STOREM            (HS_DISK) /* storage menu */
#define HS_LOCKM             (HS_SHOWHIDE+9) /* locking menu */
#define HS_CONS_FIRST        (HS_CONSOLIDATION)
#define HS_CONS_TOP          (HS_CONSOLIDATION+0)
#define HS_CONS_CREATE       (HS_CONSOLIDATION+2)
#define HS_CONS_ADD          (HS_CONSOLIDATION+4)
#define HS_CONS_MATCHUP      (HS_CONSOLIDATION+6)
#define HS_CONS_LINKBY       (HS_CONSOLIDATION+14)
#define HS_CONS_NAMEDRANGE   (HS_CONSOLIDATION+20)
#define HS_CONS_SPECFILE     (HS_CONSOLIDATION+27)
#define HS_CONS_DELETE       (HS_CONSOLIDATION+28)
#define HS_CONS_MODIFY       (HS_CONSOLIDATION+29)
#define HS_CONS_ERASE        (HS_CONSOLIDATION+22)
#define HS_CONS_VIEW         (HS_CONSOLIDATION+17)
#define HS_CONS_ROW_INTERACTIVE (HS_CONSOLIDATION+23)
#define HS_CONS_COL_INTERACTIVE (HS_CONSOLIDATION+25)
#define HS_CCUSTM            (HS_OUTLINES+5)
#define HS_PERIODS_CREATE    (HS_OUTLINES+6)
#define HS_SPLIT_COLS        (HS_OUTLINES+10)

extern card8 HelpStack[];
extern int CurHelpInd;

#define InitHelpStack() (CurHelpInd = 0, HelpStack[0] = HS_DEFAULT)
extern void PushHelp(card8 HelpScreen);
extern void PopHelp(void);

typedef struct adj_rec {
    struct adj_rec FAR qNext;    /* must be first field for aliasing */
    flg     AdjFlags;
    byte    AdjCol;
    int     AdjCnt;
} ADJ_REC, FAR QADJ_REC;

extern QADJ_REC qFirstAdj;
extern QADJ_REC qLastAdj;
extern int AdjCount;

extern void AddAdjRec(COL col,int NumCols,flg fTotal);
extern QADJ_REC FindAdjRec(int AdjCnt);
extern void PlayAdjRecs(int AdjID, ROW top, ROW bot, flg fLastIsTot);
extern void AdjustAdjRecs(int Adjust);
extern void TrimAdjRecs(void);

extern void FixCTags(COL key,COL col,int delta);

typedef enum {
    SO_SHEET,
    SO_DISK,
    SO_RAM,
} STORE_OPT;

#if USERAM
#   define SO_DEFAULT SO_RAM
#else
```

```
#   define SO_DEFAULT SO_SHEET
endif extern STORE_OPT StoreOpt;
define OnSheet()    (StoreOpt == SO_SHEET)
#define OnDisk()     (StoreOpt == SO_DISK)

extern void SwitchStore(STORE_OPT NewOpt);

define BOILER_PLATE_ROWS 5 extern flg RowIsLocked(ROW row);
extern flg UnLockRow(ROW row);
extern flg DoLocking(flg fLock, char * pw, PRANGE pRng);
extern int HashPW(char * pw);
extern char bud_file_ext[];
extern char * SetFileExtension(char fname[],char * ext);
extern void DeleteWSFile(char wsname[]);

extern int internal_read_wkl(char f[],int n);
extern int internal_save_wkl(char f[],int n);

extern flg fConsWSDirty;
extern void SaveTempWS(void);
extern void RestoreTempWS(void);

typedef enum {
    OE_CONSMENU,
    OE_ENTERCONS,
    OE_PERIODSMENU,
    OE_ENTERPERIODS,
    OE_EDITCELL,
    OE_MAINMENU,
    OE_GOALMENU,
    OE_EXPANDCUR,
    OE_EXPANDCURALL,
    OE_COLLAPSECUR,
    OE_WRITE,
    OE_READ,
    OE_SHOWGOAL,
    OE_ADJUST,
    OE_EDITBUDRNG,
    OE_SENSE,
    OE_ATTACH,
    OE_TERMINATE,
    OE_READPERIODS,
    OE_ENTERGOAL,
/*  OE_UPDCV, */
} OVL_ENTRIES;

#define OVL_BUD      1
#define OVL_CONS     2
#define OVL_PERIODS  3
#define OVL_ATTACH_DETACH   3
define OVL_GOAL     3 typedef struct {
    uns rootsz;
    uns sz;
} OVL_HDR;

extern flg LoadOverlay(int OvlNum);
extern flg OvlEnter(OVL_ENTRIES action);
extern void BEG_OF_OVLY(void);

/* these are only to be used by OvlEnter() */
extern void DoConsMenu(void);
extern flg EnterConsolidate(void);
extern void DoPeriodsMenu(void);
extern flg EnterPeriods(void);
extern void DoGoalMenu(void);
extern flg EnterGoal(void);

extern void DoMainMenu(void);
```

```c
extern void ExpandCur(flg fFull);
extern void CollapseCur(void);
extern flg WriteBud(void);
extern flg ReadBud(void);
extern void UpdateCurVal(void);
extern void Adjust(void);
extern flg SysSense(PRANGE prng);
extern flg SysSenseBud(void);
extern flg ovl_attach(void);
extern flg ovl_terminate(void);

extern void KeyHandler(void);
extern void RemoveKeyHandler(void);
extern flg InvokeOvlEntry(int OvlNum,OVL_ENTRIES OvlCode);
extern void InitVars(void);
extern void PostSignOn(void);

extern char * internal_file_name;

typedef struct {
    card8   day;
    card8   mon;
    card16  yr;
} DATE, *PDATE, FAR QDATE;

typedef union {
    card32 q;   /* for quick access in setting/compares */
    DATE d;
} UDATE;

#define NODATE   (0L)

typedef struct tunit {
    struct tunit FAR nxt;
    UDATE   last_date;  /* last date of period;
                        ** year may be zero if insignificant
                        */
    UDATE   user_date;  /* unmolested date value */
    byte    parent;     /* order in parent */
    byte    col;        /* column in spec */
    char    name[1];    /* variable length part;
                        ** null -> named by last date
                        */
} TUNIT, * PTUNIT, FAR QTUNIT;  /* time unit */ typedef struct pdesc {
    QCPTR name;         /* name for menus */
    uns units;          /* # of time units */
    QTUNIT first_unit;  /* time unit list;
                        ** if null, dates or custom names
                        */
} PERIOD_DESC;

#define MAX_PDS 8
define NUM_DVALS   6 typedef struct {
    int d[NUM_DVALS];
    UDATE ud;
} DVALS, *PDVALS;

#define YVALI    0
#define MVALI    1
#define DVALI    2
#define QVALI    3
#define CYVALI   4
define CMVALI   5 define YVAL    d[YVALI]
define MVAL    d[MVALI]
#define DVAL    d[DVALI]
#define QVAL    d[QVALI]
#define CYVAL   d[CYVALI]
#define CMVAL   d[CMVALI]
```

```c
define UPDVAL(old,new) BEGDEF if ((old) == 0) (old) = (new); ENDDEF typedef struct {
    int perPlace[MAX_PDS];
    DVALS dv;
    int yr;
    flg fWrap;
    flg fDateSeen;
} SCREC, *PSCREC;

typedef struct {
    SCREC old,new;
} SCANREC, *PSCANREC;

#define InitScanRec(pScan)   memclr((pScan),sizeof(SCANREC))
extern void RstScanRec(PSCANREC pScan);
extern void UpdScanRec(PSCANREC pScan);

extern PERIOD_DESC periods[MAX_PDS];
extern uns  num_periods;
extern int  low_date_period;

#define CustPeriods()    (num_periods != 0)

extern flg fPeriodsSet;
extern flg fRWTmp;

extern void ClrPeriods(void);
extern void FreePeriods(void);
extern flg ReadPeriods(void);
extern flg WritePeriods(void);
extern flg ReadPeriodsFile(flg fTmp);
extern flg WritePeriodsFile(flg fTmp);
extern flg OvlReadPeriods(void);
extern int SearchPer(char * str, PSCANREC pScan);
extern int SearchPerName(int per, char * str, int first);
extern QTUNIT FindTUnit(int per,int item);
extern COLTYPE PrsColHdr(COL col,PSCANREC pScan);

#define CFG_HDR_SZ   0x80
define CFG_MARK     0xfdbe typedef struct {
    uns cfg_mark;
    uns cfg_ver;
    uns logo_ct;
    uns def_split;
    uns def_firstmon;
    char reserved[CFG_HDR_SZ-(5*sizeof(uns))];
} CFG_HDR;

typedef struct {
    uns def_split;
    uns def_firstmon;
} OLD_CFG_HDR;

extern flg ColHasValues(ROW top,ROW bot,COL col,flg fAcceptLabels);

/* end BUD.H */

/* MODES: TAB 4
**
** BD3OVLY.H   -- bud data definitions for root
**
** Copyright (C) 1989 Saratoga Software, Inc.  All rights reserved.
**
*/ define XT extern include "bd3ovly.c"

/* MODES: TAB 4     Last Revision: Mon 05-29-89 06:59
**
** BANAL.C -- Bud analysis functions.
```

```
**
** Copyright (C) 1989 Saratoga Software, Inc.  All rights reserved.
**
** 7/19/88 dbh fix to scopeforward calls (0.3)
** 7/14/88 dbh added do_waits.
** 6/12/88 dbh Created.
*/ include "bud.h"
include "bdroot.h"
#include "bdovly.h"
#include <string.h>
include <mem.h>

NUM nPrev,nTot,nRun,nCur;
flg fNoPrev,fPrevNull;

/*:ANALIZECELL */
void AnalizeCell(ROW row,COL col)
{
    flg fPercent = FALSE;
    flg fCurNull;

fCurNull = !GetCellForm(row,col) || cellType == T_LABEL;
    if (fPrevNull && fCurNull)
        return;

if (!fCurNull)
        fCurNull = GetCellStack(row,col,&nCur);

if (fCurNull)
        nCur = NUM_ZERO;

{
        FIX_ES;
        _SI = &nCur;
        PUSH_FLT();

switch (AnalysisType) {
        case AT_PER_DIFF:
            nTot = nPrev;
            fPercent = TRUE;
            /*fall-thru*/
        case AT_DIFF:
            if (!fNoPrev) {
                FIX_ES;
                _SI = &nPrev;
                PUSH_FLT();
                SUB_FLT();
            }
            nPrev = nCur;
            fPrevNull = fCurNull;
            if (fNoPrev) {
PutNull:
                DROP_FLT();
                EraseRange(col,row,col,row);
                fNoPrev = FALSE;
                return;
            }
            break;

case AT_RUN_PER_TOT:
            fPercent = TRUE;
            /*fall-thru*/
        case AT_RUN_TOT:
            if (fNoPrev) {
                nRun = NUM_ZERO;
                fNoPrev = FALSE;
            }
            FIX_ES;
            _SI = &nRun;
            PUSH_FLT();
            ADD_FLT();
```

```c
                DUP_FLT();
                FIX_ES;
                _DI = &nRun;
                POP_FLT();
                break;

case AT_PER_TOT:
                fPercent = TRUE;
                break;
        } if (fPercent) {
            FIX_ES;
            _SI = &nTot;
            PUSH_FLT();
            CMP0_FLT();
            if (_AX == 0) {
                DROP_FLT();
                goto PutNull;
            }
            DIV_FLT();
            cellForm &= ~FMT_MASK;
            cellForm |= 0x30;
        }
        PutCellStack(row,col,cellForm);
    }
} /* end AnalizeCell */

/*:TOTALCELL */
void TotalCell(ROW row,COL col)
{
    if (!GetCellForm(row,col) || cellType == T_LABEL)
        return;

if (GetCellStack(row,col,NULL)) {
        DROP_FLT();
    } else {
        FIX_ES;
        _SI = &nTot;
        PUSH_FLT();
        ADD_FLT();
        FIX_ES;
        _DI = &nTot;
        POP_FLT();
    }
} /* end TotalCell */

/*:AGROUP */
int AGroup(ROW row, ROW min, ROW * pLo, ROW * pHi, flg * pfTot, LEVEL * pLev)
{
    ROW savrow;
    CR_CODE crc;
    int skip;
    flg fTot;

*pfTot = FALSE;
    crc = ScopeForward(row,&skip,pLev,FALSE,NULL);
    if (crc == CR_STOP)
        return -1;
    fTot = (crc != CR_NORM);
    if (skip <= 0) {
        if (min == 0)
            return 1;
        savrow = row;
        FOREVER {
            if (--row < min)
                return 1;
            crc = ScopeForward(row,&skip,pLev,FALSE,NULL);
            if (crc == CR_STOP)
                return -1;
            fTot = (crc != CR_NORM);
            if (row + skip + fTot >= savrow)
                break;
        }
```

```
    }
    *pLo = row;
    *pHi = row + skip + 1;
    *pfTot = fTot;
    return 0;
} /* end AGroup */

/*:DOROWANAL */
void DoRowAnal(ROW minRow, ROW maxRow, flg fTotal, flg fTotGrp, COL minCol)
{
    COL c;
    ROW r;
    LEVEL lev;

if (fTotGrp) {
        PlaceTag(maxRow, maxRow-minRow+1, TAG_TOT | TAG_SAVTOT);
        MakeRowConstant(maxRow);
    }
    if (!fColHdrDef) {
        lev = GetLevel(minRow);
        if (lev < MAXLEVEL)
            minCol = LevelCol(lev) + 1;
    }
    for (c=minCol; c < MaxCol(); ++c) {
        if (fTotal) {
            nTot = NUM_ZERO;
            if (fCalcTot) {
                for (r=minRow; r < maxRow; ++r) {
                    TotalCell(r,c);
                }
            } else {
                GetCellStack(AnalTotRow,c,&nTot);
            }
        }
        fPrevNull = fNoPrev = TRUE;
        for (r=minRow; r < maxRow; ++r) {
            if (GetLevel(r) < MAXLEVEL)
                AnalizeCell(r,c);
        }
    }
} /* end DoRowAnal */

/*:DOCOLANAL */
void DoColAnal(COL minCol, COL maxCol, flg fTotal, COLTYPE ctOrg, ROW minRow)
{
    COL c; ROW r, maxRow;
    COLTYPE ctt,loCt;
    int i;
    card8 t;

/* !! make constants */

/* determine coltype level to use for totaling (and cache CTs) */
    loCt = 0;
    for (c=minCol; c < maxCol; c += SplitCols) {
        rCTcache[c] = ctt = CTNormal(PrsColHdr(c,NULL));
        if (ctt > loCt) loCt = ctt;
    }
    if (loCt == 0) return;

/* set totaled and modified columns flags */
    for (c=minCol; c < maxCol; c += SplitCols) {
        ctt = rCTcache[c];
        t = (ctOrg == CT_NULL) ?                /* no orgin column */
                (ctt == loCt   ? 3 : 0) :       /* mod and total iff lo */
                (ctt == ctOrg  ? 3 : 0) ;       /* mod and total iff matchs org */
        rfTotals[c] = t;
        if (t == 0 &&
            (ctt < ctOrg || ctOrg == CT_NULL)
        ) {     /* not modifying && totals over mods */
            MakeColConstant(c); /*!! and mark tag?? */
        }
    }
```

```
    /* row by row, total group, then do mod */
    maxRow = BoundMaxRow();
    if (CABoundRange.bot+1 < maxRow)
        maxRow = CABoundRange.bot+1;
    for (r=max(minRow,CABoundRange.top); r < maxRow; ++r) {
        for (i=0; i < SplitCols; ++i) {
            if (fTotal) {
                nTot = NUM_ZERO;
                for (c=minCol; c < maxCol; c += SplitCols) {
                    if (rfTotals[c] & 2)
                        TotalCell(r,c+i);
                }
            }
            fPrevNull = fNoPrev = TRUE;
            for (c=minCol; c < maxCol; c += SplitCols) {
                if (rfTotals[c] & 1)
                    AnalizeCell(r,c+i);
            }
        }
    }
} /* end DoColAnal */

/*:DOANALYSIS */
void DoAnalysis(void)
{
    CR_CODE crc;
    COLTYPE ct2,ctOrg,loct;
    ROW r,loRow,hiRow,minRow,maxRow;
    COL c,hiCol,minCol,maxCol;
    LEVEL lev,mLev;
    int ret,skip;
    flg fTotal, fTotGrp;

DO_WAIT();
    fTotal = (AnalysisType == AT_PER_TOT || AnalysisType == AT_RUN_PER_TOT);
    GET_CELLPTR();
    r = _DX;
    c = _CX;
    maxRow = BoundMaxRow();
    maxCol = MaxCol();
    if (fColHdrDef) {
        minCol = CHdrLft; /*LevelCol(GetLevel(CHdrRow));*/
        minRow = CHdrBot + 1;
    } else {
        minRow = MinRow();
        minCol = MinCol();
    }
    while (minRow < maxRow && GetLevel(minRow) >= MAXLEVEL)
        ++minRow;

if (fDoRow) {
        fTotGrp = FALSE;
        switch (AScopeType) {
        case AS_RANGE:
            minRow = Range123.top;
            maxRow = (r=Range123.bot) + 1;
        break;
        case AS_WHOLE:
            break;
        case AS_GROUP:
        case AS_SIMILAR:
            if (AGroup(r,minRow,&loRow,&hiRow,&fTotGrp,&mLev))
                return;
            if (AScopeType == AS_GROUP) {
                minRow = loRow+1;
                maxRow = hiRow;
                break;                  /* break to do single group */
            }
            /* scan back over sibblings */
            for (r=loRow; --r >= minRow; ) {
                crc = ScopeForward(r,&skip,&lev,FALSE,NULL);
                if (crc == CR_STOP || lev < mLev || r+skip >= loRow) {
                    ++r;
                    break;
```

```
            }
        }
        if (r < minRow) r = minRow;

/* scan forward doing sibbling groups */
        while (r < maxRow) {
            ret = AGroup(r,0,&loRow,&hiRow,&fTotGrp,&lev);
            if (ret < 0 || lev < mLev)
                break;
            if (ret > 0)
                ++r;
            else {
                if (lev == mLev)
                    DoRowAnal(loRow+1, hiRow, fTotal, fTotGrp, minCol);
                r = hiRow + fTotGrp;
            }
        }
        return; /* avoid the common row analysis after switch */
    } /* end switch AScopeType */
    DoRowAnal(minRow, maxRow, fTotal, fTotGrp, minCol);
} /* end row analyisis */
else {                  /* Do column analysis */
    SetCHdrRow();
    InitScanRec(&colscan);
    ctOrg = CTNormal(PrsColHdr(c-((c-minCol)%SplitCols),NULL));
    if (ColType == CT_NULL)
        DoColAnal(minCol,maxCol,fTotal,ctOrg,minRow);
    else {
        ct2 = CTFull(ColType);
        c = minCol;
        FOREVER {
            /* skip over totals && blanks */
            while (c < maxCol && PrsColHdr(c,&colscan) <= ct2) {
                UpdScanRec(&colscan);
                MakeColConstant(c); /*!! and mark tag?? */
                c += SplitCols;
            }
            if (c >= maxCol) break;          /* spanned all cols */
            RstScanRec(&colscan);
            SpanCols(c,ColType,&hiCol,&loct);
            if ((!(ScanCTag(hiCol,NULL,NULL) & TAG_TOT))
                || (PrsColHdr(hiCol,&colscan) > ct2)
            ) { /* no total? */
                hiCol += SplitCols;          /* include hi */
            }
            DoColAnal(c,hiCol,fTotal,ctOrg,minRow);
            c = hiCol;                       /* next group */
        } /* end forever (span cols) */
    } /* end else use total level */
} /* end column analysis */
} /* end DoAnalysis */

/* end BANAL.C */

/* MODES: TAB 4      Last Revision:  Mon 05-29-89 06:59
**
**  BCOLS.C -- Bud column management functions.
**
** Copyright (C) 1989 Saratoga Software, Inc.  All rights reserved.
**
** 7/23/88 dbh use emm for cell data.
** 9/11/87 dbh Created.
*/ include "bud.h"
include "bdroot.h"
#include "bdovly.h"
#include <string.h>
include <mem.h> define FY_FIX_TOT  0   /* 1 for FY last week fixup in total generation */ define OLD colscan.old
define NEW colscan.new
```

```c
#if !USERAM
define save_emm()
#   define restore_emm()
endif define debugPer (0 && debug)

if debugPer
void PrnPeriods(void)
{
    char buf[80];
    int i,j;
    QTUNIT qt;
    PERIOD_DESC *pp;

dpf(-1,"Periods: n=%d, c=%d, f=%d, t=%d\n",
            num_periods,periods_nCols,periods_first_col_was_dates,ColType);

for (pp=periods,i=0; i < num_periods; ++i,++pp) {
        qstrcpy(buf,pp->name);
        dpf(-1,"%d: '%s' %d\n",i,buf,pp->units);

for (qt=pp->first_unit,j=0; qt!=QNULL; qt=qt->nxt,++j) {
            qstrcpy(buf,qt->name);
            dpf(-1,"    %d- p=%d,c=%d; %d/%d/%d",j,qt->parent,qt->col,
                qt->last_date.d.mon,qt->last_date.d.day,qt->last_date.d.yr);
            dpf(-1,", u=%d/%d/%d '%s'\n",
                qt->user_date.d.mon,qt->user_date.d.day,qt->user_date.d.yr,
                buf);
        }
    }
}
endif
/*:UPDSCANREC */
void UpdScanRec(PSCANREC pScan)
{
    pScan->new.fWrap = FALSE;
    movmem(&(pScan)->new,&(pScan)->old,sizeof(SCREC));
} /* end UpdScanRec */

/*:RSTSCANREC */
void RstScanRec(PSCANREC pScan)
{
    pScan->old.fWrap = FALSE;
    movmem(&(pScan)->old,&(pScan)->new,sizeof(SCREC));
} /* end RstScanRec */

/*:CTNormal -- make a normalized column type */
COLTYPE CTNormal(COLTYPE ct)
{
    uns ctNorm;

for (ctNorm=1; ctNorm <= (uns)ct; ctNorm <<= 1);
    return (ctNorm >> 1);
} /* end CTNormal */

/*:CTTOPERIOD */
int CTToPeriod(COLTYPE ct)
{
    int per;
    for (per=-1; ct >= CT_CUSTHI; ++per, ct >>= 1);
    return (per);
} define PeriodToCT(per) (CT_CUSTHI << (per))

if 0
/*:PERPARENT */
int PerParent(int per,int perI,int cItem)
{
    while (perI > per) {
```

```
            cItem = FindTUnit(perI,cItem)->parent + 1;
            --perI;
        )
        return (cItem);
) /* end PerParent */
endif /*:SETPERITEM */
void SetPerItem(int per,int item,PSCREC pSCR)
{
    QTUNIT qt;
    int peri;
    int i,j,first;
    flg fWrap;
    /* for more significant periods, update positions */
    i = item;
    for (peri=per; peri >= 0 && i != (j=pSCR->perPlace[peri]); --peri) {
        if (j > i)   /* prev value > this one */
            pSCR->fWrap = TRUE;
        pSCR->perPlace[peri] = i;
        if (peri == 0)
            break;
        i = FindTUnit(peri,i)->parent + 1;
    )

/* for less significant periods */
    i = item;
    while (++per < num_periods) {
        first = pSCR->perPlace[per];
        j = max(1,first);
        qt = FindTUnit(per,j);
        fWrap = FALSE;
        FOREVER {
            if (qt == QNULL) {
                if (fWrap || first == 0)
                    return;
                j = 1;
                fWrap = TRUE;
                qt = periods[per].first_unit;
            )
            if (fWrap && j == first)
                return;

if (qt->parent+1 == i) {
                if (first == j)
                    return;
                pSCR->perPlace[per] =
                i = j;
                if (fWrap)
                    pSCR->fWrap = TRUE;
                break;
            )
            qt = qt->nxt;
            ++j;
        )
    )
) /* end SetPerItem */

/*:SEARCHPERDATE */
int SearchPerDate(int per, UDATE ud)
{
    QTUNIT qt;
    int i;
    UDATE mask;

qt = periods[per].first_unit;
    if (qt->last_date.q == 0)
        return 0;
    mask.q = -0L;
    if (qt->last_date.d.yr == 0)
        ud.d.yr = 0;
    else if (ud.d.yr == 0)
        mask.d.yr = 0;
```

```c
        for (i=0; qt != QNULL; qt=qt->nxt, ++i) {
            if (ud.q <= (qt->last_date.q & mask.q))
                return (i+1);
        }
        return 0;
} /* end SearchPerDate */

DVALS xdv,cdv;

/*:XPRSDATE */
COLTYPE XPrsDate(ROW row,COL col)
{
    COLTYPE ct;

memclr(&xdv,sizeof xdv);
    ct = PrsDate(row,col);
    if (ct != CT_NULL) {
        if (ct & CT_QTR) {
            if (CustPeriods())
                return CT_NULL;
            xdv.QVAL = cQtr;
        }
        xdv.DVAL = cDay;
        if (ct & CT_MONTH) {
            xdv.CMVAL = cMon;
            xdv.MVAL = cMon - FirstMon;
            if (xdv.MVAL <= 0) xdv.MVAL += 12;
            xdv.QVAL = (xdv.MVAL-1)/3 + 1;
        }
        if (ct & CT_YEAR) {
            xdv.CYVAL = xdv.YVAL = cYr;
            if (ct & CT_MONTH) {
                if ((xdv.CMVAL > FirstMon) && (FirstMon != 0))
                    ++xdv.YVAL;
            }
        }
    }
    return (ct);
} /* end XPrsDate */

/*:PRSCOLHDRROW -- parse a (possibly) column header cell */
COLTYPE PrsColHdrRow(ROW row,COL col,PSCANREC pScan)
{
    COL cLim;
    COLTYPE ct;
    int per;

cLim = col + SplitCols;
    do {
        ct = XPrsDate(row,col);
        /* XPrsDate leaves cellPtr active and has strlwr'd the text */
        if (CustPeriods()) {
            per = SearchPer(cellPtr, pScan);
            if (per >= 0 && (perDay == 0 || ct == CT_NULL)) {
                ct = PeriodToCT(per);
                if (pScan != NULL) {
                    SetPerItem(per,cItem,&pScan->new);
                    if (perYr != 0)
                        pScan->new.dv.YVAL = perYr;
                }
            }
        }
    } while (ct == CT_NULL && ++col < cLim);

return (ct);
} /* end PrsColHdrRow */ void UpdDval(PDVALS old,PDVALS new)
{
    int i,*po,*pn;
    for (po=old->d, pn=new->d, i=0; i < NUM_DVALS; ++i, ++po, ++pn)
        if (*po == 0 || *pn != 0)
            *po = *pn;
}
```

```
/*:PRSCOLHDR     -- parse a (possibly) column header cell */
COLTYPE PrsColHdr(COL col,PSCANREC pScan)
{
    ROW row;
    COLTYPE ctt, ct=CT_NULL;

memclr(&cdv,sizeof cdv);
    for (row=CHdrRow; row >= CHdrTop; --row) {
        ctt = PrsColHdrRow(row,col,pScan);
        if (ct == 0)
            ct = ctt;
        if (ctt & (CT_YEAR|CT_MONTH|CT_DAY|CT_QTR))
            UpdDval(&cdv,&xdv);
    }
    cdv.ud.d.yr = cdv.CYVAL;
    cdv.ud.d.mon = cdv.CMVAL;
    cdv.ud.d.day = max(cdv.DVAL,1);

if (pScan != NULL) {
        if (ct != CT_NULL) {
            UpdDval(&pScan->new.dv,&cdv);
            if (cdv.ud.d.yr == 0)
                cdv.ud.d.yr = pScan->new.dv.ud.d.yr;
            pScan->new.dv.ud.q = cdv.ud.q;
        }
    } return (ct);
} /* end PrsColHdr */

/*:SETCHDRROW */
ROW SetCHdrRow(void)
{
    ROW row;
    COL col;
    LEVEL lev;

if (!fColHdrDef)
        return (CHdrRow = 0);

for (row = CHdrBot; row >= CHdrTop; --row) {
        lev = GetLevel(row);
        if (lev < MAXLEVEL) {
            col = LevelCol(lev);
            if (PrsDate(row,col) != CT_NULL)
                break;
            if (CustPeriods()) {
                GetCell(row,col);
                if (SearchPer(strlwr(cellPtr),NULL) >= 0)
                    break;
            }
        }
    }
    return (CHdrRow = (row < CHdrTop) ? CHdrBot : row);
} /* end SetCHdrRow */

/*:PLACECTAG     -- format and install column tag on sheet */
void PlaceCTag(COL col,TAG tag,TAGTYPE ttype,COLTYPE ct)
{
    ROW row;
    char *str;
    CTYPE ctype;

row = TagRow();
    GetCellForm(row,col);

if (ttype == TAG_NONE) {
        ctype = T_BLANK;
    } else {
        str = (ttype & TAG_OSHEET) ? TAG_STR_OSHEET : empty_string;
        sprintf(buffer,"%s%u+%u+%u,\"%s\"",TagStr,ttype,tag,ct,str);
        ctype = T_FORMULA;
    }
    PutCell(row,col,ctype,cellForm,buffer);
```

```
        RecalcCell(row,col);
} /* end PlaceCTag */

/*:PLACECTAGSPLIT */
void PlaceCTagSplit(COL col,TAG tag,TAGTYPE ttype,COLTYPE ct)
{
    int i;

tag /= SplitCols;
    for (i = 0; i < SplitCols; ++i)
        PlaceCTag(col+i,tag,ttype,ct);
} /* end PlaceCTagSplit */

/* MODES: TAB 4     Last Revision:  Mon 05-29-89 06:58
**
** B123.H    --    123 definitions for BUD
**
** Copyright (C) 1989 Saratoga Software, Inc.  All rights reserved.
**
** 9/12/87 dbh Created.
*/ define MAXSTR  255 typedef ord16   ROW,COL;

define CPROW   1
#define CPROWS  2         /* control panel row */
#define MAXCOL  255
define MAXROW  8191 define ERR_MEMORY  0
define ERR_OPEN    10
#define ERR_NAE     17       /* name already exists */
define ERR_NONAME  18 typedef enum {
    T_BLANK, T_LABEL, T_INTEGER, T_NUMBER, T_FORMULA, T_NSTACK, T_NEWFORM
} CELL_TYPE;
define T_SHORTINT  T_NSTACK define FMT_DATE_DMY    0x72
define FMT_DATE_DM     0x73
#define FMT_DATE_MY     0x74
#define FMT_DATE_INTL   0x79
#define FMT_DATE_INTS   0x7a
#define FMT_DEF         0x7f
#define FMT_PERCENT     0x30
#define FMT_FIXED       0x00
#define FMT_DOLLAR      0x20
define FMT_COMMA       0x40 define FMT_MASK      0x7f
define FMT_TYPEMASK  0x70
define DEFAULT_FMT   0xff typedef struct {
    ord16   lft;
    ord16   top;
    ord16   rgt;
    ord16   bot;
} RANGE, *PRANGE, FAR QRANGE;

extern char XDV_BUFFER[];

extern ord16 START_COL,START_ROW,END_COL,END_ROW;
extern byte ANCHORED;
#define Range123    (*(PRANGE)&START_COL)

/*:SCANCTAG -- scan column tag value from sheet */
TAGTYPE ScanCTag(COL col,TAG * pTag,COLTYPE * pCT)
{
    TAG tag = TAGNULL;
    TAGTYPE tt = TAG_NONE;
```

```
    card16 i;
    COLTYPE ct = CT_NULL;

GetCell(TagRow(),col);
    if ((cellType == T_FORMULA) && IsATag()) {
        cellPtr += 6;
        i = ScanInt(cellPtr, (ord16*) &tt);
        cellPtr += i;
        if (*cellPtr == '+') {
            i = ScanInt(++cellPtr, (ord16*) &tag);
            cellPtr += i;
            if (*cellPtr == '+') {
                ScanInt(++cellPtr, (ord16*) &ct);
            }
        }
    } if (pTag != NULL)    *pTag = tag;
    if (pCT != NULL)     *pCT = ct;

return (tt);
} /* end ScanCTag */

/*:COLTOTSPRESENT */
flg ColTotsPresent(COLTYPE ct)
{
    COL col, colMax = MaxCol();
    COLTYPE ctt;

if (fColHdrDef) {
        for (col=MinCol(); col < colMax; ++col) {
            if ((ScanCTag(col,NULL,&ctt) & (TAG_TOT|TAG_OSHEET))
                && (ctt & ct)
            )
                return TRUE;
        }
    }
    return FALSE;
} /* end ColTotsPresent */

/*:SETCOLLIM      -- set col limit for collapse/expand */
COL SetColLim(COL col)
{
    ROW ColLim = MaxCol();

while ( ColLim > col &&
            !ScanBlankRange(ColLim-1,MinRow(),ColLim-1,MaxRow()-1)
          )
        --ColLim;
    return (ColLim);
}

/*:DELCOLBOUND -- delete cols within row range */
void DelColBound(COL col, card16 NumCols, ROW top, ROW bot, flg fPlayBack)
{
    COL cc,ColMax;
    flg fRecalc;

ColMax = MaxCol() - 1;
    if (fPlayBack)
        --bot;
    MoveRange(  col+NumCols,    top,    ColMax,             bot,
                col,            top,    ColMax-NumCols,     bot );
    if (fPlayBack) {
        ++bot;
        fRecalc = FALSE;
        for (cc=col+NumCols; cc <= ColMax; ++cc) {
            GetCell(bot,cc);
            if (cellType == T_FORMULA)
                fRecalc = TRUE;
            PutCell(bot,cc-NumCols,cellType,cellForm,cellPtr);
        }
        if (fRecalc)
            RecalcRange( col, bot, ColMax-NumCols, bot );
```

```
    }
    EraseRange( ColMax-NumCols+1, top, ColMax, bot );
} /* end DelColBound */

/*:DELCOLS  -- delete cols and slide tail up */
void DelCols(COL col, card16 NumCols)
{
    DelColBound(col, NumCols, AMinRow(), AMaxRow()-1, FALSE );
    while (NumCols--) {
        if (CurCol >= col)
            --CurCol;
        ShiftColWidths(col,-1,0);
    }
} /* end DelCols */

/*:INSCOLBOUND -- Insert cols within row range */
void InsColBound(COL col,uns NumCols,ROW top,ROW bot,COL ColMax,flg fPlayBack)
{
    COL cc,hiCol;
    flg fRecalc;

hiCol = BudRight()-NumCols;
    if (ColMax > hiCol)
        ColMax = hiCol;

if (fPlayBack)
        --bot;
    MoveRange(  col,            top,    ColMax,         bot,
                col+NumCols,    top,    ColMax+NumCols, bot );
    if (fPlayBack) {
        ++bot;
        fRecalc = FALSE;
        for (hiCol=0,cc=ColMax; cc >= col; --cc) {
            if (GetCell(bot,cc) && hiCol == 0)
                hiCol = cc;
            if (hiCol != 0) {
                if (cellType == T_FORMULA)
                    fRecalc = TRUE;
                PutCell(bot,cc+NumCols,cellType,cellForm,cellPtr);
            }
        }
        if (fRecalc)
            RecalcRange( col+NumCols, bot, hiCol+NumCols, bot);
    }
    EraseRange( col, top, col+NumCols-1, bot );
} /* end InsColBound */

/*:INSCOLS  -- insert cols and slide tail down */
flg InsCols(COL col, card16 NumCols)
{
    COL ColMax,RgtCol,rgt;
    int NeedCols;

ColMax = SetColLim(col) - 1;
    RgtCol = ColMax+NumCols;
    NeedCols = RgtCol + 1 - FMaxCol();
    if (RgtCol > MAXCOL)
        return TRUE;
    if (BudRange.rgt > BudRange.lft && NeedCols > 0) {
        rgt = BudRange.rgt;
        GET_ACTIVE();
        if (_CX > rgt)   /* stuff after us? */
            return TRUE;
        /* else, extend bud range */
        BudRange.rgt += NeedCols;
    }

InsColBound(col, NumCols, AMinRow(), AMaxRow()-1, ColMax, FALSE );
    if (CurCol >= col)
        CurCol += NumCols;
    while (NumCols--) {
        ShiftColWidths(col,1,0);
    }
    return FALSE;
```

```c
} /* end InsCols */

/*:SPANCOLS -- determine spanning columns for ct level */
int SpanCols(COL cl,COLTYPE ct,COL * pCHi,COLTYPE * pLoCT)
{
    int ch,cMax;
    COLTYPE ctt,ctfull,loct;
    int blanks;
    int per,perI;
    int datePer;
    int idv;
    flg fUseYearBreak;

*pLoCT = loct = CT_NULL;
    ctt = PrsColHdr(cl,&colscan);
    UpdScanRec(&colscan);
    if (ctt < ct)
        return 0;

ctfull = CTFull(ct);

if (CustPeriods()) {
        fUseYearBreak = (!periods_first_col_was_dates && periods_nCols <= 1);
        per = CTToPeriod(ct);
        perI = CTToPeriod(ctt);
        datePer = low_date_period < 0 ? per : low_date_period;
#if 1
        if (perI >= num_periods) {
            cItem = SearchPerDate(datePer,NEW.dv.ud);
            if (cItem == 0)
                return 0;
            SetPerItem(datePer,cItem,&NEW);
            UpdScanRec(&colscan);
        } /* else, scanrec allready updated in PrsColHdr */
#else
        if (perI >= num_periods) {
            iItem = SearchPerDate(per,cDate);
            iYr = cCalYr;
        } else {
            iItem = PerParent(per,perI,cItem);
            iYr = perYr;
        }
        if (iItem == 0)
            return 0;
#endif
    } else {
        switch (ct) {
        case CT_YEAR:   idv = YVALI;    break;
        case CT_QTR:    idv = QVALI;    break;
        case CT_MONTH:  idv = CMVALI;   break;
        }
    }

/* find range over which to total */
    blanks = 1;
    ch = cl;
    cMax = MaxCol();
    while ((ch += SplitCols) < cMax) {  /* scan for higher bound */
        ctt = PrsColHdr(ch,&colscan);
        if (ctt == CT_NULL) {
            ++blanks;
            continue;
        }
        if (ctt < ct) break;
        if (CustPeriods()) {
            perI = CTToPeriod(ctt);
            if (perI >= num_periods) {
                cItem = SearchPerDate(datePer,NEW.dv.ud);
                if (cItem == 0)
                    break;
                SetPerItem(datePer,cItem,&NEW);
            }
            if (NEW.perPlace[per] != OLD.perPlace[per] || NEW.fWrap)
```

```
                    break;
            if (fUseYearBreak &&
                NEW.dv.YVAL != 0 && OLD.dv.YVAL != 0 &&
                NEW.dv.YVAL != OLD.dv.YVAL
            )
                break;
        } else {
            if (NEW.dv.d[idv] != 0) {
                if (OLD.dv.d[idv] != 0 &&
                    OLD.dv.d[idv] != NEW.dv.d[idv]
                )
                    break;  /* control break */
            }
#if 1
            if (ctt & CT_MONTH) {        /* current unit has month */
                if (ct & (CT_YEAR | CT_QTR)) {    /* tot level is year or qtr */
                    if (NEW.dv.MVAL < OLD.dv.MVAL)   /* break if roll-over */
                        break;
                }
            } else if (ctt & CT_QTR) {       /* current unit has qtr */
                if (ct == CT_YEAR) {             /* tot level is year */
                    if (NEW.dv.QVAL < OLD.dv.QVAL)   /* break if roll-over */
                        break;
                }
            }
#else
            else if (ct == CT_YEAR) {    /* handle year ambiguities */
                if (ctt & CT_MONTH) {
                    if (NEW.dv.MVAL < OLD.dv.MVAL)
                        break;
                } else if (ctt & CT_QTR) {
                    if (NEW.dv.QVAL < OLD.dv.QVAL)
                        break;
                }
            }
            else if (ct == CT_QTR) {     /* handle qtr ambiguities */
                if (ctt & CT_MONTH) {
                    if (NEW.dv.MVAL < OLD.dv.MVAL)
                        break;
                }
            }
endif
        }
        UpdScanRec(&colscan);
        if (ctt <= ctfull) {
            blanks = 0;
            break;
        }
        blanks = 1;
        if (ctt > loct) loct = ctt;
    }
    if (blanks != 0) {
        ch -= (blanks*SplitCols);
        RstScanRec(&colscan);
    }

*pCHi = ch;
    *pLoCT = CTNormal(loct);

return (ch-cl+1);
} /* end SpanCols */

/*:MKCTOTFORM -- build summary formula for column subtotals */
void MkCTotForm(ROW r)
{
    int i,cnt;
    COL cc;
    char CellName[7];

++r;
    strcpy(formbuf,atsumparen_string);
    for (i=0; i <= ctSubs; ++i) {
        cc = rSubTots[i].row;
        if (i != 0)
```

```
                strcat(formbuf,comma_string);
         strcat(formbuf,
                   MkCellName(r, cc, CellName) );
         cnt = rSubTots[i].ct;
         if (cnt != 0) {
             if (SplitCols == 1) {
                 strcat( strcat(formbuf,dotdot_string),
                         MkCellName(r, cc-cnt, CellName) );
             } else {
                 while (cnt-- > 0) {
                     strcat( strcat(formbuf,comma_string),
                             MkCellName(r, cc -= SplitCols, CellName) );
                 }
             }
         }
    } /* end for each sub-tot */
    strcat(formbuf,rparen_string);
} /* end MkCTotForm */

/*:UPDCOLTOT -- install total formulas for column */
void UpdColTot(COL c,COLTYPE ct,COL cl,COL ch,flg fNew,ROW top,ROW bot)
{
    int per;
    ROW row;
    RANGE rng;
    int val;
    char *pFmt,fmt[10];
    CTYPE ctype;
    COLTYPE ctt;
    QTUNIT qt;
    UDATE ud;
    COL crgt = c+SplitCols-1;

rng.lft = ch;
    rng.rgt = ch+SplitCols-1;
    for (row = top; row <= bot; ++row) {
        ctype = T_LABEL;
        if (row == CHdrRow) {        /* do column label */
            if (!fNew)
                continue;
            if (CustPeriods()) {
                per = CTToPeriod(ct);
                formbuf[0] = '\"';
                qt = FindTUnit(per,NEW.perPlace[per]);
                qstrcpy(formbuf+1,qt->name);
                ctt = PrsDateStr(formbuf+1);
                qstrcpy(formbuf+1,qt->name);   /* prsdate squashes caps */
                if (iYr != 0 && !(ctt & CT_YEAR)) {
#if FY_FIX_TOT
                    if (per < low_date_period) {
                        ud.q = qt->last_date.q;
                        if (ud.d.yr != 0) {
                            iYr = ud.d.yr;
                            if (ud.d.mon == 1 && ud.d.day <= 7)
                                --iYr;
                        }
                    }
                    if (iYr>1900 && iYr<2000) iYr -= 1900;
#endif
                    sprintf(fmt," %y",iYr);
                    if (strchr(formbuf,'/') != NULL)
                        fmt[0] = '/';
                    else if (strchr(formbuf,'-') != NULL)
                        fmt[0] = '-';
                    strcat(formbuf,fmt);
                }
            } else {
                switch (ct) {
                case CT_YEAR:
                    val = iYr;
                    pFmt = "\"Total %y";
                    break;
                case CT_QTR:
```

```
                        val = OLD.dv.QVAL;
                        pFmt = "\"Q%u-%y";
                        break;
                    case CT_MONTH:
                        val = (int) MkMonthName(OLD.dv.CMVAL-1,TRUE,1);
                        pFmt = "\"%s-%y";
                        break;
                    }
                    strcpy(fmt,pFmt);
                    if (iYr == 0)
                        fmt[strlen(fmt)-3] = 0;
                    sprintf(formbuf,fmt,val,iYr);
                }
                for (val=0; val < SplitCols; ++val) {
                    if (GetCell(row,ch+val)) {
                        /* use label justifier */
                        formbuf[0] = (cellType == T_LABEL ? cellPtr[0] : '\"');
                        PutCell(row, c+val, ctype, cellForm, formbuf );
                    }
                }
            } else if (INRANGE(CHdrRow,row,CHdrBot) || IsBarsCell(row,ch)) {
                if (fNew || row > CHdrBot) {
                    CopyRange( ch,  row,   rng.rgt,   row,
                               c,   row,   crgt,      row );
                }
            } else if (row > CHdrBot) {
                fHasValue = FALSE;
                ScanCTotRange(cl, row, rng.rgt, row);
                if (!fHasValue) {
                    ctype = T_BLANK;
                } else {
                    MkCTotForm(row);
                    ctype = T_FORMULA;
                }
                PutCell(row, c, ctype, cellForm, formbuf );
                if (SplitCols > 1) {
                    CopyRange( c,    row,   c,      row,
                               c+1,  row,   crgt,   row );
                    rng.top = rng.bot = row;
                    for (val=0; val < SplitCols; ++val) {
                        GetCell(row,ch+val);
                        if (cellType == T_FORMULA
                            && FormRangeCheck(cellPtr,&rng,FALSE)
                        ) {
                            CopyRange( ch+val, row,   ch+val, row,
                                       c+val,  row,   c+val,  row );
                        }
                    }
                }
            }
        } /* end for each row */

RecalcRange(c, max(top,CHdrBot), crgt, bot);
} /* end UpdColTot */

/*:FIXCTAGS -- fixup total col tags after a shift */
void FixCTags(COL key,COL col,int delta)
{
    COL cMax = MaxCol();
    TAG tag;
    COLTYPE ct;
    TAGTYPE tt;

delta *= SplitCols;
    while (col < cMax) {
        tt = ScanCTag(col,&tag,&ct);
        if (tt & (TAG_OSHEET | TAG_TOT)) {
            tag *= SplitCols;
            if (col-(tag+SplitCols) <= key) {
                PlaceCTagSplit(col, tag+delta, tt, ct);
            }
            col += SplitCols;
        } else
            ++col;
```

```c
        }
    } /* end FixCTags */

/*:MAKECOLCONSTANT */
void MakeColConstant(COL c)
{
    ROW r,rMax,rMin;
    COL cLim;

rMax = BoundMaxRow();
    if (rMax > CABoundRange.bot+1)
        rMax = CABoundRange.bot+1;
    rMin = MinRow();
    if (rMin < CABoundRange.top)
        rMin = CABoundRange.top;
    for (cLim = c+SplitCols; c < cLim; ++c) {
        for (r=rMin; r < rMax; ++r)
            MakeCellConstant(r,c);
    }
} /* end MakeColConstant */

/*:COLLAPSECOLS -- collapse columns */
void CollapseCols(COL cl,COL ch)
{
    /* collapse cols */
    for (; cl < ch; ++cl) {
        HideCol(cl);
    }
} /* end CollapseCols */

/*:SCANCOLBREAKS -- determine range breaks */
void ScanColBreaks(int cl,int ch)
{
    TAGTYPE tt;
    TAG tag;
    flg fSubOpen;

ctSubs = -1;
    SubCol = -1;
    fSubOpen = FALSE;
    for (; ch >= cl; ch -= SplitCols) {
        tt = ScanCTag(ch,&tag,NULL);
        if (tt & (TAG_TOT | TAG_OSHEET)) {
            NewSub(ch);
            ch -= ((tag+1) * SplitCols);
            fSubOpen = FALSE;
        } else if (fSubOpen) {
            rSubTots[ctSubs].ct++;
        } else {
            NewSub(ch);
            fSubOpen = TRUE;
        }
    }
} /* end ScanColBreaks */

/*:DOCTOTALS    -- create column totals */
int DoCTotals(COL cl,COL ch,COLTYPE ct,flg fForShow)
{
    COL c;
    int added;
    COLTYPE ctt,ctRaw,ctt2;
    TAGTYPE tt;
    TAG tag;
    UDATE d1,d2;
    int per,item;
    QTUNIT qt;

tt = ScanCTag(ch,&tag,&ctt);
    if (tt & TAG_TOT && ct == ctt) {
        if (cl == ch) {
            PlaceCTagSplit(ch,TAGNULL,TAG_NONE,CT_NULL);   /* clear tags */
            goto retNoTot;
        }
totExists:
```

```
        added = 0;       /* replace column */
        c = ch;
        ch -= SplitCols;
    } else {
        ctt = CTNormal(ctRaw=PrsColHdr(ch,&colscan));
        if (cl == ch) {
            if (ctt < (ct<<1))
                goto retNoTot;
            if (CustPeriods() && ct >= CT_CUSTHI) {
                if (ctt > CT_CUSTLO) {
                    d1 = NEW.dv.ud;
                    per = CTToPeriod(ct);
                    item = SearchPerDate(per,d1);
                    if (item >= 0) {
                        qt = FindTUnit(per,item);
                        d2 = qt->last_date;
                        if (d2.d.yr == 0)
                            d1.d.yr = 0;
                        if (d1.q == d2.q) {
                            ctt2 =PrsDateStr((CPTR)qstrcpy(formbuf,qt->name));
                            if ((ctRaw & ~CT_YEAR) == (ctt2 & ~CT_YEAR))
                                goto retNoTot;
                        }
                    }
                }
            }
        } else if (ctt == ct) { /* high col is total level */
            tt = TAG_SAVTOT|TAG_TOT;
            goto totExists;
        }
        added = 1;        /* insert column */
        c = ch + SplitCols;
        if (InsCols(c,SplitCols)) {
            goto retNoTot;
        }
        AddAdjRec(c,SplitCols,TRUE);
    } iYr = (ct >= CT_MONTH ? OLD.dv.CYVAL : OLD.dv.YVAL);
    if (iYr>1900 && iYr<2000) iYr -= 1900;

tt = (tt & ~TAG_OSHEET) | TAG_TOT;
    PlaceCTagSplit(c, ch-cl, tt, ct);    /* write tag */

ScanColBreaks(cl,ch);

if (!(tt & TAG_SAVTOT) || !fForShow)
        UpdColTot(c,ct,cl,ch,added,MinRow(),MaxRow()-1);

if (fForShow) {
        CollapseCols(cl,c);
        if (tt & TAG_SAVTOT || !added) {
            tt |= TAG_OSHEET;
        } else {
            tt = TAG_OSHEET;
        }
        PlaceCTagSplit(c, ch-cl, tt, ct);
    } if (added)
        FixCTags(c,c+SplitCols,1);
    else
        UpdScanRec(&colscan);

return (added);

retNoTot:
    RstScanRec(&colscan);
    return (-1);
} /* end DoCTotals */

/*:REMOVECTOT -- remove total col */
void RemoveCTot(COL col)
{
    FixCTags(col,col+SplitCols,-1);
```

```
    DelCols(col,SplitCols);
    AddAdjRec(col,-SplitCols,TRUE);
} /* end RemoveCTot */

/*:COLEXPANDALL -- show all columns */
flg ColExpandAll(COLTYPE * pCur)
{
    COL col,lo;
    TAG tag;
    TAGTYPE tt;
    COLTYPE ct,ctt;
    COL remCol;

ctt = CT_NULL;
    remCol = 0;
    for (col=MinCol()+1; col < MaxCol(); ++col) {
        ExposeCol(col);
        tt = ScanCTag(col,&tag,&ct);
        if (tt & TAG_OSHEET) {
            if (tt & TAG_TOT) {
                /* make it ordinary total */
                PlaceCTag(col, tag, tt & -TAG_OSHEET, ct);
            } else {
                /* remove the for-show total */
                if (remCol == 0)
                    remCol = col;
                RemoveCTot(col);
                col--;
            }
            if (ctt == CT_NULL || ct < ctt)
                ctt = ct;
        } else if (tt & TAG_TOT) {
            lo = col - (tag+1)*SplitCols;
            if (lo <= remCol) {
                DoCTotals(lo,col,ct,FALSE);
                remCol = 0;
                col += SplitCols-1;
            }
        }
    }
    *pCur = ctt;
    return FALSE;
} /* end ColExpandAll */

/*:INNERCOLTOTS */
flg InnerColTots(COLTYPE ct,flg fRemove,flg fForShow)
{
    int col,lo;
    int i;
    TAG tag;
    TAGTYPE tt;
    COLTYPE ctt,loct;
    flg fRemoveAll = (ct == CT_NULL && fRemove);

SetCHdrRow();
    InitScanRec(&colscan);
    for (col=CHdrLft; col < MaxCol(); col += SplitCols) {
        tt = ScanCTag(col,&tag,&ctt);
        if (tt & TAG_TOT) {
            lo = col - (tag+1)*SplitCols;
            if (ctt < ct) { /* higher than key level */
                DoCTotals(lo, col, ctt, FALSE); /* refresh formulas */
            } else if (ctt == ct || fRemoveAll) {
                if (fRemove) {
                    RemoveCTot(col);
                    col -= SplitCols;
                } else {
                    DoCTotals(lo, col, ct, fForShow);
                }
            }
        } else if (!fRemove) {
            if (SpanCols(lo=col,ct,&col,&loct) > 0) {
                i = DoCTotals(lo, col, ct, fForShow);
                if (i > 0)
```

```
                }
            }
        }
        return FALSE;
    } /* end InnerColTots */

/*:DOCOLTOTS -- insert, update, or delete all column totals for level */
flg DoColTots(COLTYPE ct,flg fRemove,flg fForShow)
{
    COLTYPE ctCur;
    flg res;

#if 0
    if (CustPeriods()) {
        PrnPeriods();
        return 0;
    }
endif

DO_WAIT();

if (ct == CT_NULL && !fForShow && !fRemove)
        return FALSE;

res = ColExpandAll(&ctCur);
    if (res) goto done;

if (!fForShow) {
        res = InnerColTots(ct,fRemove,FALSE);
        if (res) goto done;
    } else
        ctCur = ct;

if (ctCur != CT_NULL) {
        res = InnerColTots(ctCur,FALSE,TRUE);
    } done:
    UpdateColRange();

return (res);
} /* end DoColTots */

/*:INITCOLHDRS */
void InitColHdrs(void)
{

} /* end InitColHdrs */

/*:ADDADJREC */
void AddAdjRec(COL col,int NumCols,flg fTotal)
{
    QADJ_REC qAdj;
    if (tags == QNULL)   /* if no off-sheet info, don't need to record */
        return;

qAdj = (QADJ_REC) allocq(sizeof(ADJ_REC));
    if (qAdj != QNULL) {
        qAdj->qNext = QNULL;
        qAdj->AdjFlags = fTotal;
        qAdj->AdjCol = (byte) col;
        qAdj->AdjCnt = NumCols;
        qLastAdj->qNext = qAdj;
        qLastAdj = qAdj;
        ++AdjCount;
    }
} /* end AddAdjRec */

/*:FINDADJREC */
QADJ_REC FindAdjRec(int AdjCnt)
{
    QADJ_REC qAdj;
```

```
        for (qAdj = qFirstAdj; qAdj != QNULL && AdjCnt-- > 0; qAdj = qAdj->qNext);
        return (qAdj);
} /* end FindAdjRec */

/*:PLAYADJRECS */
void PlayAdjRecs(int AdjID, ROW top, ROW bot, flg fLastIsTot)
{
    QADJ_REC qAdj;
    int cnt;
    COL col,cl,ch;
    COLTYPE ctt;
    TAGTYPE tt;
    TAG tag;

fLastIsTot++;
    /* slide columns around */
    for (qAdj = FindAdjRec(AdjID); qAdj != QNULL; qAdj = qAdj->qNext) {
        col = qAdj->AdjCol;
        cnt = qAdj->AdjCnt;
        if (cnt > 0)
            InsColBound(col,cnt,top,bot,MaxCol()-1,fLastIsTot);
        else
            DelColBound(col,-cnt,top,bot,fLastIsTot);
    }

/* update column totals */
    for (col = CHdrLft; col < MaxCol(); col+=SplitCols) {
        tt = ScanCTag(col,&tag,&ctt);
        if (tt & (TAG_OSHEET | TAG_TOT)) {
            ch = col - SplitCols;
            cl = ch - (tag * SplitCols);
            ScanColBreaks(cl,ch);
            UpdColTot(col,ctt,cl,ch,FALSE,top,bot);
        }
    } /* end col tot update */
} /* end PlayAdjRecs */

/*:ADJUSTADJRECS */
void AdjustAdjRecs(int Adjust)
{
    QADJ_REC qAdj;

for (qAdj = qFirstAdj; qAdj != QNULL; qAdj = qAdj->qNext) {
        qAdj->AdjCol += Adjust;
    }
} /* end AdjustAdjRecs */

/*:TRIMADJRECS */
void TrimAdjRecs(void)
{
    QADJ_REC qAdj,qNxt;
    QTREC qt;
    int TrimMax = 0x7fff;
    int Trim;

for (qt=tags; qt != QNULL; qt=qt->qNxtTag) {
        if (qt->AdjID < TrimMax) {
            if ((TrimMax=qt->AdjID) <= 0)
                return; /* nothing to trim */
        }
    }
    for (qAdj=qFirstAdj, Trim=0; Trim < TrimMax; ++Trim, qAdj=qNxt) {
        if (qAdj == QNULL) {
            qLastAdj = (QADJ_REC) &qFirstAdj;
            break;
        }
        qNxt = qAdj->qNext;
        freeq(qAdj,sizeof(ADJ_REC));
    }
    qFirstAdj = qAdj;
    AdjCount -= Trim;
    for (qt=tags; qt != QNULL; qt=qt->qNxtTag) {
        qt->AdjID -= Trim;
    }
```

```c
) /* end TrimAdjRecs */

/* end BCOLS.C */

/* MODES: TAB 4     Last Revision:  Mon 05-29-89 06:59
**
** BDOVLY.C    -- bud data declarations for root
**
** Copyright (C) 1989 Saratoga Software, Inc.  All rights reserved.
**
** 8/10/88 dbh moved err messages from root.
*/ ifndef XT include "bud.h"

define ALLOCATE    1
#define XT
define INIT(x) = x else define ALLOCATE    0
/*#define XT extern */
#define INIT(x)

endif extern void dummy(void);

XT byte rCellSizes[]
#if ALLOCATE
={
    0,                      /* T_BLANK */
    sizeof(VAR_DATA),       /* T_LABEL */
    sizeof(INT_DATA),       /* T_INTEGER */
    sizeof(NUM_DATA),       /* T_NUMBER */
    sizeof(VAR_DATA),       /* T_FORMULA */
    sizeof(SHORT_INT_DATA), /* T_SHORTINT == T_NSTACK */
}
endif
;

/* ascope menu stuff */
XT char *AScopeMenu[]
#if ALLOCATE
={
    "Group",    "Analyze by group",
    "Similar",  "Analyze by similar groups",
    "Range",    "Analyze by specified range",
    "Whole",    "Analyze entire " BUD_RANGE " range",
    0
}
endif
;

XT ASCOPE_TYPE AScopeType;
extern void as_group(void);
extern void as_range(void);
extern void as_whole(void);
extern void as_similar(void);
XT PFV AScopeMenuProc[]
#if ALLOCATE
={
    as_group,
    as_similar,
    as_range,
    as_whole,
}
endif
;

/* bars option menu */
```

```c
XT char *BOMenu[]
#if ALLOCATE
={
    "Single", "Single dashes (\\-) above totals",
    "Double", "Double dashes (\\=) above totals",
    "None", "No dashes above totals",
    0
}
endif
;

XT BARS_OPT BarsOpt;

extern void bo_none(void);
extern void bo_single(void);
extern void bo_double(void);
XT PFV BOMenuProc[]
#if ALLOCATE
={
    bo_single,
    bo_double,
    bo_none,
}
endif
;

/* RC menu stuff */
XT char *RCMenu[]
#if ALLOCATE
={
    "Column", "Act on columns",
    "Row", "Act on rows",
    0
}
endif
;

XT flg fDoRow;

extern void rc_row(void);
extern void rc_col(void);
XT PFV RCMenuProc[]
#if ALLOCATE
={
    rc_col,
    rc_row,
}
endif
;

/* Calc Select menu stuff */
XT char *CSMenu[]
#if ALLOCATE
={
    "Calculate", "Calc totals over specified group",
    "Select", "Select total row",
    0
}
endif
;

XT flg fCalcTot;
XT ROW AnalTotRow;

extern void cs_calc(void);
extern void cs_select(void);
XT PFV CSMenuProc[]
#if ALLOCATE
={
    cs_calc,
    cs_select,
}
endif
```

```
extern void d_whole(void);
XT PFV DepthMenuProc[]
#if ALLOCATE
={
    d_first,
    d_all,
    d_whole,
}
endif
;
endif /* col type sub menu stuff */
define CT_ALL_POS  6   /* position of all_string in CTMenu */

XT char *CTMenu[]
#if ALLOCATE
={
#if 0
    "Year", NULL,
    "Quarter", NULL,
    "Month", NULL,
    all_string, NULL,
    0
#else
    "Year",
    "Quarter",
    "Month"
#endif
}
endif
;

XT COLTYPE ColType;

XT COLTYPE CTMenuTable[]
#if ALLOCATE
={
    CT_YEAR,
    CT_QTR,
    CT_MONTH,
    CT_NULL,
}
endif
;

/* col custom menu stuff */
XT char *ColCustMenu[]
#if ALLOCATE
={
    "Split-Cols", "Set number of split columns",
    "Periods", "Configure periods",
    "First-Month", "Set first month of fiscal year",
    "Reset", "Restore default settings",
    "Update", "Update configuration file",
    0
}
endif
;

extern void m_fyorg(void);
extern void m_periods(void);
extern void m_splitcol(void);
extern void m_colcustrest(void);
extern void m_updatecfg(void);
XT PFV ColCustMenuProc[]
#if ALLOCATE
={
    m_splitcol,
    m_periods,
    m_fyorg,
    m_colcustrest,
    m_updatecfg,
```

```c
}
endif
;

/* column menu stuff */
XT char *ColMenu[]
#if ALLOCATE
={
    "Show/Hide", "Set level of detail for column display",
    "Total", "Insert column totals",
    "Detotal", "Remove column totals",
    "Header", "Specify column header range",
    "Customize", "Split-Cols, Periods, First-Month, Reset, Update",
    0
}
endif
;

extern void c_expand(void);
extern void c_total(void);
extern void c_remove(void);
extern void m_colhdr(void);
extern void m_colcust(void);
XT PFV ColMenuProc[]
#if ALLOCATE
={
    c_expand,
    c_total,
    c_remove,
    m_colhdr,
    m_colcust,
}
endif
;

/* main menu stuff */
XT char *MainMenu[]
#if ALLOCATE
={
    "Show", "Show detail rows",
    "Hide", "Hide detail rows",
    "Total", "Insert or replace row totals",
    "Column", "Show/Hide, Total, Detotal, Header, Customize",
    "Analysis", "Goal, Values, Checkpoint, Restore",
    "Options",
        "Consolidate, Indent, Move, Range, Storage, Keys, Locking",
#if debug
    "Break", "INT 3 to debugger",
    "Patch", "Special patch function",
#endif
    0
}
endif
;

extern void m_column(void);
extern void m_expand(void);
extern void m_collapse(void);
extern void m_total(void);
extern void m_submenu(void);
extern void m_patch(void);
extern void m_analysis(void);
XT PFV MainMenuProc[]
#if ALLOCATE
={
    m_expand,
    m_collapse,
    m_total,
    m_column,
    m_analysis,
    m_submenu,
#if debug
    dummy,
    m_patch,
```

```
    #endif
    }
    #endif
    ;

extern char analysis_description[];

/* analysis sub-menu stuff */
    XT char *AnalMenu[]
    #if ALLOCATE
    ={
        "Goal", "Enter goal-tracking mode",
        "Values",analysis_description,
        "Checkpoint", "Save worksheet to checkpoint file",
        "Restore", "Retrieve worksheet from checkpoint file",
        0
    }
    #endif
    ;

extern void m_goal(void);
    extern void m_anal(void);
    extern void m_restore(void);
    extern void m_hold(void);
    XT PFV AnalMenuProc[]
    #if ALLOCATE
    ={
        m_goal,
        m_anal,
        m_hold,
        m_restore,
    }
    #endif
    ;

/* anal sub menu stuff */
    XT char *AValuesMenu[]
    #if ALLOCATE
    ={
        "Difference",        "Change from previous",
        "%-Difference",      "% change from previous",
        "Running-total",     "Running total",
        "Percent-total",     "% of total",
        "Cum-%-total",       "Running % of total",
        0
    }
    #endif
    ;

XT ANALYSIS_TYPE AnalysisType;

extern void a_diff(void);
    extern void a_per_diff(void);
    extern void a_run_tot(void);
    extern void a_per_tot(void);
    extern void a_run_per_tot(void);
    XT PFV AValuesMenuProc[]
    #if ALLOCATE
    ={
        a_diff,
        a_per_diff,
        a_run_tot,
        a_per_tot,
        a_run_per_tot,
    }
    #endif
    ;

/* sub-menu stuff */
    XT char *SubMenu[]
    #if ALLOCATE
    ={
        "Consolidate", "Consolidate worksheets",
        "Indent", "Adjust label indentation",
        "Move", "Move rows",
        "Range", "Set range affected by Budget Express",
```

```
    "Storage", "Disk, Worksheet",
    "Keys", "Enable, Disable grey +/-/* keys",
#if 0
    "Detotal", "Remove row totals",
#endif
    "Locking", "Lock, Unlock hidden rows",
    0
}
endif
;

extern void m_consolidate(void);
extern void m_adjust(void);
extern void m_move(void);
extern void m_define(void);
extern void m_storeopt(void);
extern void m_keys(void);
extern void m_remove(void);
extern void m_locking(void);
XT PFV SubMenuProc[]
#if ALLOCATE
={
    m_consolidate,
    m_adjust,
    m_move,
    m_define,
    m_storeopt,
    m_keys,
#if 0
    m_remove,
#endif
    m_locking,
}
endif
;

/* store options stuff */
XT char *SOMenu[]
#if ALLOCATE
={
    "Disk", "Move hidden rows to disk",
    "Worksheet","Move hidden rows to bottom of worksheet",
#if USERAM
    "RAM",  "Store hidden rows off-sheet in RAM/EMS",
#endif
    0
}
endif
;

extern void so_ram(void);
extern void so_disk(void);
extern void so_sheet(void);
XT PFV SOMenuProc[]
#if ALLOCATE
={
    so_disk,
    so_sheet,
#if USERAM
    so_ram,
#endif
}
endif
;

/* keys menu stuff */
XT char *KeysMenu[]
#if ALLOCATE
={
    "Disable", "Disable +/-/* keys",
    "Enable", "Enable +/-/* keys",
    0
}
```

```
#endif
;

extern void km_off(void);
extern void km_on(void);
XT PFV KeysMenuProc[]
#if ALLOCATE
={
    km_off,
    km_on
}
endif
;

XT char *LockMenu[]
#if ALLOCATE
={
    "Lock", "Assign password to hidden rows",
    "Unlock", "Unlock hidden rows",
    0
}
endif
;

extern void m_lock(void);
extern void m_unlock(void);
XT PFV LockMenuProc[]
#if ALLOCATE
={
    m_lock,
    m_unlock,
}
endif
;

XT char *RBMenu[]
#if ALLOCATE
={
    all_string, "Analyze all rows",
    "Some", "Only analyze rows within a range",
    0
}
endif
;

XT RANGE CABoundRange;

/* error messages for ovly1 */ typedef enum {
    NO_ERROR,
    GE_NO_ROOM,
    GE_MEM_OUT,
    GE_OUT_OF_RANGE,
    GE_NO_COLLAPSE,
    GE_NO_TOTAL,
    GE_FORM_REF,
    GE_NO_EXPAND,
    GE_LOCKED,
    GE_MISSING_DATA,
    GE_LOST_DATA,        /* all after here require pause */
    GE_BUD_DESTROY,
    GE_NO_DISK,
    GE_ADJCOLHDRS,
    GE_EXPANDROWS,
    GE_EXPANDCOLS,
    GE_ORIGINLOCK,
    MSG_ERR_LIM,
} GLOBAL_ERRORS;

define MSG_ERR_PAUSE    GE_LOST_DATA extern char out_of_memory_string[];
```

```
XT int GlobErrVal;
XT char *ErrMsgs[]
#if ALLOCATE
={
    BUD_RANGE " range too small",
    out_of_memory_string,
    "Not in " BUD_RANGE " data area",
    "Nothing to hide",
    "Nothing to total",
    "Can't hide, row %d references data",
    "Nothing to show",
    "Hidden rows are locked",
    "Hidden rows inaccessible (no memory?)",
    "." BUD_EXT " file not found",   /* (or currupt) pause */
    "Top-row/left-col of " BUD_RANGE " range deleted",  /* pause */
    "Disk error (out of space?)",    /* these all need pause */
    "Adjust column headers first",
    "Show all rows first",
    "Show all columns first",
    "Use " BUD_PRODUCT " Option Range to set top-left"
}
endif
;

XT char atERR_string[]   INIT("@ERR");
#define ERR_string  (atERR_string+1)
XT char atsumparen_string[] INIT("@SUM(");
XT char comma_string[]   INIT(",");
XT char dotdot_string[]  INIT("..");
XT char rparen_string[]  INIT(")");

XT char save_checkpoint_msg[]   INIT("Saving checkpoint file");

XT SCANREC colscan;

XT char remove_col_tot_str[]    INIT("Remove total columns first");
XT char cant_change_fyear_str[] INIT("Can't change with custom periods");

/* end BDOVLY.C */

/* MODES: TAB 4    Last Revision:  Mon 05-29-89 06:59
**
**  BDROOT.C   -- bud data declarations for root
**
** Copyright (C) 1989 Saratoga Software, Inc.  All rights reserved.
**
** 7/14/88 dbh added lost-data message.
** 7/08/88 dbh eliminate some record headers for new file format.
*/ ifndef XT include "bud.h"

define ALLOCATE   1
#define XT
define INIT(x) = x else define ALLOCATE   0
/*#define XT extern */
#define INIT(x)

endif if debug
XT flg fMEMOUT   INIT(FALSE);
#endif

XT flg fAttachTerm  INIT(TRUE);
XT flg fFirstAttach INIT(TRUE);
XT flg fShowLogo    INIT(TRUE);
```

```
XT flg fSystem          INIT(FALSE);
XT flg fSearchedOnce    INIT(FALSE);

/*!!BUD!! name change has to pay attention to following defs */
XT char invoke_str[]
#if ALLOCATE
={
    'I','B','U','D','\r',KEY_BESC,   /* (AltF10) Invoke BUD CR Besc */
    0,                               /* the key character */
    0
}
endif
;

#define INV_CHR_POS 6         /* key char position in invoke_str */
#define quick_invoke_str    (invoke_str + INV_CHR_POS - 1)

XT char bud_file_ext[]          INIT(BUD_EXT);

XT char bud_nrange_name[]       INIT(BUD_RANGE);
XT char col_hdr_nrange_name[]   INIT(BUD_RANGE "_COLS");
XT char save_nrange_name[]      INIT(BUD_RANGE "_SAVE");
/*XT char cons_nrange_name[]        INIT(BUD_RANGE "_CONS");*/
XT char BudHeadString[]         INIT("+\"\"");

XT char BudSysString[]          INIT("'" BUD_PRODUCT "SYS-");
XT char BudSysFileName[]        INIT("$" BUD_EXT "SYS$");

XT char sheet_divider_string[]  INIT("\\*" BUD_PRODUCT "*");

XT char BudSwapFileName[]       INIT("$SWAP$." BUD_EXT);
XT char CheckPointFileName[]    INIT(BUD_EXT "CHECK.WK1");

XT char help_file_name[]        INIT(BUD_FILE ".HLP");
XT char BudCfgFileName[]        INIT(BUD_FILE ".CFG");
XT char TmpCfgFileName[]        INIT("TMP.CFG");

XT char TagStr[]        INIT("@IF(0,");
#define TagStrLen    6

XT char space_string[]  INIT(" ");
XT char empty_string[]  INIT("");
XT char value_chars[]   INIT("0123456789+-@#.($");

XT EVENT last_evt;
XT EVENT FirstEvent;

XT flg fBreakDetected;
XT flg fDoCons;
XT flg fDoGoal;
XT flg fDoPeriods;
XT flg fInHelp;
XT flg fHelpInvoked;
XT flg fEditMode;
XT flg ovr_mode;
XT int max_length;
XT int string_len;
XT int cur_string_index;
XT int first_displayed_index;
XT char * string_buffer;
XT char * first_char_displayed_ptr;
XT int cursor_position;
XT ROW strt_row;
XT COL strt_col;
XT int display_width;

XT flg fRWinBud     INIT(FALSE);
XT flg fRWinCons    INIT(FALSE);
XT flg fUseIFN      INIT(FALSE);
XT flg fNeedCalc    INIT(FALSE);
XT flg fMsgPosted   INIT(FALSE);
XT flg fLastReturn  INIT(FALSE);
XT flg fBudAttached INIT(FALSE);
```

```
XT flg fBudActive       INIT(FALSE);
XT flg fBudDefined      INIT(FALSE);
XT flg fReady           INIT(FALSE);
XT flg fAbortOnce       INIT(FALSE);
XT flg fLAInited        INIT(FALSE);
XT flg fKeepCons        INIT(FALSE);
XT flg fKeepPeriods     INIT(FALSE);
XT flg fInvokeIDed      INIT(FALSE);
XT flg fColHdrDef       INIT(FALSE);
XT flg fConsWSDirty     INIT(FALSE);
XT flg fMustAlloc       INIT(FALSE);
XT flg fConsDestroyed   INIT(FALSE);

XT flg fXlatPlusMinus   INIT(TRUE);
XT flg fAutoCalcOn      INIT(TRUE);
XT flg fSaveProtect;

XT flg fGoalRedisplay;

XT flg fCheckPoint;

XT flg fWedged;

XT flg fRestoring;

XT RANGE BudRange;
XT RANGE ColHdrRange;
XT RANGE ModRange;

XT BUD_STATE BudState   INIT(STATE_NORM);

XT STORE_OPT StoreOpt   INIT(SO_DEFAULT);
XT RANGE StoreRange;

XT QSWAP_REC qFreeList;
XT uns SwapFreeCount;
XT CHUNK SwapNextChunk;

XT ROW ScrnHeight;

XT QBPTR qModeStr       INIT(QNULL);
XT QBPTR qMenuStr       INIT(QNULL);

XT EVENT CurEvt;

XT char *ModeStrs[]
#if ALLOCATE
={
    BUD_PRODUCT,
    "GOAL",
    "CONS",
    "CUST",
    "MENU",
    "FRMT"
)
#endif
;

#define BudMenuStr ModeStrs[0]
#define OldMenuStr ModeStrs[4]
#define OldModeStr ModeStrs[5]
#define NUM_MODE_STRS 6

XT EDIT_MODE ind_mode;

/* key handler stuff */

XT char savbuf[MAXSAVE+1];
XT UKEY keybuf[MAXKEYS];
XT int  keys;
XT int  savPos;
XT flg  fLastRgt;
XT UKEY inv_ch;    /* quick invoking character (AltF7-AltF9) */
XT UKEY inv_ch2;   /* quick invoking character (ShtF7-ShtF9) */
XT flg  fSpecialEntry   INIT(FALSE);
```

```
XT int monthCap;
XT int monthCur;
XT int yearCur;
XT flg fShortMon;

XT int raPrefix,raPer,raItem,raLen,raLen2;
XT flg fCustRA;

/* these buffers must be in DS to be used from interrupt handler */
XT char tmpl[MAXSAVE+1];
XT char monbuf[10];

XT flg fKeyRemovePending    INIT(FALSE);
XT void (FAR KeyVector)(void);

XT int OvlActive      INIT(OVL_BUD);

XT ROW OrgRow;
XT COL OrgCol;
XT ROW WinOrgRow;
XT COL WinOrgCol;
XT ROW  WinRows;
XT COL  WinWidth;
XT COL  ScrnWidth;

XT EVENT ungotevt    INIT(0);

XT ROW CurRow,OldCurRow,BotRow,TopRow,OldOrgRow;
XT COL CurCol,OldCurCol,RgtCol,LftCol,OldOrgCol;

XT COL CHdrRow;

XT CFORM cellForm;
XT CTYPE cellType;
XT char * cellPtr;

#if 0
XT UDATE cDate;
XT int cCalYr, cCalMon;
XT int iItem;
#endif

XT int cMon, cDay, cYr, cQtr;
XT int perYr, perDay;
XT int cItem;

XT int FirstMon INIT(0);
XT int DefFirstMon INIT(0);
XT COL SplitCols INIT(1);
XT COL DefSplitCols INIT(1);
XT flg fCfgExists INIT(FALSE);
XT flg fPeriodsInFile INIT(FALSE);

#if 0
XT ord8 month_days[]
#if ALLOCATE
={              /* 30 days hath sep,apr,jun,&nov */
    31,28,31,
    30,31,30,
    31,31,30,
    31,30,31
)
#endif
;
endif XT char * months[]
if ALLOCATE
=(
    "january", "february", "march", "april", "may", "june",
    "july", "august", "september", "october", "november", "december"
)
```

```c
#endif
;

XT char * smonths[]
#if ALLOCATE
={
    "jan", "feb", "mar", "apr", "may", "jun",
    "jul", "aug", "sep", "oct", "nov", "dec"
}
endif
;

XT flg fFileOpen    INIT(FALSE);
XT flg fWriting;
XT flg fFYSpecial;
XT card16 FileHandle;
XT char FileExt123[]    INIT(".WK1");

XT BHR BudHdrRec
#if ALLOCATE
    = { 0xBEA3,0 }
#endif
;
#if 0 /* bud in seperate file */
XT BPR BudPosRec
#if ALLOCATE
    = { 0xBEAF,sizeof(ord32),0 }
#endif
;

XT EOFR EofRec
#if ALLOCATE
    = { 1,0 }
#endif
;
#endif /* bud in seperate file */

XT NUM NUM_ZERO
#if ALLOCATE
    = { 0.0 }
#endif
;

XT word CalcSave;

XT flg fRngFound;
XT char * pRngName;
XT PRANGE pRng;

XT char PreCell[]   INIT("(,.+-*/^<>=#");

#if FTAGS
XT flg fTagTop  INIT(TRUE);
XT flg fTagLft  INIT(TRUE);
#else
/**XT struct faketags ( flg t,b; ) fake = { 1, 1 }; **/
endif XT TAG  nextTag INIT(1);
XT QTREC tags   INIT(QNULL);
XT flg fNewTag;

XT flg fIsNonBlank;
XT flg fHasValue;

XT int ctSubs;
XT COL SubCol;

XT int iMon,iYr,iQtr;

XT XCVAL cvals  INIT(XNULL);

XT ROW cvRow;
XT COL cvCol;
XT NUM cvVal;
```

```c
typedef enum {          /* these must stay aligned with rSelectPrompts below */
    ADJ_INS_ROW,
    ADJ_INS_COL,
    ADJ_DEL_ROW,
    ADJ_DEL_COL,
    ADJ_MAX
} ADJ_TYPE;

XT ADJ_TYPE AdjustValue;
XT char *AdjustPtr;
XT char *rSelectPrompts[4]
#if ALLOCATE
={
    select_insert_row_range_string,
    select_insert_col_range_string,
    select_delete_row_range_string,
    select_delete_col_range_string,
}
endif
;

/* cvdroot declares... */
extern char select_column_headers_string[];

/* help stuff */

/* since the index is 2-bytes per entry, a scaling factor must be used if the
    help file is larger than 64K.  E.g., a scaling factor of 16 would require
    that all the screens start on paragraph boundaries in the file and would
    allow the file to be 16 * 64K bytes long.  Regardless of the scaling
    factor, the max no of help screens is 32K: 2 byte entry into 64K index */
#define HELP_INDEX_SCALING_FACTOR    1

XT int  help_screen_no, help_file_no, help_error_flag, screen_no;
XT uns  choices_list_length, no_screens, no_topics;

XT char FAR help_buffer;
XT uns  * help_index;
XT char unable_to_open_help_file[]  INIT("Can't read help file");
#define error_reading_file_string unable_to_open_help_file
#if 0
XT char error_reading_file_string[] INIT("Help file error");
endif XT char * HelpMenu[]
if ALLOCATE
={
    "Next", "Next screen",
    "Prev", "Prev screen",
    "Index", "Help index",
    "Topics", "Select topic",
    "Quit", "Quit help",
    0
}
endif
;

extern void hm_next(void);
extern void hm_prev(void);
extern void hm_home(void);
extern void hm_pick(void);
extern void hm_quit(void);
XT PFV HelpMenuProc[]
#if ALLOCATE
={
    hm_next,
    hm_prev,
    hm_home,
    hm_pick,
    hm_quit,
}
endif
;
```

```
XT char analysis_description[]
  INIT("Difference, %-Difference, Running-total, Percent-total, Cum-%-total");

XT char * HelpTopicsMenu[]
#if ALLOCATE
=(
    "Intro", "Help overview",
    "Outlines", "About outlining and categories",
    "Show/Hide", "Hiding and showing row and column categories",
    "Totals", "Producing row and column totals",
    "Goal-tracking", "Arriving at desired budget totals",
    "Analysis",analysis_description,
    "Consolidation", "Combining worksheets",
    "Disk", "Hiding rows to disk",
    0
)
#endif
;

/* topic number to screen number translation: */
#define HT_1    HS_INTRO
#define HT_2    HS_OUTLINES
#define HT_3    HS_SHOWHIDE
#define HT_4    HS_TOTALS
#define HT_5    HS_GT
#define HT_6    HS_ANALYSIS
#define HT_7    HS_CONSOLIDATION
define HT_8    HS_DISK if 1
XT byte HelpTopicScreens[]
#if ALLOCATE
=(
    HT_1,
    HT_2,
    HT_3,
    HT_4,
    HT_5,
    HT_6,
    HT_7,
    HT_8
)
#endif
;

else extern void ht_1(void); /* and see bhelp.c for the defs and to */
extern void ht_2(void); /* add additional help topics */
extern void ht_3(void); /* add additional help topics */
extern void ht_4(void); /* add additional help topics */
extern void ht_5(void); /* add additional help topics */
extern void ht_6(void); /* add additional help topics */
extern void ht_7(void); /* add additional help topics */
extern void ht_8(void); /* add additional help topics */
XT PFV HelpTopicsMenuProc[]
#if ALLOCATE
=(
    ht_1,
    ht_2,
    ht_3,
    ht_4,
    ht_5,
    ht_6,
    ht_7,
    ht_8
)
#endif
;

endif
```

```c
#define MAX_MENUS    10
XT MENUSTACK MenuStack[MAX_MENUS];
XT int MSIndex INIT(0);
XT int RestMSIndex INIT(0);
XT flg fHelpSpecial INIT(0);

#define MAX_HELP_STACK  15
XT card8 HelpStack[MAX_HELP_STACK];
XT int CurHelpInd    INIT(0);

XT uns GlobErr INIT(0);

XT QADJ_REC qFirstAdj    INIT(QNULL);
XT QADJ_REC qLastAdj     INIT(QNULL);
XT int AdjCount INIT(0);

XT int lastIndent    INIT(INTERR);

#define GOAL_SAVE_SZ    40
XT int GoalValSave[GOAL_SAVE_SZ];

XT char * internal_file_name;
XT PERIOD_DESC periods[MAX_PDS];
XT uns  num_periods INIT(0);
XT ord16    periods_first_col_was_dates;
XT ord16    periods_nCols;

XT int per_loc[MAX_PDS];

XT int SaveHandle;
XT flg fOpenSave;
XT flg fWritingSave;

XT flg fPeriodsSet;
XT flg fRWTmp;

XT char tot_string[]    INIT("tot");
XT char sub_string[]    INIT("sub");

XT uns logo_count    INIT(LONG_LOGO_CT);

XT int low_date_period;

/* end BDROOT.C */
/* MODES: TAB 4     Last Revision:  Mon 05-29-89 06:59
**
**   BEDIT.C -- Bud cell and range editing functions.
**
** Copyright (C) 1989 Saratoga Software, Inc.  All rights reserved.
**
**   7/28/88 dbh moved misc routines to overlay1.
**   7/16/88 dbh set cv_dirty_bit in EditCell (0.23)
**   9/11/87 dbh Created.
*/ define NO_CELL_EDIT 0 include "bud.h"
include "bdroot.h"
include <string.h>
include <mem.h> forward void clear_hint_line(void);
forward void set_ovr_indicator(void);
forward void set_mode_display(EDIT_MODE m);
forward flg delete_position(uns input_char);
forward void shift_line_right(uns n);
forward void shift_line_left(uns n);
forward flg char_right(uns n);
forward flg char_left(uns n);
forward void display_line(void);
forward void display_cursor(void);
forward flg insert_char(int input);
forward void set_edit_mode_indicator(void);
```

```c
#if FTAGS
forward void DoTagMenu(void);
#else
#define DoTagMenu()
endif if 0
void ovlUpdateCurVal(void)
{
    LoadOverlay(OVL_BUD);
    OvlEnter(OE_UPDCV);
}
endif /*:CELLEDIT1 -- edit current cell contents */
void CellEdit1(void)
{
#if NO_CELL_EDIT
    ErrBeep();
#else
    EVENT evt = FirstEvent;
    flg fEscaped,fErr=FALSE,fNoOldVal;
    GET_CELLPTR();   /* sets CX,DX */
    cvRow = _DX;
    cvCol = _CX;
    GetCell(cvRow,cvCol);
    if (evt == 0)
        strcpy(buffer,cellPtr);
    strcpy(savebuf,cellPtr);

fNoOldVal = GetCellStack(cvRow,cvCol,&cvVal);

ReTry:
    fEscaped = in_string(!evt,evt,MAXSTR,empty_string,buffer,1,0,-1);

DO_ERASE12();

if (!fEscaped) {
        PutCell(cvRow, cvCol, T_FORMULA, cellForm, buffer );
        if (buffer[0] != '\'') {
            RecalcCell(cvRow,cvCol);
            GetCell(cvRow,cvCol);
            if (strncmp("'ERR>",cellPtr,5) == 0) {
                fErr = TRUE;
                evt = 0;
                ErrBeep();
                goto ReTry;
            }
        }
        if (cvRow > highest_row)   highest_row = cvRow;
        if (cvCol > highest_col)   highest_col = cvCol;

MaybeSetCalcOn();
        cv_dirty_bit = TRUE;
        if (!fNoOldVal && BudState == STATE_GOAL) {
            UpdateCurVal();
        }
    } else if (fErr) {  /* restore original contents of cell */
        PutCell(cvRow, cvCol, T_FORMULA, cellForm, savebuf );
        RecalcCell(cvRow,cvCol);
    } if (last_evt != KEY_CR && last_evt != KEY_ESC && last_evt != KEY_ABORT)
        UnGetEvent(last_evt);

DoRedisplay();
#endif  /* no cell editor */
} /* end CellEdit1 */ if !NO_CELL_EDIT   /* no cell editor */
```

```
    }
    else /* just show the part of the line following the deletion */
    {   first_displayed_index = first_char_displayed_ptr - string_buffer;
        DoSetCur(strt_row,
            strt_col + cur_string_index - first_displayed_index);
        DoMessage(first_char_displayed_ptr + cur_string_index -
            first_displayed_index);
        /* put a space where the previous end of line was */
        DoMessage(space_string);
    }
    string_len--;

return(0);
}   /* end delete_position */

/*:SHIFT_LINE_RIGHT -- scrolls the displayed line right */
void    shift_line_right(uns n)
{
#ifdef DEBUG
    if (first_char_displayed_ptr - string_buffer < n) error(232);
#endif
    first_char_displayed_ptr -= n;
    display_line();
}   /* end shift_line_right */

/*:SHIFT_LINE_LEFT -- scrolls the displayed line left */
void    shift_line_left(uns n)
{
#ifdef DEBUG
    /* if the end of the line doesn't reach the end of the display, error */
    if (first_char_displayed_ptr - string_buffer + display_width + n
        > string_len) error(233);
#endif
    first_char_displayed_ptr += n;
    display_line();
}   /* end shift_line_left */

/*:CHAR_RIGHT
**  moves the mark and the logical cur char to the right
**  returns TRUE if at end.
*/
flg char_right(uns n)
{   int diff;

/* if it's at the end of the string, beep */
    if (cur_string_index >= string_len - 1)
    {   BumpBeep();
        return(1);
    }

/* can't point beyond end of string, but partials are allowed */
    if ((diff = cur_string_index + 1 + n - string_len) > 0)
        n -= diff;
    /* make sure pointed to part is on-screen */
    if ((diff = cursor_position + 1 + n - display_width) > 0)
    {   shift_line_left(diff);
        cursor_position -= diff;
    } cur_string_index += n;
    cursor_position += n;
    display_cursor();

return(0);
}   /* end char_right */

/*:CHAR_LEFT
**  moves the mark and the logical cur char to the left
**  returns TRUE if at beginning.
*/
flg char_left(uns n)
{   int diff;
```

```
    /* if at the beginning of the string, beep */
    if (cur_string_index == 0)
    {   BumpBeep();
        return(1);
    }

/* can't point before the beginning of the string */
    if (n > cur_string_index)
        n = cur_string_index;

/* make sure pointed to part is on-screen */
    if ((diff = n - cursor_position) > 0)
    {   shift_line_right(diff);
        cursor_position += diff;
    } cur_string_index -= n;
    cursor_position -= n;
    display_cursor();

return(0);
} /* end char_left */

/*:DISPLAY_LINE -- displays the input/edit string */
void    display_line(void)
{
    DoSetCur(strt_row, strt_col);
    DoOutstr(first_char_displayed_ptr, 80);
    DoMessage(space_string);
} /* end display_line */

/*:DISPLAY_CURSOR
** set the blinking mark at the cur char's display line position.
*/
void    display_cursor(void)
{
    _CX = strt_col + cursor_position;
    _DX = strt_row;
    DO_SETMARK();
} /* end display_cursor */

/*:INSERT_CHAR
** inserts a new char in the input/edit string; handles OVR mode.
** returns TRUE if max length reached
*/
flg insert_char(int input)
{
    /* if not overwrite mode, or are but are at the end of the
       string, create a space in the string */
    if ((!ovr_mode) || (cur_string_index == string_len - 1))
    {   /* insert a space before the cur char */

/* check length limit */
        if (string_len >= max_length)
        {   BumpBeep();
            return(1);
        }

/* shift the cur and following chars to the right */
        movmem(string_buffer + cur_string_index,
               string_buffer + cur_string_index + 1,
               string_len - cur_string_index);

string_len++;
    }
    /* put the character in */
    string_buffer[cur_string_index] = (char) input;

char_right(1);
    return(0);
} /* end insert_char */
```

```c
/*:SET_EDIT_MODE_INDICATOR */
void    set_edit_mode_indicator(void)
{   EDIT_MODE m;

m = ( (fEditMode)          ?   MODE_EDIT   :
          (string_len <= 1)    ?   MODE_BUD    :
          (strchr(value_chars,string_buffer[0]) != NULL) ?
                                   MODE_VALUE  :
          /* else */               MODE_LABEL
        );

GET_INDICATOR();
    _AL = m;
    SET_INDICATOR();
    DO_DSPIND();
} /* end set_edit_mode_indicator */
#pragma warn -rch
/*:IN_STRING
** do string input and edit
** Inputs:
**      edit mode flag:
**          0 = start in non-edit mode
**          1 = start in edit mode
**      initial character
**      maximum string length
**      prompt string
**      buffer for the input/edit text
**      row for display
**      starting column for display
**      starting position for editing
** Outputs:
**      0 = successful completion
**      1 = user ESC'ed
** Notes:
**      1. Operation is exactly as in 123.
**      2. As in 123, even if it starts in non-edit mode,
**         the user can put it into edit mode with F2.
*/
flg in_string(
    int  edit_mode_flg,
    EVENT entry_evt,
    uns  max_string_length,
    char *prompt_string,
    char *in_string_buffer,
    int  display_start_row,
    int  display_start_col,
    int  starting_edit_cursor_position)
{
    int    temp, just_escaped = 0, first_displayed_index;
    char         was_start_char;

/* the buffer containing the string to be input/edited is string_buffer.
    ** Typically, this will be text_val_buffer, but for longer strings,
    ** could be a different one. These routines, and those they call, don't
    ** require that the buffer be in the 123 add-in's segment.
    */
    /* set the global vars so the other routines can use them */
    strt_row = display_start_row;
    strt_col = display_start_col;
    string_buffer = in_string_buffer;
    max_length = max_string_length;
    fEditMode = edit_mode_flg;

/* initializations */
    if (!fEditMode) {
        string_buffer[0] = (char) entry_evt;
        string_buffer[1] = '\0';
    }
    string_len = strlen(string_buffer) + 1;
    ovr_mode = 0;
    set_edit_mode_indicator();
    /*save_cursor_position();*/ /* restore on escape */
```

```
/* clear out the space to be used */
DoSetCur(strt_row, strt_col);
DoEraseN(min(max_length, ScrnWidth));

/* display the prompt string */
first_char_displayed_ptr = prompt_string;
display_line();   /* yes, this is a hack way of doing it */
strt_col += strlen(prompt_string);
display_width = ScrnWidth - strt_col;

/* start at either the front or somewhere w/i the string, dep. on edit */
if (fEditMode || entry_evt)
{   /* start off at the chosen place in the string if editing */
    if (starting_edit_cursor_position < 0)
        starting_edit_cursor_position = string_len - 1;
    cur_string_index = starting_edit_cursor_position;
    temp = starting_edit_cursor_position + 1 - display_width;
    goto start_rear;
}
else    goto start_front;

/* the main input loop */
FOREVER
{   /* as a precaution, make sure that 123's control-break handler
       didn't somehow gain control and receive a control-break, since
       that causes an infinite key stream until we return to 123,
       which would be an infinite loop if it happened here */
#if 0
    !! deal with this later if (test_control_break() || control_break_occurred_in_123)
        goto return_1;  /* pretend user ESC'ed */
endif /* wait until there's something to do */
    set_edit_mode_indicator();
    last_evt = GetEvent();
    just_escaped--; /* escape character received */ if ((last_evt >= 32) && (last_evt < 256))
    {   /* anomolous case: 0-len string, edit mode, / entered: return*/
        if ((last_evt == '/')  && fEditMode && (string_len == 1))
            goto return_1;
        /* character input */
        insert_char(last_evt);

/* show the part of the line following the insertion */
        first_displayed_index = first_char_displayed_ptr-string_buffer;
        DoSetCur(strt_row, strt_col + cur_string_index -
            first_displayed_index - 1);
        DoMessage(first_char_displayed_ptr + cur_string_index -
            first_displayed_index - 1);
    }
    else /* cursor keys and function keys */
    {   /* ESC'ing and then cursoring or CR'ing is the same as saying
            never mind and moving on.
            ESC and then ESC again says never mind and stay in this
            cell.  (All this assumes that we're in edit mode, or the
            first ESC could leave the cell editor.)
            So... the first thing we do for cursor keys and CR is to
            return 1 if the last key was ESC. */
        switch  (last_evt)
        {   /* cursor keys */
            case    KEY_RUBOUT: /* backspace: delete char to left */
                if (!char_left(1)) /* beeps if can't do it */
                    delete_position(KEY_RUBOUT);
                break;
            /* leave cursor keys in the queue, unless
                edit_eat_cursor_keys is set, which is set by routines
                which offer the user a choice of correcting bad input
                or ESC'ing */
            case    KEY_UP:
            case    KEY_DOWN:
            case    KEY_PGUP:
```

```
                case    KEY_PGDN:
                    if (just_escaped >= 0)
                        goto return_1;
                    goto return_0;
                case    KEY_RIGHT:
                    if (just_escaped >= 0)
                        goto return_1;
                    if (!fEditMode)
                        goto return_0;
                    else char_right(1);
                    break;
                case    KEY_LEFT:
                    if (just_escaped >= 0)
                        goto return_1;
                    if (!fEditMode)
                        goto return_0;
                    else char_left(1);
                    break;
                case    KEY_TAB:
                    if (just_escaped >= 0)
                        goto return_1;
                    if (!fEditMode)
                        goto return_0;
                    else char_right(5);
                    break;
                case    KEY_BACKTAB:
                    if (just_escaped >= 0)
                        goto return_1;
                    if (!fEditMode)
                        goto return_0;
                    else char_left(5);
                    break;
                case    KEY_DELETE:
                    if (fEditMode)
                        delete_position(KEY_DELETE);
                    else BumpBeep();
                    break;
                case    KEY_INSERT:
                    ovr_mode ^= 0x01;
                    set_ovr_indicator();
                    break;
                case    KEY_HOME:
                    if (!fEditMode)
                        goto return_0;
start_front:
                    cur_string_index = 0;
                    cursor_position = 0;
                    first_char_displayed_ptr = string_buffer;
                    display_cursor();
                    display_line();
                    break;
                case    KEY_END:
goto_end:
                    if (!fEditMode)
                        goto return_0;
                    cur_string_index = string_len - 1;
                    temp = string_len - display_width;
start_rear:
                    cursor_position =
                        min(cur_string_index, display_width - 1);
                    first_char_displayed_ptr = string_buffer +
                        max(temp, 0);
                    display_line();
                    display_cursor();
                    break;
                case    KEY_ESC:
                    /* clear the line */
                    DoSetCur(strt_row, strt_col);
                    DoEraseN(min(max_length, ScrnWidth));
                    if (string_len == 1 /*null*/ || !fEditMode)
                        goto return_1;
                    /* otherwise, just truncates to 0 */
                    was_start_char = string_buffer[0];
                    string_buffer[0] = '\0';
```

```
                    string_len = 1;
                    just_escaped = 1;
                    goto start_front;
                case    KEY_CR:
                    if (just_escaped >= 0)
                        goto return_1;
                    goto return_0;
                /* function keys */
                case    KEY_EDIT:
                    /* if in edit and press ESC, EDIT, line comes back */
                    if (fEditMode &&
                        just_escaped == 0 /* prev key was ESC*/)
                    {   string_buffer[0] = was_start_char;
                        string_len = strlen(string_buffer) + 1;
                        goto goto_end;
                    }
                    fEditMode ^= 0x01;
                    break;
                case    KEY_HELP:
                    /*help();*/
                    /* clear the help key if don't call help (123 will
                        clear the key and call help_xdv, which is a noop*/
                    /*(*do_chartest)();*/
                    break;
                case    KEY_ABORT:  /* Ctrl-Brk */
                    /* like ESC, only no exceptions -- just return */
                    DoSetCur(strt_row, strt_col);
                    DoEraseN(min(max_length, ScrnWidth));
/*!! what does this mean??
                    control_break_occurred_in_123 = 1;
*/
                    goto return_1;
                default:
                    BumpBeep();
            }
        }
        display_cursor();
    }  /* end main loop */ return_0:
    clear_hint_line();  /* clear OVR indicator */
    DoSetCur(strt_row, strt_col + cursor_position);
    DO_HIDEMARK();
    return(0);
return_1:
    clear_hint_line();  /* clear OVR indicator */
/*  restore_cursor_position(); */
    DO_HIDEMARK();
    return(1);
}  /* end in_string */
pragma warn .rch endif  /* no cell editor */

/* tag menu stuff */
#if 0
char *TagMenu[] = {
    "A-LeftTop",    "Special Tags on Left and Top",
    "B-LeftBottom", "Special Tags on Left and Bottom",
    "C-RightTop",   "Special Tags on Right and Top",
    "D-RightBottom","Special Tags on Right and Bottom",
    0
};
endif if FTAGS
void tm_lt(void) { fTagLft = TRUE;  fTagTop = TRUE;   CLC; }
void tm_lb(void) { fTagLft = TRUE;  fTagTop = FALSE;  CLC; }
void tm_rt(void) { fTagLft = FALSE; fTagTop = TRUE;   CLC; }
void tm_rb(void) { fTagLft = FALSE; fTagTop = FALSE;  CLC; }
PFV TagMenuProc[] = {
    tm_lt,
    tm_lb,
    tm_rt,
    tm_rb
```

```
void DoTagMenu(void)
{
    DoAMenu(TagMenu, TagMenuProc);
}
endif

/* end BEDIT.C */

/* MODES: TAB 4      Last Revision: Mon 05-29-89 06:59
**
** B03FIRST.C  -- dispatcher for ovl3 (periods)
**
** Copyright (C) 1989 Saratoga Software, Inc.  All rights reserved.
*/ include "bud.h"

flg OvlEnter(OVL_ENTRIES action)
{
    switch(action) {
    case OE_EDITCELL:      CellEdit1();        break;
    case OE_PERIODSMENU:   DoPeriodsMenu();    break;
    case OE_ENTERPERIODS:  return EnterPeriods();
    case OE_ATTACH:        return ovl_attach();
    case OE_TERMINATE:     return ovl_terminate();
    case OE_ENTERGOAL:     return EnterGoal();
    case OE_GOALMENU:      DoGoalMenu();       break;
    case OE_SHOWGOAL:      ShowGoalVal();      break;
    default:               return TRUE;
    }
    return FALSE;
}

/* MODES: TAB 4      Last Revision: Mon 05-29-89 07:00
**
** BHELP.C    -- BUD help system
**
** Copyright (C) 1989 Saratoga Software, Inc.  All rights reserved.
** 7/06/88 dbh Use start-dir to find help file.
** 7/01/88 dbh Ported from Silverado.
*/ include "bud.h"
include "bdroot.h"
include <string.h> define READ_CHOICE 0 int dos_read_file(int fhndl, long pos, QPTR qBuf, int ct)
{
    FileSeek(fhndl,SEEK_ABS,pos);
    return (FileReadFix(fhndl,qBuf,ct) ? -1 : ct);
} /* end dos_read_file */ int dos_open_file(char * fname)
{
    _DX = (uns) fname;
    _AX = 0x3d00;
    DosInt();
I   jnc opened;
I        neg ax;
opened:
    return _AX;
} /* end dos_open_file */ define dos_close_file(f)    FileClose(f)
define dos_get_file_len(fhndl) FileSeek(fhndl,SEEK_END,0)

/****************************************************************
 *                                                              *
 *                    clear_data_area                           *
 *                                                              *
 *          Function:                                           *
```

```
 *           erases the spreadsheet portion of the screen
 *       Inputs:                                              *
 *           none                                             *
 *       Outputs:                                             *
 *           none                                             *
 *                                                            *
 **************************************************************/ void    clear_data_area(void)
{
    DoEraseLines(HELP_SCREEN_START_ROW,
        ScrnHeight - HELP_SCREEN_START_ROW - 1);
    DO_VIDEOSYNC();
}   /* end clear_data_area */

/*************************************************************
 *                                                            *
 *                   display_screen                           *
 *                                                            *
 *       Function:                                            *
 *           displays the current help screen                 *
 *       Inputs:                                              *
 *           the help screen index is found in screen_no      *
 *       Outputs:                                             *
 *           none                                             *
 *       Actions:                                             *
 *                                                            *
 *                                                            *
 *                                                            *
 **************************************************************/ void    display_screen(void)
{
    char text_val_buffer[81];
    unsigned    i;
    char    FAR line_ptr;

/* clear the screen */
    clear_data_area();
    /* and the top line */
    DoEraseLines(0, 1);

/* read the desired screen into the help buffer */
    if (dos_read_file(help_file_no,
        (long)(((long) help_index[screen_no]) *
            (long) HELP_INDEX_SCALING_FACTOR),
        help_buffer,
        HELP_NO_SCREEN_CHARS) < 0)
    {   /* error reading file */
        help_error_flag = 1;
        goto done;
    }

/* the screen is in the buffer -- display it */
    line_ptr = help_buffer;
    for (i = 0; i < NO_HELP_ROWS; i++)
    {   DoSetCur(i + HELP_SCREEN_START_ROW, HELP_LINE_INDENT);
        qstrcpy(text_val_buffer, line_ptr);
        DoMessage(text_val_buffer);
        line_ptr += strlen(text_val_buffer) + 1;
    } done:
    return;

}   /* end display_screen */ void hm_next(void)
{
    if (screen_no == no_screens - 1) {
        BumpBeep();
    } else {
        screen_no++;
```

```c
        display_screen();
    }
    STC;
}
void hm_prev(void)
{
    if (screen_no == 0) {
        BumpBeep();
    } else {
        screen_no--;
        display_screen();
    }
    STC;
}
void hm_home(void)
{
    screen_no = 0 /* help_screen_no */ ;
    CLC;
}
void hm_pick(void)
{
#if READ_CHOICE
    topic = (int) choices(choices_buffer,
                    no_topics, choices_list_length, 0,
                    (char*)(index_buffer + 5), 0, 1);
    if (topic >= 0) { /* not ESC */
        screen_no = topics_to_screen_array[topic];
        display_screen();
    }
    STC;
#else
    if (DoAMenu(HelpTopicsMenu,NULL))
        STC;
    else {
        screen_no = HelpTopicScreens[menu_choice];
        CLC;
    }
endif
}
void hm_quit(void)
{
    help_error_flag = -1;
    CLC;
}

/*******************************************************************
 *                                                                  *
 *                          help                                    *
 *                                                                  *
 *       Function:                                                  *
 *           handles a request for help, running the help           *
 *           system                                                 *
 *       Inputs:                                                    *
 *           none                                                   *
 *       Outputs:                                                   *
 *           none                                                   *
 *       Actions:                                                   *
 *           This is the routine 123 calls via xdv_help, or         *
 *           if the help key is passed thru, via                    *
 *           handle_user_input.                                     *
 *                                                                  *
 *******************************************************************/ void BudHelp(void)
{
#if READ_CHOICE
#define CHC_BUF_SZ  (NO_HELP_TOPICS * AVG_TOPIC_NAME_LENGTH)
#else
#define CHC_BUF_SZ  0
#endif
define fn_buffer   choices_buffer char     choices_buffer[max(CHC_BUF_SZ,FN_BUF_SZ)];
    unsigned index_buffer[NO_HELP_SCREENS + 45],
```

```c
    topics_to_screen_array[NO_HELP_TOPICS];

/* we'll use the long buffer for the actual screen to display.  We could
    put it on the stack, but as long as a large enough buffer is available
    we don't have to worry about stack space then (altho there is no
    reason to believe it wouldn't all fit on the stack).
    Note: we leave the beginning of the buffer available for use as the
    receiving buffer for the call to decompress_string in
    display_help_line(), since that arg must be in the add-in segment */ help_file_no = -1;
help_buffer = allocq(HELP_NO_SCREEN_CHARS);
if (help_buffer == QNULL) {
    DoNonFatal("No memory for help");
    goto done;
}

/* The help file looks like (for explanations, see help.doc):

The help file, help.shf, has the following parts:
    -- # of screens in the file (2 bytes)
    -- # of topics in the file (2 bytes)
    -- length of the choices list (2 bytes)
    -- file offset of the choices list (2 bytes)
    -- file offset of the topics-to-screen array (2 bytes)
    -- the help choices prompt string (80 chars)
    -- screen index, containing the offsets of the screens (2 bytes
        for each help screen)
    -- topics-to-screen array (2 bytes for each help topic)
    -- topics list, for choices (1 string for each topic)
    -- the actual screens The entries in the screen index are to be multiplied by
HELP_INDEX_SCALING_FACTOR.  The other file offsets, for the choices list
and the topics-to-screen array, are assumed to be within 64K from the
start of the file, and so have no scaling factor.
*/

/* initializations */
help_error_flag = 0;
screen_no = HelpStack[CurHelpInd];  /* starting screen based on context */
/* there are 5 entries plus the prompt string before the actual screen
    index in the index_buffer */
help_index = index_buffer + 45;

/* open the file */
help_file_no =
    dos_open_file(MkHomeFileName(fn_buffer,help_file_name,empty_string));

if (help_file_no < 0 || dos_get_file_len(help_file_no) == 0L)
{   DoNonFatal(unable_to_open_help_file);
    goto done;
}

/* read in the first 5 vars, the choices prompt, and the index */
if (dos_read_file(help_file_no, 0L, index_buffer,
    (NO_HELP_SCREENS + 45) * 2) < 0)
    goto error_return;

/* set up the various parameters, based on what's in the file and the
    buffer dimensions assumed in the code here (they should be the same,
    but it's possible that a different help file version is being used).
    Use the smaller of what's in the file and what the buffers are set up
    to handle.  */
    no_screens = min(NO_HELP_SCREENS, index_buffer[0]);
    no_topics = min(NO_HELP_TOPICS, index_buffer[1]);
#if READ_CHOICE
    choices_list_length = min(index_buffer[2],
        NO_HELP_TOPICS * AVG_TOPIC_NAME_LENGTH);
endif if 0   /*debug*/
    /* would like to know of differences between the file and code */
    if (NO_HELP_SCREENS != index_buffer[0]) error(517);
```

```c
        if (NO_HELP_TOPICS != index_buffer[1]) error(518);
        if (index_buffer[2] > NO_HELP_TOPICS * AVG_TOPIC_NAME_LENGTH) error(519);
endif if READ_CHOICE
    /* read in the choices list */
    if (dos_read_file(help_file_no, (long) index_buffer[3],
        choices_buffer, choices_list_length) < 0)
        goto error_return;
endif /* read in the topics-to-index translation list */
    if (dos_read_file(help_file_no, (long) index_buffer[4],
        topics_to_screen_array, 2 * no_topics) < 0)
        goto error_return;
    /* do the user command loop: Next Previous Index Topics Quit */
    while (display_screen(), !help_error_flag)
        if (DoAMenu(HelpMenu, HelpMenuProc))
            break;

if (help_error_flag == 1)
error_return:
        DoNonFatal(error_reading_file_string);

clear_data_area();

done:
    if (help_file_no > 0)
        dos_close_file(help_file_no);
    if (help_buffer != QNULL)
        freeq(help_buffer, HELP_NO_SCREEN_CHARS);

} /* end BudHelp */

/*:POPHELP */
void PopHelp(void)
{
    if (CurHelpInd > 0)
        --CurHelpInd;
} /* end PopHelp */

/*:PUSHHELP */
void PushHelp(card8 HelpScreen)
{
    if (++CurHelpInd < MAX_HELP_STACK)
        HelpStack[CurHelpInd] = HelpScreen;
} /* end PushHelp */ if 0
void ht_1(void) { screen_no = HT_1; CLC; }
void ht_2(void) { screen_no = HT_2; CLC; }
void ht_3(void) { screen_no = HT_3; CLC; }
void ht_4(void) { screen_no = HT_4; CLC; }
void ht_5(void) { screen_no = HT_5; CLC; }
void ht_6(void) { screen_no = HT_6; CLC; }
void ht_7(void) { screen_no = HT_7; CLC; }
void ht_8(void) { screen_no = HT_8; CLC; }
endif /* end BHELP.C */

/* MODES: TAB 4     Last Revision: Mon 05-29-89 07:00
**
**  BMAIN.C -- Bud main overlay entries.
**
** Copyright (C) 1989 Saratoga Software, Inc.  All rights reserved.
**
** 8/10/88 dbh handle value printing in PostErrMsg.
** 7/26/88 dbh move ShowGoalVal into overlay.
** 7/22/88 dbh Better DoCTMenu descriptions (0.31).
** 7/18/88 dbh protect buffer ovfl in adjust (0.24).
** 7/11/88 dbh misc small fixes.
** 8/16/87 dbh Created.
*/
```

```c
#include "bud.h"
include "bdroot.h"
#include "bdovly.h"
#include "bemm.h"
#include <string.h>
include <mem.h> forward void DoMainMenu(void);
forward flg DoRCMenu(void);
forward flg DoDepthMenu(void);

forward flg DoCTMenu(char * DescForm,char * AllDesc);

forward void ExpandCurRow(flg fFullExpand);

forward void CollapseCurRow(void);

forward void ShowColLevel(COLTYPE ct);

/*:POSTERRMSG */
void PostErrMsg(void)
{
    ErrBeep();
    if (GlobErr > NO_ERROR && GlobErr < MSG_ERR_LIM) {
        sprintf(msg_buffer,ErrMsgs[GlobErr-1],GlobErrVal);
        if (GlobErr < MSG_ERR_PAUSE)
            PostMsg(msg_buffer);
        else
            DoNonFatal(msg_buffer);
    } else
        ClearMsgArea();
} /* end PostErrMsg */

/*:VERIFYCURROWACT */
flg VerifyCurRowAct(void)
{
    if (!INRANGE(BudRange.top,CurRow,ABudBottom())
        || (fColHdrDef && CurRow <= CHdrBot)
    ) {
        GlobErr = GE_OUT_OF_RANGE;
        PostErrMsg();
        return TRUE;
    }
    return FALSE;
} /* end VerifyCurRowAct */

/*:EXPANDCURROW -- expand current row */
void ExpandCurRow(flg fFullExpand)
{
    ROW row, newrow;
    ROW rows;

#if !ITER_EXPAND
    if (OnDisk())
        fFullExpand = FALSE;
endif if (VerifyCurRowAct())
        return;

tryExpand:
    if (RowIsLocked(CurRow) && UnLockRow(CurRow))
        return;

rows = DoExpand(CurRow, fFullExpand, TRUE);

/*DO_RECALC();*/
    DoRedisplay();

if (GlobErr == GE_MEM_OUT && OnDisk()) {
#if debug
        fMEMOUT = FALSE;
#endif
        BumpBeep();
```

```c
        if (SelectRange("Not enough memory to show; Enter row to hide",0))
            return;
        row = Range123.top;

rows = DoCollapse(row,&newrow);
        if (rows > 0) {
            if (CurRow > row) {
                CurRow -= rows;
                MoveToCur();
            }
            DoDisplay(TRUE);
            goto tryExpand;
        }
    } if (rows <= 0 || GlobErr == GE_LOCKED) {
        PostErrMsg();
    }
} /* end ExpandCurRow */

/*:COLLAPSECURROW   -- collapse current row */
void CollapseCurRow(void)
{
    ROW rows,NewRow;
    if (VerifyCurRowAct())
        return;

rows = DoCollapse(CurRow,&NewRow);

if (rows > 0 && CurRow != NewRow) {
        CurRow = NewRow;
        MoveToCur();
    }

DoDisplay(TRUE);

if (rows <= 0) {
        PostErrMsg();
    }
} /* end CollapseCurRow */

/*:EXPANDCUR */
void ExpandCur(flg fFull)
{
    if (fColHdrDef) {
        if (CurRow <= CHdrBot) {
            ShowColLevel(CT_NULL);
            return;
        }
    }
    ExpandCurRow(fFull);
}

/*:COLLAPSECUR */
void CollapseCur(void)
{
    if (fColHdrDef) {
        if (CurRow <= CHdrBot) {
            ShowColLevel(CT_NULL);
            return;
        }
    }
    CollapseCurRow();
} flg DoRCMenu(void)
{
    return DoAMenu(RCMenu, RCMenuProc);
}
void rc_row(void)    { fDoRow = TRUE; CLC; }
void rc_col(void)    { fDoRow = FALSE; CLC; } flg DoCSMenu(void)
```

```c
{
    return DoAMenuH(CSMenu, CSMenuProc, HS_CALCSELECTM);
}
void cs_calc(void)      { fCalcTot = TRUE; CLC; }
void cs_select(void)    { fCalcTot = FALSE; CLC; }
flg DoAnalMenu(void)
{
    return DoAMenuH(AValuesMenu, AValuesMenuProc, HS_VALUESM);
}
void a_diff(void)         ( AnalysisType = AT_DIFF; CLC; }
void a_per_diff(void)     ( AnalysisType = AT_PER_DIFF; CLC; }
void a_run_tot(void)      ( AnalysisType = AT_RUN_TOT; CLC; }
void a_per_tot(void)      ( AnalysisType = AT_PER_TOT; CLC; }
void a_run_per_tot(void)  ( AnalysisType = AT_RUN_PER_TOT; CLC; } flg DoAScopeMenu(void)
{
    return DoAMenuH(AScopeMenu, AScopeMenuProc, HS_SCOPEM);
}
void as_group(void)     ( AScopeType = AS_GROUP; CLC; }
void as_range(void)     ( AScopeType = AS_RANGE; CLC; }
void as_whole(void)     ( AScopeType = AS_WHOLE; CLC; }
void as_similar(void)   ( AScopeType = AS_SIMILAR; CLC; } void km_off(void)   ( fXlatPlusMinus = FALSE; CLC; }
void km_on(void)    ( fXlatPlusMinus = TRUE; CLC; } flg DoDepthMenu(void)
{
    fPickAll = fDoAll = FALSE;
#if !ITER_EXPAND
    if (OnDisk())
        return FALSE;
endif
    if (DoAMenuH(DepthMenu, NULL, HS_SHOWDEPTHM))
        return TRUE;
    switch (menu_choice) {
    case 2:
        fDoAll = TRUE;
    case 1:
        fPickAll = TRUE;
    default:    /* case 0 */
        break;
    }
    return FALSE;
}
if 0
void d_all(void)    ( fPickAll = TRUE; CLC; }
void d_first(void)  ( CLC; }
void d_whole(void)  ( fDoAll = fPickAll = TRUE; CLC; }
endif /*:DOCTMENU */
flg DoCTMenu(char * DescForm,char * AllDesc)
{
    char *menu[(MAX_PDS+1)*2 + 1];  /* maximum periods + ALL + null */
    char *cp = XDV_BUFFER;
    int i,lim;

/*  char rDescs[3][81]; */
    lim = (num_periods > 0 ? num_periods : 3);
    for (i = 0; i < lim; ++i) {
        menu[2*i] = cp;
        qstrcpy(cp, CustPeriods() ? periods[i].name : CTMenu[i] );
        cp += strlen(cp) + 1;
        menu[2*i+1] = cp;
        cp += sprintf(cp, DescForm, menu[2*i]) + 1;
    }
    if (AllDesc != NULL) {
        menu[i*2] = all_string;
        menu[i*2+1] = AllDesc;
        ++i;
    }
```

```c
        menu[i*2] = NULL;
        if (DoAMenu(menu, NULL))
            return TRUE;
        ColType =    (    CustPeriods() ?
                            (menu_choice < num_periods ?
                                CT_CUSTHI << menu_choice :
                                CT_NULL
                            ) :
                            CTMenuTable[menu_choice]
                    );

return (!fColHdrDef && GetColHdrRange());
} /* end DoCTMenu */ void DoMainMenu(void)
{
    DoAMenuH(MainMenu, MainMenuProc, HS_MAINM);
} void m_submenu(void)
{
    DoAMenuH(SubMenu, SubMenuProc, HS_OPTM);
} void m_keys(void)
{
    DoAMenuH(KeysMenu, KeysMenuProc, HS_KEYM);
}

/*:M_CONSOLIDATE
** enter consolidate:  set flag and flush out to root code
*/
void m_consolidate(void)
{
    fDoCons = TRUE;
    CLC;
} /* m_consolidate */

/*:M_PERIODS
** enter periods:  set flag and flush out to root code
*/
void m_periods(void)
{
    fDoPeriods = OkToChange(FALSE);
    CLC;
} /* m_periods */

/*:M_GOAL
** enter goal:  set flag and flush out to root code
*/
void m_goal(void)
{
    m_hold();   /* save to checkpoint */
    fDoGoal = TRUE;
    CLC;
} /* m_goal */

/*:M_COLCUST */
void m_colcust(void)
{
    DoAMenuH(ColCustMenu,ColCustMenuProc,HS_CCUSTM);
} /* end m_colcust */

/*:M_COLUMN -- column commands */
void m_column(void)
{
    DoAMenuH(ColMenu, ColMenuProc, HS_COLM);
} /* end m_column */

/*:M_ANALYSIS   -- analysis menu */
void m_analysis(void)
{
    DoAMenuH(AnalMenu,AnalMenuProc, HS_ANALM);
}
```

```
flg DoRBMenu(void)
{
tryAgain:
    if (DoAMenu(RBMenu,NULL))
        return TRUE;
    if (menu_choice == 0) {
        CABoundRange.top = 0;
        CABoundRange.bot = MAXROW;
    } else {
        if (SelectRange("Enter rows to limit analysis to",RNG_ANCH))
            goto tryAgain;
        CABoundRange = Range123;
    }
    return FALSE;
}

/*:M_ANAL    -- analyze values */
void m_anal(void)
{
    flg fNeedTot;

getAnalM:
    if (DoAnalMenu()) { STC; return; }
getRCM:
    if (DoRCMenu()) goto getAnalM;
    if (fDoRow) {
        fNeedTot =
            (AnalysisType == AT_PER_TOT || AnalysisType == AT_RUN_PER_TOT);
getCSM:
        if (fNeedTot) {
            if (DoCSMenu()) goto getRCM;
            if (!fCalcTot) {
                if (SelectRange("Enter total row",0))
                    goto getCSM;
                AnalTotRow = Range123.top;
            }
        }
getASM:
        if (DoAScopeMenu()) {
            if (fNeedTot)     goto getCSM;
            else              goto getRCM;
        }
        if (AScopeType == AS_RANGE) {
            if (SelectRange("Enter rows for analysis",RNG_ANCH))
                goto getASM;
        }
    } else {
        do {
            if (DoCTMenu("Analyze columns by %ss","Analyze all columns"))
                goto getRCM;
        } while (DoRBMenu());
    } if (!fCheckPoint)
        m_hold();
    if (!fCheckPoint) {
        ErrBeep();
        STC;
        return;
    }
    DoAnalysis();
    CLC;
} /* end m_analysis */

/*:M_RESTORE */
void m_restore(void)
{
    if (!find_first(CheckPointFileName)) {
        ErrBeep();
        PostMsg("No checkpoint file");
    } else {
        fRWinBud = TRUE;
        if (!internal_read_wkl(CheckPointFileName,-1))
            DeleteWSFile(CheckPointFileName);
```

```c
            fRWinBud = FALSE;
            fNeedCalc = TRUE;
            DoRedisplay();
        }
        fCheckPoint = FALSE;
        CLC;

} /* end m_restore */

/*:M_HOLD */
void m_hold(void)
{
#if 0
    set_cons_boundaries();
    clear_wkl_rec_contents();
#endif
    DO_WAIT();
    PostMsg(save_checkpoint_msg);

fRWinBud = TRUE;
    fCheckPoint = !internal_save_wkl(CheckPointFileName,-1);
    fRWinBud = FALSE;

ClearMsg();
    CLC;
} /* end m_hold */

/*:TRACKDISPLAY */
void TrackDisplay(void)
{
    MoveToCur();     /* updates origin */
    DoDisplay(TRUE);
} /* end TrackDisplay */

/*:M_EXPAND -- expand rows (menu command) */
void m_expand(void)
{
    int rows;

if (DoDepthMenu()) { STC; return; }
    if (fDoAll) {
        rows = ExpandAll();
        TrackDisplay();
        if (rows > 0 && GlobErr == GE_NO_EXPAND)
            GlobErr = NO_ERROR;
        if (GlobErr == NO_ERROR && rows <= 0)
            GlobErr = GE_NO_EXPAND;
        if (GlobErr != NO_ERROR)
            PostErrMsg();
    } else
        ExpandCurRow(fPickAll);
    CLC;
} /* end m_expand */

/*:SHOWCOLLEVEL -- expand current column */
void ShowColLevel(COLTYPE ct)
{
    COL cols;

if (ct == CT_NULL) {
        if (DoCTMenu("Show columns by %ss","Show all columns")) {
            STC;
            return;
        }
        ct = ColType;
    } cols = DoColTots(ct,FALSE,TRUE);

TrackDisplay();

if (cols)
        ErrBeep();

CLC;
```

```c
} /* end ShowColLevel */

/*:C_EXPAND -- expand cols (menu command) */
void c_expand(void)
{
    ShowColLevel(CT_NULL);
} /* end c_expand */

/*:M_COLLAPSE   -- collapse rows (menu command) */
void m_collapse(void)
{
    CollapseCurRow();
    CLC;
} /* end m_collapse */ void bo_none(void)      ( BarsOpt = BO_NONE;    CLC; )
void bo_single(void)    ( BarsOpt = BO_SINGLE;  CLC; )
void bo_double(void)    ( BarsOpt = BO_DOUBLE;  CLC; )

/*:M_TOTAL  -- install total rows (menu command) */
void m_total(void)
{
    ROW rows;

if (DoAMenuH(BOMenu,BOMenuProc,HS_TOTM)) ( STC; return; )

rows = DoTotals(CurRow,BarsOpt);

/*DO_RECALC();*/
    DoRedisplay();

if (rows < 0)
        PostErrMsg();
    CLC;
} /* end m_total */

/*:C_TOTAL  -- install total columns */
void c_total(void)
{
    flg fErr;

if (DoCTMenu("Total columns by %ss",NULL)) ( STC; return; )
    fErr = DoColTots(ColType,FALSE,FALSE);
    TrackDisplay();

if (fErr)
        ErrBeep();
    CLC;
} /* end c_total */ if 0
/*:M_REMOVE -- remove totals */
void m_remove(void)
{
    ROW row;

if (SelectRange("Enter range for removing totals",RNG_ANCH))
        ( STC; return; )
    for (row=Range123.bot; row >= Range123.top; --row) {
        DoRemTot(row);
    }

/*DO_RECALC();*/
    DoRedisplay();

CLC;
} /* end m_remove */
#endif

/*:C_REMOVE -- remove totals */
void c_remove(void)
{
    flg fErr;
```

```
        if (DoCTMenu("Remove %s totals","Remove all totals")) { STC; return; }
        fErr = DoColTots(ColType,TRUE,FALSE);

TrackDisplay();

if (fErr)
            ErrBeep();
        CLC;
} /* end c_remove */

/*:M_MOVE -- move rows */
void m_move(void)
{
    ROW FromTop,FromBot,ToRow;

if (SelectRange("Enter rows to Move FROM",RNG_ANCH)) { STC; return; }
    FromTop = Range123.top;
    FromBot = Range123.bot;
    if (SelectRange("Enter row to Move TO",0)) { STC; return; }
    ToRow = Range123.top;

DoMove(ToRow,FromTop,FromBot);

/*DO_RECALC();*/
    DoRedisplay();
    CLC;
} /* end m_move */

/*:M_DEFINE -- define bud range */
void m_define(void)
{
    SETC(EditBudRange());
}

/*:M_COLHDR -- define column header range */
void m_colhdr(void)
{
    SETC(EditColHdrRange());
}

/*:OKTOCHANGE */
flg OkToChange(flg fFYear)
{
    if (ColTotsPresent(fFYear ? (CT_YEAR|CT_QTR) : (~0))) {
        DoNonFatal(remove_col_tot_str);
        return FALSE;
    }
    return TRUE;
} /* end OkToChange */

/*:M_FYORG  -- define first month of year */
void m_fyorg(void)
{
    int i;

if (CustPeriods()) {
        DoNonFatal(cant_change_fyear_str);
        goto done;
    }
    if (!OkToChange(TRUE))
        goto done;

i = GetIntVal("Enter first month of fiscal year (1-12): ",FirstMon+1,12);
    if (i == INTERR) { STC; return; }

FirstMon = i-1;
done:
    CLC;
} /* end m_fyorg */

/*:M_SPLITCOL   -- define # of colums split */
void m_splitcol(void)
{
    int i;
```

```c
        if (!OkToChange(FALSE))
            goto done;

i = GetIntVal("Enter number of split columns (1-" STR(MAXSPLIT) "): ",
                    SplitCols, MAXSPLIT);
        if (i == INTERR) { STC; return; }
#if 0
        if (i < 1) {
            DoNonFatal("Invalid split value");
            STC;
            return;
        }
endif
        SplitCols = i;
done:
        CLC;
} /* end m_splitcol */

/*:M_COLCUSTREST */
void m_colcustrest(void)
{
        if (!OkToChange(FALSE))
            goto done;
#if 0
        /* reread cfg file */
        ReadPeriodsFile(FALSE);
        SplitCols = DefSplitCols;
        FirstMon = DefFirstMon;
#else
        /* reset to default time units */
        FreePeriods();
        SplitCols = 1;
        FirstMon = 0;
#endif
done:
    CLC;
} /* end m_colcustrest */

/*:M_UPDATECFG */
void m_updatecfg(void)
{
        fCfgExists = !WritePeriodsFile(FALSE) && CustPeriods();
        CLC;
} /* end m_updatecfg */

/*:ADJUST -- handle data adjustments due to insert/deletes */
void Adjust(void)
{
    uns len;
    char **pPrompt;
    RANGE Rng,brng;
    int rows;
    int cols;
    flg fJunk;

if (fBudActive)
        return;

GlobErr = 0;
    fLastReturn = FALSE;    /* resets and locks out recursive adjusts */
    if (fColHdrDef) {
#if 0
        if (QueryRange(col_hdr_nrange_name,&Rng) && RngOk(&Rng))
            ColHdrRange = Rng;
#else
        SenseColHdr();
#endif
        UpdateColRange();
    }
    for (pPrompt=rSelectPrompts, AdjustValue=0;
        AdjustValue < ADJ_MAX;
        ++AdjustValue, ++pPrompt
    ) {
        len = strlen(*pPrompt);
```

```c
        if (strncmp(savebuf,*pPrompt,len) == 0) {
            AdjustPtr = savebuf+len + 2;     /* set ptr to range stuff */
            break;
        }
    } if (!QueryRange(bud_nrange_name,&brng))
        goto BudRangeDestroyed;

if (AdjustValue < ADJ_MAX &&
        PrsRange(AdjustPtr,&Rng,&fJunk,&fJunk) <= 0
    )
        return;

rows = Rng.bot - Rng.top + 1;
    cols = Rng.rgt - Rng.lft + 1;

switch (AdjustValue) {
    case ADJ_INS_ROW:
        if (Rng.top <= BudRange.top) {
            if ((BudRange.top += rows) > MAXROW)
                goto BudRangeDestroyed;
        }
        if (Rng.top <= BudRange.bot) {
            if ((BudRange.bot += rows) > MAXROW) {
                BudRange.bot = MAXROW;
            }
        }
        goto UpdBudRng;
    case ADJ_INS_COL:
        if (Rng.lft <= BudRange.lft) {   /* left of BUD */
            if ((BudRange.lft += cols) > MAXCOL)
                goto BudRangeDestroyed;
            if ((BudRange.rgt += cols) > MAXCOL) {
                BudRange.rgt = MAXCOL;
            }
            AdjustAdjRecs(cols);
        } else {                          /* within BUD */
            AddAdjRec(Rng.lft,cols,FALSE);
            FixCTags(Rng.lft,Rng.lft,cols/SplitCols);
        }
        if (fColHdrDef) {
            if (Rng.lft <= CHdrLft) {
                CHdrLft += cols;
            }
        }
        goto UpdBudRng;
    case ADJ_DEL_ROW:
        if (Rng.top <= BudRange.top) {
            if (Rng.bot >= BudRange.top)
                goto BudRangeDestroyed;
            BudRange.top -= rows;
        }
        if (Rng.top <= BudRange.bot) {
            if (Rng.bot > BudRange.bot)
                BudRange.bot = Rng.top - 1;
            else
                BudRange.bot -= rows;
        }
        goto UpdBudRng;
    case ADJ_DEL_COL:
        cols = -cols;
        if (Rng.lft <= BudRange.lft) {   /* left of BUD */
            if (Rng.rgt >= BudRange.lft)
                goto BudRangeDestroyed;
            BudRange.lft += cols;
            BudRange.rgt += cols;
            AdjustAdjRecs(cols);
        } else {                          /* within BUD */
            AddAdjRec(Rng.lft,cols,FALSE);
            FixCTags(Rng.lft,Rng.lft,cols/SplitCols);
        }
        if (fColHdrDef) {
            if (Rng.lft < CHdrLft) {
```

```
                    if (Rng.rgt >= CHdrLft)
                        cols = (Rng.lft - CHdrLft);
                    CHdrLft += cols;
                }
            }
    UpdBudRng:
            UpdateBudRange();
            return;
        default:
            GlobErr = NewBudRange(&brng,FALSE);
            if (GlobErr != NO_ERROR) {
                UpdateBudRange();
                PostErrMsg();
            }
            return;
        }

BudRangeDestroyed:
        fBudDefined = FALSE;
        fColHdrDef = FALSE;
        CreateRange(bud_nrange_name,NULL);  /* delete named range */
        CreateRange(col_hdr_nrange_name,NULL);  /* delete named range */
        GlobErr = GE_BUD_DESTROY;
        PostErrMsg();
    } /* end Adjust */
    /*:M_STOREOPT    -- storeage options menu */
    void m_storeopt(void)
    {
        DoAMenuH(SOMenu,SOMenuProc,HS_STOREM);
    }
    #if USERAM
    void so_ram(void)    {   SwitchStore(SO_RAM);    }
    #endif
    void so_disk(void)   {   SwitchStore(SO_DISK);   }
    void so_sheet(void)  {   SwitchStore(SO_SHEET);  }

/*:M_LOCKING */
    void m_locking(void)
    {
        DoAMenuH(LockMenu,LockMenuProc,HS_LOCKM);
    }

/*:LOCKING */
    flg Locking(flg fUnLock)
    {
        char pbuf[32];

if (OnSheet()) {
            DoNonFatal("Can't lock rows stored on worksheet");
            goto done;
        } tryPW:
        if (PromptString("Enter password: ") || strlen(buffer) == 0)
            { return TRUE; }
        if (!fUnLock) {
            strcpy(formbuf,buffer);
            if (PromptString("Verify password: ") || strcmp(buffer,formbuf) != 0){
                ErrBeep();
                PostMsg("Verify failed; re-enter");
                goto tryPW;
            }
        } if (fUnLock != 2) {
            sprintf(pbuf, "Enter rows to %slock", fUnLock ? "un" : empty_string );
            if (SelectRange(pbuf,RNG_ANCH)) { return TRUE; }
        } if (!DoLocking(!fUnLock,buffer,&Range123) && fUnLock) {
            DoNonFatal("Invalid password");
            if (fUnLock == 2)
                return TRUE;
```

```
        }
done:
    return FALSE;
} /* end Locking */ flg UnLockRow(ROW row)
{
    Range123.top = Range123.bot = row;
    return Locking(2);
}

/*:M_LOCK */
void m_lock(void)
{
    SETC(Locking(0));
} /* end m_lock */

/*:M_UNLOCK */
void m_unlock(void)
{
    SETC(Locking(1));
} /* end m_unlock */

/* end BMAIN.C */
/* MODES: TAB 4     Last Revision:  Mon 05-29-89 07:00
**
**   BMISC.C -- Bud misc functions.
**
** Copyright (C) 1989 Saratoga Software, Inc.  All rights reserved.
**
**   9/02/88 dbh moved strstr & strrchr here from budlib.
**   8/17/88 dbh use select_column_headers_string.
**   7/22/88 dbh fiscal year support in prscolhdr.
**   7/08/88 dbh write/read bud info to parrellel file not to WKS file.
**   8/31/87 dbh Created.
*/ include "bud.h"
include "bdroot.h"
#include "bdovly.h"
#include <string.h>
include <mem.h> forward flg OpenSwapFile(void);

pragma warn -par
/*:MOVERANGE */
flg cdecl MvRange(
    ord16 left, ord16 top, ord16 right, ord16 bot,
    ord16 left2, ord16 top2
    )
{
    RANGE dest;

GET_ACTIVE();
    if (bot > _DX)
        bot = _DX;
    if (top > bot)
        return FALSE;

dest.lft = dest.rgt = left2;
    dest.top = dest.bot = top2;

_SI = (uns) &left;
    _DI = (uns) &dest;
    _AX = 0;
    la_move();
    RETC;
}

/*:COPYRANGE */
flg cdecl CopyRange(
    ord16 left, ord16 top, ord16 right, ord16 bot,
```

```c
        ord16 left2, ord16 top2, ord16 right2, ord16 bot2
        )
{
        _SI = (uns) &left;
        _DI = (uns) &left2;
        _AX = 0;
        la_copy();
        RETC;
}
pragma warn .par /*:GETFREESPACE */
card32 GetFreeSpace(void)
{
        GET_FREEBYTES();
        _DX = _CX;
        _AX = _BX;
#pragma warn -rvl
} /* end GetFreeSpace */
pragma warn .rvl /* file i/o primitives */

/*:MKBUDFILENAME */
char * MkBudFileName(char fname[])
{
        if (fSystem) {
#if 1
                MkHomeFileName(fname,BudSysFileName,"");
#else
                strcpy(fname,BudSysFileName);
#endif
        } else if (fUseIFN) {
                strcpy(fname,internal_file_name);
        } else {
                /* get file name */
                FIX_ES;
                _SI = (uns) fname;
                GET_SHEETNAME();
        } return SetFileExtension(fname,bud_file_ext);
} /* end MkBudFileName */ define BUDID    0xBD01

/*:WRITEBUDFILEHEAD */
flg WriteBudFileHead(void)
{
        SWAP_HDR Hdr;
        QTREC qt;
        uns ctTags;

for (ctTags=0, qt=tags; qt != QNULL; ++ctTags, qt=qt->qNxtTag);

memclr(&Hdr,sizeof(Hdr));
        Hdr.HdrID = BUDID;
        Hdr.HdrSz = sizeof(Hdr);
        Hdr.VerID = VERSION_ID;
        Hdr.ChunkSize = CHUNK_SIZE;
        Hdr.TagsAddr =
        Hdr.NextChunk = SwapNextChunk;
        Hdr.BudRange = BudRange;
        Hdr.ColHdrRange = ColHdrRange;
/*      Hdr.SaveRange = SaveRange;       */
/*      Hdr.TitleRange = TitleRange;     */
        Hdr.NextTag = nextTag;
        Hdr.FirstMon = FirstMon;
        Hdr.AdjCount = AdjCount;
        Hdr.FreeCount = SwapFreeCount;
        Hdr.TagsCount = ctTags;
        Hdr.StoreOpt = StoreOpt;
        Hdr.fColHdrDef = fColHdrDef;
        Hdr.SplitCols = SplitCols;
```

```
    Hdr.NumPeriods = num_periods;
    qmovmem(qFreeList, &Hdr.FreeVector, sizeof(Hdr.FreeVector) );
    Seek(SEEK_ABS,0);
    return WriteFix(&Hdr,sizeof(Hdr));
} /* end WriteBudFileHead */ uns CountTags;

/*:RANGEEQUAL */
flg RangeEqual(RANGE * pRng1,RANGE * pRng2)
{
    return (    pRng1->top == pRng2->top
            && pRng1->bot == pRng2->bot
            && pRng1->lft == pRng2->lft
            && pRng1->rgt == pRng2->rgt
            );
} /* end RangeEqual */

/*:SENSECOLHDR */
flg SenseColHdr(void)
{
    RANGE rng;

if (!QueryRange(col_hdr_nrange_name,&rng) || !RngOk(&rng)) {
        CreateRange(col_hdr_nrange_name,NULL);   /* kill it */
        return FALSE;
    }
    ColHdrRange = rng;
    return TRUE;
} /* end SenseColHdr */

/*:READBUDFILEHEAD */
flg ReadBudFileHead(void)
{
    SWAP_HDR Hdr;
    RANGE rng;

Seek(SEEK_ABS,0);
    if (ReadFix(&Hdr,sizeof(Hdr)))
        return TRUE;
    if (Hdr.HdrID != BUDID ||
        Hdr.HdrSz != sizeof(Hdr) ||
        Hdr.VerID != VERSION_ID ||
        Hdr.ChunkSize != CHUNK_SIZE
    )
        return TRUE;

if (!QueryRange(bud_nrange_name,&rng) || !RangeEqual(&rng,&Hdr.BudRange))
        return TRUE;

BudRange = Hdr.BudRange;

if (Hdr.fColHdrDef) {
        fColHdrDef = TRUE;
        ColHdrRange = Hdr.ColHdrRange;
    } else {
        fColHdrDef = SenseColHdr();
    }

StoreOpt = Hdr.StoreOpt;
#if !USERAM
    if (StoreOpt == SO_RAM)
        return TRUE;
endif if (OnDisk()) {
        InitFreeList();
        SwapFreeCount = Hdr.FreeCount;
        qmovmem(&Hdr.FreeVector, qFreeList, sizeof(Hdr.FreeVector) );
    }
    SwapNextChunk = Hdr.NextChunk;
/*  SaveRange = Hdr.SaveRange;  */
/*  TitleRange = Hdr.TitleRange;    */
    nextTag = Hdr.NextTag;
    FirstMon = Hdr.FirstMon;
```

```c
    AdjCount = Hdr.AdjCount;
    CountTags = Hdr.TagsCount;
    SplitCols = max(1,Hdr.SplitCols);
    fPeriodsInFile = (Hdr.NumPeriods != 0);

return FALSE;
} /* end ReadBudFileHead */

/*:DELETEBUDFILE -- delete .BUD file */
void DeleteBudFile(void)
{
    char fname[FN_BUF_SZ];

fdelem(MkBudFileName(fname));   /* delete file */
} /* end DeleteBudFile */

/*:OPENBUDFILE   -- open Bud file, identify and position */
flg OpenBudFile(flg fWrite)
{
    char fname[FN_BUF_SZ];

fFileOpen =
    fWriting = FALSE;
    /* open the file */
    _DX = (uns) MkBudFileName(fname);
    _AX = (fWrite ? 0x3c00 : 0x3d00);   /* open file, read/write mode */
    _CX = 0;
    DosInt();
I   jnc opened;
error:  /* error: undo everything */
        return TRUE;

opened:
    FileHandle = _AX;
    fFileOpen = TRUE;
    fWriting = fWrite;
    return FALSE;
} /* end OpenBudFile */

/*:ABORTBUDFILE -- abort file processing */
void AbortBudFile(void)
{
    if (fFileOpen) {
        CloseCurFile();
        if (fWriting)
            DeleteBudFile();
    }
} /* end AbortBudFile */ define CELL_ERR (-3)

/*:PRSCELL -- parse a cell spec, return chars scanned */
int PrsCell(char FAR qForm,ROW * pRow,COL * pCol,flg * pfRAbs,flg * pfCAbs)
{
    int val,len;
    char * p;
    flg fAbs;
    char c;
    char buf[9];    /* big enough for "$CC$9999" */ p = buf;
    qmovmem(qForm,buf,8);
    buf[8] = 0;
    if (strncmp(buf,ERR_string,3) == 0)
        return (CELL_ERR);  /* special value to handle ERR formulas */
```

```c
    c = *p;
    fAbs = (c == '$');
    if (!fAbs && !isupper(c))
        return 0;   /* not cell ref */
    if (fAbs) {
        c = *++p;
        if (!isupper(c))
            return 0;
    }
    val = c - 'A';
    c = *++p;
    if (isupper(c)) {
        val = ((val+1)*26) + (c - 'A');
        c = *++p;
    }
    *pfCAbs = fAbs;
    *pCol = val;

fAbs = (c == '$');
    if (fAbs) ++p;
    len = ScanInt(p,&val);
    if (len == 0)
        return 0;
    *pfRAbs = fAbs;
    *pRow = val - 1;
    return (len + (p-buf));
} /* end PrsCell */

/*:SWAPLOWER */
void SwapLower(int * pVal1, int * pVal2)
{
    uns tmp;

if (*pVal2 < *pVal1) {
        tmp = *pVal1;
        *pVal1 = *pVal2;
        *pVal2 = tmp;
    }
}

/*:PRSRANGE */
int PrsRange(char FAR qStr, RANGE * pRng, flg * pfRAbs,flg * pfCAbs)
{
    flg fRAbs,fCAbs;
    ROW row;
    COL col;
    int len,len2=0;

len = PrsCell(qStr,&row,&col,pfRAbs,pfCAbs);
    if (len <= 0)
        return (len);
    pRng->top = pRng->bot = row;
    pRng->lft = pRng->rgt = col;
    qStr += len;
    if (*(int FAR)qStr == '..') {
        len += 2;
        len2 = PrsCell(qStr+2,&row,&col,&fRAbs,&fCAbs);
        if (len2 <= 0)
            return (len2 + -len);
        pRng->bot = row;
        pRng->rgt = col;
        SwapLower(&pRng->top,&pRng->bot);
        SwapLower(&pRng->lft,&pRng->rgt);
    }
    return (len+len2);
} /* end PrsRange */
```

```
/*:FIXUPFORMULA -- fixup cell references in formula returns TRUE if changes */
flg FixupFormula(char FAR qForm,
                 ROW KeyRow, int RowDelta, COL KeyCol, int ColDelta)
{
    ROW row;
    COL col;
    char * pOut = formbuf;
    int len;
    char c;
    flg fIsCell,fInStr,fFixups;
    flg fRAbs,fCAbs;
    char ColName[3];

fIsCell = TRUE;
    fFixups =
    fInStr = FALSE;
    while ((c = *qForm) != 0) {
        if (!fInStr) {
            if (fIsCell) {
                len = PrsCell(qForm,&row,&col,&fRAbs,&fCAbs);
                if (len < 0) {
                    /* special handling of ERR cell references */
                    len = -len;
                    goto errFix;
                }
                if (len > 0) {
                    /* fix up and send */
                    if (!fRAbs && RowDelta != 0 && row >= KeyRow) {
                        row += RowDelta;
                        fFixups = TRUE;
                        if (row < KeyRow)
                            goto errFix;
                    }
                    if (!fCAbs && ColDelta != 0 && col >= KeyCol) {
                        col += ColDelta;
                        fFixups = TRUE;
                        if (col < KeyCol)
                            goto errFix;
                    } if (row > MAXROW || col > MAXCOL) {
errFix:
                        strcpy(pOut,atERR_string);
                        pOut += 4;
                    } else {
                        pOut += sprintf(pOut,"%s%s%s%d",
                                    fCAbs?"$":empty_string,
                                    MkColName(col,ColName),
                                    fRAbs?"$":empty_string,
                                    row+1 );
                    }
                    qForm += len;
                    fIsCell = FALSE;
                    continue;
                }
            }
            fIsCell = (strchr(PreCell,c) != NULL);
        }
        if (c == '\"') fInStr ^= TRUE;
        *pOut++ = c;
        ++qForm;
    }
    *pOut = 0;
    return (fFixups);
} /* end FixupFormula */
```

```c
/*:ISTOTALFORM -- check if formula is all additive terms */
flg IsTotalForm(char * pForm)
{
    char c;

while ((c = *pForm++) != 0) {
        switch (c) {
        case '+':
        case '-':
        case '(':
        case ')':
        case ',':
        case '.':
        case '_':
        case '$':
        case ' ':
/*      case 'E':    -- handled by isupper below */
            break;
        case '@':
            if (strncmp(pForm,"SUM",3) != 0)
                return FALSE;
            pForm += 3;
            break;
        default:
            if (!isdigit(c) && !isupper(c))
                return FALSE;
        }
    }
    return TRUE;
} /* end IsTotalForm */

/*:HIGHFORMROW -- scan formula for highest row reference */
ROW HighFormRow(char * pForm)
{
    ROW row,high = MAXROW;
    COL col;
    int len;
    char c;
    flg fIsCell,fInStr;
    flg fRAbs,fCAbs;

#if 0
    if (strchr(pForm+1,'+') == NULL && strstr(pForm,"@SUM") == NULL)
#else
    if (!IsTotalForm(pForm))
#endif
        return MAXROW;   /* not a summary formula */ fIsCell = TRUE;
    fInStr = FALSE;
    while ((c = *pForm) != 0) {
        if (!fInStr) {
            if (fIsCell) {
                len = PrsCell(pForm,&row,&col,&fRAbs,&fCAbs);
                if (len < 0) {
                    /* special handling of ERR cell references */
                    len = -len;
                    row = MAXROW;
                }
                if (len > 0) {
                    if (row < high)
                        high = row;
                    pForm += len;
                    fIsCell = FALSE;
                    continue;
                }
            }
            fIsCell = (strchr(PreCell,c) != NULL);
```

```c
            }
            if (c == '\"') fInStr ^= TRUE;
            ++pForm;
        }
        return (high);
    } /* end HighFormRow */

/*:FORMRANGECHECK -- scan formula for references into range */
    flg FormRangeCheck(char * pForm,PRANGE pBrng,flg fForRows)
    {
        RANGE rng;
        int len;
        char c;
        flg fIsCell,fInStr;
        flg fRAbs,fCAbs;

fIsCell = TRUE;
        fInStr = FALSE;
        while ((c = *pForm) != 0) {
            if (!fInStr) {
                if (fIsCell) {
                    len = PrsRange(pForm,&rng,&fRAbs,&fCAbs);
                    if (len < 0) {
                        /* special handling of ERR cell references */
                        len = -len;
                        goto hndlERR;
                    }
                    if (len > 0) {
                        if (fForRows) {
                            if (OnSheet()) {
                                if (   (rng.top <  pBrng->top
                                                && pBrng->top <= rng.bot)
                                    || (rng.top <= pBrng->bot
                                                && pBrng->bot < rng.bot)
                                   )
                                    return TRUE;
                            } else {
                                if (INRANGE(rng.top,pBrng->top,rng.bot) ||
                                    INRANGE(rng.top,pBrng->bot,rng.bot) ||
                                    INRANGE(pBrng->top,rng.top,pBrng->bot) ||
                                    INRANGE(pBrng->top,rng.bot,pBrng->bot)
                                   )
                                    return TRUE;
                            }
                        } else {
                            if (   rng.top < pBrng->top
                                || rng.bot > pBrng->bot
                                || rng.lft < pBrng->lft
                                || rng.rgt > pBrng->rgt
                               )
                                return FALSE;
                        }
hndlERR:
                        pForm += len;
                        fIsCell = FALSE;
                        continue;
                    }
                }
                fIsCell = (strchr(PreCell,c) != NULL);
            }
            if (c == '\"') fInStr ^= TRUE;
            ++pForm;
        }
        return (!fForRows);
    } /* end FormRangeCheck */

/*:UPDATEBUDRANGE */
void UpdateBudRange(void)
```

```c
{
    CreateRange(bud_nrange_name,&BudRange);
    UpdateColRange();
} /* end UpdateBudRange */

/*:PLACEBUDHEAD */
void PlaceBudHead(void)
{
#if 0    /* eric doesn't like this thing in A1 -- nuked*/
    PutCell(AMinRow(),AMinCol(),T_FORMULA,DEFAULT_FMT,BudHeadString);
    RecalcCell(AMinRow(),AMinCol());
#endif
    UpdateBudRange();
} /* end PlaceBudHead */

/*:ISATAG */
flg IsATag(void)
{
    return (0 == strncmp(cellPtr,TagStr,TagStrLen));
} /* end IsATag */
#define SENSED          1
#define SENSED_NO_MSG   2

/*:SENSEBUD -- detect bud ranges (if we lose supplementary data) */
flg SenseBud(void)
{
    RANGE rng;
    ROW r,maxRow;
    flg fLoseData = FALSE;

/* fetch periods config info */
    if (fCfgExists && BudState == STATE_NORM) {
        ReadPeriodsFile(FALSE);
    }
    SplitCols = DefSplitCols;
    FirstMon = DefFirstMon;

if (QueryRange(bud_nrange_name,&rng)
        && RngOk(&rng)
        && GetColWidth(rng.lft) == 1
    ) {
        BudRange = rng;
Sensed:
        fBudDefined = TRUE;
        fColHdrDef = SenseColHdr();
        PlaceBudHead();

#if 1
        StoreOpt = SO_SHEET;
        if (GetSaveRow() == 0) {
#else
        if (GetSaveRow() != 0) {
            StoreOpt = SO_SHEET;
        } else {
#    if USERAM
            StoreOpt = SO_RAM;
#    else
            StoreOpt = SO_DISK;
            if (!OpenSwapFile())
                InitFreeList();
            else {
                MkSaveArea();
                StoreOpt = SO_SHEET;
            }
endif
endif
```

```c
            for (r=MinRow(); r < MaxRow(); ++r) {
                if (ScanTag(r,NULL) & TAG_OSHEET) {
                    fLoseData = TRUE;
                    fMustAlloc = TRUE;
                    PutCell(r,TagCol(),T_LABEL,DEFAULT_FMT,"'#Err");
                    fMustAlloc = FALSE;
                }
            }
        }
        if (QueryRange(col_hdr_nrange_name,&rng)) {
            fColHdrDef = TRUE;
            ColHdrRange = rng;
            /* InitColHdrs(); ?? !!!*/
        }
        if (fLoseData && GlobErr != GE_LOST_DATA)
            GlobErr = GE_MISSING_DATA;

if (QueryRange("BUD_CONS"/*cons_nrange_name*/,&rng)) {
            CreateRange("BUD_CONS"/*cons_nrange_name*/,NULL);
            return SENSED_NO_MSG;
        }
        return SENSED;
    } else if (GetColWidth(0) == 1) {
        GET_ACTIVE();
        maxRow = _DX;
        for (r=0; r <= maxRow; ++r) {
            if (GetCell(r,0)) {
                if (!(r==0 ? 0==strcmp(cellPtr,BudHeadString) : IsATag()))
                    return FALSE;
            }
        }
        memclr(&BudRange,sizeof(RANGE));
        goto Sensed;
    }
    return FALSE;
} /* end SenseBud */

/*:SYSSENSEBUD */
flg SysSenseBud(void)
{
    RANGE rng;
    flg fRes;

if (SysSense(&rng)) {
        fSystem = TRUE;
        fRes = ReadBud();
        DeleteBudFile();    /* delete the system file */
        fSystem = FALSE;

EraseCell(rng.top,rng.lft);
        PlaceBudHead();
        return (fRes);
    }
    return FALSE;
} /* end SysSenseBud */

/* file i/o routines */

/*:OPENSWAPFILE */
flg OpenSwapFile(void)
{
    fFileOpen = FALSE;
    _DX = BudSwapFileName;
    _AX = 0x3c00;   /* open for creation */
    _CX = 0;
```

```
      DosInt();
I   jc error;
        FileHandle = _AX;
        fFileOpen = TRUE;
        return FALSE;
error:
    return TRUE;
} /* end OpenSwapFile */

/*:COPYFILE */
flg CopyFile(uns Src,uns Dest)
{
    card32 Size;
    QPTR q;
    uns len,bufsz;

q = QNULL;
    Size = GetFreeSpace();
    if (Size > 0x8000) {
        bufsz = 0x8000;
        q = allocq(bufsz);
    }
    if (q == QNULL && Size > 0x1000) {
        bufsz = 0x1000;
        q = allocq(bufsz);
    }
    if (q == QNULL) {
        bufsz = 0x400;
        q = &XDV_BUFFER;
    }
    Size = FileSeek(Src,SEEK_END,0);
    FileSeek(Src,SEEK_ABS,0);
    while (Size > 0) {
        len = (uns) min(Size,bufsz);
        if (FileReadFix(Src,q,len))
            break;
        if (FileWriteFix(Dest,q,len))
            break;
        Size -= len;
    }
    if (bufsz != 0x400)
        freeq(q,bufsz);
    return (Size != 0);
} /* end CopyFile */

/*:WRITEBUD -- send range info and offsheet data to Bud file */
flg WriteBud(void)
{
    QTREC qt;
    QRREC qr;
    QADJ_REC qAdj;
    int i;
    uns SwapHandle = FileHandle;
    flg fRet;
    if (!fBudDefined) {
        DeleteBudFile();
        return FALSE;
    } if (OpenBudFile(TRUE))
        goto error;

#if USERAM
    if (StoreOpt == SO_RAM) {
        if (CopyRowsToDisk(FALSE))
            goto error;
    } else
```

```
#endif
    if (OnDisk()) {
        if (CopyFile(SwapHandle,FileHandle))
            goto error;
    }

Seek(SEEK_ABS, OnDisk() ? ChunkToInt(SwapNextChunk) : sizeof(SWAP_HDR) );
    /* for each tag */
    for (qt=tags; qt != QNULL; qt=qt->qNxtTag) {
        if (WriteQ(qt,sizeof(TREC)))
            goto error;
        /* for each row */
        for (qr=qt->qFirst; qr != QNULL; qr=qr->qNxtRow) {
            if (WriteQ(qr,sizeof(RREC)))
                goto error;
        } /* end for rows */
    } /* end for tags */ if (!OnSheet()) {
        for (i=0, qAdj=qFirstAdj; i < AdjCount; ++i, qAdj = qAdj->qNext) {
            if (WriteQ(qAdj,sizeof(ADJ_REC)))
                goto error;
        }
    } if (CustPeriods() && WritePeriods())
            goto error;

WriteFix(NULL,0);   /* truncate file at this addr */ if (WriteBudFileHead())
        goto error;

CloseCurFile();
    fRet = FALSE;
    goto done;

error:
    AbortBudFile();
    fRet = TRUE;
done:
    FileHandle = SwapHandle;
    fFileOpen = OnDisk();
    return (fRet);
} /* end WriteBud */

/*:READBUD -- get range info and offsheet data from Bud file */
flg ReadBud(void)
{
    uns BudHandle;
    int i;
    QTREC qt, qtc, FAR qqt;
    QRREC qr, qrc, FAR qqr;
    QADJ_REC qAdj, FAR qqAdj;
    flg fSwap = FALSE;
    flg fNoFile;

GlobErr = NO_ERROR;
    fNoFile = OpenBudFile(FALSE);
    if (fNoFile)
        goto errNoClose;

BudHandle = FileHandle;

if (ReadBudFileHead())
        goto error;

FreePeriods();  /* free custom periods if valid .BUD file found */
```

```
#if !USERAM
    if (StoreOpt != SO_DISK)
        goto norows;
#endif

/* for each tag */
    Seek(SEEK_ABS, OnDisk() ? ChunkToInt(SwapNextChunk) : sizeof(SWAP_HDR) );
    qqt = &tags;    /* prev tag ptr */
    tags = QNULL;   /* for safe clears */
    while (CountTags-- > 0) {
        if (ReadQ((QPTR*)&qt,sizeof(TREC))) {
            goto error;
        }
        *qqt =                  /* previous points at new one */
        qtc = qt;               /* point at current tag rec */
        qqt = &qt->qNxtTag;     /* prev link ptr points at new link */
        qrc =
        qr = qt->qFirst;        /* first row ptr */
        qqr = &qt->qFirst;      /* init prev row ptr */
        qt->qFirst = QNULL;     /* for safe clears */
        qt = qt->qNxtTag;       /* advance to next tag */
        *qqt = QNULL;           /* set next link for safe clears */

/* for each row */
        while (qr != QNULL) {
            if (ReadQ((QPTR*)&qr,sizeof(RREC))) {
                goto error;
            }
#if USERAM
            if (StoreOpt == SO_RAM) {
                /* real ptr = disk ptr, resolved later by CopyRowsFromDisk */
                qr->Cells = qr->Temp;
            }
endif
            *qqr =                  /* previous points at new row */
            qrc = qr;               /* remember current row */
            qqr = &qr->qNxtRow;     /* prev ptr, points at this one now */
            qr = qr->qNxtRow;       /* advance to next row */
            *qqr = QNULL;           /* set next link to null for safe clear */
        } /* end for rows */ qtc->qLast = qrc;   /* fix up last row ptr for current tag */
    } /* end for tags */ if (!OnSheet()) {
        for (i=0, qqAdj=&qFirstAdj; i < AdjCount; ++i, qqAdj = &qAdj->qNext) {
            if (ReadQ((QPTR*)&qAdj,sizeof(ADJ_REC)))
                goto error;
            qAdj->qNext = QNULL;
            *qqAdj = qAdj;
        }
    } norows:
    if (fPeriodsInFile && ReadPeriods())
        goto error;

#if USERAM
    if (StoreOpt == SO_RAM) {
        if (CopyRowsFromDisk())
            goto error;
    } else
#endif
    if (OnDisk()) {
        if (OpenSwapFile()) {
            goto error;
        }
```

```
            fSwap = TRUE;
            if (CopyFile(BudHandle,FileHandle))
                goto error;
        }

FileClose(BudHandle);
        fBudDefined = TRUE;
        UpdateBudRange();
        return FALSE;

error:
        FileClose(BudHandle);
        if (fSwap)
            KillSwapFile();
        fFileOpen = FALSE;
        if (GlobErr == NO_ERROR)
            GlobErr = GE_LOST_DATA;
errNoClose:
        c_clear();
        if (SenseBud()==SENSED && fNoFile)
            GlobErr = GE_LOST_DATA;
        if (GlobErr != NO_ERROR)
            PostErrMsg();
        return TRUE;
} /* end ReadBud */

/* special range settings stuff */

/*:GETCOLHDRRANGE */
flg GetColHdrRange(void)
{
    return (fColHdrDef ? FALSE : EditColHdrRange());
}

/*:UPDATECOLRANGE */
void UpdateColRange(void)
{
    if (fColHdrDef) {
        ColHdrRange.rgt = CHdrLft;
        CreateRange(col_hdr_nrange_name,&ColHdrRange);
    }
} /* UpdateColRange */

/*:EDITCOLHDRRANGE */
flg EditColHdrRange(void)
{
    Range123 = ColHdrRange;
    if (SelectRange(select_column_headers_string, fColHdrDef ? RNG_EDIT : 0))
        return TRUE;
    ColHdrRange = Range123;
    fColHdrDef = TRUE;
    UpdateColRange();
/*  InitColHdrs();    -- !!!*/
    return FALSE;
}

/*:INITFREELIST */
void InitFreeList(void)
{
#if 0
    qFreeList = allocq(MAX_FREE * sizeof(SWAP_REC));
    dpf(-1,"qFree = %q\n",qFreeList);
#endif
    SwapFreeCount = 0;
    SwapNextChunk = INIT_CHUNK;
} /* end InitFreeList */

/*:ADDTOFREE */
void AddToFree(SWAP_REC sr)
{
    uns i;
    CHUNK Addr = sr.Addr;
    QSWAP_REC qPrev;
    QSWAP_REC qFree = qFreeList;
```

```
    for (i=0; i < SwapFreeCount && Addr > qFree->Addr; ++i, ++qFree);

if (i < SwapFreeCount && Addr+sr.Size == qFree->Addr) {
        /* combine with next element */
        qFree->Addr = Addr;
        qFree->Size += sr.Size;
    } else {
        /* insert in list */
        if (SwapFreeCount == MAX_FREE)
            return;
        qmovmem(qFree, qFree+1, (SwapFreeCount-i)*sizeof(SWAP_REC) );
        *qFree = sr;
        ++SwapFreeCount;
    } if (i > 0) {     /* maybe merge with predecessor */
        qPrev = qFree-1;
        if (qPrev->Addr + qPrev->Size == Addr) {
            qPrev->Size += qFree->Size;
            --SwapFreeCount;
            qmovmem(qFree+1, qFree, (SwapFreeCount-i)*sizeof(SWAP_REC) );
            --i;
            --qFree;
        }
    }
    if (i == SwapFreeCount-1 && qFree->Addr + qFree->Size == SwapNextChunk) {
        /* trim last free block */
        SwapNextChunk = qFree->Addr;
        --SwapFreeCount;
        /*  seek and write 0 to truncate ?? */
    }
} /* end AddToFree */

/*:ALLOCSWAP */
SWAP_REC AllocSwap(card32 len)
{
    SWAP_REC sr;
    uns i;
    CHUNK Size;
    QSWAP_REC qFree = qFreeList;

Size = sr.Size = IntToChunk(len);
    for (qFree=qFreeList, i=0; i < SwapFreeCount; ++i, ++qFree) {
        if (qFree->Size >= Size) {
            sr.Addr = qFree->Addr;
            if ((qFree->Size -= Size) > 0)
                qFree->Addr += Size;     /* pinch off rest of free block */
            else {   /* remove free block */
                --SwapFreeCount;
                qmovmem(qFree+1,qFree, (SwapFreeCount-i)*sizeof(SWAP_REC) );
            }
            goto done;
        }
    }
    /* no free regions found, extend file */
    sr.Addr = SwapNextChunk;
    SwapNextChunk += Size;
done:
    return (sr);
} /* end AllocSwap */

/*:CHUNKTOINT */
card32 ChunkToInt(CHUNK Addr)
{
/*  return ((card32)Addr * CHUNK_SIZE); */
/* this is for CHUNK_SIZE == 128 */
    _AX = Addr;
    _DX = 0;
I   xchg    dl,ah    /* * 256 -- shift left by 8 (bytes swapping) */
I   xchg    ah,al
I   shr     dx,1     /* / 2 -- shift right by 1 bit */
I   rcr     ax,1
#pragma warn -rvl
```

```c
} /* end ChunkToInt */
#pragma warn .rvl

/*:INTTOCHUNK */
CHUNK IntToChunk(card32 Val)
{
/*    return (CHUNK) ((Val+CHUNK_SIZE-1) / CHUNK_SIZE); */
      LD_DWRD(DX,AX,Val);
      _AX += (CHUNK_SIZE-1);   /* round up */
I     adc     dx,0

I     shl     ax,1    /* * 2 -- shift left by 1 bit */
I     rcl     dx,1
      _AL = _AH;      /* / 256 -- shift right by 8 bits (byte swapping) */
      _AH = _DL;
      return (_AX);
} /* end IntToChunk */ if USERAM

/*:COPYROWSTODISK */
flg CopyRowsToDisk(flg fFree)
{
    QTREC qt;
    QRREC qr;

SwapFreeCount = 0;
    SwapNextChunk = INIT_CHUNK;

for (qt=tags; qt != QNULL; qt=qt->qNxtTag) {
        /* for each row */
        for (qr=qt->qFirst; qr != QNULL; qr=qr->qNxtRow) {
            qr->Temp = CopyRamToDisk(qr->Cells);
            if (fFree) {
                FreeStream(qr->Cells);
                qr->Cells = qr->Temp;
            }
        } /* end for rows */
    } /* end for tags */
        return FALSE;
} /* end CopyRowsToDisk */

/*:COPYROWSFROMDISK */
flg CopyRowsFromDisk(void)
{
    QTREC qt;
    QRREC qr;

for (qt=tags; qt != QNULL; qt=qt->qNxtTag) {
        /* for each row */
        for (qr=qt->qFirst; qr != QNULL; qr=qr->qNxtRow) {
            qr->Cells = CopyDiskToRam(qr->Cells);
        } /* end for rows */
    } /* end for tags */
        return FALSE;
} /* end CopyRowsFromDisk */ endif USERAM

/*:MKSAVEAREA */
ROW MkSaveArea(void)
{
    RANGE Rng;
    ROW row;
    COL col = TagCol();
    COL mcol = MaxCol()-1;

Rng.top = GetSaveRow();
    if (Rng.top != 0)
        goto done;         /* might want to extend to current max col */ row = ScrnHeight - BOILER_PLATE_ROWS;
    if (!RowsBound()) {
        row += SetRowLim(0);
```

```c
        if (row > MAXROW)
            return 0;
    } else {
        row += SetRowLim(-(BudRange.top+1));
        if (row > BudRange.bot)
            row = BudRange.bot;
        if (GetLevel(row) != BLANKLEVEL) {
            GlobErr = GE_NO_ROOM;
            return 0;
        }
    }

PutCell(row, col, T_LABEL, DEFAULT_FMT, sheet_divider_string );
    if (mcol < 8 && BudRange.lft==BudRange.rgt)
        mcol = 8;   /* always span first page */
    CopyRange( col, row, col, row,
               MinCol(), row, mcol, row );
    Rng.lft = col;
    Rng.rgt = col;
    Rng.top = Rng.bot = row;
    CreateRange(save_nrange_name,&Rng);
        return (Rng.top);
} /* end MkSaveArea */

/*:CHECKFORTAGS */
flg CheckForTags(void)
{
    ROW row, rowLim = BoundMaxRow();

for (row = MinRow(); row < rowLim; ++row) {
        if (ScanTag(row,NULL) & TAG_OSHEET)
            return TRUE;
    }
    return FALSE;
} /* end CheckForTags */

/*:REMOVESAVEAREA */
void RemoveSaveArea(void)
{
    ROW row;

if ((row=GetSaveRow()) != 0) {
        EraseRange( AMinCol(), row, MaxCol()-1, row /*MaxRow()-1*/ );
        CreateRange(save_nrange_name,NULL);
    }
} /* end RemoveSaveArea */

/*:SWITCHSTORE */
void SwitchStore(STORE_OPT NewOpt)
{
    if (NewOpt == StoreOpt)
        goto done;

switch (NewOpt) {
#if USERAM
        case SO_RAM:
            if (OnSheet()) {
                if (CheckForTags())
                    goto error;
                RemoveSaveArea();
            } else {    /* SO_DISK */
                CopyRowsFromDisk();
                KillSwapFile();
#if 0
                FreeFreeList();
#endif
            }
            break;
#endif
        case SO_DISK:
            if (OnSheet()) {
                if (CheckForTags())
                    goto error;
                RemoveSaveArea();
```

```
        }
        if (OpenSwapFile())
                goto error;
            InitFreeList();
#if USERAM
            if (StoreOpt == SO_RAM) {
                CopyRowsToDisk(TRUE);
            }
endif
            break;
        case SO_SHEET:
            if (CheckForTags())
                goto error;
#if 0
            if (tags != QNULL) {
                /* free allocated tags? */
            }
endif
            if (OnDisk()) {
                KillSwapFile();
#if 0
                FreeFreeList();
#endif
            }
if 0
            MkSaveArea();
#endif
            break;
        }
        StoreOpt = NewOpt;
        goto done;
error:
        ErrBeep();
        DoNonFatal("Must show all rows first");
done:
        CLC;
} /* end SwitchStore */

/*:HASHPW */
int HashPW(char * pw)
{
    int len;
    int hash = 0;

for (len = strlen(strlwr(pw)); len--; ++pw) {
        _CX = len;
        _AX = *(uns*)pw;
        CLC;
I       rcr ax,cl;
        hash += _AX;
        hash += *pw;
    }
    return (hash ? hash : 1);
} /* end HashPW */

/*:NEWBUDRANGE */
uns NewBudRange(RANGE * pRng,flg fEdit)
RANGE rng = *pRng;
ROW row, loRow = MAXROW, hiRow = 0, rowMax = BoundMaxRow();
COL col, loCol = MAXCOL, hiCol = 0, colMax = MaxCol();
uns org;

if (!fEdit) {
        if (rng.lft != BudRange.lft || rng.top != BudRange.top)
            return GE_ORIGINLOCK;
    } if (fColHdrDef) {
        for (col=MinCol(); col < colMax; ++col) {
            if (ScanCTag(col,NULL,NULL) != TAGNULL) {
                loCol = col;
                col = colMax;
```

```
            while (--col > loCol && ScanCTag(col,NULL,NULL) == TAGNULL);
            hiCol = col;
            break;
        }
    }
}
for (row=MinRow(); row < rowMax; ++row) {
    if (ScanTag(row,NULL) != TAGNULL) {
        loRow = row;
        row = rowMax;
        while (--row > loRow && ScanTag(row,NULL) == TAGNULL);
        hiRow = row;
        break;
    }
} row = rng.top;
col = rng.lft;
if (row > BudRange.top) {
    --row;
    --rng.bot;
    if (fColHdrDef && row >= CHdrTop)
        return GE_ADJCOLHDRS;
    if (row >= loRow)
        return GE_EXPANDROWS;
}
if (col > BudRange.lft) {
    --col;
    --rng.rgt;
    if (fColHdrDef && col >= CHdrLft)
        return GE_ADJCOLHDRS;
    if (col >= loCol)
        return GE_EXPANDCOLS;
    if (hiRow != 0)
        return GE_EXPANDROWS;
} if (col != rng.rgt) {
    if (rng.rgt <= hiCol)
        return GE_EXPANDCOLS;
    if (fColHdrDef && rng.rgt < CHdrLft)
        return GE_ADJCOLHDRS;
} if (row != rng.bot) {
    if (rng.bot <= hiRow)
        return GE_EXPANDROWS;
    if (fColHdrDef && rng.bot <= CHdrBot)
        return GE_ADJCOLHDRS;
    if (OnSheet() && RowsBound()) {
        if (hiRow != 0 && rng.bot != BudRange.bot)
            return GE_EXPANDROWS;
    }
} if (OnSheet() && hiRow == 0)
    RemoveSaveArea();

/* transfer col tags */
org = BudRange.top;
if (row != org) {
    fWedged = FALSE;
    if (row > org)
        ++row;
    if (InsRows(row,1,TRUE))
        return (fWedged ? GE_MEM_OUT : GlobErr);
    if (row < org)
        ++org;
    if (hiCol != 0) {
        --colMax;
        MoveRange( AMinCol(),  org,    colMax, org,
                   AMinCol(),  row,    colMax, row );
    }
```

```
        DelRows(org,1,TRUE);
        if (row > org)
            --row;
    )
    BudRange.top = row;
    BudRange.bot = rng.bot;
    UpdateBudRange();

/* transfer row tags */
    org = BudRange.lft;
    if (col != org) {
        if (col > org)
            ++col;
        MoveRange( col,    0,  MAXCOL-1,   MAXROW,
                   col+1,  0,  MAXCOL,     MAXROW  );
        ShiftColWidths(col,1,1);
        if (col < org)
            ++org;
        if (hiRow != 0) {
            MoveRange( org,    0,  org,       MAXROW,
                       col,    0,  col,       MAXROW  );
        )
        MoveRange( org+1,  0,  MAXCOL,     MAXROW,
                   org,    0,  MAXCOL-1,   MAXROW  );
        ShiftColWidths(org,-1,0);
        if (col > org)
            --col;
    )
    BudRange.lft = col;
    BudRange.rgt = rng.rgt;
    PlaceBudHead();

return NO_ERROR;
) /* end NewBudRange */

/*:EDITBUDRANGE
** get or modify bounding range.
** return TRUE if escaped.
*/
flg EditBudRange(void)
{
    ROW row,maxRow;
    COL col,maxCol;
    TITLEINFO ti;

if (!fBudDefined) {
        if (SenseBud())
            return FALSE;
        memclr(&BudRange,sizeof(RANGE));
    ) else (
        Range123 = BudRange;
        if (SelectRange("Modify " BUD_RANGE " range",
                RowsBound() || ColsBound() ? RNG_EDIT|RNG_ANCH : RNG_EDIT)
        )
            return TRUE;
        GlobErr = NewBudRange(&Range123,TRUE); -
        if (GlobErr != NO_ERROR) {
            UpdateBudRange();
            PostErrMsg();
        )
        return FALSE;
    )

if (!fBudDefined) {
        /* insert tag row/col */
        col = BudRange.lft;
        row = BudRange.top;

GetDispOriginCell();
        GET_ACTIVE();
        maxRow = _DX;
        maxCol = _CX;
        if (row <= maxRow) {
            if (maxRow == MAXROW)
```

```
        --maxRow;
    MoveRange(  0, row, maxCol, maxRow,
                0, row+1, maxCol, maxRow+1 );
            ++maxRow;
        }
        if (col <= maxCol) {
            if (maxCol == MAXCOL)
                --maxCol;
            MoveRange(  col, 0, maxCol, maxRow,
                        col+1, 0, maxCol+1, maxRow );
            ++maxCol;
        }

ShiftColWidths(col,1,1);    /* slide column attribute to right */ if (CurCol >= col)   ( ++CurCol; /*DO_CELLPTR_RIGHT();*/ )
        if (CurRow >= row)   ( ++CurRow; /*DO_CELLPTR_DOWN();*/ )

/* adjust titles */
        _BX = (uns) &ti;
        la_title_info();
        if (ti.TitleLft+ti.TitleCols > col) {
            if (ti.TitleLft > col) {
                ++ ti.TitleLft;
            } else {
                ++ ti.TitleCols;
            }
            ++ OrgCol;
        }
        if (ti.TitleTop+ti.TitleRows > row) {
            if (ti.TitleTop > row) {
                ++ ti.TitleTop;
            } else {
                ++ ti.TitleRows;
            }
            ++ OrgRow;
        }
        _DX = ti.TitleRows;
        _CX = ti.TitleTop;
        _BX = ti.TitleCols;
        _AX = ti.TitleLft;
        la_set_titles();

GetWinDimensions();
        RestCalc();
        DoDisplay(FALSE);
        fBudDefined = TRUE;
    }
    PlaceBudHead();

return FALSE;
} /* end EditBudRange */

/*:SHIFTCOLWIDTHS */
void ShiftColWidths(COL col,int dir,int defInfo)
{
    COL colLim;
    if (dir > 0) {
        colLim = col;
        col = MAXCOL;
    } else {
        colLim = MAXCOL;
    }
    while (col != colLim) {
        SetColInfo(col,GetColInfo(col-dir));
        col -= dir;
    }
    SetColInfo(col,defInfo);    /* the limit column gets default values */
} /* end ShiftColWidths */

/*:OVLREADPERIODS */
flg OvlReadPeriods(void)
{
```

```
    return ReadPeriodsFile(fRWTmp);
}

/* end BMISC.C */
/* MODES: TAB 4      Last Revision:  Mon 05-29-89 07:00
**
**  BOFIRST.C   -- dispatcher for ovl1 (BUD core)
**
** Copyright (C) 1989 Saratoga Software, Inc.  All rights reserved.
**
**  7/26/88 dbh move ShowGoalVal into overlay.
*/ include "bud.h"

flg OvlEnter(OVL_ENTRIES action)
{
    switch(action) {
    case OE_EDITCELL:      break;
    case OE_MAINMENU:      DoMainMenu();      break;
    case OE_EXPANDCUR:     ExpandCur(FALSE);  break;
    case OE_EXPANDCURALL:  ExpandCur(TRUE);   break;
    case OE_COLLAPSECUR:   CollapseCur();     break;
    case OE_WRITE:         return WriteBud();
    case OE_READ:          return ReadBud();
    case OE_ADJUST:        Adjust();          break;
    case OE_EDITBUDRNG:    return EditBudRange();
    case OE_SENSE:         return SysSenseBud();
    case OE_READPERIODS:   return OvlReadPeriods();
    }
    return TRUE;
}
/* MODES: TAB 4      Last Revision:  Mon 05-29-89 07:00
**
**  BROOT.C -- Bud main root entries.
**
** Copyright (C) 1989 Saratoga Software, Inc.  All rights reserved.
**
**  7/26/88 dbh move ShowGoalVal into overlay.
**  7/21/88 dbh set ScrnWidth/Height in Activate instead of attach (0.31)
**  7/16/88 dbh set cv_dirty_bit in EditCell (0.23)
**  7/06/88 dbh Use start-dir for overlay loader; suppress time display
**              and support message posting in time area.
**  8/16/87 dbh Created.
*/ include "bud.h"
include "bdroot.h"
#include "bemm.h"
#include <string.h>
include <mem.h> define OLDMSG 0 forward void dummy(void);

forward flg RootDoCons(void);
forward flg RootDoGoal(void);
forward flg RootDoPeriods(void);
forward void StuffStr(char * str);

forward void Activate(void);
forward void DeActivate(void);
forward EVENT Ready(void);

#define SCAN_BIGSTAR    55
#define SCAN_BIGPLUS    78
#define SCAN_BIGMINUS   74
#define SCAN_BESC        2
#define SCAN_CTRL_HOME 119
#define SCAN_CTRL_END  117
#define SCAN_CTRL_PGUP 132
#define SCAN_CTRL_PGDN 118
#define SCAN_ALT_F7    110
#define SCAN_ALT_F8    111
```

```c
#define SCAN_ALT_F9     112
#define SCAN_SHT_F7     90
#define SCAN_SHT_F8     91
#define SCAN_SHT_F9     92
#define SCAN_ALT_F10    113
define SCAN_RIGHT      77 define ZERO_FLAG       0x40

/*:TIMEOFF -- suppress time display */
void TimeOff(void)
{
    GET_INDICATOR();
    _BX &= -(IND_TIME|IND_EXTRA);
    SET_INDICATOR();
} /* end TimeOff */

/*:TIMEON -- enable time display */
void TimeOn(void)
{
    GET_INDICATOR();
    _BX |= (IND_TIME|IND_EXTRA);
    SET_INDICATOR();
} /* end TimeOn */

/*:GOTOMSGAREA */
void GotoMsgArea(void)
{
    DoSetCur(ScrnHeight-1,0);
}

/*:WRITESCOREBOARD */
void WriteScoreBoard(void)
{
    GotoMsgArea();
    FIX_ES;
    _CX = GOAL_SAVE_SZ;
    _SI = GoalValSave;
    DO_WRITEA();
} /* end WriteScoreBoard */

/*:READSCOREBOARD */
void ReadScoreBoard(int * pBuf)
{
    GotoMsgArea();
    FIX_ES;
    _CX = GOAL_SAVE_SZ;
    _SI = (uns) pBuf;
    DO_READA();
} /* end ReadScoreBoard */

/*:CLEARMSGAREA */
void ClearMsgArea(void)
{
    if (fMsgPosted) {
        fMsgPosted = FALSE;
        GotoMsgArea();
        DoEraseN(POST_MSG_AREA_SZ);
        DO_VIDEOSYNC();
    }
} /* end ClearMsgArea */ char * msgHold;

/*:SHOWMSG */
void ShowMsg(void)
{
    TimeOff();
    DoSetAttr( AT_BRIGHT );
    GotoMsgArea();
    DoMessage(msgHold);
    DoSetAttr( AT_NORMAL );
    DO_VIDEOSYNC();
#if OLDMSG
```

```c
        fMsgPosted = 2;
#else
        fMsgPosted = 4;
#endif
} /* end ShowMsg */

/*:REPOSTMSG */
void RePostMsg(void)
{
    if (fMsgPosted) {
        ClearMsgArea();
        ShowMsg();
    }
} /* end RePostMsg */

/*:POSTMSG */
void PostMsg(char * msg)
{
    fMsgPosted = TRUE;
    msgHold = msg;
    RePostMsg();
} /* end PostMsg */

/*:CLEARMSG */
void ClearMsg(void)
{
    ClearMsgArea();
    TimeOn();
} /* end ClearMsg */ if !BOXLOGO
/*:POSTSIGNON */
void PostSignOn(void)
{
    DoSetAttr(AT_BRIGHT);
    DoSetCur(0,0);
    DoMessage(msg_buffer);
    DoSetAttr(AT_NORMAL);
    DO_VIDEOSYNC();
} /* end PostSignOn */
endif /*:MAYBERECALC -- recalc if flag set */
flg MaybeRecalc(void)
{
    if (fNeedCalc) {
        fNeedCalc = FALSE;
        DO_RECALC();
        CalcSave = 0;
        return TRUE;
    }
    return FALSE;
} /* end MaybeRecalc */

/*:DOREDISPLAY */
void DoRedisplay(void)
{
    MaybeRecalc();
    REDISPLAY();
    RePostMsg();
} /* end DoRedisplay */ void ClrPeriods(void)
{
    num_periods = 0;
    memclr(periods, sizeof(PERIOD_DESC) * MAX_PDS);
}

/*:INITVARS -- initialize global vars (used by attach & clear) */
void InitVars(void)
{
    fAbortOnce = FALSE;
    fBudDefined = FALSE;
    fColHdrDef = FALSE;
    fLastRgt = FALSE;
```

```
    fKeepCons = FALSE;
    fKeepPeriods = FALSE;
    fMustAlloc = FALSE;
    if (!fRWinCons) {
        if (BudState == STATE_GOAL)
            BudState = STATE_NORM;
    }
    if (!fRWinBud) {
        StoreOpt = SO_DEFAULT;
        fXlatPlusMinus = TRUE;
    }
    savPos = 0;
    AdjCount = 0;
    nextTag = TAGINIT;

cvals = XNULL;
    tags = QNULL;
    qFirstAdj = QNULL;
    qLastAdj = (QADJ_REC)&qFirstAdj;

memclr(&ModRange,sizeof(RANGE));

ClrPeriods();
} /* end InitVars */

/*:C_ATTACH
** Initialization from 123
*/
void    c_attach(void)
{
    fAttachTerm = TRUE;
    if (InvokeOvlEntry(OVL_ATTACH_DETACH,OE_ATTACH)) {
        STC;
        return;
    } if (InvokeOvlEntry(OVL_BUD,OE_SENSE))
        fFirstAttach = FALSE;

if (fFirstAttach) {
        fFirstAttach = FALSE;
#if !BOXLOGO
        fMsgPosted = 0xff;
        PostSignOn();
#endif
    }
    fBudAttached = TRUE;
    CLC;
} /* end c_attach */

/*:C_TERMINATE */
void c_terminate(void)
{
    fAttachTerm = TRUE;
    fSystem = IsSystemExit();
    if (fSystem && fBudDefined) {
        if (BoundsState()) {
            InvokeOvlEntry(OVL_BUD,OE_WRITE);
            sprintf(buffer,"%s%d",BudSysString,StoreOpt);
            PutCell(TagRow(), TagCol(), T_LABEL, DEFAULT_FMT, buffer);
        }
    }
    fSystem = FALSE;
    InvokeOvlEntry(OVL_ATTACH_DETACH,OE_TERMINATE);
    fBudAttached = FALSE;
} /* c_terminate */

/*RESTOREAFTERPERIODS */
void RestoreAfterPeriods(void)
{
    if (!fKeepPeriods) {
        LoadOverlay(OVL_BUD);
```

```
            RestoreTempWS();
            if (fPeriodsSet) {
                fRWTmp = TRUE;
                InvokeOvlEntry(OVL_BUD, OE_READPERIODS);
            }
        }
    }
} /* end RestoreAfterPeriods */

/*:C_MAIN
** main entry point from 123
*/
void    c_main(void)
    flg fInCons;

if (!fBudAttached)
        return;

Activate();
    GetDispOriginCell();
    if (fSpecialEntry) {
        fSpecialEntry = FALSE;
        CurEvt = GetEvent();
        if (CurEvt == KEY_ABORT)
            goto Abort;
        if (!Navigate(CurEvt)) {
            switch (CurEvt) {
            case KEY_EXPAND:
                InvokeOvlEntry(OVL_BUD,OE_EXPANDCUR);
                break;
            case KEY_EXPANDALL:
                InvokeOvlEntry(OVL_BUD,OE_EXPANDCURALL);
                break;
            case KEY_COLLAPSE:
                InvokeOvlEntry(OVL_BUD,OE_COLLAPSECUR);
                break;
            }
        }
    } else if (BudState == STATE_NORM) {
mainAgain:
        fDoGoal = fDoCons = fDoPeriods = FALSE;
        InvokeOvlEntry(OVL_BUD,OE_MAINMENU);
        if (fDoCons) {
            if (RootDoCons()) {
                StuffStr("O");
                goto mainAgain;
            }
        } else if (fDoPeriods) {
            if (RootDoPeriods()) {
                StuffStr("CC");
                goto mainAgain;
            }
        } else if (fDoGoal) {
            if (RootDoGoal()) {
                StuffStr("A");
                goto mainAgain;
            }
        }
    } else if (BudState == STATE_PERIODS) {
        InvokeOvlEntry(OVL_PERIODS, OE_PERIODSMENU);
        RestoreAfterPeriods();
    } else {
        fDoCons =
        fInCons = (BudState == STATE_CONS);
        fDoGoal = (BudState == STATE_GOAL);
        if (DoEventLoop())
            goto Abort;
        if (fInCons && !fKeepCons) {
            LoadOverlay(OVL_BUD);
            RestoreTempWS();
        }
    }
Abort:
```

```
    DeActivate();
} /* end c_main */

/*:DOLOOPMENU -- pick correct menu proc */
void DoLoopMenu(void)
{
    if (BudState == STATE_GOAL)
        InvokeOvlEntry(OVL_GOAL,OE_GOALMENU);
    else
        InvokeOvlEntry(OVL_CONS,OE_CONSMENU);
}

/*:EDITCELL -- edit current cell contents */
void EditCell(EVENT evt)
{
    FirstEvent = evt;
    OvlEnter(OE_EDITCELL);   /* invoke cell edit for whichever ovl is loaded */
}

/*:DOEVENTLOOP -- navigate event loop */
flg DoEventLoop(void)
{
    flg fRet = FALSE;

if (BudState == STATE_CONS) {
        RestMSIndex = MSIndex;      /* 2nd overlay fix */
        set_cons_boundaries();
    } fGoalRedisplay = TRUE;
    fKeepCons = FALSE;
    while (BudState != STATE_NORM && !fKeepCons) {
        GetDispOriginCell();
        if (fDoCons) {
            fDoCons = FALSE;
            CurEvt = KEY_MENU;
        } else
            CurEvt = Ready();
        if (CurEvt == KEY_ABORT) {
            fRet = TRUE;
            break;
        }
        if (!Navigate(CurEvt)) {
            switch (CurEvt) {
            case KEY_CR:       /* no beep */   break;
            case KEY_ESC:      /* no beep */   break;
            case KEY_MENU:     DoLoopMenu();   break;
            case KEY_EDIT:     EditCell(0);    break;
            case KEY_CALC:
                fNeedCalc = TRUE;
                DoRedisplay();
                break;
            default:
                if (INRANGE(' ',CurEvt,KEY_HIGH))
                    EditCell(CurEvt);
                else
                    KeyBeep();
                break;
            } /* end switch */
            fGoalRedisplay = TRUE;
        }
    } /* end main event loop */
    RestMSIndex = 0;
    return (fRet);
} /* end DoEventLoop */

/*:OKTOPATCH */
flg OkToPatch(QCPTR qStr)
{
    int i;

for (i=0; i < NUM_MODE_STRS; ++i)
        if (0 == qstrcmp(ModeStrs[i],qStr))
            return TRUE;
```

```
        return FALSE;
} /* end OkToPatch */

/*:SETMODESTR
**  replaces or restores a rarely used 123 mode string with the BUD
**  identifier to indicate that bud is active.
*/
void SetModeStr(flg fBudMode)
{
    if (qModeStr != QNULL) {
        if (OkToPatch(qMenuStr))
            qstrcpy(qMenuStr, (fBudMode ? BudMenuStr : OldMenuStr) );
        if (OkToPatch(qModeStr))
            qstrcpy(qModeStr, (fBudMode ? ModeStrs[BudState] : OldModeStr) );
    }
} /* end SetModeStr */

/*:ACTIVATE
**  things to do when we get control
*/
void Activate(void)
{
    if (!fInvokeIDed && inv_ch.k.chr == 0) {
        if (INRANGE(SCAN_ALT_F7,inv_ch.k.scan,SCAN_ALT_F9)) {
            inv_ch2.k.scan += (SCAN_SHT_F9 - SCAN_ALT_F9);
            fInvokeIDed = TRUE;
        } else if (INRANGE(SCAN_SHT_F7,inv_ch.k.scan,SCAN_SHT_F9)) {
            inv_ch2.k.scan += (SCAN_ALT_F9 - SCAN_SHT_F9);
            fInvokeIDed = TRUE;
        }
    } fBudActive = TRUE;
    ClearMsg();

RestMSIndex = 0;
    MSIndex = 0;
    GlobErr = 0;
    fNeedCalc = FALSE;
    fInHelp = FALSE;
    fBreakDetected = FALSE;
    CtrlBreakDetect();   /* clears hardware ctrl-break detect flag */ if (fConsDestroyed) {
        fConsDestroyed = FALSE;
        DoNonFatal("Cons spec cleared while in 123");
        /* confirm reload of worksheet */
        fConsWSDirty = TRUE;
        RestoreTempWS();
    } fAutoCalcOn = IsAutoCalcOn();
    if ((fSaveProtect = IsProtectOn()) != 0)
        ProtectOff();

SaveCalc();
    SetModeStr(TRUE);
    GetWinDimensions();

SAVE_MARK();
    GET_INDICATOR();
    ind_mode = _AL;
    DO_ERASE12();
    DO_VIDEOSYNC();
    if (!fBudDefined && BudState == STATE_NORM) {
        InvokeOvlEntry(OVL_BUD,OE_EDITBUDRNG);
        RestCalc();
    }
} /* end Activate */

/*:STICKMSG -- makes msg stick; call before returning from xdv_ entry */
void StickMsg(void)
{
```

```
    if (fMsgPosted) {
#if OLDMSG
        fMsgPosted = 2;
#else
        fMsgPosted = 4;
#endif
    } else
        TimeOn();
} /* end StickMsg */

/*:DEACTIVATE
**  things to do when we return control to 123
*/
void DeActivate(void)
{
    SetModeStr(FALSE);
    if (fSaveProtect)
        ProtectOn();

RestCalc();
    GET_INDICATOR();
    _AL = ind_mode;
    SET_INDICATOR();
    DO_DSPIND();
    RESTORE_MARK();
    fBudActive = FALSE;
    StickMsg();
} /* end DeActivate */

/*:READY
**  get an event and make things look just like 123's ready state
*/
EVENT Ready(void)
{
    EVENT evt;

DO_HIDEMARK();
    GET_INDICATOR();
    _AL = MODE_BUD;
    SET_INDICATOR();
    DO_ERASE12();
    DO_DSPIND();
    SetModeStr(TRUE);
    if (BudState == STATE_GOAL)
        InvokeOvlEntry(OVL_GOAL,OE_SHOWGOAL);
    GlobErr = 0;
    fReady = TRUE;
    evt = GetEvent();
    fReady = FALSE;
    return (evt);
} /* end Ready */

/*:C_CLEAR */
void c_clear(void)
{
    if (!fBudAttached)
        return;

if (StoreOpt == SO_DISK)
        KillSwapFile();
    InitVars();
    if (!fRWinCons)
        fCheckPoint = FALSE;
    if (!fBudActive && BudState == STATE_CONS) {
        fConsDestroyed = TRUE;
        BudState = STATE_NORM;
    }

/* all memory is freed by 123! */
    Clear_EMM();
#if 0
    /*!! this doesn't work because 123 clears AFTER not BEFORE xdv_clear */
    /* fetch periods config info */
```

```
    if (fCfgExists && BudState == STATE_NORM) {
        fRWTmp = FALSE;
        InvokeOvlEntry(OVL_BUD,OE_READPERIODS);
    }
endif
    SplitCols = DefSplitCols;
    FirstMon = DefFirstMon;
} /* end c_clear */

/*:C_SAVE */
void c_save(void)
{
    if (!fBudAttached)
        return;

if (fRWinCons) return;
    InvokeOvlEntry(OVL_BUD,OE_WRITE);
    StickMsg();
} /* end c_save */

/*:C_RETRIEVE */
void c_retrieve(void)
{
    if (!fBudAttached)
        return;

if (fRWinCons) return;
    InvokeOvlEntry(OVL_BUD,OE_READ);
    StickMsg();
} /* end c_retrieve */

/*:C_ABORT */
void c_abort(void)
{
    flg fBudAct = fBudActive;

if (!fBudAttached)
        return;

if (!fAbortOnce) {
        fAbortOnce = TRUE;
        MSIndex = 0;
        fBudActive = FALSE;
        fHelpSpecial = FALSE;
        fRWinBud = FALSE;
        fRWinCons = FALSE;
        fUseIFN = FALSE;
        fReady = FALSE;
        fMustAlloc = FALSE;
        SetModeStr(FALSE);
        if (fBudAct && fSaveProtect)
            ProtectOn();
    }
        fAbortOnce = FALSE;
    } /* end c_abort */

/*:C_ADJUST */
    void c_adjust(void)
    {
        if (!fBudAttached)
            return;

if (fBudDefined && fLastReturn && BudState == STATE_NORM) {
            InvokeOvlEntry(OVL_BUD,OE_ADJUST);
        }
    } /* end c_adjust */

/*:DOAMENUH */
    flg DoAMenuH(void * menustrs, void * menuprocs, card8 helpcode)
    {
        flg fEsc;
        MENUSTACK * pMS;
        extern PFV MenuProcVector[];
```

```
    if (helpcode != HS_NIL)
        PushHelp(helpcode);

if (MSIndex < MAX_MENUS) {
        pMS = MenuStack + MSIndex;
        pMS->menustrs = menustrs;
        pMS->menuprocs = menuprocs;
    }
    ++MSIndex;          /* push menu stack */

_SI = menustrs;
    _DI = MenuProcVector;
    DO_MENU();

SAVC(fEsc);
    --MSIndex;          /* pop menu stack */
    if (helpcode != HS_NIL)
        PopHelp();
    SETC(fEsc);
    return (fEsc);
} /* end DoAMenuH */ flg DoAMenu(void * menustrs, void * menuprocs)
{ return DoAMenuH(menustrs,menuprocs,HS_NIL); }

/*:C_HELP */
void c_help(void)
{
    MENUSTACK *pMS;
    flg fSpecial;
    EDIT_MODE mode;
    uns flags;
    if (!fBudAttached)
        return;

if (!fInHelp) {
        GET_INDICATOR();
        mode = _AL;
        flags = _BX;
        if (mode != MODE_MENU) {
            fSpecial = FALSE;
            /* save panel lines */
            DoSetCur(1,0);
            FIX_ES;
            _SI = (uns) help_special_buffer;
            _CX = 2*80;
            DO_READA();
        } else
            fSpecial = TRUE;

fInHelp = TRUE;
        BudHelp();
        fInHelp = FALSE;

/* this lets the menu system get set up right again */
        if (MSIndex > RestMSIndex && MSIndex <= MAX_MENUS) {
            fHelpSpecial = fSpecial;    /* key_handler saves menu lines */
            StuffStr("\x1b");
            pMS = MenuStack + MSIndex - 1;
            DoAMenu(pMS->menustrs, pMS->menuprocs);
            fHelpSpecial = FALSE;
        }
        /* restore panel lines and mode indicator */
        _BX = flags;
        _AL = mode;
        SET_INDICATOR();
        DoSetCur(1,0);
        FIX_ES;
        _SI = (uns) help_special_buffer;
        _CX = 2*80;
        DO_WRITEA();
        DoRedisplay();
    }
```

```c
} /* end c_help */
/*:C_POLL */
void c_poll(void)
{
    int buf[GOAL_SAVE_SZ];
    ROW row;
    COL col;
    flg fReset;

if (!fBudAttached)
        return;

GET_CUR();
    col = _CX;
        row = _DX;

#if OLDMSG
        fReset = FALSE;
    #else
        fReset = fMsgPosted & 1;
        if (fMsgPosted == 3) {
            RePostMsg();
            fMsgPosted = 2;
        }
        if (fMsgPosted == 1) {
            ClearMsg();
            DO_DSPIND();
        }
    #endif if (fBudActive
            && BudState == STATE_GOAL
            && GET_INDICATOR() != MODE_ERROR
        ) {
            ReadScoreBoard(buf);
            FIX_ES;
            _CX = GOAL_SAVE_SZ;
            _SI = (uns) buf;
            _DI = (uns) GoalValSave;
I           cld
I           repe cmps WP ds:[si],WP es:[di]
I           je   noChng; {
                WriteScoreBoard();
    noChng: ;}
            fReset = TRUE;
        } if (fReset)
            DoSetCur(row,col);
} /* end c_poll */ void StuffKey(UKEY key)
{
    if (keys < MAXKEYS)
        keybuf[keys++] = key;
} /* end StuffKey */ void StuffStr(char * str)
{
    UKEY key;
    int i = strlen(str);

while (i > 0) {
        key.k.chr = str[--i];
        StuffKey(key);
    }
} /* end StuffStr */
/*:CHECKMONTH
** check for month names in saved keystrokes.
** build template.
*/
flg CheckMonth(void)
{
```

```
    int i,len;
    char *cp, *yrp;

if (savPos == 0 || savPos == MAXSAVE || NoBoundsState())
        return FALSE;

savbuf[savPos] = 0;
    strlwr(strcpy(tmpl,savbuf));

fCustRA = FALSE;
    if (CustPeriods()) {
        i = SearchPer(tmpl,NULL);
        if (i >= 0) {
            raPer = i;
            raItem = cItem;
            fCustRA = TRUE;
            i = raPrefix;
            len = raLen;
            goto chkYear;    /* and build template */
        }
    } cp = ScanMonth(tmpl, &monthCur);    /* monthCur must be in DS */
    if (cp == NULL)
        return FALSE;

fShortMon = TRUE;
    len = strlen(months[monthCur]);
    i = cp[len];
    if (len > 3) {
        cp[len] = 0;
        if (strcmp(cp,months[monthCur]) == 0)
            fShortMon = FALSE;
        else {
            len = 3;
            i = cp[3];
        }
    }
    if (islower(i) || (cp > tmpl && islower(cp[-1])))
        return FALSE;       /* previous and next chars can't be letters */ i = cp - tmpl;
    monthCap = (isupper(savbuf[i]) ? isupper(savbuf[i+1]) ? 2 : 1 : 0 );

chkYear:
    savbuf[i] = 0;
    cp = savbuf+i+len;
    yrp = empty_string;
    for (i=strlen(cp); --i >= 0; ) {
        if (isdigit(cp[i])) {
            while (--i >= 0 && isdigit(cp[i])) continue;
            ++i;
            ScanInt(cp+i, &yearCur);
            if (yearCur > 31) {
                cp[i] = 0;
                yrp = "%y";
            }
            break;
        }
    } sprintf(tmpl,"%s%s%s%s", savbuf, cp, yrp);

return TRUE;
} /* end CheckMonth */

/*:MKMONTHNAME */
char * MkMonthName(int month,flg fShortMonth,int monthCap)
{
    strcpy(monbuf,months[month]);
    if (fShortMonth)
        monbuf[3] = 0;
    switch (monthCap) {
    case 2:
```

```c
            strupr(monbuf);
            break;
        case 1:
            monbuf[0] -= ('a'-'A');
            break;
        }
        return (monbuf);
} /* end MkMonthName */

/*:STUFFMONTH -- stuff key board with next month/year */
void StuffMonth(void)
{
    int i;
    UKEY RgtArrow;
    QTUNIT qt;
    char * cp;

if (fCustRA) {
        qt = FindTUnit(raPer,raItem);
        ++raItem;
        i = qt->col;
        qt = qt->nxt;
        if (qt == QNULL) {
            raItem = 1;
            qt = periods[raPer].first_unit;
            i = -1; /* force year roll over */
        }
        i = (i != qt->col);
        cp = (char *) qstrcpy(formbuf,qt->name);
    } else {
        if (++monthCur >= 12) {
            monthCur = 0;
            i = 1;
        } else
            i = 0;
        cp = MkMonthName(monthCur,fShortMon,monthCap);
    }
    if ((yearCur+=i) == 100)
        yearCur = 2000;

sprintf(savbuf,tmpl,cp,yearCur);
    StuffStr(savbuf);
    RgtArrow.w = RIGHT_KEY;
    for (i = 1; i < SplitCols; ++i)
        StuffKey(RgtArrow);
} /* end StuffMonth */

/*:C_KEYHANDLER */
#pragma warn -par
void interrupt c_KeyHandler(
    uns r_bp,
    uns r_di,
    uns r_si,
    uns r_ds,
    uns r_es,
    uns r_dx,
    uns r_cx,
    uns r_bx,
    uns r_ax,
    uns r_ip,
    uns r_cs,
    uns r_flags)
{
    ROW row;
    COL col;
    UKEY key,xlat;
    byte act,mode;
    flg fInBudRng,fXlatPM,fRdy;

act = _AH;

GET_INDICATOR();
    mode = _AL;
    GET_CELLPTR();
```

```c
    row = _DX;
    col = _CX;
    fInBudRng = (INRANGE(BudLeft(), col, BudRight()) &&
                 INRANGE(BudTop(), row, BudBottom()) );
    fXlatPM = fXlatPlusMinus && (BudState == STATE_NORM);

if (keys != 0) {
        switch (act) {
        case KI_CHECK:
            r_flags &= -ZERO_FLAG;  /* clear zeroflag means char ready */
        case KI_READ:
            key.w = r_ax = keybuf[keys-1].w;
            if (act == KI_READ) {
                --keys;
                savPos = 0;
            }
            if (fHelpSpecial) {
                fHelpSpecial = FALSE;
                /* save menu lines for help to repaint */
                DoSetCur(1,0);
                FIX_ES;
                _SI = (uns) help_special_buffer;
                _CX = 2*80;
                DO_READA();
            }
            return;
        default: break;
        }
    }

ChainOldVector:
    _SI = r_si;        /* restore all gp registers and chain int 16h */
    _DI = r_di;
    _DX = r_dx;
    _CX = r_cx;
    _BX = r_bx;
    _AX = r_ax;
I   push     r_flags;
I   popf
I   pushf
    KeyVector();
I   pushf
I   pop r_flags
    key.w = r_ax = _AX;

#if !BOXLOGO
    if (fMsgPosted == 0xff) {
        PostSignOn();
        fMsgPosted = 0;
    }
endif if OLDMSG
    if (fMsgPosted == 2) {
        ShowMsg();
        fMsgPosted = 1;
    }
#else
    if (fMsgPosted == 4)
        fMsgPosted = 3;
endif if (act != KI_READ)
        return;

#if OLDMSG
    if (fMsgPosted) {
        ClearMsg();
    }
#else
    if (fMsgPosted >= 2)
        fMsgPosted = 1;
#endif
```

```
fLastReturn = FALSE;
xlat.w = 0;

if (!fInvokeIDed) {
    inv_ch2.w = inv_ch.w = key.w;
} else if (fBudActive && fReady
           && (inv_ch.w == key.w || inv_ch2.w == key.w)
) {
    /* translate invoke key to menu key */
    r_ax = key.w = MENU_KEY;
} if (fBudDefined && fInBudRng) {
    fRdy = (fBudActive ? fReady : (mode == MODE_ENTER) );
    switch (key.k.scan) {
    default:
        break;
    case SCAN_BESC:
        if (fBudActive && key.k.chr == KEY_BESC)
            xlat.k.chr = KEY_BESC;
        break;
    case SCAN_CTRL_PGUP:
        xlat.k.chr = KEY_SIBUP - KEY_XLATE;
        break;
    case SCAN_CTRL_PGDN:
        xlat.k.chr = KEY_SIBDOWN - KEY_XLATE;
        break;
    case SCAN_CTRL_HOME:
        xlat.k.chr = KEY_SIBHOME - KEY_XLATE;
        break;
    case SCAN_CTRL_END:
        xlat.k.chr = KEY_SIBEND - KEY_XLATE;
        break;
    case SCAN_BIGSTAR:
        if (fXlatPM)
            xlat.k.chr = KEY_EXPANDALL - KEY_XLATE;
        break;
    case SCAN_BIGPLUS:
        if (fXlatPM)
            xlat.k.chr = KEY_EXPAND - KEY_XLATE;
        break;
    case SCAN_BIGMINUS:
        if (fXlatPM)
            xlat.k.chr = KEY_COLLAPSE - KEY_XLATE;
        break;
    } /* end xlat switch */
} if ((xlat.k.chr != 0) && fRdy) {     /* translation */
    if (fBudActive) {
        StuffKey(xlat);
        r_ax = BESC_KEY;
    } else {
        invoke_str[INV_CHR_POS] = xlat.k.chr;
        if (fInvokeIDed) {
            StuffStr(quick_invoke_str);
            StuffKey(inv_ch);
        } else {
            StuffStr(invoke_str);
            key.w = ALT_F10_KEY;     /* send ALT_F10 */
            StuffKey(key);
        }
        r_ax = ESCAPE_KEY;
        fSpecialEntry = TRUE;
    }
} else {     /* save keys and do month name recognition */
    if (key.w == RIGHT_KEY) {
        if (fLastRgt || (mode == MODE_LABEL && CheckMonth())) {
            StuffMonth();
            fLastRgt = TRUE;
        }
        savPos = 0;
    } else {     /* not right arrow */
```

```
            fLastRgt = FALSE;
            if (mode != MODE_LABEL) {
                savPos = 0;
                if (!fBudActive && key.k.chr == '\r') {
                    ReadScreenText(1,0,INS_DEL_TEXT_LEN);
                    fLastReturn = TRUE;
                }
            }
            if (savPos < MAXSAVE) {
                if (key.k.chr == '\b') { /* back space */
                    if (savPos > 0) --savPos;
                } else if (key.k.chr < ' ' || key.k.chr >= '\x7f') {
                    savPos = 0;     /* cntrl-chars clear buf */
                } else {            /* remember normal chacaters */
                    savbuf[savPos++] = key.k.chr;
                }
            }
        } /* end normal char */
    } /* end no xlat case */
} /* end c_KeyHandler */
pragma warn .par if debug
void xexit(void)    /* go here to fixup int handler from debugger */
{
    RemoveKeyHandler();
    DBGTRAP();
} void m_patch(void)
{
    int i = 0;
    DBGTRAP();
#if 0
    dpfmask ^= 0xffff;
    dpf(-1,"dpfmask = %x\n",dpfmask);
#endif
    if (i) {
        dummy();
    }
}
endif /*:ROOTDOCONS     -- load and execute consolidate overlay */
flg RootDoCons(void)
{
    flg fRet = FALSE;

fDoCons = FALSE;
    fKeepCons = FALSE;

SaveTempWS();

LoadOverlay(OVL_CONS);

if (OvlEnter(OE_ENTERCONS)) { fRet = TRUE; goto done; } if (BudState == STATE_CONS)
        if (DoEventLoop())
            return FALSE;

done:
    if (!fKeepCons) {
        LoadOverlay(OVL_BUD);
        RestoreTempWS();
    } return (fRet);
} /* RootDoCons */

/*:ROOTDOPERIODS    -- load and execute Periods overlay */
flg RootDoPeriods(void)
{
    flg fRet = FALSE;
```

```
    fPeriodsSet = FALSE;
    fDoPeriods = FALSE;
    fKeepPeriods = FALSE;

SaveTempWS();

LoadOverlay(OVL_PERIODS);

if (OvlEnter(OE_ENTERPERIODS)) { fRet = TRUE; goto done; }
done:
    RestoreAfterPeriods();
    return (fRet);
} /* RootDoPeriods */

/*:ROOTDOGOAL    -- load and execute Goal overlay */
flg RootDoGoal(void)
{
    fDoGoal = FALSE;

if (InvokeOvlEntry(OVL_GOAL,OE_ENTERGOAL))
        return TRUE;

if (BudState == STATE_GOAL)
        DoEventLoop();

return FALSE;
} /* RootDoGoal */

/*:INVOKEOVLENTRY -- load and enter overlay */
flg InvokeOvlEntry(int OvlNum,OVL_ENTRIES OvlCode)
{
    if (LoadOverlay(OvlNum))
        return TRUE;
    return OvlEnter(OvlCode);
} /* end InvokeOvlEntry */

/*:MKHOMEFILENAME */
char * MkHomeFileName(char * outname,char * fname,char * ext)
{
    char * cp;

FIX_ES;
    _SI = (uns) outname;
    GET_STARTDIR();
    cp = outname + strlen(outname) - 1;
    if (*cp != '\\') ++cp;
    sprintf(cp, "\\%s%s", fname, ext );
    return (outname);
} /* end MkHomeFileName */ int OvlFileHandle;

/*:OVLLOADERR */
flg OvlLoadErr(char * msg_prefix)
{
    char buf[40];

if (OvlFileHandle > 0)
        FileClose(OvlFileHandle);

sprintf(buf,"%s " BUD_FILE " overlays", msg_prefix);
    FIX_ES;
    _SI = (uns) buf;
    if (fAttachTerm)    DO_NONFATAL();
    else                DO_ERROR();
    return TRUE;
} /* end OvlLoadErr */
/*:LOADOVERLAY -- load overlay from .ADN or .OVL file */
flg LoadOverlay(int OvlNum)
{
    char fname[FN_BUF_SZ];
    OVL_HDR OvlHdr;
```

```c
    uns ovlsz,ovlpos;
    uns *pBaseOfImage = 0;

if (OvlActive == OvlNum)
        return FALSE;

OvlFileHandle = -1;

_DX = (uns)
        MkHomeFileName(fname, BUD_FILE ".", OvlNum==OVL_BUD ? "ADN" : "OVL" );
    _AX = 0x3d00;   /* open,read only */
    DosInt();
I   jnc opened;
        return OvlLoadErr("Can't find");
opened:
    OvlFileHandle = _AX;

ovlsz = (uns) FileSeek(OvlFileHandle,SEEK_END,0);
    FileSeek( OvlFileHandle, SEEK_ABS, 0 );
    ovlpos = sizeof OvlHdr;
    if (FileReadFix( OvlFileHandle, &OvlHdr, sizeof OvlHdr ))
        goto readErr;

switch (OvlNum) {
    case OVL_BUD:       /* 1st overlay is tail of root */
        ovlpos = (uns)BEG_OF_OVLY;  /* position is at OvlEnter point */
        ovlsz -= (uns)BEG_OF_OVLY;  /* size is filesz - position */
        break;
    case OVL_CONS:      /* 2nd ovly is first in .OVL */
        /* ovlpos = sizeof OvlHdr;  -- position is after hdr */
        ovlsz = OvlHdr.sz;          /* size is recorded in hdr */
        break;
    default:            /* 3rd overlay is second in .OVL */
        ovlpos += OvlHdr.sz;        /* position after first ovly */
        ovlsz -= ovlpos;            /* size is filesz - position */
        break;
    }

/* check for possible overrun/file-mismatch */
    if (OvlHdr.rootsz != *pBaseOfImage) {
        return OvlLoadErr("Incompatible");
    }

FileSeek( OvlFileHandle, SEEK_ABS, ovlpos);
    OvlActive = -1;     /* no such overlay! */
    if (FileReadFix( OvlFileHandle, (void *) BEG_OF_OVLY, ovlsz)) {
readErr:
        return OvlLoadErr("Error reading");
    }
        FileClose(OvlFileHandle);
        OvlActive = OvlNum;
        return FALSE;
    } /* end LoadOverlay */ if debug
    void dummy(void)
    {
        DBGTRAP();
        CLC;
    }
    #endif /* end BROOT.C */
/* MODES: TAB 4    Last Revision: Mon 05-29-89 07:00
**
**  BROWS.C -- Bud cell and row management functions.
**
**  Copyright (C) 1989 Saratoga Software, Inc.  All rights reserved.
**
**  7/23/88 dbh use emm for cell data.
**  7/16/88 dbh pass indentation information down when collapsing.
**  7/14/88 dbh added do_waits; fixed label swaping bug
**  7/11/88 dbh bug fix in scoping (Beta 0.21)
```

```
**   9/11/87 dbh Created.
*/ include "bud.h"
include "bdroot.h"
#include "bdovly.h"
#include <string.h>
include <mem.h> define TTOTS   0       /* 1 -> use tags for total rows */ if !USERAM
define save_emm()
#   define restore_emm()
endif

XPTR StreamXPtr;
int StreamXPos;
int StreamXLen;

/*:STREAMOUT */
flg StreamOut(void * ptr,uns len)
{
#if USERAM
    QSTREAM_HDR qStream;
    uns tlen;

if (StoreOpt == SO_RAM) {
        qStream = refm(StreamXPtr);
        FOREVER {
            tlen = min(len,StreamXLen);
            qmovmem(ptr, qStream->data+StreamXPos, tlen);
            len -= tlen;
            StreamXLen -= tlen;
            StreamXPos += tlen;
            ptr = (PTR) (((BPTR)ptr) + tlen);
            if (len == 0)
                break;
            StreamXPtr = qStream->next;
            if (StreamXPtr == XNULL)
                return TRUE;
            qStream = refm(StreamXPtr);
            StreamXLen = qStream->len;
            StreamXPos = 0;
        }
    } else
#endif
    {   /* SO_DISK */
        /* buffered write */
        return WriteFix(ptr,len);
    }
#if USERAM
    return FALSE;
endif
} /* end StreamOut */

/*:STREAMIN */
flg StreamIn(void * ptr,uns len)
{
#if USERAM
    QSTREAM_HDR qStream;
    uns tlen;

if (StoreOpt == SO_RAM) {
        qStream = refm(StreamXPtr);
        FOREVER {
            tlen = min(len,StreamXLen);
            qmovmem(qStream->data+StreamXPos, ptr, tlen);
            len -= tlen;
            StreamXLen -= tlen;
            StreamXPos += tlen;
            ptr = (PTR) (((BPTR)ptr) + tlen);
            if (len == 0)
                break;
            StreamXPtr = qStream->next;
```

```
                if (StreamXPtr == XNULL)
                    return TRUE;
                qStream = refm(StreamXPtr);
                StreamXLen = qStream->len;
                StreamXPos = 0;
            }
        } else
#endif
        {   /* SO_DISK */
            /* buffered read */
            return ReadFix(ptr,len);
        }
#if USERAM
    return FALSE;
endif
} /* end StreamIn */

/*:OPENSTREAM */
card32 OpenStream(STREAM Stream)
{
    card32 StreamSize;
#if USERAM
    QSTREAM_HDR qStream;

if (StoreOpt == SO_RAM) {
        if (Stream.x == XNULL)
            return 0;
        StreamXPtr = Stream.x;
        qStream = refm(StreamXPtr);
        StreamXPos = sizeof(card32);
        StreamXLen = qStream->len - sizeof(card32);
        StreamSize = * (card32 FAR) qStream->data;
        if (StreamXLen < 0) /* wasn't big enough for initial size! */
            return 0;
    } else
#endif
    {   /* SO_DISK */
        /* seek and init buffer */
        Seek(SEEK_ABS, ChunkToInt(Stream.s.Addr) );
        ReadFix(&StreamSize,sizeof(card32));
    }
    return (StreamSize);
} /* end OpenStream */

/*:FREESTREAM */
void FreeStream(STREAM Stream)
{
#if USERAM
    QSTREAM_HDR qStream;
    XPTR xNext;

if (StoreOpt == SO_RAM) {
        while (Stream.x != XNULL) {
            qStream = refm(Stream.x);
            xNext = qStream->next;
            freem(Stream.x,qStream->len);
            Stream.x = xNext;
        }
    } else
#endif
    {   /* SO_DISK */
        /* add to free list */
        if (Stream.x != XNULL)
            AddToFree(Stream.s);
    }
} /* end FreeStream */

/*:CREATESTREAM */
STREAM CreateStream(card32 len)
{
    STREAM Stream;
    card32 StreamSize = len;
#if USERAM
```

```
    QSTREAM_HDR qStream, qPrev;
    XPTR x;
    uns tlen;
endif len += sizeof(card32);

if USERAM
    if (StoreOpt == SO_RAM) {
        qPrev = QNULL;
        do {
            tlen = (uns) min(len,1000);
            if ((x = allocm(tlen+STREAM_HDR_SIZE)) == XNULL)
                goto AllocFail;
            qStream = refm(x);
            qStream->next = XNULL;
            qStream->len = tlen;
            if (qPrev == QNULL) {
                * (card32 FAR) qStream->data = StreamSize;
                StreamXPtr = Stream.x = x;
                StreamXPos = sizeof(card32);
                StreamXLen = tlen - sizeof(card32);
            } else {
                qPrev->next = x;
            }
            qPrev = qStream;
            len -= tlen;
        } while (len > 0);
    } else
#endif
    {   /* SO_DISK */
        /* search free list */
        Stream.s = AllocSwap(len);
        /* seek and init buffer */
        Seek(SEEK_ABS, ChunkToInt(Stream.s.Addr) );
        WriteFix(&StreamSize,sizeof(card32));
    }
    return (Stream);
AllocFail:
    FreeStream(Stream);
    Stream.x = XNULL;
    return (Stream);
} /* end CreateStream */

/*:CLOSESTREAM */
flg CloseStream(void)
{
#if 0
    if (StoreOpt == SO_DISK) {
        /* flush buffer */
    }
endif
    /* else, nothing needed for SO_RAM */
    return FALSE;
} /* end CloseStream */ if USERAM

/*:COPYRAMTODISK */
STREAM CopyRamToDisk(STREAM Stream)
{
    STREAM Temp;
    card32 Size;
    uns bufsz,tlen;
    STORE_OPT SaveOpt = StoreOpt;
    save_emm();
    StoreOpt = SO_RAM;
    Size = OpenStream(Stream);
    StoreOpt = SO_DISK;
    Temp = CreateStream(Size);
    bufsz = 1024-sizeof(card32);
    while (Size > 0) {
        StoreOpt = SO_RAM;
```

```
        tlen = (uns) min(Size,bufsz);
        if (StreamIn(XDV_BUFFER,tlen))
            break;
        StoreOpt = SO_DISK;
        if (StreamOut(XDV_BUFFER,tlen))
            break;
        Size -= tlen;
        bufsz = 1024;
    }
    StoreOpt = SO_DISK;
    CloseStream();

restore_emm();
    StoreOpt = SaveOpt;

if (Size != 0)
        Temp.x = XNULL;
    return (Temp);
} /* end CopyRamToDisk */

/*:COPYDISKTORAM */
STREAM CopyDiskToRam(STREAM Stream)
{
    STREAM Temp;
    card32 Size;
    uns bufsz,tlen;
    STORE_OPT SaveOpt = StoreOpt;

save_emm();
    StoreOpt = SO_DISK;
    Size = OpenStream(Stream);
    StoreOpt = SO_RAM;
    Temp = CreateStream(Size);
    if (Temp.x == XNULL)
        goto done;
    bufsz = 1024-sizeof(card32);
    while (Size > 0) {
        StoreOpt = SO_DISK;
        tlen = (uns) min(Size,bufsz);
        if (StreamIn(XDV_BUFFER,tlen))
            break;
        StoreOpt = SO_RAM;
        if (StreamOut(XDV_BUFFER,tlen))
            break;
        Size -= tlen;
        bufsz = 1024;
    }
    StoreOpt = SO_RAM;
    CloseStream();

restore_emm();
    StoreOpt = SaveOpt;

if (Size != 0)
        Temp.x = XNULL;
done:
    return (Temp);
} /* end CopyDiskToRam */ endif  USERAM

/*:MKTAG      -- allocate TREC and assign new tag value */
QTREC MkTag(void)
{
    QTREC qt;

if (tags == QNULL)
        nextTag = TAGINIT;

qt = allocq(sizeof(TREC));
    if (qt != QNULL) {
        qt->tag = nextTag++;
        qt->qNxtTag = tags;
```

```
            qt->qFirst = qt->qLast = QNULL;
            qt->Lock = 0;
            qt->fSavTot = FALSE;
            qt->AdjID = AdjCount;
            qt->LftCol = BudRange.lft;
            tags = qt;
        }
        return (qt);
    } /* end MkTag */

/*:FINDTAG  -- search for tag value, return QNULL or ptr to TREC */
QTREC FindTag(TAG tag)
{
    QTREC qt = tags;

while (qt != QNULL && qt->tag != tag)
        qt = qt->qNxtTag;
    return (qt);
}

/*:FREETAG  -- remove TREC from tags list and free TREC */
void FreeTag(TAG tag)
{
    QTREC qt,qtp;

/* search tag list */
    for (qt=tags,qtp=QNULL; qt != QNULL; qtp=qt, qt=qt->qNxtTag ) {
        if (qt->tag == tag) {    /* found */
            /* unlink and free it */
            if (qtp != QNULL)
                qtp->qNxtTag = qt->qNxtTag;
            else
                tags = qt->qNxtTag;
            freeq(qt,sizeof(TREC));
            if (tag == nextTag-1)    /* save tag value */
                --nextTag;
            break;
        }
    } /* end for */
} /* end FreeTag */

/*:FIRSTTOTCOL -- return cell for first total formula in row */
COL FirstTotCol(ROW row)
{
    COL col,maxCol;
    LEVEL lev;

#if 0
    if (fColHdrDef) {
        lev = GetLevel(CHdrBot);
        col = LevelCol(lev);
    } else {
        lev = GetLevel(row);
        col = LevelCol(lev);
        if (cellType == T_LABEL)
            ++col;
    }
#else
    lev = GetLevel(row);
    col = LevelCol(lev);
    if (cellType == T_LABEL)
        ++col;
    if (fColHdrDef && CHdrLft > col)
        col = CHdrLft;
endif for (maxCol=MaxCol(); col < maxCol; ++col) {
        if (GetCell(row,col)) {
            if (cellType == T_FORMULA)
                return (col);
            break;
        }
    }
```

```
    return 0;
} /* end FirstTotCol */

/*:HIGHESTFORMROW -- return highest reference row (chaining formulas) */
ROW HighestFormRow(char * str,COL col)
{
    ROW high=MAXROW,r2;

do {
        r2 = HighFormRow(str);
        if (r2 == MAXROW || r2 >= high)
            break;
        high = r2;
        GetCell(high,col);
        str = cellPtr;
    } while (cellType == T_FORMULA);

return (high);
} /* end HighestFormRow */

/*:COLHASVALUES */
flg ColHasValues(ROW top,ROW bot,COL col,flg fAcceptLabels)
{
    while (bot > top) {
        if (GetCellForm(bot,col) && (fAcceptLabels || cellType != T_LABEL))
            return TRUE;
        --bot;
    }
    return FALSE;
} /* end ColHasValues */ define LAB_LEN 20

/*:SCOPEFORWARD -- returns # of rows owned by row */
CR_CODE ScopeForward(ROW row,int * pSkip,LEVEL * pLev,
                flg fIndentSeen,flg * pfIndentFound)
{
    ROW r,r2,highRow,matchRow,indRow,firstInd;
    ROW maxRow = BoundMaxRow();
    COL col;
    LEVEL lev,mLev,minLev;
    TAGTYPE tt;
    TAG tag;
    CR_CODE crc = CR_NEWTOT;
    int numRows,blanks2,blanks = 0;
    flg fFirst = TRUE;
    flg fIndScope = FALSE;
    flg fNoIndBreak = FALSE;
    flg fParentLabel,fTotLab,fTotForm;
    char pLabel[LAB_LEN+1];

*pSkip = 0;
    if (pfIndentFound != NULL)
        *pfIndentFound = fIndentSeen;
    tt = ScanTag(row,&tag);
    *pLev = mLev = GetLevel(row);

/* remember parent's label */
    if (cellType==T_LABEL) {
        fParentLabel = TRUE;
        cellPtr[LAB_LEN] = 0;
        strlwr(strcpy(pLabel, cellPtr));
    } else
        fParentLabel = FALSE;

/* total lines have no forward scope */
    if ((tt & TAG_TOT) || (cellType==T_LABEL && isTotLabel(cellPtr)))
        return CR_NORM;
    for (   r=row, blanks=0;
            ++r < maxRow && (lev=GetLevel(r)) >= MAXLEVEL && blanks <= BLANKS;
            ++blanks
    )
        continue;   /* skip blank lines */
```

```
        if (mLev >= MAXLEVEL)         /* at a blank */
            return (r >= maxRow || blanks >= BLANKS ? CR_STOP : CR_NORM);

if (r >= maxRow || r-row > BLANKS || lev < mLev)
            return CR_NORM;       /* too many blanks or belong to parent? */ blanks2 = blanks = 0;
        firstInd = indRow = matchRow=0; highRow=MAXROW; minLev=MAXLEVEL;
        for (r=row; ++r < maxRow && !fNoIndBreak; ) {
#if TTOTS
            tt = ScanTag(r,&tag);
            if (IS_TOT(tt)) {     /* total line */
                r2 = r - tag - 1;
                if (r2 <= row) {
                    if (r2 < row) {
                        r -= (blanks+1);    /* scopes to before parent */
                        break;
                    }
                    crc = CR_TOT;
                    goto found_tot;         /* found scope */
                }
            }
endif lev = GetLevel(r);
            if (lev >= MAXLEVEL) {       /* noise row */
                if (++blanks >= BLANKS) {
                    r -= blanks;
                    break;                  /* stop if too many noise rows */
                }
                continue;
            }
            if (lev < mLev) {     /* outdented row */
                r -= blanks;
                break;
            }
            if (firstInd==0 && lev > mLev) {
                firstInd = r;    /* indented row found */
            }
            if (fFirst) {
                fFirst = FALSE;
                fIndScope = (firstInd != 0);     /* use ind to scope? */
                if (fIndentSeen && !fIndScope)
                    return CR_NORM;
            }
            if (fIndScope) {
                if (lev <= mLev)
                    fIndScope = FALSE;
                else
                    indRow = r;
#if 0 /* debug */
                dpf(1,"scope IndScope: r %d, indRow %d, lev %x, mLev %x\n",
                    r, indRow, lev, mLev);
#endif
            } else {
                if (lev > mLev) /* not indent scope, but indent found */
                    fNoIndBreak = TRUE;
            }
            blanks2 = blanks;
            blanks = 0;

#if TTOTS
            if (tt != TAG_NONE)
                continue;
#endif

/* if total and label match */
            fTotLab = (cellType==T_LABEL && isTotLabel(cellPtr));
            if (fTotLab) {
                if (fParentLabel) {
                    while (islower(*cellPtr)) ++cellPtr;
                    while (*cellPtr == ' ' || *cellPtr == '-') ++cellPtr;
                    if (strncmp(cellPtr,pLabel,LAB_LEN) == 0)
                        goto found_tot;    /* label matches parent */
                }
```

```
            }
        col = FirstTotCol(r);
        if (col != 0) {
            fTotForm = IsTotalForm(cellPtr);
            r2 = HighestFormRow(cellPtr,col);
            if (r2 >= r)     /* highest reference is self or later row */
                continue;
            if (!fTotLab && col != LevelCol(lev) && !fTotForm)
                continue;
            if (r2 < row) {
                if (indRow == r)
                    indRow -= blanks2 + 1;
                --r;
                break;
            }
            if (ColHasValues(row,r2-1,col,FALSE))    /* values not spanned? */
                continue;
            if (indRow != 0) {   /* is indented */
                if (lev == mLev) {
                    matchRow = r;
                    break;
                }
                if (lev < minLev ||
#if 1  /* don't ignore possible totals just because their indented */
                    (lev == minLev && r2 <= highRow)
#else
                    (r2 <= highRow)
#endif
                    ) {
                    minLev = lev;
                    highRow = r2;
                    matchRow = r;
                }
            } else {
#if 0  /* don't ignore possible totals just because their indented */
                if (lev == mLev && r2 <= highRow) {
#else
                if (r2 <= highRow) {
#endif
                    highRow = r2;
                    matchRow = r;
                }
            }
        }
    } /* end for */ if 0 /* debug */
    dpf(0,"scope: row %d, indrow %d, matchRow %d, firstInd %d, highRow %d\n",
        row, indRow, matchRow, firstInd, highRow);
endif if (matchRow == 0) {     /* no possible total found */
        if (indRow != 0) {
useIndent:
            if (pfIndentFound != NULL)
                *pfIndentFound = TRUE;
            *pSkip = indRow - row;
        }
        return CR_NORM;
    } else {                 /* possible total */
        r = matchRow;
        if (indRow != 0 && indRow >= r) {    /* indentation? */
            if (indRow > r) {    /* indent scopes farther */
                /* check if last line is a good total */
#if 1
                r = indRow;
                col = FirstTotCol(r);
                if (col == 0 || !IsTotalForm(cellPtr))
                    goto useIndent; /* doesn't look like total formula */
                r2 = HighestFormRow(cellPtr,col);
                if (r2 >= r || r2 > highRow)
#endif
                    goto useIndent; /* total doesn't scope back far enough */
```

```c
            }
            /* else indRow == r    -- indent scopes just as far */
        } if (mLev == GetLevel(r)) {   /* tot & parent at same level */
            /* make sure previous row isn't real owner */
            for (r2=row, blanks=0;
                 --r2 >= MinRow() && blanks < BLANKS;
                 ++blanks
            ) {
                lev = GetLevel(r2);
                if (lev < MAXLEVEL) {   /* not noise row */
                    /* if outdented and scopes to same row */
                    if (lev < mLev &&
                        CR_NEWTOT ==
                            ScopeForward(r2,&numRows,&lev,TRUE,NULL) &&
                        r2+numRows+1 == r
                    )
                        return CR_NORM; /* previous is really owner */
                    else
                        break;   /* no scope problem, r is total row */
                }
            } /* end for blanks */
        } /* end if same level */
    } /* end possible total */ found_tot:
    if (pfIndentFound != NULL)
        *pfIndentFound = fIndentSeen || (firstInd <= r);
    *pSkip = (r-row-1);
    return (crc);
} /* end ScopeForward */

/*:CHECKFORNEWTOT
**  identify untagged total line & scope and tag it. returns spaned rows.
*/
int CheckForNewTot(ROW row, ROW minRow)
{
    LEVEL lev;
    COL col;
    ROW r2;
    CR_CODE crc;
    int numRows;
/*  flg fTotLab; */ lev = GetLevel(row);
    if (lev >= MAXLEVEL)
        return 0;

/*  fTotLab = (cellType == T_LABEL && isTotLabel(cellPtr)); */
    col = FirstTotCol(row);
    if (col == 0 || !IsTotalForm(cellPtr))
        return 0;

r2 = HighestFormRow(cellPtr,col);
    if (r2 >= row)   /* highest reference is self or later row */
        return 0;

if (minRow == 0) minRow = MinRow();
    for ( ; r2 >= minRow; --r2) {
        crc = ScopeForward(r2,&numRows,&lev,FALSE,NULL);
        if (crc == CR_STOP)
            return 0;
        if (crc == CR_NEWTOT) {
            if (r2 + numRows + 1 == row)
                break;
        }
    }
if TTOTS
    PlaceTag(row, numRows, TAG_TOT | TAG_SAVTOT);
#endif
    return (numRows);
} /* end CheckForNewTot */
```

```c
/*:MKCELLNAME -- make a cell reference */
char * MkCellName(ROW row,COL col,char CellName[7])
{
    char ColName[3];

sprintf(CellName,"%s%u", MkColName(col,ColName), row);
    return (CellName);
} /* end MkCellName */

/*:PLACETAG -- format and install tag on sheet */
flg PlaceTag(ROW row,TAG tag,TAGTYPE ttype)
{
    COL col;
    char *str;
    CTYPE ctype;
    char temp[7];

col = TagCol();
    GetCellForm(row,col);

if (ttype == TAG_NONE) {
putblank:
        ctype = T_BLANK;
    } else {
        if (IS_TOT(ttype))
#if TTOTS
            MkCellName(row-tag,col,temp);
#else
            goto putblank;
#endif
        else if (OnSheet() && (ttype & TAG_OSHEET))
            MkCellName(tag+1,col,temp);
        else
            putdec(temp,tag,1);
        str = (ttype & TAG_OSHEET) ? TAG_STR_OSHEET : empty_string;
        sprintf(buffer,"%s%u+%s,\"%s\")",TagStr,ttype,temp,str);
        ctype = T_FORMULA;
    }
    if (PutCell(row,col,ctype,cellForm,buffer))
        return TRUE;
    RecalcCell(row,col);
    return FALSE;
} /* end PlaceTag */

/*:SCANTAG -- scan tag value from sheet */
TAGTYPE ScanTag(ROW row,TAG * pTag)
{
    COL c;
    TAG tag = TAGNULL;
    TAGTYPE tt = TAG_NONE;
    card16 i;

fNewTag = FALSE;
    c = TagCol();
    GetCell(row,c);
    if ((cellType == T_FORMULA) && IsATag()) {
        cellPtr += 6;
        i = ScanInt(cellPtr, (ord16*) &tt);
        cellPtr += i;
        if (*cellPtr == '+') {
#if TTOTS
            if (IS_TOT(tt)) {
                ScanInt(cellPtr+(c>25?3:2), (ord16*) &tag);
                tag = row - tag;
            } else
#endif
            if (OnSheet() && (tt & TAG_OSHEET)) {
                ScanInt(cellPtr+(c>25?3:2), (ord16*) &tag);
                --tag;
            } else {
                ScanInt(cellPtr+1, (ord16*) &tag);
            }
        }
```

```
    } if (pTag != NULL)
        *pTag = tag;

return (tt);
} /* end ScanTag */

/*:SETROWLIM     -- set row limit for collapse/expand */
ROW SetRowLim(int row)
{
    int RowLim;

if (row < 0) {
        row = -row;
        RowLim = MaxRow();
    } else {
        GET_ACTIVE();
        RowLim = _DX + 1;
    }
    while (RowLim > row && GetLevel(RowLim-1) == BLANKLEVEL)
        --RowLim;
    return (RowLim);
} /* end SetRowLim */

/*:DELROWS  -- delete rows and slide tail up */
void DelRows(ROW row, int NumRows, flg fUnBound)
{
    COL ColMax;
    ROW RowMax;

RowMax = (fUnBound ? MAXROW : MaxRow()-1);
    ColMax = AMaxCol() - 1;
    MoveRange( AMinCol(),  row+NumRows,    ColMax, RowMax,
               AMinCol(),  row,            ColMax, RowMax-NumRows  );
    UpdateBudRange();
    EraseRange( AMinCol(),  RowMax-NumRows+1, ColMax, row+NumRows-1 );
} /* end DelRows */

/*:INSROWS  -- insert rows and slide tail down */
flg InsRows(ROW row, int NumRows, flg fUnBound)
{
    COL ColMax;
    ROW r,RowMax,BotRow;
    int NeedRows;
    COL col;
    long NeedSpace;

BotRow = (!fUnBound && RowsBound()) ? ABudBottom() : MAXROW;

RowMax = BotRow;
    GET_ACTIVE();
    if (_DX < RowMax)
        RowMax = _DX;
    BotRow -= NumRows;

/* check for pushing rows off the end */
    for (r=BotRow+1; r <= RowMax; ++r) {
        if (GetLevel(r) != BLANKLEVEL) {
            GlobErr = GE_NO_ROOM;
            return TRUE;
        }
    }

/* trap out-of-memory */
#if debug
    if (fMEMOUT) {
        fWedged = TRUE;
        return TRUE;
    }
endif ColMax = AMaxCol() - 1;
    RowMax = SetRowLim(row) - 1;
```

```
    NeedSpace = 0;
    for (col=AMinCol(); col <= ColMax; ++col) {
        for (r=RowMax; r >= row; --r) {
            if (GetCellForm(r,col) || cellForm != DEFAULT_FMT) {
                if (r <= BotRow) {
                    NeedRows = NumRows + (r & 3) - 3;
                    if (NeedRows > 0)
                        NeedSpace += ((NeedRows + 3) & -3) << 2;
                }
                break;
            }
        }
    }
    if (GetFreeSpace() < NeedSpace + MOVE_GAP) {
        fWedged = TRUE;
        return TRUE;
    }

/* shift rows now */
    MoveRange(  AMinCol(),  row,            ColMax, BotRow,
                AMinCol(),  row+NumRows,    ColMax, BotRow+NumRows  );
    EraseRange( AMinCol(),  BotRow+1,       ColMax, row+NumRows-1 );
    return FALSE;
} /* end InsRows */

/*:GRABCELL -- move cell contents off sheet, return ptr to CELL */
uns GrabCell(ROW row, COL col, flg fStore)
{
    uns         len,vlen=0;
    CELL_REC    CellRec;

if (fStore)
        restore_emm();

GetCellForm(row,col);
    CellRec.Head.Form = cellForm;
    CellRec.Head.Type = cellType;
    len = rCellSizes[cellType] + sizeof(CELL_HDR);
    switch (cellType) {
    case T_BLANK:
        break;
    case T_NUMBER:
        if (fStore) {
            GetCellStack(row,col,&CellRec.Data.n.nval);
        }
        break;
    case T_INTEGER:
        GetCellStack(row,col,NULL);
        CellRec.Data.i.ival = DFLT2INT();
        _CX = _DX;
I       cwd;
        if (_CX == _DX) {
            CellRec.Head.Type = T_SHORTINT;
            len -= sizeof(ord16);
        }
        break;
    case T_FORMULA:
    case T_LABEL:
        GetCell(row,col);
        CellRec.Data.v.vlen = vlen = strlen(cellPtr) + 1;
        break;
    }
    if (fStore) {
        save_emm();
        if (StreamOut(&CellRec,len))
            return 0;
        if (vlen != 0)
            if (StreamOut(cellPtr,vlen))
                return 0;
    }
    return (len+vlen);
} /* end GrabCell */
```

```
/*:GRABROW  -- move row contents off sheet, return ptr to RREC */
QRREC GrabRow(ROW row)
{
    card32 len;
    uns sz;
    COL col,colMax;
    TAG tag;
    TAGTYPE tt;
    QRREC qr;
    flg fStore;

if ((qr = allocq(sizeof(RREC))) == QNULL)
        goto recFail;

qr->qNxtRow = QNULL;
    qr->Cells.x = XNULL;
    qr->child = TAGNULL;
    qr->tot = FALSE;
    qr->OrgRow = row;
    colMax = MaxCol();
    while (colMax-- > MinCol() &&
            (!GetCellForm(row,colMax) && cellForm==DEFAULT_FMT) )
        continue;   /* find last col */

/* two passes, first to size the info, second to actually write it */
    for (fStore=0; fStore <= 1; ++fStore) {
        len = 0;
        for (col=MinCol(); col <= colMax; ++col) {
            sz = GrabCell(row,col,fStore);
            if (sz == 0)
                goto writeFail;
            len += sz;
        } if (!fStore) {
            save_emm();
            qr->Cells = CreateStream(len);
            if (qr->Cells.x == XNULL)
                goto createFail;
        } else {
            CloseStream();
            restore_emm();
        }
    } qr->ctCells = colMax - MinCol() + 1;
    tt = ScanTag(row,&tag);
    if (tt & TAG_OSHEET)
        qr->child = tag;
    if (tt & TAG_TOT) {
        qr->tot = tt & ~TAG_OSHEET;
        qr->span = tag;
    }
    return (qr);

writeFail:
    FreeStream(qr->Cells);
    GlobErr = GE_NO_DISK;
createFail:
    freeq(qr,sizeof(RREC));
recFail:
    return QNULL;
} /* end GrabRow */

/*:PLACECELL
**  put cell onto sheet and free contents;
**  return ptr to nxt cell
**  assumes correct emm state.
*/
flg PlaceCell(ROW row,COL col,int rdelta,int cdelta)
{
    CELL_HDR Head;
    UDATA    Data;
```

```c
    if (fWedged ||
        StreamIn(&Head,sizeof(Head)) ||
        StreamIn(&Data,rCellSizes[Head.Type])
    )
        return TRUE;

switch (Head.Type) {
    case T_BLANK:
        break;
    case T_SHORTINT:
        _AX = Data.si.sival;
I       cwd;
        goto doInt;
    case T_INTEGER:
        LD_DWRD(DX,AX,Data.i.ival);
doInt:
        DINT2FLT();
        Head.Type = T_NSTACK;
        break;
    case T_NUMBER:
        FIX_ES;
        _SI = &Data.n.nval;
        PUSH_FLT();
        Head.Type = T_NSTACK;
        break;
    case T_FORMULA:
        if (StreamIn(buffer,Data.v.vlen))
            return TRUE;
        FixupFormula(buffer, 0, rdelta, 0, cdelta);
        /* out -> formbuf */
        break;
    case T_LABEL:
        if (StreamIn(formbuf,Data.v.vlen))
            return TRUE;
        break;
    }
    /* put the cell value */
    restore_emm();
    fWedged = PutCell(row,col,Head.Type,Head.Form,formbuf);

if (Head.Type == T_BLANK && Head.Form != DEFAULT_FMT) {
        _AH = Head.Form;
        _CX = col;
        _DX = row;
        SET_CELL_FMT();
    } else if (Head.Type == T_FORMULA) {
        RecalcCell(row,col);
        /*fNeedCalc = fAutoCalcOn;*/
    } save_emm();
    return (fWedged);
} /* end PlaceCell */

/*:PUTROW   -- move row contents on sheet, return ptr to next row */
QRREC PutRow(ROW row,QRREC qr,int cdelta)
{
    COL col,maxCol;
    QRREC qrn;
    int rdelta;
    TAGTYPE tt;

if (fWedged)
        goto done;

rdelta = row - qr->OrgRow;

save_emm();
    OpenStream(qr->Cells);

for (col=MinCol(), maxCol=col+qr->ctCells; col < maxCol; ++col) {
        if (PlaceCell(row,col,rdelta,cdelta)) {
            break;
        }
```

```
        }
        if (col == maxCol) {
            EraseRange(col,row,MaxCol()-1,row);
        }
/*      FreeStream(qr->Cells); */
        restore_emm();

tt = qr->tot;
        if (qr->child != TAGNULL)
            PlaceTag(row, qr->child, tt | TAG_OSHEET);
        else if (tt & TAG_TOT)
            PlaceTag(row, qr->span, tt);

done:
        qrn = qr->qNxtRow;
/*      freeq(qr,sizeof(RREC)); */
        return (qrn);
} /* end PutRow */

/*:FREEROW */
QRREC FreeRow(QRREC qr)
{
        QRREC qrn;

save_emm();
        FreeStream(qr->Cells);
        restore_emm();
        qrn = qr->qNxtRow;
        freeq(qr,sizeof(RREC));
        return (qrn);
} /* end FreeRow */ if TTOTS
/*:FIXTOTALS -- fixup total line tags after a shift or sub-total. */
void FixTotals(ROW row,LEVEL lev /*,int delta,flg fTagOnly*/ )
{
        ROW r,rowMax = MaxRow();
        LEVEL l;
        TAG tag;

for (r=row; r < rowMax; ++r) {
            l = GetLevel(r);
            if (l < lev) {    /* scopes total level fixed so far */
                lev = l;
                if (ScanTag(r,&tag) == TAG_TOT) {
                    if (!fNewTag && r-tag-1 <= row) {
#if 0
                        if (delta < 0)
                            PlaceTag(r, tag+delta, TAG_TOT);
                        if (!fTagOnly)
#endif
                            DoTotals(r,BO_NULL);
                    }
                }
            }
        }
} /* end FixTotals */
endif TTOTS /*:ADDROWSTOTAG -- recursively add rows to tag at appropriate level */
QRREC AddRowsToTag(QTREC qt,QRREC qrf,LEVEL ParentLev)
{
        QRREC qr;
        QTREC qtc;
        LEVEL LastLev;

if (qrf == QNULL)
            return QNULL;

qr = qt->qLast;
        LastLev = qr->level;
```

```
    /* if children, recurse to add rows to child */
    if (qr->child != TAGNULL) {
        qtc = FindTag(qr->child);
        if (qtc == QNULL)
            LostTag(qr->child);
        else {
            qrf = AddRowsToTag(qtc,qrf,LastLev);
            if (qrf == QNULL)
                return QNULL;
        }
    }

/* if first new row should be child of tag's last row */
    if (qrf->level > LastLev) {
        qtc = MkTag();          /* make new tag for last */
        qr->child = qtc->tag;
        qtc->qFirst = qrf;
        do {                    /* and attach all inferior rows */
            qr = qrf;
            qrf = qrf->qNxtRow;
        } while (qrf != QNULL && qrf->level > LastLev);
        qtc->qLast = qr;
        qr->qNxtRow = QNULL;
    }

/* attach all inferior rows to end of tag's row list */
    qr = qt->qLast;
    while (qrf != QNULL && qrf->level > ParentLev) {
        qr->qNxtRow = qrf;
        qr = qrf;
        qrf = qrf->qNxtRow;
    }
    qr->qNxtRow = QNULL;
    qt->qLast = qr;
    return (qrf);
} /* end AddRowsToTag */

/*:MAKECELLCONSTANT -- replace formula with it's value */
void MakeCellConstant(ROW r,COL c)
{
    GetCellForm(r,c);
    if (cellType == T_FORMULA) {
        GetCellStack(r,c,NULL);
        PutCellStack(r,c,cellForm);
    }
} /* end MakeCellConstant */

/*:MAKEROWCONSTANT */
void MakeRowConstant(ROW r)
{
    COL c;
    for (c=MinCol(); c < MaxCol(); ++c)
        MakeCellConstant(r,c);
}
void MoveCell(ROW r1,COL c1,ROW r2,COL c2)
{
    MoveRange(  c1,r1,c1,r1,
                c2,r2,c2,r2 );
}

/*:SWAPLABELS -- used to swap labels between total & parent rows */
COL SwapLabels(ROW row,ROW tRow,flg fHide)
{
    COL col,tCol;
    LEVEL lev;
    CFORM savForm;
    CTYPE savType;

lev = GetLevel(row);
    col = LevelCol(lev);
    lev = GetLevel(tRow);
    tCol = LevelCol(lev);

#if 1   /* new way keeping all info on sheet */
```

```
    /* temp <- parent */
    GetCellForm(row,col);
    savType = cellType;

/* fetch total label */
    GetCellForm(tRow,tCol);
    if (cellType == T_LABEL) {
        if (savType == T_LABEL) {
            MoveCell(tRow,tCol,TagRow(),TagCol());  /* total -> temp */
            MoveCell(row,col,tRow,col);              /* parent -> total */
            MoveCell(TagRow(),TagCol(),row,tCol);    /* temp -> parent */
        } else if (tCol < col) {
            MoveCell(tRow,tCol,row,tCol);
        }
    } else if (savType == T_LABEL) {
        if (col < tCol) {
            MoveCell(row,col,tRow,col);
        }
    } /* else no labels, no swap */
    UpdateBudRange();   /* make sure bud range is preserved */
#else    /* old way */

/* temp <- parent */
    GetCell(row,col);
    savForm = cellForm;
    savType = cellType;
    strcpy(savebuf,cellPtr);

/* fetch total label */
    GetCell(tRow,tCol);
    if (cellType == T_LABEL) {
        if (savType == T_LABEL) {
            if (fHide) {
                MoveCell(row,col,tRow,col);
                /* parent <- total */
                PutCell(row,tCol,cellType,cellForm,cellPtr);
            } else {
                MoveCell(tRow,tCol,row,tCol);
                /* total <- temp */
                PutCell(tRow,col,savType,savForm,savebuf);
            }
            if (col != tCol) {
                EraseCell(row,col);
                EraseCell(tRow,tCol);
            }
        } else if (tCol < col) {
            if (fHide) {
                /* parent <- total, clear total label */
                PutCell(row,tCol,cellType,cellForm,cellPtr);
                EraseCell(tRow,tCol);
            } else {
                MoveCell(tRow,tCol,row,tCol);
            }
        }
    } else if (savType == T_LABEL) {
        if (col < tCol) {
            if (fHide) {
                MoveCell(row,col,tRow,col);
            } else {
                /* total <- temp(parent), clear parent label */
                PutCell(tRow,col,savType,savForm,savebuf);
                EraseCell(row,col);
            }
        }
    } /* else no labels, no swap */
endif return (col);
} /* end SwapLabels */

/*:CHECKMEMFORMOVE */
flg CheckMemForMove(ROW row,ROW NumRows,COL ColLim)
{
```

```c
    COL col;
    ROW r;
    long NeedSpace;

NeedSpace = 0;
    for (col=AMinCol(); col < ColLim; ++col) {
        for (r=row+NumRows; r >= row; --r) {
            if (GetCellForm(r,col) || cellForm != DEFAULT_FMT) {
                NeedSpace += ((r-row+4) & ~3) * 4;
                break;
            }
        }
    }
    if (GetFreeSpace() < NeedSpace + MOVE_GAP) {
        fWedged = TRUE;
        return TRUE;
    } return FALSE;
} /* end CheckMemForMove */

/*:FINDDESTINATION */
flg FindDestination(ROW * pDest,int numRows)
{
    ROW row;

row = MkSaveArea();
    if (row == 0)
        return TRUE;

if (!RowsBound()) {
        *pDest = SetRowLim(row);
    } else {
        if (InsRows(row+1,numRows,TRUE))
            return TRUE;
        *pDest = row+1;
    }
    return FALSE;
} /* end FindDestination */

/*:COLLAPSEROW
** recursively collapse a row so all inferior rows posses their
** own inferiors.
** moves data off sheet but does NOT slide trailing rows up.
** returns number of rows "owned".
*/
CR_CODE CollapseRow(ROW row,int * pSkip,flg fIndentSeen)
{
    RANGE rng;
    ROW r,dest;
    COL col,ColLim = MaxCol();
    CR_CODE crcode;
    TAG tag;
    TAGTYPE tt;
    int numRows,skip,ct;
    LEVEL lev,mLev;
    QRREC qr,qrp,qrm = QNULL;
    QTREC qt;
    flg fHasTot = FALSE;
    flg fFirst;
    flg fIndentFound;
#if TTOTS
    flg fSavTot = FALSE;
    TAG tag2;
#endif

*pSkip = 0;
    crcode = ScopeForward(row,&numRows,&mLev,fIndentSeen,&fIndentFound);
    if (crcode == CR_STOP)
        return CR_STOP;
    if (numRows == 0)
        return CR_NORM;
```

```
#if TTOTS
    if (crcode == CR_NEWTOT) {
        if (PlaceTag(row+numRows+1, numRows, TAG_TOT | TAG_SAVTOT))
            goto Wedged;
        fHasTot = fSavTot = TRUE;
    } else if (crcode == CR_TOT) {
        fHasTot = TRUE;
        if (ScanTag(row+numRows+1,&tag2) & TAG_SAVTOT)
            fSavTot = TRUE;
    }
#else
    if (crcode == CR_NEWTOT)
        /* fSavTot = */
        fHasTot = TRUE;
endif /* check for intrusive formulas */
    if (mLev < MAXLEVEL) {
        /* find row for identifying key column */
        for (r = row + numRows + fHasTot;
            r > row && (lev=GetLevel(r)) >= MAXLEVEL;
            --r)
                continue;    /* skip noise rows */
        /* determine key column */
        fFirst = TRUE;
        for (col=LevelCol(lev); col < ColLim; ++col) {
            GetCellForm(r,col);
            if (fFirst) {
                fFirst = FALSE;
                if (cellType == T_LABEL)
                    continue;
            }
            if (cellType != T_BLANK)
                break;
        }
        if (col < MaxCol()) {
            /* scan rows */
            rng.top = row;
            rng.bot = rng.top + numRows;
            if (!fHasTot)
                rng.top += 1;
            for (r=MinRow(); r < MaxRow(); ++r) {
                if (r == row && !OnSheet()) {    /* skip scoped rows */
                    r += numRows;
                    if (crcode == CR_TOT || crcode == CR_NEWTOT)
                        ++r;
                    continue;
                }
                GetCell(r,col);
                if (cellType == T_FORMULA &&
                    FormRangeCheck(cellPtr,&rng,TRUE)
                ) {
                    GlobErr = GE_FORM_REF;
                    GlobErrVal = r+1;
                    return CR_NORM; /* blocked collapse */
                }
            }
        }
    } /* end intrusive formula check */ if (OnSheet()) {
    if (fHasTot)
        ++numRows;

/* find destination area */
    if (FindDestination(&dest,numRows))
        goto Wedged;

if (!RowsBound()) {
        if (CheckMemForMove(row+!fHasTot,numRows,ColLim))
            goto Wedged;
    }
```

```
        /* total adjustments */
        r = row;
        if (fHasTot) {
            row += numRows;
            SwapLabels(r,row,TRUE); /* swap parent and total labels */
            crcode = CR_TOT;
        } else {
            ++r;
            crcode = CR_NORM;
        }
        /* move the rows */
        --ColLim;
        MoveRange( AMinCol(),   r,      ColLim, r   +numRows-1,
                   AMinCol(),   dest,   ColLim, dest+numRows-1  );
        /* fix the tag info */
#if TTOTS
        tt = (ScanTag(row,&tag) & TAG_MASK) | (numRows << TAG_SHIFT);
#else
        tt = (fHasTot ? TAG_TOT|TAG_SAVTOT : 0) | (numRows << TAG_SHIFT);
#endif
        tag = dest;
    } else {
        if (GetFreeSpace() < ALLOC_GAP+sizeof(TREC) + (numRows*sizeof(RREC)))
            goto Wedged;

/* scan and grab children */
        for (qrp = QNULL, ct = 0; ct < numRows; qrp = qr, ct += skip+1) {
            r = row + ct + 1;

#if 1   /* hierarchical hides disabled */
            skip = 0;
#else
            if (fSavTot)
                skip = 0;
            else {
                /* collapse inferior rows */
                crcode = CollapseRow(r,&skip,fIndentFound);
                if (crcode == CR_STOP) {
                    if (GlobErr == GE_MEM_OUT)
                        goto Wedged;
                    break;
                }
                if (crcode == CR_TOT) {
                    r += skip;
                    ct += skip;
                    skip = 0;
                }
            }
endif  /* hierarchical hides */ lev = GetLevel(r);
            qr = GrabRow(r);        /* move off-sheet */
            if (qr == QNULL)
                goto Wedged;
            qr->level = lev;
            if (qrp == QNULL)       /* link up */
                qrm = qr;
            else
                qrp->qNxtRow = qr;
        } /* end for inferior rows */ tt = ScanTag(row,&tag);
        if (!(tt & TAG_OSHEET)) {
NewTag:     qt = MkTag();
            if (qt == QNULL)
                goto Wedged;
            tag = qt->tag;
            qt->qFirst = qrm;
            qt->qLast = qr;
        } else {
            qt = FindTag(tag);
            if (qt == QNULL) {
                LostTag(tag);
                goto NewTag;    /* save what we've got */
```

```
            }
            if (AddRowsToTag(qt,qrm,mLev) != QNULL) {
#if debug
                _SI = "Problem in collapse";
                DBGTRAP();
#endif
            }
        )

++r;     /* advance to total line */
#if TTOTS
        tt = ScanTag(r,&tag2);
        if (IS_TOT(tt) && tag2 == numRows) {
#else
        if (fHasTot) {
            tt = TAG_TOT | TAG_SAVTOT;
#endif
            crcode = CR_TOT;
            col = SwapLabels(row,r,TRUE);    /* swap parent and total labels */
            if (tt & TAG_SAVTOT) {           /* save total formulas if necc. */
                qr = GrabRow(r);
                if (qr == QNULL)
                    goto WedgedTag;
                qt->qLast->qNxtRow = qr;
                qt->qLast = qr;
                qt->fSavTot = TRUE;
            }
            MakeRowConstant(r);              /* replace formulas with values */
            qr = GrabRow(row);               /* grab parent row and save */
            if (qr == QNULL)
                goto WedgedTag;
            qr->child = TAGNULL;
            qr->qNxtRow = qt->qFirst;
            qt->qFirst = qr;
            ++numRows;
            row = r;
        } else {
            tt = 0;
            crcode = CR_NORM;
        }
    )

if (PlaceTag(row, tag, TAG_OSHEET | tt ))
        goto WedgedTag;
    *pSkip = numRows;
    GlobErr = NO_ERROR;
    return (crcode);

WedgedTag:
    freeq(qt,sizeof(TREC));
    SwapLabels(r,row,FALSE);
Wedged:
    while (qrm != QNULL)
        qrm = FreeRow(qrm);
    if (GlobErr == NO_ERROR)
        GlobErr = GE_MEM_OUT;
    *pSkip = 0;
    return CR_STOP;
) /* end CollapseRow */

/*:DOCOLLAPSE    -- collapse a row and fix up sheet */
int DoCollapse(ROW row,ROW * pNewRow)
{
    int NumRows, adjust;
    TAG tag;
    CR_CODE crcode;

DO_WAIT();

if (
#if TTOTS
        (IS_TOT(ScanTag(row,&tag))) ||
#endif
```

```
        ((tag=CheckForNewTot(row,0)) != 0)
    }
        row -= tag+1;   /* collapse a total maps to parent */
        crcode = CollapseRow(row,&NumRows,FALSE);
        if (NumRows != 0) {
            if (pNewRow != NULL) *pNewRow = row;
            adjust = (crcode != CR_TOT);
            DelRows(row+adjust, NumRows, (RowsBound() && OnSheet()) );
#if TTOTS
            FixTotals(row+1, GetLevel(row) /*, -NumRows, FALSE*/ );
#endif
        } else if (GlobErr == NO_ERROR)
            GlobErr = GE_NO_COLLAPSE;

return (NumRows);
} /* end DoCollapse */

/*:COUNTTAG -- count children owned by tag */
int CountTag(TAG tag, flg fFullExpand)
{
    int rows;
    QTREC qt;
    QRREC qr;

qt = FindTag(tag);
    if (qt == QNULL) {
        LostTag(tag);
        return 0;
    }
    if (qt->Lock != 0) {
        GlobErr = GE_LOCKED;
        return 0;
    }

/* count rows */
    for (qr=qt->qFirst, rows=0; qr != QNULL; qr=qr->qNxtRow, ++rows) {
#if !ITER_EXPAND
        if (fFullExpand && qr->child != TAGNULL) {
            rows += CountTag(qr->child, TRUE);
        }
endif
    }
    return (rows - qt->fSavTot);
} /* end CountTag */

/*:EXPANDTAG -- put tag's rows on sheet for expand */
int ExpandTag(TAG tag, /*ROW parent,*/ ROW row, flg fFullExpand)
{
    int r;
    int AdjID, top;
    int cdelta;
    QTREC qt;
    QRREC qr;
#if !ITER_EXPAND
    int skip;
    TAG child;
    TAGTYPE tt;
endif
    qt = FindTag(tag);
    if (qt == QNULL) {
        LostTag(tag);
        return 0;
    }
    if (qt->Lock != 0)
        return 0;

/* restore values and free space */
    cdelta = BudRange.lft - qt->LftCol;
    AdjID = qt->AdjID;
    for (qr=qt->qFirst, top=r=row; qr != QNULL; ++r) {
#if !ITER_EXPAND
        child = qr->child;
        if (fFullExpand &&
            child != TAGNULL &&
```

```
                    FindTag(child)->Lock == 0
            ) { /* sub group */
                tt = qr->tot;
                if (tt) {    /* totaled group */
                    if (r > top)
                        PlayAdjRecs(AdjID,top,r-1,FALSE);
                    skip = ExpandTag(child, /*r,*/ r, fFullExpand);
                    if (fWedged) return 0;
                    r += skip;
                    if (!(tt & TAG_SAVTOT)) {
                        qr = PutRow(r, qr, cdelta); /* re-install total line */
                        if (fWedged) return 0;
                        PlayAdjRecs(AdjID,r,r,TRUE);
                    } else {
                        qr = qr->qNxtRow;        /* skip the constants row */
                        /* ?? storage leak -- use free? */
                    }
#if 0   /* wait for freetags */
                    SwapLabels(r-skip,r,FALSE);
#endif
                    PlaceTag(r, skip-1, tt);
                    if (!(tt & TAG_SAVTOT))
                        DoTotals(r,BO_NULL);
                } else {         /* untotaled group */
                    qr = PutRow(r, qr, cdelta); /* put parent line */
                    if (fWedged) return 0;
                    PlayAdjRecs(AdjID,top,r,FALSE);
                    r += ExpandTag(child, /*r,*/ r+1, fFullExpand);
                }
                top = r+1;
            } else
#endif
            {
                qr = PutRow(r,qr,cdelta);
                if (fWedged) return 0;
            }
        } if (r > top)
            PlayAdjRecs(AdjID,top,r-1,qt->fSavTot);
#if 0   /* wait for freetags */
        FreeTag(tag);   /* release the tag */
        ClearTag(parent);
endif return (r - row - qt->fSavTot);
} /* end ExpandTag */

/*:FREETAGS -- free tag & rows after ExpandTag */
int FreeTags(TAG tag, ROW parent, ROW row, flg fFullExpand)
{
    int r;
    int tmp;
    QTREC qt;
    QRREC qr;
#if !ITER_EXPAND
    int skip;
    TAG child;
    TAGTYPE tt;
endif qt = FindTag(tag);
    if (qt == QNULL) {
        LostTag(tag);
        return 0;
    }
    if (qt->Lock != 0)
        return 0;

/* free space */
    for (qr=qt->qFirst, r=row; qr != QNULL; ++r) {
#if !ITER_EXPAND
        child = qr->child;
        if (fFullExpand &&
```

```
                    child != TAGNULL &&
                    FindTag(child)->Lock == 0
                ) { /* sub group */
                    tt = qr->tot;
                    if (tt) {    /* totaled group */
                        skip = FreeTags(child, r, r, fFullExpand);
                        r += skip;
                        if (!(tt & TAG_SAVTOT)) {
                            qr = FreeRow(qr);   /* re-install total line */
                        } else {
                            qr = FreeRow(qr);   /* skip the constants row */
                        }
                        SwapLabels(r-skip,r,FALSE);
                    } else {         /* untotaled group */
                        qr = FreeRow(qr);    /* put parent line */
                        r += FreeTags(child, r, r+1, fFullExpand);
                    }
                } else
#endif
                    qr = FreeRow(qr);
    }
    tmp = qt->fSavTot;
    FreeTag(tag);    /* release the tag */
    ClearTag(parent);

return (r - row - tmp);
} /* end FreeTags */

/*:DOEXPAND -- expand row(s) */
int DoExpand(ROW row, flg fFullExpand, flg fDoChilds)
{
    TAGTYPE tt;
    TAG tag;
    int skip, NumRows = 0;
    int blanks;
    LEVEL lev,tlev;
    COL maxCol;
    ROW r = row;

#if ITER_EXPAND
#define fFULLEXPAND FALSE          /* iterative expand-all */
#else
#define fFULLEXPAND fFullExpand    /* recursive expand-all */
endif DO_WAIT();
    fWedged = FALSE;

/* locate tag formula */
    tt = ScanTag(row,&tag);
    if (!(tt & TAG_OSHEET)) {
        if (!fDoChilds || (lev=GetLevel(row)) >= MAXLEVEL)
            goto NoExpand;

iter:   /* loop to do full expand */
        blanks = 0;
        while (++row < BoundMaxRow()) { /* expand children */
            tlev = GetLevel(row);
            if (tlev >= MAXLEVEL) {
                if (blanks >= BLANKS)
                    break;
                ++blanks;
                continue;
            }
            blanks = 0;
            if (tlev <= lev)
                break;
            skip = DoExpand(row, fFullExpand, FALSE);
            row += skip;
            NumRows += skip;
            if (GlobErr == GE_NO_ROOM || GlobErr == GE_MEM_OUT)
                return (NumRows);
        }
        if (NumRows == 0)
```

```
            goto NoExpand;
        return (NumRows);
    }
    NumRows = OnSheet() ?
                (tt >> TAG_SHIFT)    :
                CountTag(tag, fFULLEXPAND) ;
    if (NumRows == 0) {
NoExpand:
        if (GlobErr != GE_LOCKED)
            GlobErr = GE_NO_EXPAND;
        return 0;
    }
    if (!(tt & TAG_TOT))
        ++r;
    if (InsRows(r, NumRows, (OnSheet() && RowsBound()) )) {
noMem:
        GlobErr = fWedged ? GE_MEM_OUT : GE_NO_ROOM;
        return 0;
    }
    if (OnSheet()) {
        maxCol = MaxCol() - 1;
        tag += NumRows;        /* compensate for row insertion above */
        MoveRange( AMinCol(),   tag,     maxCol, tag+NumRows-1,
                   AMinCol(),   r,       maxCol, r  +NumRows-1 );
        DelRows(tag, NumRows, RowsBound() );
        ClearTag(row);
    } else {
        fWedged = FALSE;
        ExpandTag(tag, /*row,*/ r, fFULLEXPAND);
        if (fWedged) {
            DelRows(r,NumRows,FALSE);
            goto noMem;
        }
        FreeTags(tag, row, r, fFULLEXPAND);
        TrimAdjRecs();
    }
    r = row + NumRows;
    if (tt & TAG_TOT) {
        PlaceTag(r, NumRows-1, tt & TAG_MASK & ~TAG_OSHEET);
        SwapLabels(row,r,FALSE);
        if (!(tt & TAG_SAVTOT))
            DoTotals(r,BO_NULL);
    }
if TTOTS
    FixTotals(r+1, GetLevel(row) /*, NumRows, FALSE*/ );
endif if ITER_EXPAND
    if (fFullExpand) {
#else
    if (OnSheet() && fFullExpand) {
#endif
        lev = GetLevel(row);
        goto iter;
    }
    return (NumRows);
} /* end DoExpand */
#undef fFULLEXPAND
#if 0
/*:RESTOREALL -- Restores display state of row collapsing. */
void RestoreAll(void)
{
    ROW r;

for (r=MinRow(); r < BoundMaxRow(); ++r) {
        if (ScanTag(r,NULL) == TAG_MARK) {
            ClearTag(r);      /* remove mark */
            DoCollapse(r,NULL);
        }
    }
} /* end RestoreAll */
#endif

/*:EXPANDALL
```

```c
**  expands all rows and leaves tags for restoring display state
*/
int ExpandAll(void)
{
    ROW r;
    TAG tag;
    int skip;
    int marks = 0;

DO_WAIT();

for (r=MinRow(); r < BoundMaxRow(); ++r) {
        if (ScanTag(r,&tag) & TAG_OSHEET) {
            skip = DoExpand(r,TRUE,FALSE);
            if (skip == 0) {
#if 0
                if (fRestore)
                    RestoreAll();
#endif
                return -1;
            }
if 0
            if (fRestore)
                PlaceTag(r,0,TAG_MARK);
#endif
            ++marks;
            if (CurRow > r)
                CurRow += skip;
            r += skip;
        }
    }
    return (marks);
} /* end ExpandAll */

/*:DOMOVE -- move rows */
int DoMove(ROW To,ROW FromTop,ROW FromBot)
{
#if 0
    QRREC qr,qrp,qrm;
#endif
    ROW row,NumRows,r2;
    TAG tag;
    TAGTYPE tt;
    LEVEL lev;
    CR_CODE crc;
    COL ColMax;

if (INRANGE(FromTop, To, FromBot+1))
        return 0;

DO_WAIT();
    /* scan range, adjust top & bot out to include maximum scopes */
    for (row=FromTop; row <= FromBot; ++row) {
        crc = ScopeForward(row,&NumRows,&lev,FALSE,NULL);
        if (crc == CR_STOP)
            break;
        if (crc != CR_NORM) {
            row += NumRows+1;   /* skip forward over totaled scope */
        } else {
            tt = ScanTag(row,&tag);
            if (tt & TAG_OSHEET)
                continue;
            /* check for backward total scope */
            if ((tt & TAG_TOT) || ((tag=CheckForNewTot(row,0)) != 0)) {
                r2 = row - tag - 1;
                if (r2 < FromTop)
                    FromTop = r2;   /* adjust backwards scope */
            } else
                row += NumRows; /* skip forward over indented scope */
        }
    }
    FromBot = row-1;    /* adjust bottom to lowest scope */
```

```
    if (INRANGE(FromTop, To, FromBot+1))
        return 0;

NumRows = FromBot - FromTop + 1;
    ColMax = AMaxCol() - 1;
    MoveRange(  AMinCol(),   To,          ColMax, MAXROW-NumRows,
                AMinCol(),   To+NumRows,  ColMax, MAXROW   );
    if (To < FromTop) {
        FromTop += NumRows;
        FromBot += NumRows;
    }
    MoveRange(  AMinCol(),   FromTop,     ColMax, FromBot,
                AMinCol(),   To,          ColMax, To+NumRows   );
    MoveRange(  AMinCol(),   FromBot+1,   ColMax, MAXROW,
                AMinCol(),   FromTop,     ColMax, MAXROW-NumRows   );

return 1;
} /* end DoMove */

/* range scanning stuff */ void ScanBlankCell(void)
{
    if (_AL != T_BLANK)
        fIsNonBlank = TRUE;
}

/* used by ScanTotRange */
void ScanTotCell(void)
{   /* paramters are _CX,_DX sent by range scan */
    if (_AL != T_BLANK && _AL != T_LABEL)
        rfTotals[_CX] = TRUE;
}
void ScanCTotCell(void)
{   /* paramters are _CX,_DX sent by range scan */
    if (_AL != T_BLANK && _AL != T_LABEL)
        fHasValue = TRUE;
} pragma warn -par
void cdecl ScanRange(
    ord16 left, ord16 top, ord16 right, ord16 bot, PFV ScanFunc
    )
{
    if (top > bot || left > right)
        return;
    _DI = (uns) ScanFunc;
    _SI = (uns) &left;
    _AX = _CS;
    _ES = _AX;
    _AL = 0;
    DO_RANGE_SCAN();
    FIX_DS;
}
pragma warn .par /*:CLOSESUB -- scan the most recent sub-total's range */
void CloseSub(void)
{
    ROW row;

row = rSubTots[ctSubs].row;
    ScanTotRange(SubCol,      row-rSubTots[ctSubs].ct,
                 MaxCol()-1,  row );
}

/*:NEWSUB    -- open a new sub-total range in rSubTots */
flg NewSub(ROW r)
{ if (ctSubs >= 0 && SubCol != -1) {
        if (rSubTots[ctSubs].row - rSubTots[ctSubs].ct - 1 == r) {
```

```
            ++rSubTots[ctSubs].ct;
            return FALSE;
        }
        CloseSub();
    }
    if (++ctSubs >= MAX_SUB_TOT)
        return TRUE;

rSubTots[ctSubs].row = r;
    rSubTots[ctSubs].ct = 0;
    return FALSE;
} /* end NewSub */

/*:MKTOTFORM -- build summary formula for row totals */
void MkTotForm(COL c)
{
    int i;
    ROW r;
    char ColName[3];
    char CellName[7];

/* form column name */
    MkColName(c,ColName);

/* build summary formula for all subtotals */
    strcpy(formbuf,atsumparen_string);
    for (i=0; i <= ctSubs; ++i) {
        r = rSubTots[i].row + 1;
        sprintf(CellName,"%s%u", ColName, r);
        if (i != 0)
            strcat(formbuf,comma_string);
        strcat(formbuf,CellName);
        if (rSubTots[i].ct != 0) {
            strcat(formbuf,dotdot_string);
            sprintf(CellName,"%s%u", ColName, r-rSubTots[i].ct );
            strcat(formbuf,CellName);
        }
    } /* end for each sub-tot */
    strcat(formbuf,rparen_string);
} /* end MkTotForm */

/*:SCANROWBREAKS -- scan range and make list of sub-totals */
void ScanRowBreaks(ROW r,ROW row)
{
    flg fSubOpen;
    TAG tag;
    TAGTYPE tt;

ctSubs = -1;
    fSubOpen = FALSE;
    while (--r > row) {
        tt = ScanTag(r,&tag);
        if (
#if TTOTS
            IS_TOT(tt) ||
#endif
            (!(tt & TAG_OSHEET) && (tag=CheckForNewTot(r,0)) != 0)
        ) {
            NewSub(r);
            r -= (tag+1);       /* jump over sub-totaled range */
            fSubOpen = FALSE;
        } else if (fSubOpen) {
            rSubTots[ctSubs].ct++;
        } else {
            NewSub(r);
            fSubOpen = TRUE;
        }
    }
    CloseSub();
} /* end ScanRowBreaks */

/*:DOTOTALS -- Install totals for a row */
int DoTotals(ROW row,BARS_OPT BarsOpt)
{
```

```
    ROW TotRow;
    COL c,col,hiCol,ColLim;
    TAG tag;
    LEVEL mLev /*,lev*/;
    int bars,added /*,blanks=0*/;
    CR_CODE crc;
    flg fHadBars;

DO_WAIT();
    bars = added = 0;
    TotRow = row;
    if (
#if TTOTS
        (IS_TOT(ScanTag(row,&tag))) ||
#endif
        ((tag=CheckForNewTot(row,0)) != 0)
    ) { /* redo totals on this line */
        row -= tag+1;
        mLev = GetLevel(row);
    } else {
        /* scan for range to total over */
        crc = ScopeForward(row,(int*)&tag,&mLev,FALSE,NULL);
        if (crc == CR_STOP) {
NoTot:
            GlobErr = GE_NO_TOTAL;
            return -1;
        }
        TotRow = row + tag + 1;
        if (crc == CR_NORM) {
            if (TotRow <= row+1)
                goto NoTot;
            added = 1;
            if (BarsOpt > BO_NONE) {
                bars = 1;
                ++added;
                ++TotRow;
            }
            if (InsRows(TotRow-bars,added,FALSE)) {
InsErr:
                GlobErr = GE_NO_ROOM;
                return -1;
            }
if 0
            InsOSRows(TotRow,1);
#endif
        } else {                        /* total row exists */
#if TTOTS
            if (crc == CR_NEWTOT) {
                PlaceTag(TotRow, tag, TAG_TOT);
            }
endif
            /* added = 0; -- default */
        }
    } /* end range scan */ if (BarsOpt != BO_NULL && !added) {
        fHadBars = (GetLevel(TotRow-1) >= MAXLEVEL);
        if (BarsOpt == BO_NONE) {
            if (fHadBars) {
                DelRows(--TotRow,1,FALSE);
            }
        } else { /* adding bars */
            if (!fHadBars) {
                if (InsRows(TotRow,1,FALSE))
                    goto InsErr;
                ++TotRow;
            }
            bars = 1;
        }
    } memclr(rfTotals,MAXCOL);    /* clear value flags */
    col = LevelCol(mLev);
    SubCol = col+1;
```

```
ScanRowBreaks(TotRow,row);

ColLim = MaxCol();
SetCHdrRow();
hiCol = 0;
for (c=SubCol; c < ColLim; ++c) {    /* for each column with values */
    if (rfTotals[c] ||               /* data exists? or */
        (fColHdrDef &&               /* cols defined? and */
         GetCellForm(CHdrRow,c)      /* col hdr not blank? */
        )
    ) {
        /* make formula and install */
        GetCellForm(TotRow-added,c);
        MkTotForm(c);
        PutCell(TotRow, c, T_FORMULA, cellForm, formbuf);
        RecalcCell(TotRow,c);
        hiCol = c;
    }
} /* end for each col */
if (bars) {
    /* install bars */
    c = (fColHdrDef && SubCol < CHdrLft ? CHdrLft : SubCol);
    for (; c <= hiCol; ++c) {        /* for each column with values */
        PutCell(TotRow-1, c, T_LABEL, DEFAULT_FMT,
                (BarsOpt == BO_SINGLE ? "\\-" : "\\=") );
    }
} if TTOTS
    PlaceTag(TotRow,TotRow-row-1,TAG_TOT);
endif if (added) {
        /* make the label */
        GetCell(row,col);
        c = LevelIndent(mLev) + 1;
        setmem(formbuf, c, ' ');
        formbuf[0] = '\'';
        sprintf(formbuf+c,"Total %s",cellPtr+c);
        PutCell(TotRow, col, T_LABEL, cellForm, formbuf);

#if TTOTS
        FixTotals(TotRow+1, mLev /*, 1, FALSE*/ );
#endif
    } return (added);
} /* end DoTotals */

/*:LOCKTAG */
flg LockTag(flg fLock, TAG tag, int key)
{
    QTREC qt;
    QRREC qr;
    flg fSet = FALSE;

if (tag != TAGNULL && ((qt=FindTag(tag)) != QNULL)) {
        if (fLock) {
            if (qt->Lock == 0)
                qt->Lock = key;
        } else {
            if (qt->Lock == key) {
                qt->Lock = 0;
                fSet = TRUE;
            }
            for (qr=qt->qFirst; qr != QNULL; qr=qr->qNxtRow) {
                fSet |= LockTag(fLock,qr->child,key);
            }
        }
    }
    return (fSet);
} /* end LockTag */
```

```c
/*:DOLOCKING */
flg DoLocking(flg fLock, char * pw, PRANGE pRng)
{
    ROW row, maxRow;
    int key = HashPW(pw);
    TAG tag;
    flg fSet;

row = max(pRng->top,MinRow());
    maxRow = min(pRng->bot,MaxRow()-1);
    for (fSet=FALSE; row <= maxRow; ++row) {
        if (ScanTag(row,&tag) & TAG_OSHEET) {
            fSet |= LockTag(fLock,tag,key);
        }
    }
    return (fSet);
} /* end DoLocking */

/*:ROWISLOCKED */
flg RowIsLocked(ROW row)
{
    TAG tag;
    QTREC qt;

if (StoreOpt == SO_SHEET)
        return FALSE;

if (ScanTag(row,&tag) & TAG_OSHEET) {
        qt = FindTag(tag);
        if (qt != QNULL && qt->Lock != 0)
            return TRUE;
    }
    return FALSE;
} /* end RowIsLocked */

/*:ROWHASCHILDREN */
flg RowHasChildren(ROW row)
{
    return ((ScanTag(row,NULL) & TAG_OSHEET) != 0);
}

/* end BROWS.C */

/* MODES: TAB 4    Last Revision: Mon 05-29-89 07:00
**
** BUDLIB.CAS   --  TC library functions used in bud.
**
** Copyright (C) 1989 Saratoga Software, Inc.  All rights reserved.
**
** 9/04/88 dbh changed memset to memclr.
** 9/02/88 dbh moved strstr & strrchr to bmisc.c
** 7/18/88 dbh added strncpy (0.24).
*/ pragma inline
pragma warn -rvl include "bud.h"
include <string.h>
include <mem.h>

/*:STRSTR */
char    *strstr(const char *s1, const char *s2)
{
    unsigned int    Lng2;

/* Save DS in COMPACT and LARGE models */ if defined(__COMPACT__) || defined(__LARGE__)
I   PUSH    DS
#endif
```

```
    /* Set ES equal to DS in TINY, SMALL and MEDIUM models */ if defined(__TINY__) || defined(__SMALL__) || defined(__MEDIUM__)
    _ES = _DS;
endif /* Compute length of s1 */ if defined(__TINY__) || defined(__SMALL__) || defined(__MEDIUM__)
I   MOV DI, s1
#else
I   LES DI, s1
#endif
I   MOV BX, DI
I   XOR AX, AX
I   MOV CX, -1
I   REPNZ   SCASB
I   INC CX
I   NOT CX /* Compute length of s2, and check Lng1 > Lng2 */

I   PUSH    CX
#if defined(__TINY__) || defined(__SMALL__) || defined(__MEDIUM__)
I   MOV DI, s2
#else
I   PUSH    ES
I   LES DI, s2
I   PUSH    ES
#endif
I   MOV DX, DI
I   MOV CX, -1
I   REPNZ   SCASB
I   INC CX
I   NOT CX
I   MOV Lng2, CX
#if defined(__COMPACT__) || defined(__LARGE__) || defined(__HUGE__)
I   POP DS
I   POP ES
#endif
I   POP AX
I   INC AX      /* $$$ DM: bug fix 06/05/87 $$$ */
I   SUB AX, CX
I   JLE NotFound /* First, search for first character of s2 in s1 */

Again:
I   MOV DI, BX
I   MOV BX, AX
I   MOV SI, DX
I   LODSB
I   MOV CX, BX
I   JCXZ    NotFound
I   REPNZ   SCASB
I   MOV BX, CX
I   JNZ NotFound /* If found, then compare Lng2 characters from this point */

I   MOV AX, BX
I   MOV BX, DI
I   MOV CX, Lng2
I   REPZ    CMPSB
I   JCXZ    Found
I   JMP Again
NotFound:
I   XOR AX, AX
I   CWD
I   JMP End
Found:
I   MOV AX, BX
I   DEC AX
I   MOV DX, ES
End:
```

```
        /* Restore DS in COMPACT and LARGE models */
#if defined(__COMPACT__) || defined(__LARGE__)
I   POP DS
#endif
    /*nop*/;
#pragma warn -rvl
) /* end strstr */
pragma warn .rvl /*:STRRCHR */
char    *strrchr(const char *s, char c)
{
    register char    *ss;

for (ss = (char*) s + strlen(s); ss > s; )
        if (*--ss == c)
            return(ss);
    return(0);
} /* end strrchr */ char *strlwr(char * s)
{
    char * str;

for (str=s; *str; ++str) {
        if (isupper(*str))
            *str += 0x20;   /* tolower */
    }
    return s;
} char *strupr(char * s)
{
    char * str;

for (str=s; *str; ++str) {
        if (islower(*str))
            *str -= 0x20;   /* toupper */
    }
    return s;
} char    *strcat(char *dest, const char *src)
    {
    strcpy(dest + strlen(dest), src);
    return(dest);
    } char    *strchr(const char *s, char c)
    {
    while   (*s != c)
        if (*s++ == '\0') return(0);
    return((char*)s);
    } char    *strcpy (char *dest, const char *src)
{
I   cld
                /* find the length the source string */
#if defined(__LARGE__) || defined(__COMPACT__)
I   push    DS
#endif
#if defined(__LARGE__) || defined(__COMPACT__) || defined(__HUGE__)
I   LES di,dword ptr src
#else
I   mov di,src
I   mov ax,ds
I   mov es,ax
#endif
I   mov si,di           /* save for movsb later */
I   xor al,al
I   mov cx, -1
I   repne   scasb
```

```
I   not cx   /* CX = source length including terminator */ if defined(__LARGE__) || defined(__COMPACT__) || defined(__HUGE__)
I   mov bx,es
I   mov ds,bx
I   les di,dword ptr dest
#else
I   mov di,dest
#endif
I   rep movsb if defined(__LARGE__) || defined(__COMPACT__)
I   pop DS
endif
    return(dest) ;
}                    /* end strcpy */ if 0
char *strncpy (char *dest, const char *src, unsigned maxlen)
{
    asm cld
#if defined ( __LARGE__ ) || defined ( __COMPACT__ )
    asm push    ds
#endif
#if defined ( __LARGE__ ) || defined ( __HUGE__ ) || defined ( __COMPACT__ )
    asm les di,dword ptr src
#else
    asm mov di,src
    asm mov ax,ds
    asm mov es,ax
#endif
    asm mov si,di
    asm xor al,al
    asm mov bx,maxlen
    asm mov cx,bx
    asm repne   scasb
    asm sub bx,cx       /* BX = source length including terminator */ if defined ( __LARGE__ ) || defined ( __HUGE__ ) || defined ( __COMPACT__ )
    asm mov dx,es
    asm mov ds,dx
    asm les di,dword ptr dest
#else
    asm mov di, dest
#endif
    asm xchg    cx,bx
    asm rep movsb            /* copy source to target */
    asm mov cx,bx
    asm rep stosb            /* terminate and zero-fill */ if defined ( __LARGE__ ) || defined ( __COMPACT__ )
    asm pop ds
#endif
    return(dest) ;
}       /* end strncpy */
endif int strcmp(const char *s1, const char *s2)
{
I   cld
/*  Determine size of 2nd source string. */
#if defined(__LARGE__) || defined(__COMPACT__)
I   push    DS
#endif
#if defined(__LARGE__) || defined(__COMPACT__) || defined(__HUGE__)
I   LES di,dword ptr s2
I   mov si,di            /* to avoid a later les */
#else
I   mov di,s2
I   mov si,di            /* to avoid another memory mov */
I   mov ax,ds
I   mov es,ax
#endif
I   xor al,al
```

```
I   mov cx,-1
I   repne   scasb
I   not cx              /* cx = length of s1 */
/* Set pointers for cmpsb */
I   mov di,si
#if defined(__LARGE__) || defined(__COMPACT__) || defined(__HUGE__)
I   LDS si,dword ptr s1
#else
I   mov si,s1
endif /*  Scan until either *s2 terminates or a difference is found.  Note that
    it is sufficient to check only for right termination, since if the left
    terminates before the right then that difference will also terminate
    the scan.
*/
I   repe    cmpsb
/*  The result is the signed difference of the final character pair, be they
    equal or different.
*/
I   mov al,[si-1]       /* to point at chars just cmp'ed */
I   sub al,es:[di-1]
I   cbw if defined(__LARGE__) || defined(__COMPACT__)
I   pop DS
endif
    return ;
)       /* end strcmp */ int stricmp(const char *s1, const char *s2)
{
#if 1
    return qstricmp(s1,s2);
else if defined(__LARGE__) || defined(__COMPACT__)
I   push    DS
#endif
#if defined(__LARGE__) || defined(__COMPACT__) || defined(__HUGE__)
I   LDS si,dword ptr s1
I   LES di,dword ptr s2
#else
I   mov si,s1
I   mov di,s2
I   mov ax,ds
I   mov es,ax
#endif
I   cld
/*  Scan until either *s1 terminates or a difference is found.  Note
    that it is sufficient to check only for left termination, since if the
    right terminates before the left then that difference will also
    terminate the scan.
*/ cmi_nextCh:
I   lodsb
I   or  al, al
I   jz  cmi_endZ
I   scasb
I   je  cmi_nextCh
I   mov ah, ES:[di-1]

/*  note: bug in 0.20 doesn't handle character constants
    right, so use ascii values directly.
*/
cmi_alUpper:                /* convert characters to upper case */
I   cmp al, 061h        /* 'a' */
I   jb  cmi_ahUpper
I   cmp al, 07ah        /* 'z' */
I   ja  cmi_ahUpper
I   sub al, 061h-041h   /* 'a' - 'A' */
```

```
cmi_ahUpper:
I   cmp ah, 061h        /* 'a' */
I   jb  cmi_compareAgain
I   cmp ah, 07ah        /* 'z' */
I   ja  cmi_compareAgain
I   sub ah, 061h-041h   /* 'a' - 'A' */
/*
    The result is the signed difference of the final character pair, be they
    equal or different.
*/
cmi_compareAgain:
I   cmp al, ah
I   je  cmi_nextCh cmi_end:
    /* al = s1 last byte; ah = s2 last byte */
I   sub al,ah
I   cbw if defined(__LARGE__) || defined(__COMPACT__)
I   pop DS
endif
    return ;

cmi_endZ:
I   mov ah, ES:[di]
I   jmp short   cmi_end endif
}       /* end stricmp */ unsigned    strlen(const char *src)
{
#if defined(__LARGE__) || defined(__COMPACT__) || defined(__HUGE__)
I   LES di,dword ptr src
#else
I   mov di,src
I   mov ax,ds
I   mov es,ax
#endif
I   mov al, 0           /* match the zero terminator */
I   mov cx, -1
I   cld
I   repne   scasb
I   mov ax, cx          /* result wanted in AX */
I   not ax              /* AX = -AX -1 */
I   dec ax              /* not counting the terminator */ return(_AX);
}       /* end strlen */ int strncmp(const char *s1, const char *s2, unsigned maxlen)
{
I   cld
/*  Determine size of 2nd source string. */
#if defined(__LARGE__) || defined(__COMPACT__)
I   push    DS
#endif
#if defined(__LARGE__) || defined(__COMPACT__) || defined(__HUGE__)
I   LES di,dword ptr s2
#else
I   mov di,s2
I   mov ax,ds
I   mov es,ax
#endif
I   mov si,di           /* for reinstating */
I   mov cx,maxlen
I   jcxz    ncm_trivial
I   mov bx,cx
I   xor al,al
I   repne   scasb
I   sub bx,cx
I   mov cx,bx           /* cx = either "maxlen" or strlen */
/*  Set pointers for cmpsb  */
```

```
I    mov   di,si
#if defined(__LARGE__) || defined(__COMPACT__) || defined(__HUGE__)
I    LDS   si,dword ptr s1
#else
I    mov   si,s1
endif /*   Scan until either *s2 terminates, a difference is found, or "limit" is
     reached.  Note that it is sufficient to check only for right termination,
     since if the left terminates before the right then that difference will
     also terminate the scan.
*/
I    repe  cmpsb
/*   The result is the signed difference of the final character pair, be they
     equal or different.
*/
I    mov   al,[si-1]
I    sub   al,es:[di-1]
I    cbw ncm_end:
if defined(__LARGE__) || defined(__COMPACT__)
I    pop   DS
#endif
     return ;
ncm_trivial:
I    xchg  ax,cx             /* 1 byte less than xor */
I    jmp short ncm_end
}          /* end strncmp */ int  strnicmp(const char *s1, const char *s2, unsigned maxlen)
{
#if defined(__LARGE__) || defined(__COMPACT__)
I    push  DS
#endif
#if defined(__LARGE__) || defined(__COMPACT__) || defined(__HUGE__)
I    LDS   si,dword ptr s1
I    LES   di,dword ptr s2
#else
I    mov   si,s1
I    mov   di,s2
I    mov   ax,ds
I    mov   es,ax
#endif
I    mov   cx,maxlen
I    jcxz  nci_trivial
I    cld /*   Scan until either *s1 terminates or a difference is found.  Note
     that it is sufficient to check only for left termination, since if the
     right terminates before the left then that difference will also
     terminate the scan.
*/ nci_nextCh:
I    lodsb
I    or    al, al
I    jz    nci_endZ
I    scasb
I    loope nci_nextCh
I    mov   ah, ES:[di-1]
I    je    nci_finalDif      /* happens when CX exhausted */

/*   note: bug in 0.20 doesn't handle character constants
     right, so use ascii values directly.
*/
nci_alUpper:                  /* convert characters to upper case */
I    cmp   al, 061h          /* 'a' */
I    jb    nci_ahUpper
I    cmp   al, 07ah          /* 'z' */
I    ja    nci_ahUpper
I    sub   al, 061h-041h     /* 'a' - 'A' */ nci_ahUpper:
I    cmp   ah, 061h          /* 'a' */
```

```
I   jb   nci_finalDif
I   cmp  ah, 07ah        /* 'z' */
I   ja   nci_finalDif
I   sub  ah, 061h-041h   /* 'a' - 'A' */
/* The result is the signed difference of the final character pair, be they
   equal or different.
*/
nci_finalDif:
I   jcxz    nci_end      /* ah = last s2 byte */
I   cmp al, ah           /* al = last s1 byte */
I   je  nci_nextCh       /* in upper case */ nci_end:
    /* al = s1 last byte; ah = s2 last byte */
I   sub al,ah
I   cbw nci_endf:
if  defined(__LARGE__) || defined(__COMPACT__)
I   pop DS
endif return ;

nci_trivial:                        /* cx = 0 because "maxlen" = 0 */
I   xor ax,ax
I   jmp short   nci_endf
nci_endZ:
I   mov ah, ES:[di]      /* al = 0 because at end of */
I   jmp short   nci_end  /* s1 string */
)   /* end strnicmp */ void    setmem(void *addr, unsigned len, char val)
{
#if defined(__LARGE__) || defined(__COMPACT__) || defined(__HUGE__)
I   les di,addr
#else
I   mov di,addr
I   mov ax,ds
I   mov es,ax
#endif
I   mov cx,len
I   mov al,val
I   mov ah,al
I   cld I   test    di,1
I   jz  isAligned
I   jcxz    done
I   stosb
I   dec cx
isAligned:
I   shr cx,1
I   rep stosw
I   jnc noOdd
I   stosb
noOdd:
done:   /*nop*/;
)

void memclr(void *src, unsigned n)
(
    setmem(src, n, 0);
)

void    movmem(void *src, void *dst, unsigned len)
{
    if (src < dst) {
I       std
I       mov ax,1    /* travel backward, need to adjust ptrs later */
    } else {
I       cld
I       xor ax,ax /* travel forward, no need to adjust ptrs */
    )
```

```
I   mov si,src
I   mov di,dst
I   mov cx,ds
I   mov es,cx
I   mov cx,len

I   or  ax,ax
I   jz  movit

I   add si,cx    /* backward move, adjust ptrs to end-1 */
I   dec si
I   add di,cx
I   dec di
movit:
I   test    di,1
I   jz  isAligned
I   jcxz    done
I   movsb
I   dec cx
isAligned:
I   sub si,ax       /* compensate for word moves */
I   sub di,ax
I   shr cx,1
I   rep movsw
I   jnc noOdd
I   add si,ax       /* recompensate for final byte */
I   add di,ax
I   movsb
noOdd:
done:
I   cld
} if 0
void    *memmove(void *dst, void *src, unsigned n)
{
    movmem(src,dst,n);
    return(dst);
}
endif QPTR qstrcpy(QPTR dst, QPTR src)
{
I   push ds I   les di,dword ptr src;
I   mov si,di           /* save for movsb later */
I   xor al,al
I   mov cx, -1
I   cld;
I   repne   scasb
I   not cx  /* CX = source length including terminator */

I   mov bx,es
I   mov ds,bx
I   les di,dword ptr dst
I   rep movsb

I   pop ds
    return (dst);
} /* end qstrcpy */ int qstrcmp(QPTR s1, QPTR s2)
{
I   push ds

I   les di,dword ptr s2;
I   mov si,di           /* save for cmpsb later */
I   xor al,al
I   mov cx, -1
I   cld;
I   repne   scasb
I   not cx
```

```
I    mov  bx,es
I    mov  ds,bx
I    les  di,dword ptr s1
I    repe cmpsb
I    mov  al,[si-1]
I    sub  al,es:[di-1]
I    cbw I    pop  ds
     return (_AX);
) /* end qstrcmp */

QPTR qmovmem(QPTR src, QPTR dst, card16 cnt)
{
I    push    ds        /* save it */
     if (src < dst) {
I        std
I        mov ax,1     /* travel backward, need to adjust ptrs later */
     } else {
I        cld
I        xor ax,ax /* travel forward, no need to adjust ptrs */
     }

I    lds  si,dword ptr src
I    les  di,dword ptr dst
I    mov  cx,cnt

I    or   ax,ax
I    jz   movit
I        add si,cx    /* backward move, adjust ptrs to end-1 */
I        dec si
I        add di,cx
I        dec di
movit:
I    test    di,1
I    jz   isAligned
I    jcxz    done
I        movsb
I        dec cx
isAligned:
I    sub si,ax        /* compensate for word moves */
I    sub di,ax
I    shr cx,1
I    rep movsw
I    jnc noOdd
I        add si,ax    /* recompensate for final byte */
I        add di,ax
I        movsb
noOdd:
done:
I    cld
I    pop ds
     return (dst);
) /* end qmovmem */ card16 qstrlen(QPTR src)
{
I    les di,dword ptr src
I    mov al, 0
I    mov cx, -1          /* match the zero terminator */
I    cld
I    repne   scasb
I    mov ax, cx          /* result wanted in AX */
I    not ax              /* AX = -AX -1 */
I    dec ax              /* not counting the terminator */
     return(_AX);
) /* end qstrlen */

/***************
CODE    SEGMENT BYTE PUBLIC 'CODE'
```

```
        CGROUP  group   CODE
            assume  cs:CODE

PUBLIC  SCOPY@
            EXTRN   QMOVMEM:NEAR

SCOPY@  proc    far
        IF 1
            ;;; chain to qmovmem (pascal conventions)
            mov bx,sp
            push    [bx+4 + 2]  ;push src
            push    [bx+4 + 0]
            push    [bx+4 + 6]  ;push dest
            push    [bx+4 + 4]
            push    cx          ;push len
            call    CGROUP:QMOVMEM  ;do it
            ret 8
        ELSE
            push    bp
            mov bp,sp
            push    si
            push    di
            push    ds
            lds si,dword ptr 6[bp]
            les di,dword ptr 10[bp]
            mov ax,ds
            mov dx,es
            cmp ax,dx
            ja  srchigher cmp si,di
            ja  srchigher
            cld
        comm:
            rep movsb
            cld
            pop ds
            pop di
            pop si
            pop bp
            ret 8
        srchigher:
            add si,cx
            add di,cx
            dec si
            dec di
            std
            jmp comm
        ENDIF SCOPY@  endp
        CODE    ends
            end
        ***************/

/* MODES: TAB 4     Last Revision:  Mon 05-29-89 07:00
**
** BUTIL.C -- Bud utility functions.
**
** Copyright (C) 1989 Saratoga Software, Inc.  All rights reserved.
**
** 7/19/88 dbh save/restore DTA in findfirst/next (0.3)
** 7/18/88 dbh catch overflow in ScanInt (0.24).
** 7/14/88 dbh added EraseCell.
** 8/31/87 dbh Created.
*/ include "bud.h"
include "bdroot.h"
include <string.h>
include <mem.h>
```

```c
forward void ToggleEndMode(void);
forward COL RightColOf(COL col);
forward COL LeftColOf(COL col);

/*:ERASECELL */
void EraseCell(ROW row,COL col)
{
    _CX = col;
    _DX = row;
    _AL = T_BLANK;
    IN_CELL();
}

/* used by EraseRange */
void EraRngCell(void)
{   /* paramters are _CX,_DX sent by range scan */
    if (_AL != T_BLANK) {
        _AL = T_BLANK;
        IN_CELL();
    }
} pragma warn -par
/*:ERASERANGE */
void cdecl EraseRange(
    ord16 left, ord16 top, ord16 right, ord16 bot
    )
{
    GET_ACTIVE();
    if (bot > _DX)
        bot = _DX;
    if (right > _CX)
        right = _CX;

if (top > bot || left > right)
        return;

_SI = (uns) &left;
    _DI = (uns) EraRngCell;
    _AX = _CS;
    _ES = _AX;
    _AL = 0;
    DO_RANGE_SCAN();
    FIX_DS;
}

/*:RECALCRANGE */
void cdecl RecalcRange(
    ord16 left, ord16 top, ord16 right, ord16 bot
    )
{
    _SI = (uns) &left;
    _AL = 0;
    DO_RECALC_RANGE();
}
pragma warn .par /*:RECALCCELL */
void RecalcCell(ROW row, COL col)
{
    RecalcRange(col,row,col,row);
}

/*:MKCOLNAME    -- form column name */
char * MkColName(COL c,char ColName[3])
{
    uns l;

ColName[1] = ColName[2] = 0;
    l = (c % 26) + 'A';
    c /= 26;
    if (c != 0) {
        ColName[0] = c + ('A'-1);
        ColName[1] = l;
```

```c
    } else
        ColName[0] = 1;
    return (ColName);
} /* end MkColName */

/*:SCANINT -- parse integer; return characters consumed */
card16 ScanInt(char * str, ord16 * pi)
{
    char * cp = str;
    flg fDigitSeen = FALSE;
    flg sign = FALSE;
    uns i = 0;

while (*cp == ' ') ++cp;
    if (*cp == '-') {
        sign = TRUE;
        ++cp;
    }
    while (isdigit(*cp)) {
        i = (10*i) + (*cp-'0');
#if 0
        if (i < 0)
            return 0;   /* overflow detected */
#endif
        ++cp;
        fDigitSeen = TRUE;
    }
    if (sign) i = (uns) (-(int)i);
    *pi = (int) i;
    return (fDigitSeen ? cp-str : 0);
} /* end ScanInt */

/*:PUTDEC -- print integer to string */
int putdec(char * str, uns i, int width)
{
    static char buf[5]; /* must be in DS to be called from interrupt */
    int j;

j = 0;
    do
        buf[j++] = i % 10 + '0';
    while ((i/=10) != 0);

while (j < width)
        buf[j++] = '0';
    width = j;

while (j--) *str++ = buf[j];
    *str = 0;

return (width);
} /* end putdec */ if debug
void puthex(char * str, uns u)
{
    static char digs[16] = "0123456789ABCDEF";
    int j;

for (j=4; j--; u >>= 4)
        str[j] = digs[u&0xf];
} /* end puthex */
endif define STACKPTR    _ss *   /* near ptr into SS: */

/*:SPRINTF -- minimal replacement for standard sprintf */
int cdecl sprintf(char * buf, char * form, ... )
{
    void * _ss * pArgs = (void * STACKPTR) (&form + 1);
    int i;
    char * pOut = buf;
    char c;
```

```
while ((c = *form++) != 0) {
    if (c != '%') {
outCh:
            *pOut++ = c;
        } else {
            i = 0;
            switch (c = *form++) {
            default:
                goto outCh;
            case 0:
                goto done;
            case 's':
                i = strlen(*(char * STACKPTR)pArgs);
                movmem(*(char * STACKPTR)pArgs, pOut, i);
                pOut += i;
                break;
            case 'y':
                i = 2;  /* special for year format from interrupt */
            case 'd':
            case 'u':
                pOut += putdec(pOut, *(int STACKPTR)pArgs, i);
                break;
#if debug
/* no use of STACKPTR because these aren't called from interrupt */
            case 'q':    /* special for far ptr */
                puthex(pOut,    ((uns*)pArgs)[1]);
                puthex(pOut+4,  ((uns*)pArgs)[0]);
                ++pArgs;
                pOut += 8;
                break;
            case 'x':
                puthex(pOut, *(uns*)pArgs);
                pOut += 4;
                break;
#endif
            } /* end switch */
            ++pArgs;
        } /* end else format */
    } /* end while */
done:
    *pOut = 0;
    return (pOut - buf);
} /* end sprintf */ if debug
uns dpfmask = 0;
void cdecl dpf(ord8 dbcode,char * format, ...)
{
    char buf[100];
    char *cp;
    void * /*_ss*/ * pArgs = (void * STACKPTR) (&format + 1);

if (dbcode < 0 || dpfmask & (1<<dbcode)) {
        sprintf( buf, format, pArgs[0], pArgs[1], pArgs[2], pArgs[3],
                    pArgs[4], pArgs[5], pArgs[6], pArgs[7], pArgs[8] );
        for (cp=buf; *cp; ++cp) {
            if (*cp == '\n') {
                _DL = '\r';
                CallDos(2);
            }
            _DL = *cp;
            CallDos(2);
        }
    }
} /* end dpf */
endif /* memory allocation */
QPTR allocq(card16 sz)
{
    if (!fMustAlloc) {
        GET_FREEBYTES();
        if (_CX == 0 && (_BX < (sz + ALLOC_GAP)))
            return QNULL;
```

```
        }
        _AX = sz;
        DO_ALLOC();
I       jnc noerr;
            return QNULL;
noerr:
        _DX = _ES;
        _AX = _BX;
#pragma warn -rvl
    }
pragma warn .rvl void freeq(QPTR q, card16 sz)
{
    if (q == QNULL) return;
I   les bx,dword ptr q;
    _AX = sz;
    DO_FREE();
}

/*:UNGETEVENT    -- unget an event (only works once) */
void UnGetEvent(EVENT evt)   {    ungotevt = evt;  }

/*:GETEVENT
** get a keyboard event; handle special keys that 123 screens.
*/
EVENT GetEvent(void)
{
    EVENT e;

if (fBreakDetected)
        return KEY_ABORT;

if (ungotevt) {
        e = ungotevt;
        ungotevt = 0;
        return e;
    }
    if (CtrlBreakDetect()) {
#if 0
        dpf(-1,"Break detected\n");
#endif
        fBreakDetected = TRUE;
        return KEY_ABORT;
    }
    GET_INPUT();
    if (_AL == KEY_BESC) {       /* esc char */
        GET_INPUT();             /* get next and transform */
        if (_AL != KEY_BESC) {   /* special case for literal escape char */
            _AH = 0;
            return (_AX + KEY_XLATE);
        }
    }
    return _AL;
} /* end GetEvent */

ROW TMinRow(void)
{
    ROW r = MinRow();
    return (r < WinOrgRow ? WinOrgRow : r);
}
COL TMinCol(void)
{
    COL c = MinCol();
    return (c < WinOrgCol ? WinOrgCol : c);
}

/*:NAVIGATE
** handle navigation events; returns TRUE iff event handled
*/
flg Navigate(EVENT evt)
{
    ROW RowLim;
```

```
COL ColLim,col;
int DirC, DirR;
int i,blanks;
LEVEL KeyLev,lev;
flg fEndMode,fSkipBlank,fCurBlank;

DirR = DirC = 0;
RowLim = ColLim = -1;

GET_IND_STATUS();
fEndMode = (_AX & IND_END) != 0;
fCurBlank = IsBlankCell(CurRow,CurCol);

switch (evt) {
default:
    return FALSE;

case KEY_LEFT:
    DirC = -1;
    if (CurCol <= WinOrgCol)
        goto Bump;
    if (!fEndMode) {
        ColLim = WinOrgCol;
        DO_CELLPTR_LEFT();
doLftRgt:
        jnc noBump;
        /* handle left-right over hidden columns */
        if (CurCol == ColLim)
            goto Bump;
        while ((CurCol += DirC) != ColLim) {
            if (!ColIsHidden(CurCol))
                break;
        }
        if (ColIsHidden(CurCol))
            goto Bump;
        MoveToCur();
        break;
    }

ColLim = TMinCol();
    if (CurCol <= ColLim) {
        if (CurCol == ColLim)
            CurCol -= fTagLft;
        ColLim = WinOrgCol;
    }
    goto DoEnd;

case KEY_UP:
    if (CurRow <= WinOrgRow)
        goto Bump;
    if (!fEndMode) {
        DO_CELLPTR_UP();
MayBump:
        jnc noBump;  {
Bump:       BumpBeep();
noBump:  ;}
        return TRUE;
    }

RowLim = TMinRow();
    if (CurRow <= RowLim) {
        if (CurRow == RowLim)
            CurRow -= fTagTop;
        RowLim = WinOrgRow;
    }
    DirR = -1;

DoEnd:
    ToggleEndMode();
    if (CurRow == RowLim || CurCol == ColLim)
        goto Bump;

CurRow += DirR;
    CurCol += DirC;
```

```
    fSkipBlank = IsBlankCell(CurRow,CurCol);
    if (!fCurBlank || fSkipBlank) {
        while (CurRow != RowLim && CurCol != ColLim) {
            CurRow += DirR;
            CurCol += DirC;
            if (IsBlankCell(CurRow,CurCol) != fSkipBlank) {
                if (!fSkipBlank) {
                    CurRow -= DirR; /* back up to last non-blank */
                    CurCol -= DirC;
                }
                break;
            }
        }
    }

MoveToCur();
    break;

case KEY_DOWN:
    if (!fEndMode) {
        DO_CELLPTR_DOWN();
        goto MayBump;
    }

RowLim = ABudBottom();
    if (CurRow >= RowLim || NoBoundsState()) {
#if FTAGS
        if (CurRow == RowLim)
            CurRow += !fTagTop;
#endif
        RowLim = MAXROW;
    }
    DirR = 1;
    goto DoEnd;

case KEY_RIGHT:
    DirC = 1;
    if (!fEndMode) {
        ColLim = MAXCOL;
        DO_CELLPTR_RIGHT();
        goto doLftRgt;
    }

ColLim = BudRight();
    if (CurCol >= ColLim || NoBoundsState()) {
#if FTAGS
        if (CurCol == ColLim)
            CurCol += !fTagLft;
#endif
        ColLim = MAXCOL;
    }
    goto DoEnd;

case KEY_HOME:
    if (fEndMode) {
        CurCol = MaxCol()-1;
        for (col=CurCol, i=0; col > 0; --col) {
            i += GetColWidth(col);
            if (i > WinWidth) {
                if (col < CurCol)
                    ++col;
                break;
            }
            if (col == OrgCol)
                break;
        }
        OrgCol = col;

CurRow = BoundMaxRow()-1;
        if (OrgRow <= CurRow-WinRows)
            OrgRow = CurRow-WinRows+1;
        ToggleEndMode();
    } else {
        CurRow = TMinRow();
        OrgRow = AMinRow();
```

```c
            if (OrgRow < WinOrgRow) OrgRow = WinOrgRow;
            CurCol = TMinCol();
            OrgCol = AMinCol();
            if (OrgCol < WinOrgCol) OrgCol = WinOrgCol;
        }
        break;

case KEY_END:
        ToggleEndMode();
        break;

case KEY_GOTO:
        if (!SelectRange("Enter address to go to",0)) {
            _CX = START_COL;
            _DX = START_ROW;
            _AX = 0;
            DO_DSP_CELLPTR();
        }
        break;

case KEY_PGUP:
        if (CurRow <= WinOrgRow) goto Bump;
        if (OrgRow < WinRows+WinOrgRow) {
            CurRow = OrgRow = WinOrgRow;
        } else {
            CurRow -= WinRows;
            OrgRow -= WinRows;
        }
        break;

case KEY_PGDN:
        if (CurRow == MAXROW) goto Bump;
        if (OrgRow > MAXROW-WinRows) {
            CurRow = MAXROW;
            OrgRow = MAXROW - WinRows + 1;
        } else {
            CurRow += WinRows;
            OrgRow += WinRows;
        }
        break;
    case KEY_TAB:
        if (RgtCol == MAXCOL) goto Bump;
        /* find rightmost column for next screen */
        CurCol = OrgCol = LeftColOf(RightColOf(RgtCol+1));
        break;

case KEY_BACKTAB:
        if (OrgCol <= WinOrgCol) goto Bump;
        /* find leftmost column of previous (to left) screen */
        CurCol = OrgCol = LeftColOf(OrgCol-1);
        break;

case KEY_SIBUP:
        RowLim = TMinRow();
        if (CurRow <= RowLim)
            goto Bump;
        DirR = -1;
DoSib:
        KeyLev = GetLevel(CurRow);
        do {
            CurRow += DirR;
            blanks = 0;
            while (KeyLev != (lev=GetLevel(CurRow))) {
                if (lev >= MAXLEVEL)
                    ++blanks;
                else
                    blanks = 0;
                if (CurRow == RowLim || blanks >= BLANKS)
                    goto Bump;
                CurRow += DirR;
            }
        } while (cellType == T_LABEL && isTotLabel(cellPtr));
        MoveToCur();
        break;
```

```
    case KEY_SIBDOWN:
        RowLim = ABudBottom();
        if (CurRow >= RowLim)
            goto Bump;
        DirR = 1;
        goto DoSib;

case KEY_SIBHOME:
        RowLim = TMinRow();
        if (CurRow <= RowLim)
            goto Bump;
        DirR = -1;
DoSibHE:
        KeyLev = GetLevel(CurRow);
        blanks = i = 0;
        while ((CurRow+=DirR) != RowLim) {
            lev = GetLevel(CurRow);
            if (lev >= MAXLEVEL) {
                if (++blanks >= BLANKS)
                    break;
                i += DirR;
            } else {
                blanks = i = 0;
                if (lev < KeyLev)
                    break;
            }
        }
        CurRow -= i;
        if (DirR > 0)
            CurRow--;

MoveToCur();
        break;

case KEY_SIBEND:
        RowLim = ABudBottom();
        if (CurRow >= RowLim)
            goto Bump;
        DirR = 1;
        goto DoSibHE;

} /* end switch */

DoDisplay(FALSE);
    return TRUE;
} /* end Navigate */

/*:HIDECOLADJUST */
flg HideColAdjust(COL *pCol)
{
    COL col,org;

for (col = org = *pCol; col < MAXCOL && ColIsHidden(col); ++col);
    if (ColIsHidden(col)) {
        for (col = org; col > 0 && ColIsHidden(col); --col);
    }
    *pCol = col;
    return (col != org);
} /* end HideColAdjust */

/*:MOVETOCUR */
void MoveToCur(void)
{
    flg fAdjust;

/* adjust appropriate origins */
    if (TopRow > CurRow || CurRow > BotRow) {
        OrgRow = CurRow;
        if (CurRow > BotRow) { /* moved down? */
            /* make currow last on screen */
            if (OrgRow > WinRows-1)
                OrgRow -= (WinRows-1);
            else
                OrgRow = 0;
        }
    }
```

```
        HideColAdjust(&CurCol);
        fAdjust = HideColAdjust(&LftCol);
        RgtCol = RightColof(LftCol);

if (fAdjust || !INRANGE(LftCol,CurCol,RgtCol)) {
            OrgCol = (CurCol > RgtCol) ? LeftColOf(CurCol) : CurCol;
        }
} /* end MoveToCur */ void WorkOff(void)
{
    GET_INDICATOR();
    _BX &= ~IND_WORKSHEET;    /* turn off worksheet display */
    SET_INDICATOR();
} void WorkOn(void)
{
    GET_INDICATOR();
    _BX |= IND_WORKSHEET;     /* turn worksheet display back on */
    SET_INDICATOR();
}

/*:DODISPLAY
** redisplay collptr if position changed;
*/
void DoDisplay(flg fRecalc)
{
    flg fHideAdjust;

if (fRecalc)
        WorkOff();

if (fRecalc != 2 && CurRow == OldCurRow && CurCol == OldCurCol)
        goto done;

fHideAdjust = HideColAdjust(&OldOrgCol) || fRecalc == 2;
    if (fHideAdjust || OrgCol != OldOrgCol || OrgRow != OldOrgRow) {
        if (fHideAdjust ||
            (INRANGE(OldOrgCol, OrgCol, RightColOf(OldOrgCol)) &&
             INRANGE(TopRow, OrgRow, BotRow) )
        ) {                                     /* partial page jump */
            WorkOff();
            _CX = MAXCOL;
            _DX = MAXROW;
            _AX = 0;
            DO_DSP_CELLPTR();   /* jump to end to force repaint at origin */
            if (!fRecalc)
                WorkOn();
        }
        _CX = OrgCol;
        _DX = OrgRow;
        _AX = 0;
        DO_DSP_CELLPTR();       /* jump to origin */
    }
    OldCurCol = _CX = CurCol;
    OldCurRow = _DX = CurRow;
    _AX = 0;
    DO_DSP_CELLPTR();           /* jump to cell */
done:
    if (fRecalc) {
        WorkOn();
        DoRedisplay();
    }
} /* end DoDisplay */

/*:TOGGLEENDMODE    -- turn on/off END mode */
void ToggleEndMode(void)
{
    GET_IND_STATUS();
    _AX ^= IND_END;
    SET_IND_STATUS();
    DO_DSPIND();
}
```

```c
/*:GETCOLWIDTH  -- return column width */
card16 GetColWidth(COL col)
{
    _CX = col;
    GET_COLWIDTH();
    return _AL;
}

/*:GETCOLINFO */
int GetColInfo(COL col)
{
    int width;
#if 0
    int hidden;
    byte defWidth;
    hidden = 0;
    width = GetColWidth(col);
    if (width == 0) {
        hidden = COL_HIDDEN_BIT;
        ExposeCol(col);
        width = GetColWidth(col);
    }
    GET_DEF_COLWIDTH();
    defWidth = _AL;
    if (defWidth == width) {
        _AL = defWidth+1;
        SET_DEF_COLWIDTH();
        if (width != GetColWidth(col))
            width = 0;   /* default col width */
        _AL = defWidth;
        SET_DEF_COLWIDTH();
    }
    if (hidden != 0)
        HideCol(col);
    return (width | hidden);
#else
    width = GetColWidthValue(col);
    if (GetColWidth(col) == 0)
        width |= COL_HIDDEN_BIT;
    return (width);
#endif
} /* end GetColInfo */

/*:SETCOLINFO */
void SetColInfo(COL col,int ColInfo)
{
    _CX = col;
    _AL = (byte) ColInfo;    /* ah is ignored */
    SET_COLWIDTH();
    if (ColInfo & COL_HIDDEN_BIT)
        HideCol(col);
    else
        ExposeCol(col);
} /* end SetColInfo */

/*:RIGHTCOLOF  -- return right column of screen origined at col */
COL RightColOf(COL col)
{
    COL RightCol;
    card16 i;

for (RightCol=col, i=0; /* RightCol <= MAXCOL */; ++RightCol) {
        i += GetColWidth(RightCol);
        if (i > WinWidth) {
            if (RightCol > col)
                --RightCol;
            break;
        }
        if (RightCol >= MAXCOL)
            break;
    }
    col = RightCol;
    HideColAdjust(&col);
```

```
        return (col);
) /* end RightColOf */

/*:LEFTCOLOF    -- return left column of screen whose left at col */
COL LeftColOf(COL col)
{
    COL LeftCol;
    card16 i;

for (LeftCol=col, i=0; /* LeftCol >= WinOrgCol */; --LeftCol) {
        i += GetColWidth(LeftCol);
        if (i > WinWidth) {
            if (LeftCol < col)
                ++LeftCol;
            break;
        }
        if (LeftCol <= WinOrgCol)
            break;
    }
    col = LeftCol;
    HideColAdjust(&col);
    return (col);
) /* end LeftColOf */

/*:READSCREENTEXT    -- read text off screen into savebuf (no attr) */
void ReadScreenText(ROW row,COL col,card16 len)
{
    int i;

DoSetCur(row,col);
    FIX_ES;
    _SI = (uns) savebuf;
    _CX = len;
    DO_READA();
    for (i=1; i < len; ++i)
        savebuf[i] = savebuf[i+1];
    savebuf[i] = 0;
) /* end ReadScreenText */

/*:GETDISPORIGINCELL    -- read screen to determine upper-left cell */
void GetDispOriginCell(void)
{
#if 0
    COL col,cl;
    int i;

/* read origin row number */
    ReadScreenText(WinOrgRow, WinOrgCol-4, 4);
    ScanInt(savebuf,&OrgRow);
    --OrgRow;    /* zero based */

/* read column letters */
/*!!NOTE:   there are still holes in this algorithm for narrow 2 digit
**  columns and for hidden columns
*/
    ReadScreenText(WinOrgRow-1, WinOrgCol, 2+(WinWidth>>1) );
    for (i=0; savebuf[i] == ' '; ++i);   /* skip blanks */

OrgCol = col = savebuf[i] - 'A';
    if (savebuf[i+1] == ' ')    /* no abutment */
        goto finish;

cl = savebuf[i+1] - 'A';
    col = ((col+1) * 26) + cl;
    if (i != 0) {        /* not left most char; no abutment problems */
        OrgCol = col;
        goto finish;
    }
    if (GetColWidth(OrgCol) == 1) {
        if (GetColWidth(col) > 2)    /* two digits couldn't be at left */
            goto finish;
        if (cl != OrgCol+1)     /* neighbor is not next column */
            OrgCol = col;
        goto finish;
```

```
    } else {
        OrgCol = col;
        if (GetColWidth(col) > 2)
            goto finish;
    } finish:
else
    la_get_upper_left();
    OrgCol = _CX;
    OrgRow = _DX;
#endif
    LftCol = OldOrgCol = OrgCol;
    RgtCol = RightColOf(OrgCol);
    TopRow = OldOrgRow = OrgRow;
    BotRow = OrgRow + WinRows - 1;

GET_CELLPTR();
    CurRow = OldCurRow = _DX;
    CurCol = OldCurCol = _CX;
} /* end GetDispOriginCell */

/*:BEEPs    -- sound effects */
void ErrBeep(void)  { _BX= TONE_ERROR;  DO_TONE(); }
void KeyBeep(void)  { _BX= TONE_BADKEY; DO_TONE(); }
void BumpBeep(void) { _BX= TONE_BUMP;   DO_TONE(); }

/*:GETCELL  -- get cell contents in statics; return TRUE iff non-blank */
flg GetCell(ROW row,COL col)
{
    _CX = col;
    _DX = row;
    _AX = 1;
    OUT_CELL();
    cellType = _AL;
    cellForm = _AH;
    cellPtr = ( (cellType != T_BLANK) ? (PTR) _SI : empty_string );
    return (cellType != T_BLANK);
} /* end GetCell */

/*:GETCELLFORM  -- get cell type & format; return TRUE iff non-blank/def */
flg GetCellForm(ROW row,COL col)
{
    _CX = col;
    _DX = row;
    GET_CELL_FMT();
    cellType = _AL;
    cellForm = _AH;
    return (cellType != T_BLANK);
} /* end GetCellForm */

/*:GETCELLSTACK
** get value of cell thru stack; if third parm is null leaves value on TOS
** else, sets val parm and cleans stack.
** returns TRUE if value was non-numeric.
*/
flg GetCellStack(ROW row,COL col,PNUM pVal)
{ flg fRes = FALSE;

_CX = col;
    _DX = row;
    _AX = 0x0201;   /* num stack, no blanks */
    OUT_CELL();
    if (_CX != ((uns)-1)) { /* oops, funny value, nothing pushed */
        fRes = TRUE;
        if ((*(BPTR)_SI) == 'E')   /* assume ERR */
            ERR_FLT();
        else                        /* assume N/A */
            NA_FLT();
    }
```

```
    _DI = (uns) pVal;
    if (_DI != NULL) {
        FIX_ES;
        POP_FLT();
    }
    return fRes;
} /* end GetCellStack */

/*:ISBLANKCELL  -- return TRUE iff blank cell */
flg IsBlankCell(ROW row,COL col)
{
    _CX = col;
    _DX = row;
    GET_CELL_FMT();
    return (_AL == T_BLANK);
} /* end IsBlankCell */

/*:PUTCELL */
flg PutCell(ROW row,COL col,CTYPE ctype,CFORM cform,PTR val)
{
#if debug
    if (fMEMOUT)
        return TRUE;
endif
    switch (ctype) {
    case T_BLANK:
    case T_INTEGER:
        break;
    default:
        if (!fMustAlloc) {
            GET_FREEBYTES();
            if (_CX == 0 && _BX < PUT_GAP)
                return TRUE;
        }
    }

_DX = row;
    _CX = col;
    _SI = (uns) val;
    _AH = cform;
    _AL = ctype;
    IN_CELL();
    return FALSE;
} /* end PutCell */

/*:BUDRIGHT */
COL BudRight(void)
{
    return (ColsBound() ? BudRange.rgt : MAXCOL);
} /* end BudRight */

/*:BUDBOTTOM */
ROW BudBottom(void)
{
    return (RowsBound() ? BudRange.bot : MAXROW);
} /* end BudBottom */

/*:ABUDBOTTOM */
ROW ABudBottom(void)
{
    ROW row;

row = GetSaveRow();
    return (row != 0 ? row-1 : BudBottom());
} /* end ABudBottom */

/*:RNGOK */
flg RngOk(PRANGE pr)
{
    return (    (uns)pr->top < MAXROW
             && (uns)pr->bot < MAXROW
             && (uns)pr->lft < MAXCOL
             && (uns)pr->rgt < MAXCOL
           );
} /* end RngOk */
```

```
/*:GETSAVEROW */
ROW GetSaveRow(void)
{
    RANGE rng;

return (QueryRange(save_nrange_name,&rng) && RngOk(&rng) ? rng.top : 0);
} /* end GetSaveRow */

/*:MAXCOL    -- max column to scan */
COL MaxCol(void)
{
    GET_ACTIVE();
    if (_CX > BudRange.rgt && ColsBound() && BoundsState())
        _CX = BudRange.rgt;
    return _CX+1;
}

/*:MAXROW    -- max row to scan */
ROW MaxRow(void)
{
    GET_ACTIVE();
    if (_DX > BudRange.bot && RowsBound() && BoundsState())
        _DX = BudRange.bot;
    return _DX+1;
}

/*:BOUNDMAXROW */
ROW BoundMaxRow(void)
{
    ROW row, rowLim;

rowLim = MaxRow();
    row = OnSheet() && BoundsState() ? GetSaveRow() : 0;
    return (row != 0 && row < rowLim ? row : rowLim);
}

COL AMinCol(void)
{
    return (NoBoundsState() ? 0 : BudRange.lft);
}
COL MinCol(void)
{
    return (NoBoundsState() ? 0 : BudRange.lft+fTagLft);
}
ROW AMinRow(void)
{
    return (NoBoundsState() ? 0 : BudRange.top);
}
ROW MinRow(void)
{
    return (NoBoundsState() ? 0 : BudRange.top+fTagTop);
}

/*:ISBARSCELL -- get cell & check for bars */
flg IsBarsCell(ROW row,COL col)
{
    char *p;

GetCell(row,col);
    if (cellType == T_LABEL) {
        p = cellPtr;
        if (p[0] == '\\')
            return TRUE;
        while (*++p == ' ') /* skip blanks */;
        if (*p == '=')
            return TRUE;
        if (*p == '-') {
            while (*++p == '-') /* skip dashes */;
            if (*p == '\0')
                return TRUE;
        }
    }
    return FALSE;
```

```c
} /* end IsBarsCell */

/*:GETLEVEL -- returns level value for row */
LEVEL GetLevel(ROW row)
{
    COL col,colMax = MaxCol();
    LEVEL lev;

for (col=MinCol(); col < colMax; ++col) {
        GetCellForm(row,col);
        if (cellType != T_BLANK) {
            lev = 0;
            if (cellType == T_LABEL) {
                if (IsBarsCell(row,col))
                    return BARSLEVEL;
                if (*cellPtr == '\'') {
                    while (*++cellPtr == ' ')
                        lev++;
                    if (*cellPtr == '\0')   /* all blanks? */
                        continue;
                } else
                    lev = 0xFF;
            }
            break;
        }
    }
    return (col == colMax ? BLANKLEVEL : lev + ((col-MinCol())<<8) );
} /* end XGetLevel */ if 1

/*:SCANMONTH -- locate month in string */
char * ScanMonth(char * str, int * pMon)
{
    int i;
    char *cp;

for (i=0; i < 12; ++i) {      /* search for month names */
        if ((cp=strstr(str,smonths[i])) != NULL)
            break;
    }
    *pMon = i;
    return (cp);
} /* end ScanMonth */ else

/*:SCANMONTH
**  parallel string search for any lowercase month
**  abbreviation substring in given string STR.
**   Will be one of
**   ("jan" "feb" "mar" "apr" "may" "jun" "jul" "aug" "sep" "oct" "nov" "dec")
**  If month abbrev is found, function returns char pointer
**  to position in 'str' where month substr begins, argument
**  'pMon' is an integer in range 0 - 11 representing month.
**  If no month abbrev is found, function returns NULL.
**  argument 'pMon' is 12.
*/
char * ScanMonth(char * str, int * pMon)
{
    for( ; *str != 0; str++) {  /* for each char in string */
        /* look for starting character */
        switch(*str) {
        case 'd':    /* dec or fail */
            if (str[1] == 'e') {
                if (str[2] == 'c') {
                    *pMon = DEC;
                    goto foundmonth;
                }
                str++;       /* no months start with 'e' */
                continue;
            }
            continue;
```

```
        case 'f':    /* feb or fail */
            if (str[1] == 'e') {
                if (str[2] == 'b') {
                    *pMon = FEB;
                    goto foundmonth;
                }
                str++;        /* no months start with 'e' */
                continue;
            }
            continue;

case 'n':    /* nov or fail */
            if (str[1] == 'o') {
                if (str[2] == 'v') {
                    *pMon = NOV;
                    goto foundmonth;
                }
                str++;
                goto tryoct;
            }
            continue;

case 'o':    /* oct or fail */
tryoct:
            if (str[1] == 'c') {
                if (str[2] == 't') {
                    *pMon = OCT;
                    goto foundmonth;
                }
                str++;        /* no months start with 'c' */
                continue;
            }
            continue;

case 's':    /* sep or fail */
            if (str[1] == 'e') {
                if (str[2] == 'p') {
                    *pMon = SEP;
                    goto foundmonth;
                }
                str++;        /* no months start with 'e' */
                continue;
            }
            continue;

case 'a':    /* apr or aug */
tryapr:
            if (str[1] == 'p') {
                if (str[2] == 'r') {
                    *pMon = APR;
                    goto foundmonth;
                }
                str++;        /* no months start with 'p' */
                continue;
            }
            else if (str[1] == 'u') {
                if (str[2] == 'g') {
                    *pMon = AUG;
                    goto foundmonth;
                }
                str++;        /* no months start with 'u' */
                continue;
            }
            continue;                /* second char is unknown */ case 'm':    /* may or mar or fail */
            if (str[1] == 'a') {     /* must be 'a' */
                switch(str[2]) {     /* 'y' or 'r' or fail */
                case 'y':
                    *pMon = MAY;
                    goto foundmonth;
                case 'r':
                    *pMon = MAR;
                    goto foundmonth;
                default:
                    str++;
```

```
                    goto tryapr;
                }
            }
            continue;

case 'j':    /* jan jun or jul or fail */
            switch(str[1]) {
            case 'a':
                if (str[2] == 'n') {
                    *pMon = JAN;
                    goto foundmonth;
                }
                str++;
                goto tryapr;
            case 'u':
                if (str[2] == 'n') {
                    *pMon = JUN;
                    goto foundmonth;
                }
                if (str[2] == 'l') {
                    *pMon = JUL;
                    goto foundmonth;
                }
                str++;       /* no months start with 'u' */
                continue;
            default:
                continue;
            }
        }
    }
    *pMon = NO_MONTH;
    return(NULL);
foundmonth:
    return(str);
} /* end ScanMonth */ endif

/* file i/o primitives */

/*:FILESEEK -- seek to position in file */
card32 FileSeek(int fhndl,SEEK_MODE mode,ord32 pos)
{
    LD_DWRD(CX,DX,pos);
    _BX = fhndl;
    _AL = mode;
    CallDos(0x42);   /* do seek */
    /* DX:AX have new position; all seek errors are trivial */
#pragma warn -rvl
} /* end FileSeek */
pragma warn .rvl /*:SEEK -- seek to position in open file */
card32 Seek(SEEK_MODE mode,ord32 pos)
{
    return FileSeek(FileHandle,mode,pos);
}

/*:FILEREADFIX */
flg FileReadFix(int fhndl,QPTR q,card16 sz)
{
    _BX = fhndl;
    _CX = sz;
I   LDS dx,DP q;
    CallDos(0x3F);   /* read */
    FIX_DS;
I   jc err;
    if (_AX == sz)
        return FALSE;
err:
    DBGTRAP();
    return TRUE;
} /* end FileReadFix */
```

```
/*:READFIX */
flg ReadFix(QPTR q,card16 sz)
{
    return FileReadFix(FileHandle,q,sz);
} /* end ReadFix */

/*:FILECLOSE */
void FileClose(int fhndl)
{
    _BX = fhndl;
    CallDos(0x3e);
} /* end CloseFile */

/*:CLOSECURFILE -- write final records and close active file */
void CloseCurFile(void)
{
    if (fFileOpen) {
        FileClose(FileHandle);
        fFileOpen = FALSE;
    }
} /* end CloseCurFile */

/*:KILLSWAPFILE */
void KillSwapFile(void)
{
    CloseCurFile();
    fdelem(BudSwapFileName);   /* delete file */
} /* end KillSwapFile */

/*:DOSFINDFN */
flg DosFindFN(byte func,DIR_INFO * pDirrec,char * pName)
{
    QPTR qHold;
    flg fRes;

CallDos(0x2f);                  /* save old DTA */
    ST_DWRD(qHold,ES,BX);

CallDosDX(0x1a,pDirrec);        /* set DTA */
    _CX = 0;
    CallDosDX(func,pName);          /* find first or next */
I   cmc;                            /* complement result */
    SAVC(fRes);

I   LDS dx,qHold;                   /* restore DTA */
    CallDos(0x1a);
    FIX_DS;

return (fRes);
} /* end DosFindFN */

/*:DOSFINDFIRST */
flg DosFindFirst(char * pName, DIR_INFO * pDirrec)
{
    return DosFindFN(0x4e,pDirrec,pName);
} /* end DosFindFirst */

/*:DOSFINDNEXT */
flg DosFindNext(DIR_INFO * pDirrec)
{
    return DosFindFN(0x4f,pDirrec,NULL);
} /* end DosFindNext */

/*:FIND_FIRST */
flg find_first(char * pName)
{
    DIR_INFO junk;
    return DosFindFirst(pName, &junk);
} /* end find_first */ if 0
if debug
void LostTag(TAG tag)
{
```

```c
        sprintf(savebuf,"Lost a tag (%u)",tag);
        _SI = (uns) savebuf;
        DO_NONFATAL();
    }
endif
endif void SaveCalc(void)
{
    GET_IND_STATUS();
    CalcSave = _AX & IND_CALC;
} void RestCalc(void)
{
    GET_IND_STATUS();
    _AX &= ~IND_CALC;
    _AX |= CalcSave;
    SET_IND_STATUS();
}

/* range handling stuff */
/* named range stuff */
/*:CREATERANGE  -- create or modify a named range */
void CreateRange(char * name,PRANGE pr)
{
    _SI = (uns) name;
    DO_DELETE_RANGE();
    if (pr != NULL) {
        FIX_ES;
        _SI = (uns) name;
        _DI = (uns) pr;
        _AH = 1;
        DO_CREATE_RANGE();
    }
} /* end CreateRange */

/*:CHECKRANGE  -- used by QueryRange to scan for named range */
void CheckRange(void)
{
    struct {
        char rName[16];
        RANGE Rng;
    } FAR qRngInfo;

FIX_DS;
    ST_DWRD(qRngInfo,ES,SI);
    if (fRngFound || qstricmp(pRngName,qRngInfo->rName) != 0)
        return;
    qmovmem(&qRngInfo->Rng,pRng,sizeof(RANGE));
    fRngFound = TRUE;
} /* end CheckRange */

/*:QUERYRANGE  -- find range info for named range; returns TRUE if exists */
flg QueryRange(char * name,PRANGE pr)
{
    fRngFound = FALSE;
    pRngName = name;
    pRng = pr;
    FIX_ES;
    _DI = (uns) CheckRange;
    DO_RANGE_LIST();
    return (fRngFound);
} /* end QueryRange */

/*:SELECTRANGE -- prompt for a range */
flg SelectRange(char * prmpt,uns option)
{
    char buf[70];

sprintf(buf,"%s: ",prmpt);

DO_ERASE12();
    _SI = (uns) buf;
    _CH = 1;
```

```c
        _AX = option;
        DO_RANGE();
        RETC;
} /* end SelectRange */

/*:GETWINDIMENSIONS */
void GetWinDimensions(void)
{
    int i;
    TITLEINFO ti;

/* get window dimensions (assume whole screen for now) */
    GET_SCRSIZE();
    ScrnHeight = _DX;
    ScrnWidth = _CX;

_BX = &ti;
    la_title_info();
    WinOrgRow = ti.TitleTop + ti.TitleRows;
    WinOrgCol = ti.TitleLft + ti.TitleCols;

WinRows = ScrnHeight - BOILER_PLATE_ROWS - ti.TitleRows;
    WinWidth = ScrnWidth - 8;
    for (i=0; i < ti.TitleCols; ++i)
        WinWidth -= GetColWidth(ti.TitleLft+i);
} /* end GetWinDimensions */

/*:SETFILEEXTENSION */
char * SetFileExtension(char fname[],char * ext)
{
    char * cp;

cp = strrchr(fname,'.');
    if (strrchr(fname,'\\') >= cp) {      /* no dot or dot before bslash */
        cp = fname + strlen(fname);       /* append default extention */
    }
    *cp = '.';
    strcpy(cp+1,ext);
    return (fname);
} /* end SetFileExtension */

/*:DELETEWSFILE */
void DeleteWSFile(char wsname[])
{
    char fname[FN_BUF_SZ];

fdelem(wsname);
    fdelem(SetFileExtension(strcpy(fname,wsname),bud_file_ext));
} /* end DeleteWSFile */

/*:GETINTVAL -- returns integer value obtained from user */
int GetIntVal(char * prmpt,int def,int hival)
{
    sprintf(buffer,"Integer expected [1-%d]",hival);
    _SI = (uns) prmpt;
    _DI = (uns) buffer;
    _BX = 1;
    _CX = hival;
    _AX = def;
    DO_INT();
I   jc retErr;
        return _AX;

retErr:
    return INTERR;
} /* end GetIntVal */

/*:PROMPTSTRING -- string input into buffer */
flg PromptString(char * prmpt)
{

_SI = (uns) prmpt;
    _DI = (uns) buffer;
    _CX = 30;
```

```c
    _AL = 0;
    DO_STRING();
    RETC;
} /* end PromptString */

/* custom column stuff */

/*:FINDTUNIT */
QTUNIT FindTUnit(int per,int item)
{
    QTUNIT qt;

for (qt=periods[per].first_unit; --item > 0; qt=qt->nxt);
    return (qt);
} /* end FindTUnit */ int temp;

/*:SCANPERYRORDAY */
void ScanPerYrOrDay(char * cp)
{
    while (*cp && !isdigit(*cp))
        ++cp;
    ScanInt(cp,&temp);
    if (temp <= 31) {
        if (perDay == 0)
            perDay = temp;
    } else {
        if (perYr == 0)
            perYr = (temp < 100 ? temp + 1900 : temp);
    }
} /* end ScanPerYrOrDay */

/*:SEARCHPERNAME */
int SearchPerName(int per, char * str, int first)
{
    char *cp;
    QTUNIT qt;
    int i;
    int len, itemlen = 0;
    int item = 0;
    char chold;
    flg fWrap = FALSE;

perYr = 0;
    qt = FindTUnit(per,first);
    i = max(1,first);

FOREVER {
        if (qt == QNULL) {
            if (fWrap || first == 0)
                break;
            i = 1;
            fWrap = TRUE;
            qt = periods[per].first_unit;
        }
if (fWrap && i == first)
    break;

len = qstrlen(qt->name);
if (len > itemlen) {
    qmovmem(qt->name,formbuf,len+1);
    cp = strstr(str,strlwr(formbuf));
    if (cp != NULL) {
        raPrefix = cp-str;
        raLen = len;
        item = i;
        itemlen = len;

perYr = perDay = 0;
        ScanPerYrOrDay(cp+len); /* scan suffix */
        chold = *cp;
        *cp = 0;
        ScanPerYrOrDay(str);    /* scan prefix */
        *cp = chold;
```

```c
            if (perYr == 0)
                perYr = qt->last_date.d.yr;
        }
    }
    qt = qt->nxt;
    ++i;
    }
    return (item);
} /* end SearchPerName */

/*:SEARCHPER */
int SearchPer(char * str,PSCANREC pScan)
{
    int per;

for (per=num_periods; per-- > 0; ) {
        cItem = SearchPerName(per, str, pScan ? pScan->old.perPlace[per] : 0);
        if (cItem > 0)
            break;
    }
    return (per);
} /* end SearchPer */

/*:ISTOTLABEL -- test for total labels */
flg isTotLabel(char * str)
{
    strlwr(str);
    if (strncmp(str,sub_string,3) == 0) {
        str += 3;
        if (*str == '-' || *str == ' ')
            ++str;
    }
    return (strncmp(str,tot_string,3) == 0);
} /* end isTotLabel */

/*:CTRLBREAKDETECT */
flg CtrlBreakDetect(void)
{
    byte val;
    QBPTR q = 0x471;    /* BIOS CtrlBreakDetect location */ val = *q;
    *q = val & ~0x80;
    GET_BREAK();
I   jnc noBreak;
        val = 0x80;
noBreak:
    return (val & 0x80);
} /* end CtrlBreakDetect */

/*:SYSSENSE */
flg SysSense(PRANGE prng)
{
    int len = strlen(BudSysString);

return (QueryRange(bud_nrange_name,prng) &&
            GetCell(prng->top,prng->lft) &&
            0 == strncmp(cellPtr,BudSysString,len)
    );
} /* end SysSense */

/* end BUTIL.C */

B:BD3OVLY.C   5/31/89 6:00pm

/* MODES: TAB 4      Last Revision:  Mon 05-29-89 07:00
**
**  BD3OVLY.C   -- bud data declarations for overlay 3
**
** Copyright (C) 1989 Saratoga Software, Inc.  All rights reserved.
**
*/
```

```c
ifndef XT include "bud.h"
include "cvi.h"

#define ALLOCATE    1
#define XT
define INIT(x) = x else define ALLOCATE    0
/*#define XT extern */
#define INIT(x)

endif extern void dummy(void);
/*
 *      Periods strings
 */

XT card8    select_periods_def_string[]
    INIT("Enter the range containing the periods names and dates");
XT card8    enter_level_name_string[]
    INIT("Enter the name for the type of period highlighted (eg Month): ");
XT card8    modify_periods_and_invoke_bud_string[]
    INIT("Modify settings and then re-invoke Bud");
XT card8    missing_end_date_for_this_time_period_string[]
    INIT("Row is missing a date");
XT card8    invalid_period_spec_string[]
    INIT("Invalid specification");
XT card8    entry_must_be_a_date_string[]
    INIT("Entry must be a date");
XT card8    first_col_mixed_dates_string[]
    INIT("Mixed dates and non-dates in first col");
XT card8    year_string[]   INIT("Year");
XT card8    atdate_string[] INIT("@DATE(");
XT card8    max_levels_exceeded_string[]
    INIT("Max no of time period levels exceeded");

/* period display variables  */

XT ROW      pd_row;
XT COL      pd_col;
XT QTUNIT   pd_levels_ptrs[MAX_PDS];
XT ord16    pd_level_display_index[MAX_PDS];
XT ord16    pd_first_col;

/* periods menus */ void    handle_periods_set_menu(void);
void handle_periods_quit_menu(void);
void m_adjust(void);

XT card8 *periods_menu[]
#if ALLOCATE
={
    "Indent",
    "Adjust label Indentation",
    "Set",
    "Use the fiscal period definition showing in the worksheet",
    "Quit",
    "Return to the worksheet without changing the fiscal period definition",
    0
}
endif
;

XT PFV  periods_menu_proc[]
#if ALLOCATE
={
```

```
    m_adjust,
    handle_periods_set_menu,
    handle_periods_quit_menu
)
#endif
;

/* period quit menu   */
#if COMPRESSED_MENUS == 0
XT char *periods_quit_menu[]
#if ALLOCATE
=(
    "No",
"Keep this fiscal periods specification in the worksheet for modification",
    "Yes",
"Return to the worksheet without changing the fiscal periods specification",
    0
)
#endif
;
else
XT char *periods_quit_menu[]
#if ALLOCATE
=(
    "No",
"Keep%s in the worksheet for modification",
    "Yes",
"Return to the worksheet without changing%s",
    0
)
#endif
;
XT char r1_periods_quit_menu[]  INIT(" the fiscal periods specification");
endif /* period mixed dates and non-dates in the first column menu */
XT char *periods_mixed_dates_menu[]
#if ALLOCATE
=(
    "Stop",
    "Modify the specification before using it",
    "Continue",
    "Treat the first column as period names, not dates",
    0
)
#endif
;

/* goal menu stuff */
XT char *GoalMenu[]
#if ALLOCATE
=(
    "Percent", "Modify values by percentage",
    "Difference", "Modify values by difference",
    "Restore", "Restore original values",
    "Flip", "Exchange current and original values",
#if debug
    "Break", "INT 3 to debugger",
#endif
    "Quit", "Leave Goal-tracking mode",
    0
)
#endif
;

extern void g_percent(void);
extern void g_delta(void);
extern void g_restore(void);
extern void g_flip(void);
extern void g_quit(void);
XT PFV GoalMenuProc[]
#if ALLOCATE
=(
```

```c
    g_percent,
    g_delta,
    g_restore,
    g_flip,
#if debug
    dummy,
#endif
    g_quit
}
endif
;

/* modify values menu */
XT char *ModMenu[]
#if ALLOCATE
={
    "Number", "Enter arbitrary value",
    "Difference", "Change by difference",
    "Percent", "Change by percentage",
    0
}
endif
;

extern void mm_percent(void);
extern void mm_delta(void);
extern void mm_enter(void);
XT PFV ModMenuProc[]
#if ALLOCATE
={
    mm_enter,
    mm_delta,
    mm_percent
}
endif
;

/* goal tracking variables */

XT char GoalDeltaStr[20];

XT char GoalMetStr[]    INIT("Met: ");
XT char GoalNotMetStr[] INIT("Goal: ");

XT char GoalStr[35];

XT flg fGoalIsLower;
XT NUM GoalVal;
XT ROW GoalRow;
XT COL GoalCol;
XT MODTYPE GoalModType;

XT flg fModToZero    INIT(FALSE);
XT NUM ModValue;
XT NUM OldValue;
XT MODTYPE ModType;

XT NUM NUM_ONE
#if ALLOCATE
    = { 1.0 }
#endif
;

XT NUM NUM_1_100
#if ALLOCATE
    = { 0.01 }
#endif
;

/* end BD3OVLY.C */
```

B:BEXTRA.C  5/31/89  6:01pm

```c
/* MODES: TAB 4      Last Revision: Mon 05-29-89 07:00
**
**  BEXTRA.C     -- Bud misc ovl3 code.
**
** Copyright (C) 1989 Saratoga Software, Inc.  All rights reserved.
**
*/ include "bud.h"
include "bdroot.h"
#include "bd3ovly.h"
#include "bemm.h"
#include <string.h>
include <mem.h> forward flg ShowLogo(void);

/* mode strings for v2.00,2.01:
** VALUE0POINT0EDIT00MENU00ERROR0LABEL0READY0FIND00HELP00WAIT00FILES0STAT00
** FRMT00NAMES0spacespacespacespacespace0
** mode strings for v2.2:
** VALUE0POINT0EDIT0MENU0ERROR0LABEL0READY0FIND0HELP0WAIT0FILES0STAT0
** FRMT0NAMES0
*/
char srch_str[]     = "iT\0\0FILES\0ST";
char srch_str2[]    = "iT\0FILES\0ST";

#define SRCH_LEN      12   /* (sizeof(srch_str1) - 1) */
#define MODE_DELTA    (SRCH_LEN + 5)
#define MENU_DELTA    ((MODE_BUD-MODE_MENU)*6)

#define SRCH_LEN2     11   /* (sizeof(srch_str2) - 1) */
#define MODE_DELTA2   (SRCH_LEN2 + 4)
#define MENU_DELTA2   (MENU_DELTA - 5)     /* comp for five extra nulls */

/*:FIND123STR -- search backwards to locate pattern in memory */
QPTR Find123Str(char * str,int slen,char last)
{
    _BX = slen;
    str += slen-1;

_DX = _CS;
I   std
seg_lp:
I   sub dx,0ffeh
I   jb  not_found

_ES = _DX;
    _AL = last;
    _DI = 0xffff;
chr_lp:
    _CX = _DI;
I   repne   scas BP es:[di]
I   jne seg_lp _SI = (uns) str;
    _CX = _BX;
I   repe cmps BP ds:[si],BP es:[di]
I   je  found I   sub cx,bx
I   sub di,cx
I   jnz chr_lp
    goto seg_lp;

found:
    _DX = _ES;      /* normalize pointer (but leave some room for subtract */
    _AX = _DI;
    _CL = 4;
I   shr di,cl
    _DX += _DI;
    _DX -= 0x3;
    _AX &= 0xf;
```

```
    _AL += 0x30;
#pragma warn -rvl
#pragma warn -ret
    return;

not_found:
    return QNULL;
} /* end Find123Str */
#pragma warn .rvl
pragma warn .ret /*:FINDMODESTR
**  search backward to find mode strings to patch in 123
**
**  the 123 mode strings are stored as follows:
**  VALUE0POINT0EDIT0OMENU00ERROR0LABEL0READY0FIND0OHELP00WAIT00FILES0STAT00
**  FRMT00NAMES0spacespacespacespacespace0
**  The 5 spaces at the end are used to blank out the existing mode display
**  before putting up another one (in case the new one is shorter)
*/
void FindModeStr(void)
{
    if (fSearchedOnce)
        return;

srch_str[0] &= ~0x20;   /* toupper on first char --
                            ** avoids finding srch_str in load buffer.
                            */
    qModeStr = Find123Str(srch_str,SRCH_LEN,'A');
    if (qModeStr != QNULL) {
        qModeStr += MODE_DELTA;
        qMenuStr = qModeStr - MENU_DELTA;
    } else {
        srch_str2[0] &= ~0x20;
        qModeStr = Find123Str(srch_str2,SRCH_LEN2,'A');
        if (qModeStr != QNULL) {
            qModeStr += MODE_DELTA2;
            qMenuStr = qModeStr - MENU_DELTA2;
        }
    } memclr(srch_str,SRCH_LEN);  /* avoids finding srch_str in memory later */
    memclr(srch_str2,SRCH_LEN2);
    fSearchedOnce = TRUE;
} /* end FindModeStr */

/*:ALLOCFREELIST */
flg AllocFreeList(void)
{
    _AX = MAX_FREE * sizeof(SWAP_REC);
    DO_PALLOC();
    ST_DWRD(qFreeList,ES,BX);
    RETC;   /* return TRUE if error */
} /* end AllocFreeList */

/*:FREEFREELIST */
void FreeFreeList(void)
{
    _AX = MAX_FREE * sizeof(SWAP_REC);
I   les bx,dword ptr qFreeList
    DO_PFREE();
#if 0
    freeq(qFreeList, MAX_FREE * sizeof(SWAP_REC));
#endif
} /* end FreeFreeList */ typedef void (far * QFV)(void);
typedef QFV FAR QQFV;

/*:INSTALLKEYHANDLER */
void InstallKeyHandler(void)
{
    /* get old vector and remember it */
    _AL = KEY_INT;
    CallDos(0x35);
```

```
    ST_DWRD(KeyVector,es,bx);

/* install our vector */
    _DX = (uns) (PFV) KeyHandler;
    /* DS = CS already */
    _AL = KEY_INT;
    CallDos(0x25);

fKeyRemovePending = FALSE;
} /* end InstallKeyHandler */

/*:OVL_ATTACH
** initialization from 123
*/
flg ovl_attach(void)
{
    RANGE rng;
    if (fBudAttached)
        goto done;

MSIndex = 0;    /* reset menu stack */
    fInvokeIDed = FALSE;
    fInHelp = FALSE;
    fCfgExists = FALSE;
    fConsDestroyed = FALSE;
    InitVars();

GET_SCRSIZE();
    ScrnHeight = _DX;
    ScrnWidth = _CX;

if (!fLAInited) {
        la_init();              /* init move/copy routines */
I       jnc laInit; {
            return TRUE;
laInit: ;}
        fLAInited = TRUE;
    } if (AllocFreeList()) {
        return TRUE;
    } init_emm(50);
    consolidation_attachment_initialization();
    InstallKeyHandler();
    FindModeStr();
    if (!ReadPeriodsFile(FALSE) && CustPeriods())
        fCfgExists = TRUE;
#if BOXLOGO
    if (fShowLogo && !SysSense(&rng)) {
        fShowLogo = FALSE;
        if (ShowLogo())
            WritePeriodsFile(FALSE);
    }
endif
done:
    return FALSE;
} /* end ovl_attach */

/*:OVL_TERMINATE */
flg ovl_terminate(void)
{
    RemoveKeyHandler();
    /* free space? -- nah, 123 will do it for us */
    FreeFreeList();
    exit_emm();
    TimeOn();
    KillSwapFile();
    fBudAttached = FALSE;
    return FALSE;
} /* ovl_terminate */
```

```c
/*:ROWHASCHILDREN */
#pragma warn -par
flg RowHasChildren(ROW row) { return FALSE; }
pragma warn .par if BOXLOGO define EOS "\0"

char logo_text[] = {
EOS
" The Budget Express V1.0" EOS
#include "bversion.h"
"    Symantec Corporation" EOS
EOS
EOS
"    Copyright (C) 1989" EOS
" Saratoga Software, Inc." EOS
"    All rights reserved." EOS
EOS
" Designed & Programmed by" EOS
EOS
"       Eric Michelman" EOS
"       Devin Ben-Hur" EOS
EOS
"   QA by Herb Isenberg" EOS
EOS
};

#define LOGO_COLS    31
#define LOGO_ROWS    10
#define LOGO_BRIGHT  5
#define TC_ROWS      17
define TC_BRIGHT    12 char logo_boxes[] = {
    0,  1,
    1,  4,
    2,  7,
    3,  10,
    4,  13,
    5,  16,
    6,  19,
    7,  22,
    8,  25,
    9,  28,
    LOGO_ROWS,  LOGO_COLS,
    -1, LOGO_COLS,
    -1
};

/*:GETTIME */
uns GetTime(void)
{
    byte secs,hsecs;
    CallDos(0x2c);
    secs = _DH;
    hsecs = _DL;
    if (hsecs > 95)
        hsecs = 95;
    return (100*secs + hsecs);
} /* end GetTime */

/*:SHOWLOGO */
flg ShowLogo(void)
{
    uns goal,now,last;
    char c;
    flg fLogoChange;
    flg fTechCredit = FALSE;

showAgain:
    logo_boxes[(LOGO_ROWS+1)*2] = fTechCredit ? TC_ROWS : -1;

FIX_ES;
    _SI = logo_text;
```

```
    _DI = logo_boxes;
    if (fTechCredit) {
        _BX = TC_ROWS;
        _CX = TC_BRIGHT;
    } else {
        _BX = LOGO_ROWS;
        _CX = LOGO_BRIGHT;
    }
    _AX = LOGO_COLS;
    DO_LOGO();
    last = GetTime();
    goal = last;
    if (fTechCredit) {
        goal += TC_DELAY;    /* 30 seconds */
    } else if (logo_count) {
        --logo_count;
        fLogoChange = TRUE;
        goal += DELAY1;
    } else {
        fLogoChange = FALSE;
        goal += DELAY2;
    }
    while ((c=DO_CHARTEST()) == NO_CHAR) {
        now = GetTime();
        if (now < last)
            now += 6000;     /* minute roll-over */
        if (now >= goal)
            goto done;
    }
    if (c == TC_CHAR) {
        GET_CHAR();
        fTechCredit = TRUE;
        goto showAgain;
    }
done:
    REDISPLAY();
    return (fLogoChange);
} /* end ShowLogo */
endif /****************************************************************
 *                                                              *
 *         consolidation_attachment_initialization              *
 *                                                              *
 *      Function:                                               *
 *          does the 1-time consolidation initializations       *
 *      Inputs:                                                 *
 *          none                                                *
 *      Outputs:                                                *
 *          none                                                *
 *      Actions:                                                *
 *          adds the nice graphics chars to 123's char set      *
 *                                                              *
 ****************************************************************/ void    consolidation_attachment_initialization(void)
{   card32 loc;
    card32 prev_loc;
    extern card8    graphics_string_123[];
    extern card8    correct_graphics_string[];
    extern card32 pascal fix_graphics_chars(card32 start);

/* fix up 123's graphics chars */
/*  string_loc = Find123Str(graphics_string_123, strlen(graphics_string_123),
        ' ');

if (string_loc != QNULL)
        qmovmem((QPTR) correct_graphics_string,
                ((card8 far*) string_loc) + 9,
                strlen(correct_graphics_string) );
*/
    /* change all occurrences of the graphics string.  Treat the addresses as
       unsigned longs, rather than long ptrs so the high word (segment) is
       used in the comparison */
    loc = (card32) 0;
    do
```

```
    {   prev_loc = loc;
        loc = fix_graphics_chars(loc);
    }   while (loc != (card32) 0 && loc > prev_loc);

}   /* end consolidation_attachment_initialization */

/* end BEXTRA.C */

B:B23COM.C  5/31/89  6:01pm

/*
** B23COM.C -- routines common to ovly 2 & 3
**
**  Copyright (C) 1989 Saratoga Software, Inc. All rights Reserved.
*/ include <dos.h>
include "bud.h"
#include "bemm.h"
#include "cvi.h"
include <string.h>

/**********************************************************************
 *                                                      *
 *                     select_range                     *
 *                                                      *
 *      Function:                                       *
 *          prompts the user for a range                *
 *      Inputs:                                         *
 *          prompt string                               *
 *          pointer to range structure to store results *
 *      Outputs:                                        *
 *          0 = operation completed                     *
 *          1 = user ESC'ed                             *
 *          start_col, start_row, end_col, end_row are  *
 *              with the chosen range values            *
 *      Actions:                                        *
 *          Range is assumed to be unanchored and a new one *
 *          is being requested (i.e. one isn't being edited) *
 *                                                      *
 **********************************************************/ ord16   select_range(prompt, range_ptr)
card8   *prompt;
RANGE   *range_ptr;
{   ord16       ret;

#if 0
    _AX = 0;  /* new range, not anchored */
    _CH = 0;  /* display hidden columns */
    _SI = prompt;
    do_range();

ret = carry();

if (!ret)
        {   range_ptr->lft = start_col;
            range_ptr->top = start_row;
            range_ptr->rgt = end_col;
            range_ptr->bot = end_row;
        }
#else
    ret = SelectRange(prompt,0);
    movmem(&Range123,range_ptr,sizeof(RANGE));
#endif
    return(ret);
}   /* end select_range */
```

```
/*******************************************************************
 *                                                                 *
 *                   post_out_of_memory_error                      *
 *                                                                 *
 *        Inputs:                                                  *
 *            none                                                 *
 *        Outputs:                                                 *
 *            none                                                 *
 *                                                                 *
 *******************************************************************/ void    post_out_of_memory_error()
{
    extern char out_of_memory_string[];

if (!out_of_memory_error_occurred)
    {   post_error(out_of_memory_string);
        out_of_memory_error_occurred = 1;
    }

}   /* end post_out_of_memory_error */

/*******************************************************************
 *                                                                 *
 *                   reenable_calc_indicator                       *
 *                                                                 *
 *        Inputs:                                                  *
 *            none                                                 *
 *        Outputs:                                                 *
 *            none                                                 *
 *                                                                 *
 *******************************************************************/ void    reenable_calc_indicator()
{
    get_indicator();
    _BX |= IND_CALC;
    set_indicator();
    do_dspind();

}   /* end reenable_calc_indicator */

/*******************************************************************
 *                                                                 *
 *                   set_status_for_leaving_cons                   *
 *                                                                 *
 *        Function:                                                *
 *            sets the appropriate variables so the cons mode      *
 *            is exited before control returns to user             *
 *        Inputs:                                                  *
 *            none                                                 *
 *        Outputs:                                                 *
 *            none                                                 *
 *        Actions:                                                 *
 *                                                                 *
 *                                                                 *
 *                                                                 *
 *******************************************************************/ void    set_status_for_leaving_cons()
{
    BudState = STATE_NORM;
    fKeepCons = 0;
    fKeepPeriods = 0;

reenable_calc_indicator();

}   /* end set_status_for_leaving_cons */
```

```
/*******************************************************************
 *                                                                 *
 *                    reset_worksheet                              *
 *                                                                 *
 *        Function:                                                *
 *           resets the worksheet state other than erasing the     *
 *           contents                                              *
 *        Inputs:                                                  *
 *           highest column to worry about                         *
 *        Outputs:                                                 *
 *           none                                                  *
 *                                                                 *
 *******************************************************************/ void    reset_worksheet(high_col)
COL high_col;
{   COL col;

for (col = 0; col <= high_col; col++)
    {
        SetColInfo(col, 0); /* sets to default col width, visible */
    } highest_col = highest_row = -1;

} /* end reset_worksheet */

/*******************************************************************
 *                                                                 *
 *                    erase_worksheet                              *
 *                                                                 *
 *        Function:                                                *
 *           clears the active worksheet area                      *
 *        Inputs:                                                  *
 *           none                                                  *
 *        Outputs:                                                 *
 *           none                                                  *
 *                                                                 *
 *******************************************************************/ void    erase_worksheet(void)
{   COL high_col;

do_wait();
    get_active();
    high_col = _CX;
    EraseRange(0, 0, _CX, _DX);

reset_worksheet(high_col);

} /* end erase_worksheet */

/*******************************************************************
 *                                                                 *
 *                    is_a_format_char                             *
 *                                                                 *
 *        Function:                                                *
 *           tells whether a char is a 123 format-prefix char      *
 *        Inputs:                                                  *
 *           character to check                                    *
 *        Outputs:                                                 *
 *           0 = no                                                *
 *           1 = yes                                               *
 *                                                                 *
 *******************************************************************/ ord16   is_a_format_char(c)
card8   c;
{
    return(c == '\'' || c == '^' || c == '"' || c == '\\');

} /* end is_a_format_char */
```

```
/****************************************************************
 *                                                              *
 *                    nLeading_spaces                           *
 *                                                              *
 *      Function:                                               *
 *          counts leading blanks in a string                   *
 *      Inputs:                                                 *
 *          far pointer to the string                           *
 *      Outputs:                                                *
 *          number of spaces                                    *
 *      Actions:                                                *
 *                                                              *
 *                                                              *
 *                                                              *
 ****************************************************************/ card16  nLeading_spaces(string)
card8 far   *string;

{   ord16   i = 0;
    ord16   is_a_format_char(card8);

/* pass a leading format char */
    if (is_a_format_char(string[0]))
        string++;

while (string[i] == ' ')
        i++;

return(i);
}   /* end nLeading_spaces */

/****************************************************************
 *                                                              *
 *                    row_indentation                           *
 *                                                              *
 *      Function:                                               *
 *          determines the indentation level of a row           *
 *      Inputs:                                                 *
 *          row number                                          *
 *      Outputs:                                                *
 *          indentation level (MAXLEVEL for no values found)    *
 *      Actions:                                                *
 *                                                              *
 *                                                              *
 *                                                              *
 ****************************************************************/ card16  row_indentation(row)
ROW     row;
{   COL     col;
    card16  indentation = 0;

for (col = left_match_col; col <= right_match_col; col++)
    {
        GetCellForm(row,col);
        if (cellType != T_BLANK)
        {   xout_cell(row, col, 1);

/* numbers by definition have no leading spaces */
            if (cellType != T_LABEL)
                indentation = 0;
            else    /* label */
            {   /* cells with a label prefix char and nothing else are
                   given maximum indentation for a real entry (a/o/t
                   MAXLEVEL). Empty labels are created for total
                   overscore rows so there's an entry in the spec (so
                   the input row is included) but no visible row header.*/
                if (cellPtr[1] == 0)
                {   col = right_match_col;
                    indentation = 0xff;
                }
                else    indentation = nLeading_spaces((card8 far*) cellPtr);
            }
```

```c
            break;
        }
    }
    return (col > right_match_col ?
        MAXLEVEL : indentation + ((col/* - left_match_col*/) << 8));

}   /* end row_indentation */

/******************************************************************
 *                                                                *
 *                      build_menu                                *
 *                                                                *
 *       Function:                                                *
 *           creates a menu by substituting into template         *
 *           strings                                              *
 *       Inputs:                                                  *
 *           standard menu structure, ie a 0-terminated list      *
 *               of pointers to strings                           *
 *           replacement string to be used                        *
 *           if desired, a second replacement string.  If this    *
 *               is specified, it is assumed that the menu        *
 *               consists of one choice and descriptor, which     *
 *               should be repeated, once for each of the         *
 *               replacement strings.                             *
 *       Outputs:                                                 *
 *           pointer to the resulting substitute menu             *
 *       Actions:                                                 *
 *           builds up a substitute menu in xdv_buffer            *
 *                                                                *
 ******************************************************************/ card8   *build_menu(menu_list, replacement_string1, replacement_string2)
char    *menu_list[];
card8   *replacement_string1, *replacement_string2;
(   card16  menu_item_no, *menu_index_ptr;
    card8   *string_list_ptr, *replacement_string;

/* put the pointers at the front, and the strings after them */
    menu_index_ptr = xdv_buffer;
    string_list_ptr = xdv_buffer + 100;  /* enough for 24 menu items */
    menu_item_no = 0;
    replacement_string = replacement_string1;

/* the menu list can be any length -- it goes until a 0 byte */
loop:
    while (menu_list[menu_item_no] != 0)
    (   *menu_index_ptr++ = string_list_ptr;
        string_list_ptr += sprintf(string_list_ptr,
            menu_list[menu_item_no++], replacement_string,
            replacement_string) + 1;
    )

/* if a second replacement was specified, we have to go through again. */
    if (replacement_string2 != NULL &&
        replacement_string != replacement_string2)

B:B23COM.C   5/31/89  6:01pm (   replacement_string = replacement_string2;
        menu_item_no = 0;
        goto loop;
    )

*menu_index_ptr = 0;   /* terminating-0 */ return(xdv_buffer);

)   /* end build_menu */

/* end B23COM.C */
```

```c
/*
** B13COM.C -- routines common to ovly 1 & 3
**
** Copyright (C) 1989 Saratoga Software, Inc. All rights Reserved.
*/ include "bud.h"
include "bdroot.h"
include <string.h>
include <mem.h>

/*:GETSIGNINTVAL -- returns integer value obtained from user */
int GetSignIntVal(char * prmpt,int def)
{
    int len,res;
    char *cp = buffer;

if (def != INTERR) {
        if (def < 0) {
            *cp++ = '-';
            def = -def;
        }
        sprintf(cp,"%u",def);
    } else
        buffer[0] = '\0';

FIX_ES;
    _SI = (uns) prmpt;
    _DI = (uns) buffer;
    _CX = 5;
    _AL = 0xff;
    DO_STRING();
I   jc retErr;

len = ScanInt(buffer,&res);
    if (len != 0 && buffer[len] == 0)
        return (res);
    _SI = (uns) "Integer expected";
    DO_NONFATAL();

retErr:
    return INTERR;
} /* end GetSignIntVal */

/*:M_ADJUST -- adjust labels in or out */
void m_adjust(void)
{
    int indent,i;
    ROW row;
    COL col;
    LEVEL lev;

if (SelectRange("Enter rows to adjust",RNG_ANCH)) { STC; return; }
    indent =
        GetSignIntVal("Indent by (- outdent by) [-80..80]: ",lastIndent);
    if (indent == INTERR) { STC; return; }
```

B:B13COM.C  5/31/89  6:02pm

```c
    if (!INRANGE(-80,indent,80)) {
        DoNonFatal("Value out of range");
        STC;
        return;
    } for (row=Range123.top; row <= Range123.bot; ++row) {
        if (BudState == STATE_NORM) {
            if (RowHasChildren(row)) {
                DoNonFatal("Must show hidden rows");
                STC;
                return;
```

```
            }
        }
        lev = GetLevel(row);
        if (cellType != T_LABEL)
            continue;
        if (indent < 0) {
            col = LevelCol(lev);
            GetCell(row,col);
            if (*cellPtr++ != '\'')
                continue;
            for (i=0; cellPtr[i] == ' '; ++i);
            if (i < -indent) {
                DoNonFatal("Can't outdent past left edge of cell");
                STC;
                return;
            }
        }
    } lastIndent = indent;
    for (row=Range123.top; row <= Range123.bot; ++row) {
        lev = GetLevel(row);
        if (cellType != T_LABEL)
            continue;
        col = LevelCol(lev);
        GetCell(row,col);
        if ((formbuf[0]=*cellPtr++) != '\'')
            continue;

i = indent;
        if (indent >= 0) {
            setmem(formbuf+1,i,' ');
        } else {
            cellPtr += -i;
            i = 0;
        }
        if (strlen(cellPtr) > MAXSTR-2-i)
            cellPtr[MAXSTR-2-i] = 0;
        strcpy(formbuf+1+i,cellPtr);
        PutCell(row, col, T_LABEL, cellForm, formbuf );
    }

/*DO_RECALC();*/
    DoRedisplay();

CLC;
} /* end m_adjust */

/*:PRSDATESTR   -- parse a cell as date */
COLTYPE PrsDateStr(char * str)
{
    COLTYPE ct = CT_NULL;
    int i[3],j,ict;
    char * cp;

/* parse it */
    i[0] = i[1] = i[2] = cQtr = cDay = cYr = 0;
    cp = strlwr(str);
    for (ict=0; ict < 3; ++ict) { /* scan three integer fields */
        while (*cp && !isdigit(*cp)) ++cp;
        if (*cp == 0) break;
        cp += ScanInt(cp, &i[ict]);
    } cp = ScanMonth(str, &cMon);

if (cp != NULL) {
        ++cMon;
        ct = CT_MONTH;
        j = 0;
        if (i[0] > 0 && i[0] <= 31) {
            cDay = i[0];
            ct |= CT_DAY;
            j = 1;
```

```
            }
            if (ict > j) {
                cYr = i[j];
                ct |= CT_YEAR;
            }
        } else {
            cMon = 0;
            if (strchr(str,'q') != NULL && ict > 0) {
                if (i[0] < 1 || i[0] > 4) return CT_NULL;
                cQtr = i[0];
                ct = CT_QTR;
                if (ict > 1) {
                    cYr = i[1];
                    ct |= CT_YEAR;
                }
            } else {
                switch (ict) {
                case 0:
                    if (strncmp(str,"tot",3) == 0)
                        ct = CT_YEAR;
                    break;
                case 1:
                    if (i[0] > 31 && i[0] < 2100) {
                        cYr = i[0];
                        ct = CT_YEAR;
                    }
                    break;
                case 2:
                    cMon = i[0];
                    ct = CT_MONTH;
                    if (i[1] > 0 && i[1] <= 31) {
                        cDay = i[1];
                        ct |= CT_DAY;
                    } else {
                        cYr = i[1];
                        ct |= CT_YEAR;
                    }
                    break;
                case 3:
                    ct = CT_MONTH | CT_DAY | CT_YEAR;
                    cMon = i[0];
                    cDay = i[1];
                    cYr = i[2];
                    break;
                }
            }
        }
    if (0 < cYr && cYr < 100) cYr += 1900;

return (ct);
} /* end PrsDateStr */

/*:PRSDATE   -- parse a cell as date */
COLTYPE PrsDate(ROW row,COL col)
{
    COLTYPE ct = CT_NULL;
    int colinfo;

GetCell(row,col);
    switch (cellType) {
    case T_BLANK:
        return CT_NULL;
    case T_LABEL:
        ++cellPtr;
prsIt:
        ct = PrsDateStr(cellPtr);
        break;
    default:
#if 0   /* hey, we can try to parse displayed value regardless of format */
        cellForm &= FMT_MASK;
        if (cellForm == FMT_DEF) {
            GET_DEF_FORMAT();
            cellForm = _AL;
```

```
            }
            switch (cellForm & FMT_MASK) {
            case FMT_DATE_DMY:
            case FMT_DATE_DM:
            case FMT_DATE_MY:
            case FMT_DATE_INTL:
            case FMT_DATE_INTS:
                /* handle date decoding */
    #endif
                colinfo = GetColInfo(col);    /* save col width/stat */
            SetColInfo(col,20);               /* make sure it's visible */
            _CX = col;
            _DX = row;
            GET_DISPLAYED_CELL();
            cellPtr = (PTR) _SI;
            SetColInfo(col,colinfo);          /* restore col width */
            goto prsIt;
#if 0
        default:
            ; /* !!try to treat as year */
        )
#endif
        } return (ct);
} /* end PrsDate */

/*:FREEPERIODS */
void FreePeriods(void)
{
    uns i;
    PERIOD_DESC * ppd;
    QTUNIT qtu,qtunxt;

for (ppd=periods, i=0; i < num_periods; ++i, ++ppd) {
        if (ppd->name != QNULL)
            freeq(ppd->name, qstrlen(ppd->name)+1 );

for (qtu = ppd->first_unit; qtu != QNULL; qtu = qtunxt) {
            qtunxt = qtu->nxt;
            freeq(qtu, qstrlen(qtu->name) + sizeof(TUNIT) );
        }
    } /* end for each period */
    ClrPeriods();
} /* end FreePeriods */

/*:FILEWRITEFIX */
flg FileWriteFix(int fhndl,QPTR q,card16 sz)
{
    _BX = fhndl;
    _CX = sz;
I   LDS dx,DP q;
    CallDos(0x40);   /* write */
    FIX_DS;
I   jc err;
    if (_AX == sz)
        return FALSE;
err:
    DBGTRAP();
    return TRUE;
} /* end FileWriteFix */

/*:WRITEFIX */
flg WriteFix(QPTR q,card16 sz)
{
    return FileWriteFix(FileHandle,q,sz);
} /* end WriteFix */

/*:READQ */
flg ReadQ(QPTR *pq,card16 sz)
{
```

```
    QPTR q;
    q = allocq(sz);
    if (q == QNULL || ReadFix(q,sz)) {
        freeq(q,sz);
        *pq = QNULL;
        return TRUE;
    }
    *pq = q;
    return FALSE;
} /* end ReadQ */

/*:WRITEVAR */
flg WriteVar(QPTR q,uns sz)
{
    return (WriteFix(&sz,sizeof(sz))    ||
            WriteQ(q,sz)
           );
} /* end WriteVar */

/*:READVAR */
flg ReadVar(QPTR * pq)
{
    QPTR q;
    uns sz;

*pq = QNULL;
    if (ReadFix(&sz,sizeof(sz)))
        return TRUE;
    if ((q=allocq(sz)) == QNULL)
        return TRUE;
    if (ReadFix(q,sz)) {
        freeq(q,sz);
        return TRUE;
    }
    *pq = q;
    return FALSE;
} /* end ReadVar */

/*:WRITEPERIODS */
flg WritePeriods(void)
{
    uns i;
    PERIOD_DESC * ppd;
    QTUNIT qtu;

if (WriteFix(&num_periods,sizeof num_periods) ||
        WriteFix(&periods_nCols,sizeof periods_nCols) ||
        WriteFix(&periods_first_col_was_dates,
                 sizeof periods_first_col_was_dates)
       )
        return TRUE;

for (ppd=periods, i=0; i < num_periods; ++i, ++ppd) {
        if (WriteVar(ppd->name, qstrlen(ppd->name)+1)   ||
            WriteFix(&ppd->units, sizeof(ppd->units))
           )
            return TRUE;

for (qtu = ppd->first_unit; qtu != QNULL; qtu = qtu->nxt) {
            if (WriteVar(qtu, qstrlen(qtu->name) + sizeof(TUNIT) ))
                return TRUE;
        }
    } /* end for each period */ return FALSE;
} /* end WritePeriods */

/*:READPERIODS */
flg ReadPeriods(void)
{
    int mon;
    uns num,units;
    PERIOD_DESC * ppd;
    QTUNIT qtu, FAR qqtu;
```

```
    FreePeriods();   /* be sure old ones are clear */ if (ReadFix(&num,sizeof num) ||
        ReadFix(&periods_nCols,sizeof periods_nCols) ||
        ReadFix(&periods_first_col_was_dates,
                sizeof periods_first_col_was_dates)
    )
        return TRUE;

/* error recovery assumes that periods array is clear */
    for (ppd=periods,num_periods=0; num_periods < num; ++ppd) {
        ++num_periods;
        if (ReadVar((QPTR*)&ppd->name)    ||
            ReadFix(&units, sizeof(units))
        )
            goto err;

ppd->units = 0;         /* should be asserted by initial conditions */
        ppd->first_unit = QNULL;
        qqtu = &ppd->first_unit;
        while (ppd->units < units) {
            if (ReadVar((QPTR*)&qtu))
                goto err;
            qtu->nxt = QNULL;
            *qqtu = qtu;
            qqtu = &qtu->nxt;
            ++ppd->units;
        }
    } /* end for each period */
        while (num-- >= 0) {
            mon = periods[num].first_unit->last_date.d.mon;
            if (mon != 0) {
                FirstMon = mon-1;
                break;
            }
        }
        low_date_period = num;

return FALSE;

err:
    FreePeriods();
    low_date_period = -1;
    return TRUE;
} /* end ReadPeriods */

/*:WRITECFGHEAD */
flg WriteCfgHead(void)
{
#if 1
    CFG_HDR hdr;

memclr(&hdr,sizeof hdr);
    hdr.cfg_mark = CFG_MARK;
    hdr.cfg_ver = CFG_ID;
    hdr.logo_ct = logo_count;
    hdr.def_split = DefSplitCols = SplitCols;
    hdr.def_firstmon = DefFirstMon = FirstMon;
    return (WriteFix(&hdr,sizeof hdr));
#else
    DefSplitCols = SplitCols;
    DefFirstMon = FirstMon;
    return (WriteFix(&DefSplitCols,sizeof DefSplitCols)
         || WriteFix(&DefFirstMon,sizeof DefFirstMon)
    );
#endif
} /* end WriteCfgHead */

/*:READCFGHEAD */
flg ReadCfgHead(void)
{
    CFG_HDR hdr;
    OLD_CFG_HDR ohdr;
    flg fRet;
```

```c
#if 1
    fRet = ReadFix(&ohdr, sizeof ohdr);
    if (!fRet) {
        if (ohdr.def_split <= 10) {
            DefSplitCols = ohdr.def_split;
            DefFirstMon = ohdr.def_firstmon;
        } else {
            Seek(SEEK_ABS,0);
            fRet = ReadFix(&hdr,sizeof hdr);
            if (!fRet) {
                if (hdr.cfg_mark != CFG_MARK || hdr.cfg_ver > CFG_ID)
                    fRet = TRUE;
                else {
                    logo_count = hdr.logo_ct;
                    DefSplitCols = hdr.def_split;
                    DefFirstMon = hdr.def_firstmon;
                }
            }
        }
    }
#else
    fRet =  ReadFix(&DefSplitCols,sizeof DefSplitCols)
         || ReadFix(&DefFirstMon,sizeof DefFirstMon);
#endif
    SplitCols = DefSplitCols;
    FirstMon = DefFirstMon;
    return (fRet);
} /* end ReadCfgHead */

/*:OPENPERIODSFILE */
flg OpenPeriodsFile(flg fWrite,flg fTmp)
{
    char fname[FN_BUF_SZ];

SaveHandle = FileHandle;
    fOpenSave = fFileOpen;
    fWritingSave = fWriting;

/* open the file */
    _DX = fTmp ?
            TmpCfgFileName :
            MkHomeFileName(fname,BudCfgFileName,empty_string);
    _AX = (fWrite ? 0x3c00 : 0x3d00);    /* open file, read/write mode */
    _CX = 0;
    DosInt();
I   jnc opened;
        return TRUE;

opened:
    FileHandle = _AX;
    fFileOpen = TRUE;
    fWriting = TRUE;
    return FALSE;
} /* end OpenPeriodsFile */

/*:WRITEPERIODSFILE */
flg WritePeriodsFile(flg fTmp)
{
    flg fRet;

if (OpenPeriodsFile(TRUE,fTmp))
        return TRUE;

fRet = (!fTmp && WriteCfgHead()) || WritePeriods();
    CloseCurFile();
    FileHandle = SaveHandle;
    fFileOpen = fOpenSave;
    fWriting = fWritingSave;

return (fRet);
} /* end WritePeriodsFile */

/*:READPERIODSFILE */
```

```c
flg ReadPeriodsFile(flg fTmp)
{
    flg fRet;

FreePeriods();

if (OpenPeriodsFile(FALSE,fTmp))
        return TRUE;

fRet = (!fTmp && ReadCfgHead()) || ReadPeriods();
    CloseCurFile();

FileHandle = SaveHandle;
    fFileOpen = fOpenSave;
    fWriting = fWritingSave;

if (fTmp)
        fdelem(TmpCfgFileName);

return (fRet);
} /* end ReadPeriodsFile */

/* end B13COM.C */
/* MODES: TAB 4    Last Revision:  Mon 05-29-89 07:01
**
**  BGOAL.C -- Bud goal tracking stuff.
**
** Copyright (C) 1989 Saratoga Software, Inc.  All rights reserved.
**
*/ include "bud.h"
include "bdroot.h"
#include "bd3ovly.h"
#include <string.h>
include <mem.h>

/*:MAYBESETCALCON */
void MaybeSetCalcOn(void)
{
    fNeedCalc = fAutoCalcOn;
    if (!fAutoCalcOn) {
        GET_IND_STATUS();
        _AX |= IND_CALC;
        SET_IND_STATUS();
        CalcSave = IND_CALC;
    }
} /* end MaybeSetCalcOn */

/*:ENTERGOAL     -- enter goal mode */
flg EnterGoal(void)
{
    char * p;

tryRng:
    if (SelectRange("Enter cell for Goal Tracking",0)) { return TRUE; }
    GoalRow = Range123.top;
    GoalCol = Range123.lft;
    GetCellForm(GoalRow,GoalCol);
    if (cellType != T_FORMULA) {
        DoNonFatal("Goal tracking cell should have formula");
        goto tryRng;
    }
    CurRow = GoalRow;
    CurCol = GoalCol;
    MoveToCur();
    DoDisplay(FALSE);
tryMod:
    if (DoModMenu())
        goto tryRng;
    GoalModType = ModType;
    if (GetModValue())
        goto tryMod;
```

```
    if (ApplyMod(GoalRow,GoalCol,&GoalVal)) { return TRUE; }

/* construct goal value display string */
GetCellForm(GoalRow,GoalCol);
    /*SaveCalc();   -- done at activate now */

FIX_ES;
    _SI = (uns) &GoalVal;
    PUSH_FLT();
    _SI = (uns) &OldValue;
    PUSH_FLT();
    CMP_FLT();
    fGoalIsLower = (((int)_AX) < 0);

DROP_FLT();
    fMustAlloc = TRUE;
    PutCellStack(TagRow(),TagCol(),cellForm);
    fMustAlloc = FALSE;

p = GoalStr;
    p += GetGoalVal(TagRow(),TagCol(),p);
    strcpy(p,", Now: ");

EraseCell(TagRow(),TagCol());

RestCalc();

BudState = STATE_GOAL;
    DoEventLoop();

return FALSE;
} /* end EnterGoal */

/*:DOGOALMENU */
void DoGoalMenu(void)
{
    DoAMenuH(GoalMenu, GoalMenuProc, HS_GOALM);
    ShowGoalVal();
}

/*:DOMODMENU */
flg DoModMenu(void)
{
    return DoAMenuH(ModMenu, ModMenuProc, HS_MODIFYM);
}
void mm_percent(void)    { ModType = MOD_PERCENT; CLC; }
void mm_delta(void)      { ModType = MOD_DELTA; CLC; }
void mm_enter(void)      { ModType = MOD_ENTER; CLC; }

/*:GETNUMVAL
** prompt for numeric value (returned in NumVal)
** returns TRUE if escaped or error
*/
NUM NumValue;
flg GetNumVal(char * prmpt)
{
#if 0
    QNUM qNum;
#else
    flg fRes;
#endif
    int i;

if (PromptString(prmpt)) goto errExit;

#if 0
    _SI = (uns) buffer;
    DO_STON();
I   jc errExit2;

i = _AX;
    ST_DWRD(qNum,ES,SI);
```

```
    if (qNum == QNULL) {
        _AX = i;
        INT2FLT();
        FIX_ES;
        _DI = (uns) &NumValue;
        POP_FLT();
    } else {
        NumValue = *qNum;
    }
#else
    i = CalcSave;
    SaveCalc();
    fMustAlloc = TRUE;
    PutCell(TagRow(),TagCol(),T_NUMBER,DEFAULT_FMT,buffer);
    fMustAlloc = FALSE;
    fRes = GetCellStack(TagRow(),TagCol(),&NumValue);
    EraseCell(TagRow(),TagCol());
    RestCalc();
    CalcSave = i;
    if (!fRes)
        return FALSE;
endif errExit2:
    DoNonFatal("Number expected");
errExit:
    return TRUE;
} /* end GetNumVal */

/*:GETMODVALUE */
flg GetModValue(void)
{
    char prmpt[50];

fModToZero = FALSE;

sprintf(prmpt,"Enter %s: ",
        ModType == MOD_PERCENT  ?   "percentage change (eg -10)" :
        ModType == MOD_DELTA    ?   "difference" :
        /* else */                  "new value"
        );
    if (GetNumVal(prmpt)) return TRUE;
    ModValue = NumValue;
    if (ModType == MOD_PERCENT) {
        FIX_ES;
        _SI = (uns) &ModValue;
        PUSH_FLT();
        FLT2INT();
I       jc tooBig;
        if (((int)_AX) == -100)
            fModToZero = TRUE;
tooBig:;
    } return FALSE;
} /* end GetModValue */

/*:MODFUNC */
void ModFunc(void)
{
    QCVAL qv;
    XCVAL xv;
    CFORM cf;
    NUM n;
    ROW row;
    COL col;

if (_AL != T_NUMBER && _AL != T_INTEGER) return;

FIX_DS;
    cf = _AH;
    row = _DX;
    col = _CX;
    xv = FindCVal(row,col);
```

```c
        if (ApplyMod(row,col,&n)) return;

FIX_ES;
        _SI = (uns) &n;
        PUSH_FLT();
        PutCellStack(row,col,cf);

if (xv == XNULL)
            AddCVal(row,col,&OldValue);
        else {
            save_emm();
            qv = refcv(xv);
            if (qv->fFlip) {
                qv->fFlip = FALSE;
                qmovmem(&OldValue,&qv->value,sizeof(NUM));
            }
            restore_emm();
        }
} /* end ModFunc */

/*:MODRANGEOPT -- determine range selction option based on call position */
uns ModRangeOpt(void)
{
    Range123 = ModRange;
    return((INRANGE(ModRange.lft, CurCol, ModRange.rgt) &&
            INRANGE(ModRange.top, CurRow, ModRange.bot)) ?
                RNG_EDIT|RNG_ANCH : RNG_ANCH
          );
} /* end ModRangeOpt */

/*:DOMODIFY -- modify a range of values */
void DoModify(void)
{
tryRng:
    if (SelectRange("Enter range for modification",ModRangeOpt()))
        { STC; return; }
    if (GetModValue())
        goto tryRng;
    ModRange = Range123;

MaybeSetCalcOn();

FIX_ES;
    _DI = (uns) ModFunc;
    _SI = &Range123;
    _AL = 0;
    DO_RANGE_SCAN();
    FIX_DS;

DoRedisplay();

CLC;
} /* end DoModify */

/*:G_PERCENT -- modify by percent */
void g_percent(void)
{
    ModType = MOD_PERCENT;
    DoModify();
}

/*:G_DELTA -- modify by delta */
void g_delta(void)
{
    ModType = MOD_DELTA;
    DoModify();
}

/*:RESTFUNC -- used to restore range of values */
void RestFunc(void)
{
    QCVAL qv;
    XCVAL xv;
    CFORM cf;
```

```
    NUM n;
    ROW row;
    COL col;

FIX_DS;
    cf = _AH;
    row = _DX;
    col = _CX;
    xv = FindCVal(row,col);
    if (xv == XNULL) return;

if (fRestoring) {
        save_emm();
        if (refcv(xv)->fFlip) {
            restore_emm();
            FreeCVal(xv);
            return;
        }
    } else {
        GetCellStack(row,col,&OldValue);      /*!!!what if non-num? */
        save_emm();
    } qmovmem(&refcv(xv)->value,&n,sizeof(NUM));
    restore_emm();

FIX_ES;
    _SI = (uns) &n;
    PUSH_FLT();
    PutCellStack(row,col,cf);

if (fRestoring)
        FreeCVal(xv);
    else {
        save_emm();
        qv = refcv(xv);
        qmovmem(&OldValue,&qv->value,sizeof(NUM));
        qv->fFlip = !qv->fFlip;
        restore_emm();
    }
} /* end RestFunc */

/*:DORESTORE -- restore or flip a range */
void DoRestore(void)
{
    char prmpt[50];

sprintf(prmpt,"Enter range for %s",
                  fRestoring ? "restoration" : "exchange" );
    if (SelectRange(prmpt,ModRangeOpt())) { STC; return; }
    ModRange = Range123;

MaybeSetCalcOn();

fGoalRedisplay = TRUE;
    DO_WAIT();

FIX_ES;
    _DI = (uns) RestFunc;
    _SI = &Range123;
    _AL = 0;
    DO_RANGE_SCAN();
    FIX_DS;

DoRedisplay();

CLC;
} /* end DoRestore */

/*:G_RESTORE    -- restore a range of values */
void g_restore(void)
{
    fRestoring = TRUE;
    DoRestore();
```

} /* end g_restore */

```c
/*:G_FLIP    -- flip a range of values */
void g_flip(void)
{
    fRestoring = FALSE;
    DoRestore();
} /* end g_flip */

/*:G_QUIT */
void g_quit(void)
{
    TimeOn();

FreeCVals();

BudState = STATE_NORM;
    DoRedisplay();
    CLC;
} /* end g_quit */

/*:GETGOALVAL -- put goal cell display value in buffer */
uns GetGoalVal(ROW row,COL col,char * buf)
{
    char * p;
    uns len;
    int hold;

hold = GetColInfo(col);
    SetColInfo(col,20);     /* make sure column is visible and wide */
    _CX = col;
    _DX = row;
    GET_DISPLAYED_CELL();
    p = (char *) _SI;
    len = _CX - 1;

/* strip leading & trailing spaces */
    while (*p == ' ' && len > 0) {
        ++p;
        --len;
    }
    while (len > 0 && p[len-1] == ' ')
        --len;
    movmem(p,buf,len);
    buf[len] = '\0';
    SetColInfo(col,hold);   /* restore column settings */
    return (len);
} /* end GetGoalVal */

/*:GOALMET -- return goal met status */
flg GoalMet(void)
{
    char *p;
    flg fMet;
    CFORM cform;

if (GetCellStack(GoalRow,GoalCol,NULL)) {
        DROP_FLT();
        return FALSE;
    }
    FIX_ES;
    _SI = (uns) &GoalVal;
    PUSH_FLT();
    CMP_FLT();
    if (_AX == 0)
        fMet = TRUE;
    else
        fMet = ((((int)_AX) < 0) == fGoalIsLower);

/* construct goal delta display string */
    GetCellForm(GoalRow,GoalCol);

SWAP_FLT();
    SUB_FLT();
```

```
    p = GoalDeltaStr;
    if (CMP0_FLT() > 0)
        *p++ = '+';
    cform = cellForm & FMT_TYPEMASK;
    if (cform == FMT_COMMA || cform == FMT_DOLLAR)
        cform = FMT_FIXED;

fMustAlloc = TRUE;
    PutCellStack(TagRow(),TagCol(), cform | (cellForm & -FMT_TYPEMASK));
    fMustAlloc = FALSE;

p += GetGoalVal(TagRow(),TagCol(),p);
    strcpy(p, ")" );

EraseCell(TagRow(),TagCol());
    RestCalc();

return (fMet);
} /* end GoalMet */

/*:SHOWGOALVAL  -- display goal values in goal window */
void ShowGoalVal(void)
{
    char buf[21];
    flg fMet;
    char *p;
    int len;

TimeOff();
    ClearMsgArea();

GotoMsgArea();

if (!fGoalRedisplay) {
        WriteScoreBoard();
        return;
    }

GetGoalVal(GoalRow,GoalCol,buf);
    fMet = GoalMet();

DoSetAttr( fMet ? AT_BRIGHT : AT_REVERSE );

FIX_ES;
    p = fMet ? GoalMetStr : GoalNotMetStr;
    DoMessage(p);
    DoMessage(GoalStr);
    DoMessage(buf);

len = strlen(GoalDeltaStr);
    GET_CUR();
    if (_CX+len < 38) {
        DoMessage(" (");
        DoMessage(GoalDeltaStr);
    }

DoSetAttr( AT_NORMAL );
    DO_VIDEOSYNC();

ReadScoreBoard(GoalValSave);

fGoalRedisplay = FALSE;
} /* end ShowGoalVal */

/*:APPLYMOD */
flg ApplyMod(ROW row,COL col,PNUM pn)
{
    GetCellForm(row,col);
    if (cellType == T_BLANK || cellType == T_LABEL)
        return TRUE;

if (GetCellStack(row,col,&OldValue))
        return TRUE;
```

```
    if (fModToZero) {
        *pn = NUM_ZERO;
        return FALSE;
    }

FIX_ES;
    _SI = (uns) &OldValue;
        PUSH_FLT();

FIX_ES;
        _SI = (uns) &ModValue;
        PUSH_FLT();
        switch (ModType) {
        case MOD_ENTER:
            SWAP_FLT();
            DROP_FLT();
            break;
        case MOD_DELTA:
            ADD_FLT();
            break;
        case MOD_PERCENT:
            FIX_ES;
            _SI = (uns) &NUM_1_100;
            PUSH_FLT();
            MUL_FLT();
            FIX_ES;
            _SI = (uns) &NUM_ONE;
            PUSH_FLT();
            ADD_FLT();
            MUL_FLT();
            break;
        }
        FIX_ES;
        _DI = (uns) pn;
        POP_FLT();

return FALSE;
} /* end ApplyMod */

/* old value storage routines */

/*:FINDCVAL */
XCVAL FindCVal(ROW row,COL col)
{
    QCVAL qv;
    XCVAL xv;

save_emm();

for (xv=cvals; xv != XNULL; xv=qv->xNxtCVal) {
        qv = refcv(xv);
            if (qv->row == row && qv->col == col)
                break;
    } restore_emm();

return (xv);
} /* end FindCVal */

/*:ADDCVAL */
XCVAL AddCVal(ROW row,COL col,PNUM pn)
{
    QCVAL qv;
    XCVAL xv;

save_emm();

xv = allocm(sizeof(CVAL));
    if (xv != XNULL) {
        qv = refcv(xv);
        qmovmem(pn,&qv->value,sizeof(NUM));
```

```c
            qv->row = row;
            qv->col = col;
            qv->fFlip = FALSE;
            qv->xNxtCVal = cvals;
            cvals = xv;
        } restore_emm();

return (xv);
} /* end AddCVal */

/*:FREECVAL */
void FreeCVal(XCVAL xvf)
{
    XCVAL xv;
    XCVAL FAR qxv;

save_emm();

for(qxv = &cvals; (xv=*qxv) != XNULL; qxv = &refcv(xv)->xNxtCVal) {
        if (xv == xvf) {
            *qxv = refcv(xv)->xNxtCVal;
            freem(xv,sizeof(CVAL));
            break;
        }
    } restore_emm();
}

/*:FREECVALS */
void FreeCVals(void)
{
    XCVAL xv,xnxt;

save_emm();

for (xv=cvals; xv != XNULL; xv=xnxt) {
        xnxt = refcv(xv)->xNxtCVal;
        freem(xv,sizeof(CVAL));
    } cvals = XNULL;
    restore_emm();
}

/*:UPDATECURVAL */
void UpdateCurVal(void)
{
    if (FindCVal(cvRow,cvCol) == XNULL) {
        AddCVal(cvRow,cvCol,&cvVal);
    }
}

/* end BGOAL.C */
/*
    periods.c -- UI code for modifying the fiscal period specification

**  Copyright (C) 1989 Saratoga Software, Inc. All rights Reserved.
*/ include <dos.h>
include "bud.h"
#include "bemm.h"
#include "cvi.h"
include <string.h> extern PFV  periods_menu_proc[];
extern char    *periods_menu[];
extern PFV  two_choice_menu_proc[];
extern char    *periods_quit_menu[];
extern PFV  two_choice_menu_proc[];
extern char *periods_mixed_dates_menu[];
```

```c
extern char modify_periods_and_invoke_bud_string[];

extern flg   fKeepPeriods;

extern void set_status_for_leaving_cons(void);

#if COMPRESSED_MENUS == 1
extern char r1_periods_quit_menu[];
#endif

/***********************************************************************
*                                                                      *
*                   handle_periods_quit_menu                           *
*                                                                      *
*         Function:                                                    *
*             leaves the Periods mode and returns to 1-2-3 with        *
*             the original worksheet restored                          *
*         Inputs:                                                      *
*             none                                                     *
*         Outputs:                                                     *
*             none                                                     *
*                                                                      *
***********************************************************************/ void    handle_periods_quit_menu(void)
{
    DoAMenu(build_menu(periods_quit_menu, r1_periods_quit_menu, NULL),
        two_choice_menu_proc);
I   jnc no_esc
    return;   /* ESC'ed */
no_esc:

if (menu_choice == 0) /* No */
        goto done;

set_status_for_leaving_cons();
done:
    clear_carry();

}   /* end handle_periods_quit_menu */

/***********************************************************************
*                                                                      *
*                   EnterPeriods                                       *
*                                                                      *
*         Function:                                                    *
*             main entry point for the periods configuration           *
*         Inputs:                                                      *
*             none                                                     *
*         Outputs:                                                     *
*             none                                                     *
*                                                                      *
***********************************************************************/ flg EnterPeriods(void)
{
    /* suppress CALC indicator */
    get_indicator();
    _BX &= ~IND_CALC;
    set_indicator();
    do_dspind();

#if USE_INTERNAL_SAVE_AND_RETRIEVE == 0
    /* re-initialize the file buffers */
    clear_wk1_rec_contents();
endif /* do Periods menu when doing Bud menu */
    BudState = STATE_PERIODS;
    /* restore the original worksheet when leaving Periods mode (its already
       been saved) */
```

```
fConsWSDirty = TRUE;
/* exit to 1-2-3 upon returning */
fKeepPeriods = 1;

/* display the current periods definition */
display_current_periods_spec();

PostMsg(modify_periods_and_invoke_bud_string);

DoRedisplay();

return FALSE;

}  /* end EnterPeriods */

/***********************************************************************
 *                                                                     *
 *                      DoPeriodsMenu                                  *
 *                                                                     *
 *      Function:                                                      *
 *          handles the consolidation menu                             *
 *      Inputs:                                                        *
 *          none                                                       *
 *      Outputs:                                                       *
 *          none                                                       *
 *      Actions:                                                       *
 *                                                                     *
 *                                                                     *
 *                                                                     *
 ***********************************************************************/ void DoPeriodsMenu(void)
{
    /* since we might want some function following an out-of-memory
       situation, we'll leave the flag set only for the duration of
       one command */
    out_of_memory_error_occurred = 0;

DoAMenuH(periods_menu, periods_menu_proc, HS_PERIODS_CREATE);

}  /* end DoPeriodsMenu */
```

We claim:

1. In a computer having a display device, an entry device, and a processor for executing a spreadsheet program, the spreadsheet program causing a plurality of intersecting rows and columns to be displayed on the display device, some of the plurality of rows having a predefined relationship with other rows, the predefined relationship being either dominant or subordinate, a method of hiding selected ones of the plurality of rows comprising the steps of:
   a) automatically identifying a dominant row having a dominant relationship to at least one subordinate row;
   b) automatically selecting the at least one subordinate row having a subordinate relationship to the dominant row; and
   c) hiding the selected at least one subordinate row such that the at least one subordinate row is not displayed on the display device.

2. The method of claim 1 wherein each of the plurality of rows has a ranked indentation level and the step of selecting the at least one subordinate row further comprises the step of comparing the ranked indentation levels of a subset of the plurality of rows with the ranked indentation level of the dominant row to determine if a subordinate relationship exists between the rows in the subset and the dominant row.

3. The method of claim 2 wherein each of the rows in the subset has a beginning and each contains at least one blank space and the step of comparing the ranked indentation levels comprises the steps of:
   counting the number of blank spaces at the beginning of each of the rows in the subset;
   assigning a ranked indentation level to each of the rows in the subset using the counted number of the blank spaces; and
   comparing the ranked indentation level of the each of the rows in the subset to the indentation level of the dominant row.

4. The method of claim 2 wherein the step of comparing the ranked indentation levels comprises the steps of:
   identifying the subset of the plurality of rows to be a group of contiguous rows displayed below the dominant row;
   determining the indentation level of each of the rows in the subset; and
   comparing the indentation level of each of the rows int he subset with the indentation level of the dominant row.

5. The method of claim 1 wherein each of the plurality of rows has a row label containing text and the step of automatically selecting the at least one subordinate row further comprises:

comparing the text contained in the row labels of a subset of the plurality of rows with the text contained in the row label of the dominant row to locate a row having a row label including the text contained in the row label of the dominant row and additional text indicating a total row or a summary row; and identifying as the at least one subordinate row at least one of the rows displayed between the dominant row and the located row.

6. The method of claim 1 wherein the columns have column headers indicating time periods and the method further comprises the steps of:

automatically selecting at least one of the columns by examining the column headers to determine time-based groupings;

hiding the at least one selected column; and displaying at least one summary column containing totals of the hidden columns.

7. The method of claim 6 further comprising the step of displaying the selected at least one column in response to a predefined signal from the entry device.

8. The method of claim 1 further comprising the step of displaying the hidden at least one subordinate row in response to a predefined signal from the entry device.

9. The method of claim 1 further comprising the steps of:

replacing the dominant row on the display device with a summary row containing totals of the at least one subordinate row; and replacing the at least one subordinate row on the display device with rows that have not been hidden, thereby compressing the spreadsheet to create a summary view.

10. The method of claim 9 further comprising the step of constructing and displaying a label for the summary row from the label of the dominant row.

11. The method of claim 1 further comprising the steps of:

selecting a referring row not within the at least one subordinate row that contains a first formula, the first formula referring to a row within the at least one subordinate row;

storing the first formula of the selected referring row; and replacing the first formula of the selected referring row with a second formula that uses a constant to replace the reference to the row within the at least one subordinate row.

12. The method of claim 11 further comprising the steps of:

retrieving the at least one subordinate row;

retrieving the stored first formula; and replacing the second formula of the selected referring row with the retrieved first formula.

13. The method of claim 1 wherein the step of automatically identifying a dominant row comprises the step of identifying a parent row in response to a predefined signal from the entry device.

14. In a computer having a processing unit, an entry device coupled to the processing unit, a display device coupled to the processing unit, and a spreadsheet program being executed by the CPU, the spreadsheet program having a plurality of rows, the rows including at least one parent row and at least one child row, the child row having a predefined relationship to the parent row, the rows having row labels, the spreadsheet program causing a portion of the rows to be displayed on the display device, a method of hiding selected rows comprising the steps of:

a) identifying the parent row;

b) automatically selecting the at least one child row by comparing each of the row labels of a subset of the rows with the row label of the parent row to determine if the predefined relationship between the parent row and the child row exists; and c) hiding the selected at least one child row such that the selected at least one child row is not displayed on the display device.

15. The method of claim 14 wherein the row labels have ranked indentation levels and the step of automatically selecting the at least one child row further comprises the step of comparing the indentation levels of each row label of a subset of the rows with the indentation level of the row label of the parent row to determine if the predefined relationship exists.

16. The method of claim 15 wherein at least one of the plurality of rows has a blank row label and the step of comparing indentation levels comprises assigning a maximum indentation level to at least one of the plurality of rows having a blank row label.

17. The method of claim 14 wherein the row labels contain text and the step of automatically selecting the at least one child row further comprises the steps of:

comparing the text contained in each row label of a subset of the rows with the text contained in the row label of the parent row to locate a row having a row label including the text contained in the row label of the parent row and additional text indicating a total row or a summary row; and identifying as the selected child row at least one of the rows displayed between the parent row and the located row.

18. The method of claim 14, the spreadsheet having a plurality of columns intersecting the rows, the plurality of columns having column headers indicating time periods, the method further comprising the steps of:

selecting at least one of the plurality of columns by examining the column headers to determined time-based groupings;

hiding the selected at least one column; and displaying at least one summary column containing totals of the hidden columns.

19. The method of claim 14 further comprising the step of displaying the hidden at least one child row in response to a predefined signal from the entry device.

20. The method of claim 14 further comprising the steps of:

replacing the parent row on the display device with a summary row containing totals of the selected at least one child row; and replacing the selected at least one child row on the display device with rows that have not been selected, thereby compressing the spreadsheet display to create a summary view.

21. The method of claim 20 further comprising the step of constructing and displaying a label for the summary row from the label of the parent row.

22. The method of claim 14 further comprising the steps of:

selecting a referring row not within the selected at least one child row that contains a first formula, the first formula referring to a cell within the group of children rows;

storing the first formula of the selected referring row; and replacing the first formula of the selected referring row with a second formula that uses a constant to replace the reference to the row within the selected at least one child row.

23. The method of claim 22 further comprising the steps of:

retrieving the selected at least one child row;

retrieving the stored first formula; and replacing the second formula of the selected referring row with the retrieved first formula.

24. In a computer having random access memory (RAM), a processing unit coupled to the RAM, an entry means coupled to the processing unit, a display means coupled to the processing unit, and a spreadsheet program being executed by the processing unit, the spreadsheet program having a plurality of rows, the plurality of rows including at least one parent row, at least one child row, and at least one total row, the child row having a predefined relationship to the parent row, the total row containing a formula indicative of the predefined relationship of the child row to the parent row, the spreadsheet program causing a portion of the plurality of rows to be displayed on the display means, a method of hiding selected rows comprising the steps of:

a) identifying the parent row;

b) automatically identifying the total row by examining the contents of a subset of the plurality of rows to locate a row containing a formula indicative of the predefined relationship of the child row to the parent row;

c) automatically selecting the at least one child row by selecting at least one of the rows displayed between the parent row and the total row; and d) hiding the selected at least one child row such that the selected at least one child row is not displayed on the display means.

25. The method of claim 24 further comprising the steps of:

replacing the parent row on the display means with the total row; and replacing the selected at least one child row on the display device with rows that have not been selected, thereby compressing the spreadsheet to create a summary view.

* * * * *